US012130740B2

(12) United States Patent
Brandt et al.

(10) Patent No.: US 12,130,740 B2
(45) Date of Patent: Oct. 29, 2024

(54) APPARATUSES AND METHODS FOR A PROCESSOR ARCHITECTURE

(71) Applicant: Intel Corporation, Santa Clara, CA (US)

(72) Inventors: Jason W. Brandt, Austin, TX (US); Robert S. Chappell, Portland, OR (US); Jesus Corbal, King City, OR (US); Edward T. Grochowski, San Jose, CA (US); Stephen H. Gunther, Beaverton, OR (US); Buford M. Guy, Austin, TX (US); Thomas R. Huff, Hillsboro, OR (US); Christopher J. Hughes, Santa Clara, CA (US); Elmoustapha Ould-Ahmed-Vall, Chandler, AZ (US); Ronak Singhal, Portland, OR (US); Seyed Yahya Sotoudeh, San Jose, CA (US); Bret L. Toll, Hillsboro, OR (US); Lihu Rappoport, Haifa (IL); David B. Papworth, Cornelius, OR (US); James D. Allen, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/712,632

(22) Filed: Apr. 4, 2022

(65) Prior Publication Data
US 2022/0237123 A1 Jul. 28, 2022

Related U.S. Application Data

(63) Continuation of application No. 16/115,067, filed on Aug. 28, 2018, now Pat. No. 11,294,809, which is a
(Continued)

(51) Int. Cl.
G06F 12/0831 (2016.01)
G06F 9/30 (2018.01)
(Continued)

(52) U.S. Cl.
CPC ...... *G06F 12/0831* (2013.01); *G06F 9/30043* (2013.01); *G06F 9/384* (2013.01);
(Continued)

(58) Field of Classification Search
USPC ........................................ 712/217
See application file for complete search history.

(56) References Cited

U.S. PATENT DOCUMENTS 5,442,802 A * 8/1995 Brent .................. G06F 13/28
711/147
5,471,633 A * 11/1995 Colwell ............ G06F 9/30112
712/216
(Continued)

FOREIGN PATENT DOCUMENTS

CN 1231443 A 10/1999
CN 101127008 A 2/2008
(Continued)

OTHER PUBLICATIONS

Decision to Grant a Patent, JP App. No. 2019-521670, May 24, 2022, 3 pages (2 pages of English Translation and 1 page of Original Document).
(Continued)

Primary Examiner — Yaima Rigol
(74) Attorney, Agent, or Firm — Nicholson De Vos Webster & Elliott LLP

(57) ABSTRACT

Embodiments of an invention a processor architecture are disclosed. In an embodiment, a processor includes a decoder, an execution unit, a coherent cache, and an interconnect. The decoder is to decode an instruction to zero a
(Continued)

cache line. The execution unit is to issue a write command to initiate a cache line sized write of zeros. The coherent cache is to receive the write command, to determine whether there is a hit in the coherent cache and whether a cache coherency protocol state of the hit cache line is a modified state or an exclusive state, to configure a cache line to indicate all zeros, and to issue the write command toward the interconnect. The interconnect is to, responsive to receipt of the write command, issue a snoop to each of a plurality of other coherent caches for which it must be determined if there is a hit.

15 Claims, 68 Drawing Sheets

Related U.S. Application Data continuation of application No. 15/376,647, filed on Dec. 12, 2016, now Pat. No. 10,282,296.

(51) Int. Cl.
  *G06F 9/38* (2018.01)
  *G06F 12/1009* (2016.01)
  *G06F 12/1027* (2016.01)
(52) U.S. Cl.
  CPC ...... *G06F 12/1009* (2013.01); *G06F 12/1027* (2013.01); *G06F 2212/1016* (2013.01); *G06F 2212/621* (2013.01); *G06F 2212/68* (2013.01)

(56) References Cited

U.S. PATENT DOCUMENTS

| | | | |
|---|---|---|---|
| 5,497,493 A * | 3/1996 | Colwell | G06F 9/3826 |
| | | | 712/E9.046 |
| 5,551,001 A | 8/1996 | Cohen et al. | |
| 5,692,152 A | 11/1997 | Cohen et al. | |
| 5,717,898 A | 2/1998 | Kagan et al. | |
| 5,809,548 A | 9/1998 | Chang et al. | |
| 6,018,763 A | 1/2000 | Hughes et al. | |
| 6,178,461 B1 | 1/2001 | Chan et al. | |
| 6,233,671 B1 | 5/2001 | Abdallah et al. | |
| 6,249,845 B1 | 6/2001 | Nunez et al. | |
| 6,336,160 B1 * | 1/2002 | Eickemeyer | G06F 9/384 |
| | | | 712/217 |
| 6,345,339 B1 | 2/2002 | Arimilli et al. | |
| 6,374,330 B1 | 4/2002 | Arimilli et al. | |
| 6,463,507 B1 | 10/2002 | Arimilli et al. | |
| 6,950,903 B2 | 9/2005 | Solomon et al. | |
| 6,970,976 B1 | 11/2005 | Arimilli et al. | |
| 7,454,577 B2 | 11/2008 | Fields et al. | |
| 7,856,633 B1 | 12/2010 | Lee et al. | |
| 8,195,917 B2 | 6/2012 | Hohmuth et al. | |
| 8,352,646 B2 | 1/2013 | Cox et al. | |
| 9,336,004 B2 | 5/2016 | King | |
| 9,344,091 B2 | 5/2016 | Jayasena et al. | |
| 9,430,237 B2 | 8/2016 | Rupley et al. | |
| 9,454,371 B2 | 9/2016 | Madduri et al. | |
| 9,760,490 B2 * | 9/2017 | Daly | G06F 12/084 |
| 2004/0103248 A1 | 5/2004 | Hass et al. | |
| 2004/0215886 A1 | 10/2004 | Cargnoni et al. | |
| 2004/0225845 A1 | 11/2004 | Kruckemyer et al. | |
| 2005/0071573 A1 | 3/2005 | Dodson et al. | |
| 2006/0179245 A1 | 8/2006 | Fields et al. | |
| 2006/0265553 A1 | 11/2006 | Arimilli et al. | |
| 2007/0226423 A1 | 9/2007 | Arimilli et al. | |
| 2007/0226427 A1 | 9/2007 | Guthrie et al. | |
| 2008/0040556 A1 | 2/2008 | Fields et al. | |
| 2008/0046658 A1 | 2/2008 | Goodman et al. | |
| 2009/0276578 A1 | 11/2009 | Moyer | |
| 2010/0106916 A1 | 4/2010 | Gunna et al. | |
| 2012/0005459 A1 | 1/2012 | Fleischman et al. | |
| 2013/0038474 A1 * | 2/2013 | Baba | G06F 9/30032 |
| | | | 341/60 |
| 2013/0046936 A1 | 2/2013 | Tran | |
| 2013/0262778 A1 | 10/2013 | Ghai et al. | |
| 2013/0275720 A1 * | 10/2013 | Keller | G06F 9/30181 |
| | | | 712/205 |
| 2014/0189324 A1 * | 7/2014 | Combs | G06F 12/0292 |
| | | | 712/225 |
| 2014/0201498 A1 | 7/2014 | Ould-Ahmed-Vall et al. | |
| 2014/0237185 A1 | 8/2014 | Solihin | |
| 2014/0281432 A1 * | 9/2014 | Anderson | G06F 9/30032 |
| | | | 712/226 |
| 2014/0310504 A1 * | 10/2014 | Kadgi | G06F 9/30098 |
| | | | 712/32 |
| 2014/0372732 A1 | 12/2014 | Fleischman et al. | |
| 2015/0121046 A1 | 4/2015 | Kunjan et al. | |
| 2015/0121050 A1 | 4/2015 | Williams et al. | |
| 2016/0092366 A1 | 3/2016 | Pal et al. | |
| 2016/0217080 A1 | 7/2016 | Solihin | |
| 2016/0299845 A1 | 10/2016 | Gschwind et al. | |
| 2016/0299846 A1 | 10/2016 | Gschwind et al. | |

FOREIGN PATENT DOCUMENTS

| | | |
|---|---|---|
| CN | 101944012 A | 1/2011 |
| JP | 03-231345 A | 10/1991 |
| JP | 05-204756 A | 8/1993 |
| JP | 11-272556 A | 10/1999 |
| JP | 2000-235558 A | 8/2000 |
| JP | 2006-323845 A | 11/2006 |
| TW | 510990 B | 11/2002 |
| TW | 200515277 A | 5/2005 |
| WO | 2016/141817 A1 | 9/2016 |

OTHER PUBLICATIONS

Office Action, CN App. No. 201680090755.2, Nov. 28, 2022, 14 pages (06 pages of English Translation and 8 pages of Original Document).
Su, Dong, "On The FPGA Design and Implementation of the Turbo Encoder and Decoder Based on Frame Splitting and Trellis Zero Terminating", Mar. 2010, 80 pages.
Tao et al., "An Energy-Efficient Lat Level Cache Design Using Software and Hardware Collaborative Region-based Management", Journal of Computer-Aided Design & Computer Graphics, vol. 25, No. 11, Nov. 2013, 10 pages.
Tezuka et al., "Pin-down Cache: A Virtual Memory Management Technique for Zero-copy Communication", Proceedings of the First Merged International Parallel Processing Symposium and Symposium on Parallel and Distributed Processing), 2002, 8 pages.
Advisory Action, U.S. Appl. No. 16/115,067, Nov. 15, 2021, 3 pages.
Clark M., "A New X86 Core Architecture for the Next Generation of Computing," Hot chips 28, Aug. 23, 2016, 19 pages.
Cutress I., "Amd Zen Microarchiture Part 2: Extracting Instruction-Level Parallelism," AnandTech, Aug. 23, 2016, downloaded from http://www.anandtech.com/print/10591/amd-zen-microarchiture-part-2-extracting-instructionlevel-parallelism on Nov. 15, 2016, 20 pages.
Decision of Refusal, JP App. No. 2019-521670, Nov. 2, 2021, 7 pages (4 pages of English Translation and 3 pages of Original Document).
Decision to grant a European patent pursuant to Article 97(1) EPC, 16923787, Jul. 22, 2021, 2 pages.
European Search Report and Search Opinion, EP App. No. 16923787.2, Jun. 16, 2020, 9 pages.
European Search Report and Search Opinion, EP App. No. 21168711.6, Sep. 1, 2021, 9 pages.
Examination Report, IN App. No. 201947019036, Jan. 26, 2021, 6 pages.
Final Office Action, U.S. Appl. No. 16/115,067, Aug. 31, 2021, 9 pages.
Final Office Action, U.S. Appl. No. 16/115,067, Jan. 29, 2021, 10 pages.

(56) References Cited

OTHER PUBLICATIONS

Intention to Grant, EP App. No. 16923787.2, Mar. 10, 2021, 8 pages.
International Preliminary Report on Patentability for Application No. PCT/US2016/066242, Jun. 27, 2019, 8 pages.
International Search Report and Written Opinion for Application No. PCT/US2016/066242, Sep. 1, 2017, 11 pages.
Non-Final Office Action, U.S. Appl. No. 16/115,067, Aug. 10, 2020, 6 pages.
Non-Final Office Action, U.S. Appl. No. 16/115,067, May 14, 2021, 13 pages.
Notice of Allowance from U.S. Appl. No. 15/376,647, Aug. 14, 2018, 8 pages.
Notice of Allowance from U.S. Appl. No. 15/376,647, Jan. 18, 2019, 7 pages.
Notice of Allowance, TW App. No. 106138929, Oct. 25, 2021, 3 pages (1 page of English Translation and 2 pages of Original Document).
Notice of Allowance, U.S. Appl. No. 16/115,067, Dec. 9, 2021, 11 pages.
Notice of Allowance, U.S. Appl. No. 16/115,067, Jan. 12, 2022, 8 pages.
Notice of Reasons for Refusal, JP App. No. 2019-521670, Jan. 5, 2021, 10 pages (6 pages of English Translation and 4 pages of Original Document).
Office Action, TW App. No. 106138929, Jun. 16, 2021, 6 pages (3 pages of English Translation and 3 pages of Original Document).
Stephens N., et al., "ARMvB-A Next-Generation Vector Architecture for HPC, Introduction of Fujitsu's HPC Processor for the Post-K Computer," Aug. 22, 2016, ARM, Hot chips 28, 31 pages.
Office Action, TW App. No. 111102764, Apr. 25, 2023, 6 pages (3 pages of English Translation and 3 pages of Original Document).
Intention to Grant, EP App. No. 21168711.6, May 25, 2023, 5 pages.
Decision to grant, EP App. No. 21168711.6, Oct. 6, 2023, 2 pages.
Office Action, TW App. No. 111102764, Oct. 30, 2023, 17 pages (8 pages of English Translation and 9 pages of Original Document).
Second Office Action, CN App. No. 201680090755.2, Feb. 6, 2024, 09 pages (04 pages of English Translation and 05 pages of Original Document).
Wei, L., et al., "Using Write Mask to Support Hybrid Write-Back and Write-Through Cache Policy on Many-Core Architectures", Chinese Journal of Computers, vol. 31, No. 11, Nov. 2008, pp. 1918-1928.
Notice of Allowance, TW App. No. 111102764, May 1, 2024, 03 pages (1 page of English Translation and 02 pages of Original Document).
Notice of Allowance, CN App. No. 201680090755.2, Jun. 17, 2024, 04 pages (02 pages of English Translation and 02 pages of Original Document).

* cited by examiner

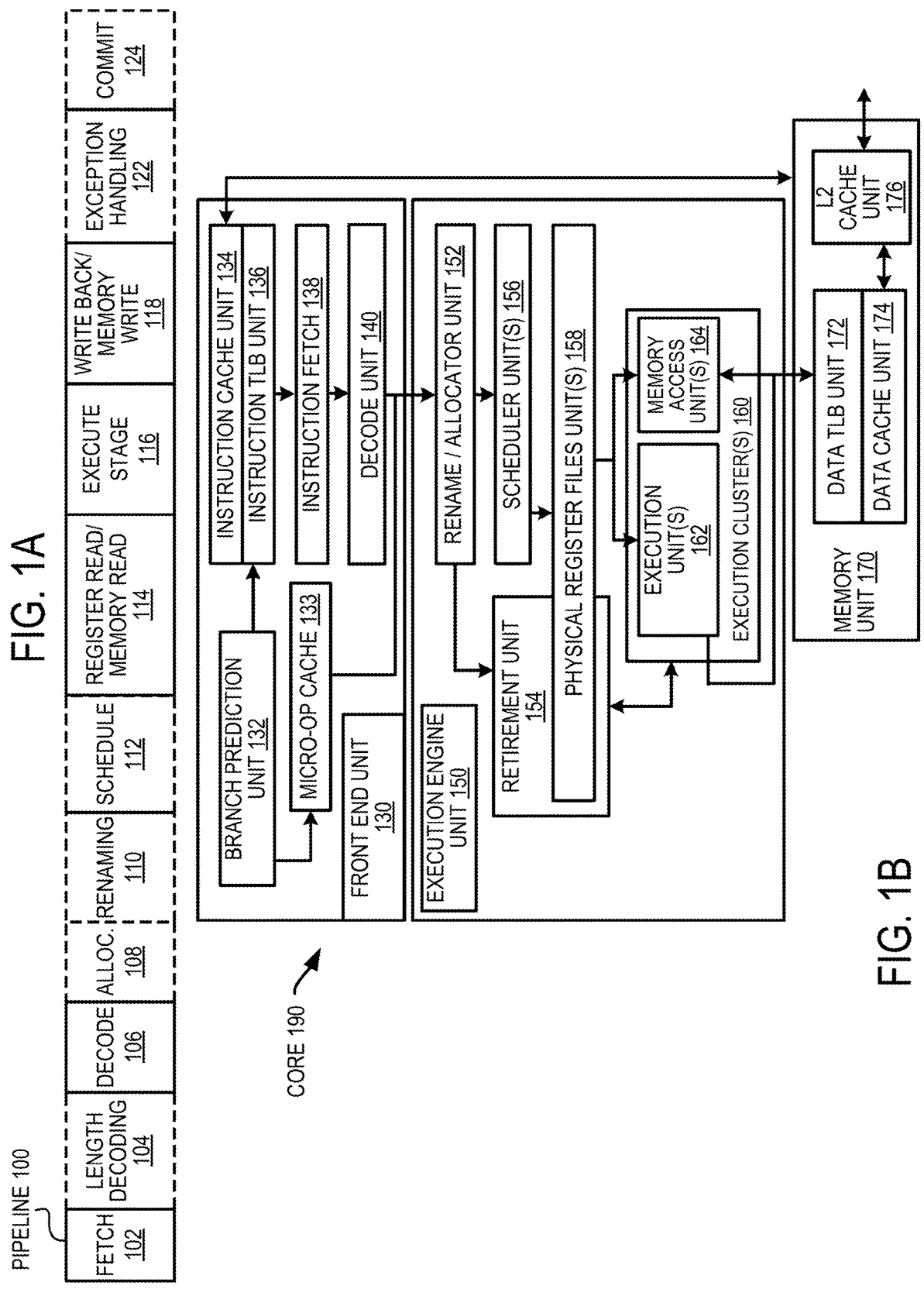

R0 = MOV.ZE R1

| PRFID | Z | SE | ZE |
|---|---|---|---|
| R0 | A | 0 | 0 | 1 |
| R1 | A | 0 | 0 | 0 |
| ... | | | | |

RAT 3000

FIG. 30

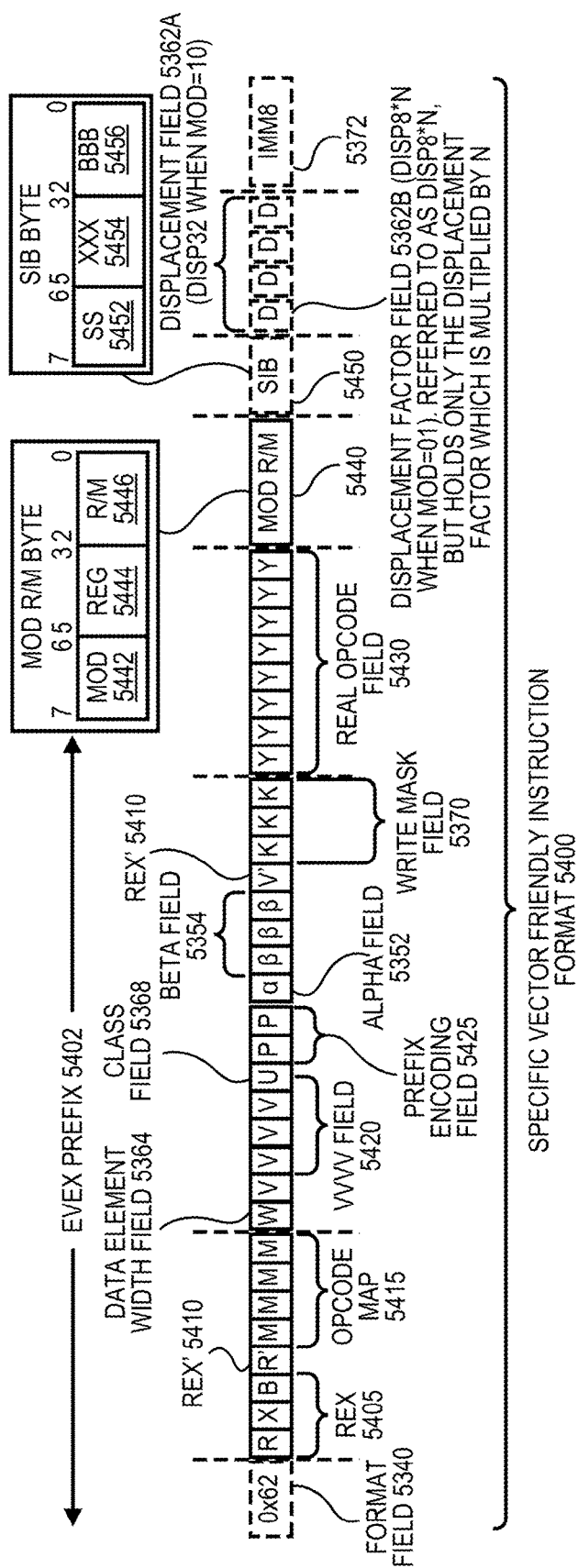
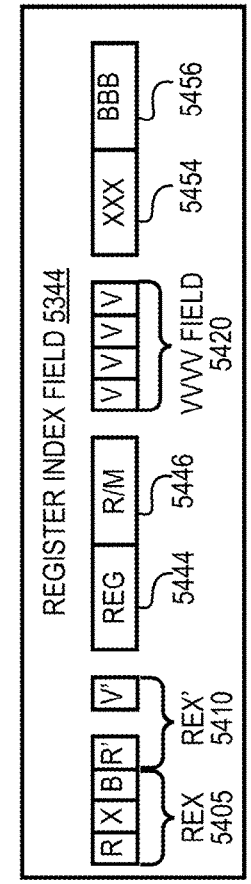
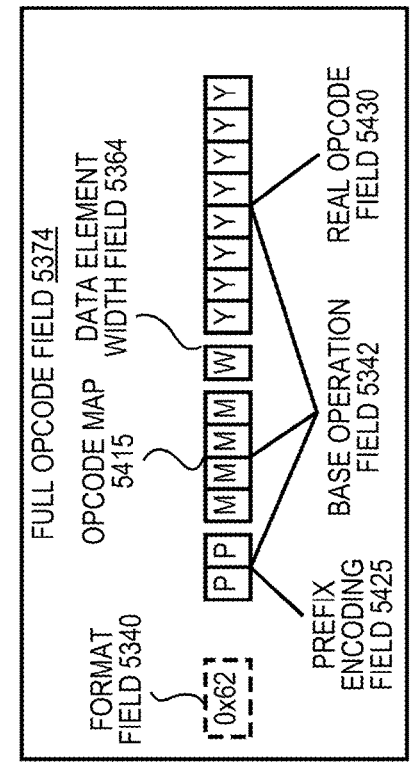
FIG. 54A
FIG. 54B
FIG. 54C

APPARATUSES AND METHODS FOR A PROCESSOR ARCHITECTURE

FIELD OF THE INVENTION

The field of invention relates generally to computers, and, more specifically, to processor architectures.

BACKGROUND

Processors include many interconnected circuits and structures that function together to execute instructions and process information. These circuits and structures and the features they provide may be included in a processor in many different configurations and combinations.

BRIEF DESCRIPTION OF THE DRAWINGS

The present invention is illustrated by way of example and not limitation in the figures of the accompanying drawings, in which like references indicate similar elements and in which:

FIG. 1A is a block diagram illustrating both an exemplary in-order pipeline and an exemplary register renaming, out-of-order issue/execution pipeline according to embodiments of the invention;

FIG. 1B is a block diagram illustrating both an exemplary embodiment of an in-order architecture core and an exemplary register renaming, out-of-order issue/execution architecture core to be included in a processor according to embodiments of the invention;

FIG. 2A is a block diagram of a single processor core, along with its connection to the on-die interconnect network 202 and with its local subset of the Level 2 (L2) cache 204, according to embodiments of the invention;

FIG. 2B is an expanded view of part of the processor core in FIG. 2A according to embodiments of the invention;

FIG. 30 is a block diagram illustrating a RAT extended to include zero idioms, sign extension, and zero extension according to embodiments;

FIG. 49 shows a block diagram of a system in accordance with one embodiment of the present invention;

FIG. 50 is a block diagram of a first more specific exemplary system in accordance with an embodiment of the present invention;

FIG. 51 is a block diagram of a second more specific exemplary system in accordance with an embodiment of the present invention;

FIG. 52 is a block diagram of a system-on-chip (SoC) in accordance with an embodiment of the present invention;

FIG. 53A is a block diagram illustrating a generic vector friendly instruction format and class A instruction templates thereof according to embodiments of the invention;

FIG. 53B is a block diagram illustrating the generic vector friendly instruction format and class B instruction templates thereof according to embodiments of the invention;

FIG. 54A is a block diagram illustrating an exemplary specific vector friendly instruction format according to embodiments of the invention;

FIG. 54B is a block diagram illustrating the fields of a specific vector friendly instruction format that make up the full opcode field according to one embodiment of the invention;

FIG. 54C is a block diagram illustrating the fields of a specific vector friendly instruction format that make up the register index field according to one embodiment of the invention;

DETAILED DESCRIPTION

Figure 2B:
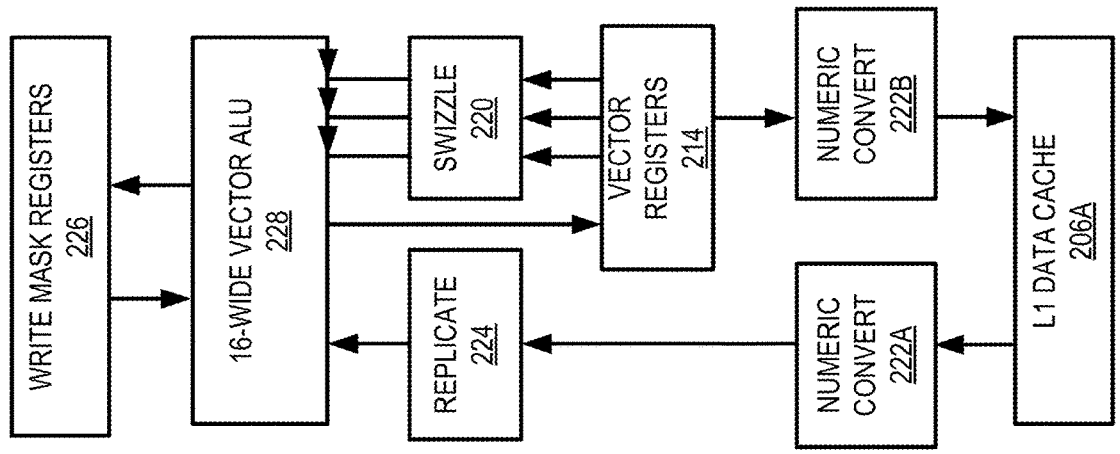
FIGS. 2A-B illustrate a block diagram of a more specific exemplary core architecture, which core would be one of several logic blocks (including other cores of the same type and/or different types) in a chip.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An apparatus, such as a computer, to process information may include one or more processor cores. Each processor core may include a variety of circuitry, hardware, structures, and other features, where each alone, or any number together in combination, may be referred to as a feature. Features may be implemented and/or arranged in various ways, employ various techniques, and be involved in performing various methods to attempt to achieve desired levels, in various combinations, of performance, power consumption, and/or other characteristics (e.g., increasing performance, decreasing power consumption and implementing power-saving features, and improving fairness, minimum performance guarantees, throughput, instructions per clock (IPC), instructions per unit time, quality of service, time and/or memory efficiency, to list just a few of the applicable criteria). Embodiments of the invention may include one or more of the features described in this specification. Some examples of architectures and systems in which the invention may be embodied are provided in the figures and description in this specification.

Processor cores in which the invention may be embodied may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die the described CPU (sometimes referred to as the application core(s) or application processor(s)), the above described coprocessor, and additional functionality.

Exemplary core architectures are described next, followed by descriptions of exemplary processors and computer architectures. Each processor may include one or more cores, where each core and/or combination of cores may be architected and designed to execute one or more threads, processes, or other sequences of instructions at various times. Core architectures and design techniques may provide for and/or support the concurrent execution of multiple threads, according to any of a type of approaches known as simultaneous (or symmetric) multi-threading (SMT) or any other approach. Accordingly, processor cores in which the invention may be embodied, including those described as examples below, may include various novel features architected and designed to support SMT and/or various known features modified in various novel ways to support SMT, as may be described below. For ease of description, the meaning of the term SMT in this specification may include SMT in combination with any other approach to multi-threading (e.g., time-slicing).

As mentioned above and explained in more detail below, embodiments of the present disclosure may be desirable for a variety of reasons, including, e.g., increasing performance, decreasing power consumption and implementing power-saving features, and improving fairness, minimum performance guarantees, throughput, instructions per clock (IPC), instructions per unit time, quality of service, time and/or memory efficiency, to list just a few of the applicable criteria. The desirable criteria listed above and described herein are exemplary; as explained herein, the present disclosure is may be desirable for any of the reasons listed above, individually or in combination, and may further be desirable for additional reasons not specifically enumerated above.

Further, as mentioned above and explained in more detail below, embodiments of the present disclosure may apply to any type of processor or processing element, including general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor or processors may be implemented on one or more chips. The processor or processors 3600 may be a part of and/or may be implemented on one or more substrates using any of a number of process technologies, such as, for example, BiCMOS, CMOS, or NMOS. The processors and processing devices listed above and described herein are exemplary; as explained herein, the present disclosure is applicable to any processor or processing device.

Further, as mentioned above and explained in more detail below, embodiment of the present disclosure may apply to processors or processing elements using a wide variety of instruction sets and instruction set architectures, including for example, the x86 instruction set (optionally including extensions that have been added with newer versions); the MIPS instruction set of MIPS Technologies of Sunnyvale, CA; the ARM instruction set (with optional additional extensions such as NEON) of ARM Holdings of Sunnyvale, CA; IBM's "Power" instruction set, or any other instruction set, including both RISC and CISC instruction sets. The instruction sets and instruction set architectures listed above and described herein are exemplary; as explained herein, the present disclosure is applicable to any instruction set or instruction set architecture.

Exemplary Core Architectures

In-Order and Out-of-Order Core Block Diagram

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like. For example, as explained above, core 190 may be any member of a set containing: general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device.

The front end unit 130 includes a branch prediction unit 132 coupled to a micro-op cache 133 and an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The micro-operations, micro-code entry points, microinstructions, etc. may be stored in at least the micro-op cache 133. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The micro-op cache 133 and the decode unit 140 are coupled to a rename/allocator unit 152 in the execution engine unit 150. In various embodiments, a micro-op cache such as 133 may also or instead be referred to as an op-cache, u-op cache, uop-cache, or μop-cache; and micro-operations may be referred to as micro-ops, u-ops, uops, and μops.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA, IBM's "Power" instruction set, or any other instruction set, including both RISC and CISC instruction sets), including the instruction(s) described herein. In one embodiment, the core 190 includes logic to support a packed data instruction set extension (e.g., AVX, AVX2, AVX-512), thereby allowing the operations used by many multimedia applications to be performed using packed data.

It should be understood that the core may support multi-threading (executing two or more parallel sets of operations or threads), and may do so in a variety of ways including time sliced multithreading, SMT (e.g., a single physical core provides a logical core for each of the threads that physical core is simultaneously multithreading), or a combination thereof (e.g., time sliced fetching and decoding, and SMT thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache(s) may be external to the core and/or the processor.

Specific Exemplary Core Architecture

Figure 2A:
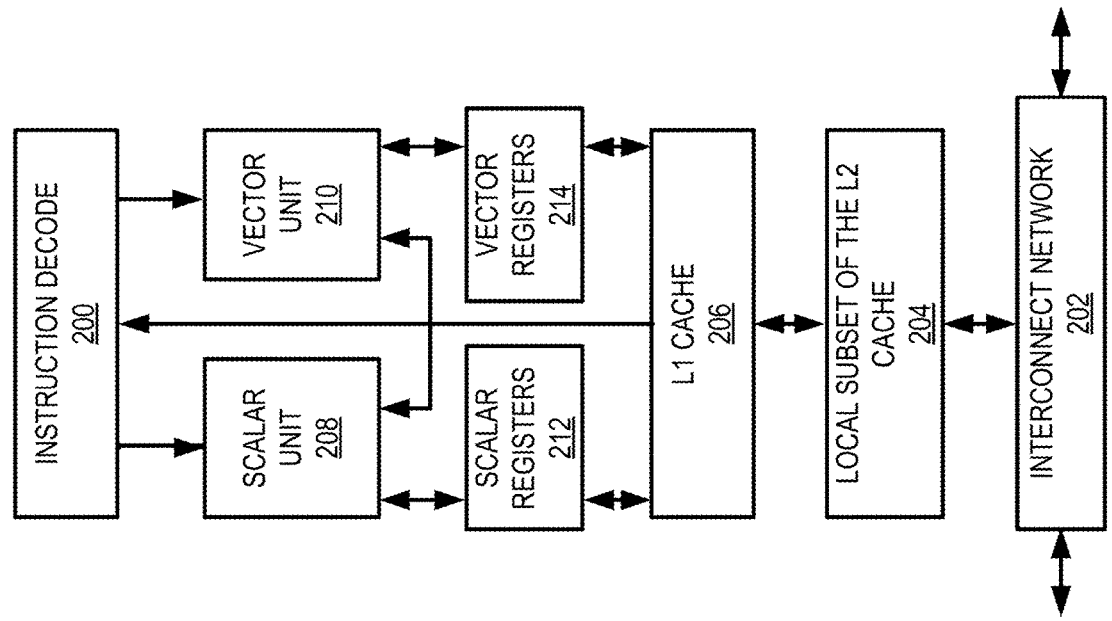

FIGS. 2A-B illustrate a block diagram of a more specific exemplary core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring datapath is 1012-bits wide per direction.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 16-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input. Write mask registers 226 allow predicating resulting vector writes.

Specific Exemplary Out-of-Order Core Architecture

Figure 3:
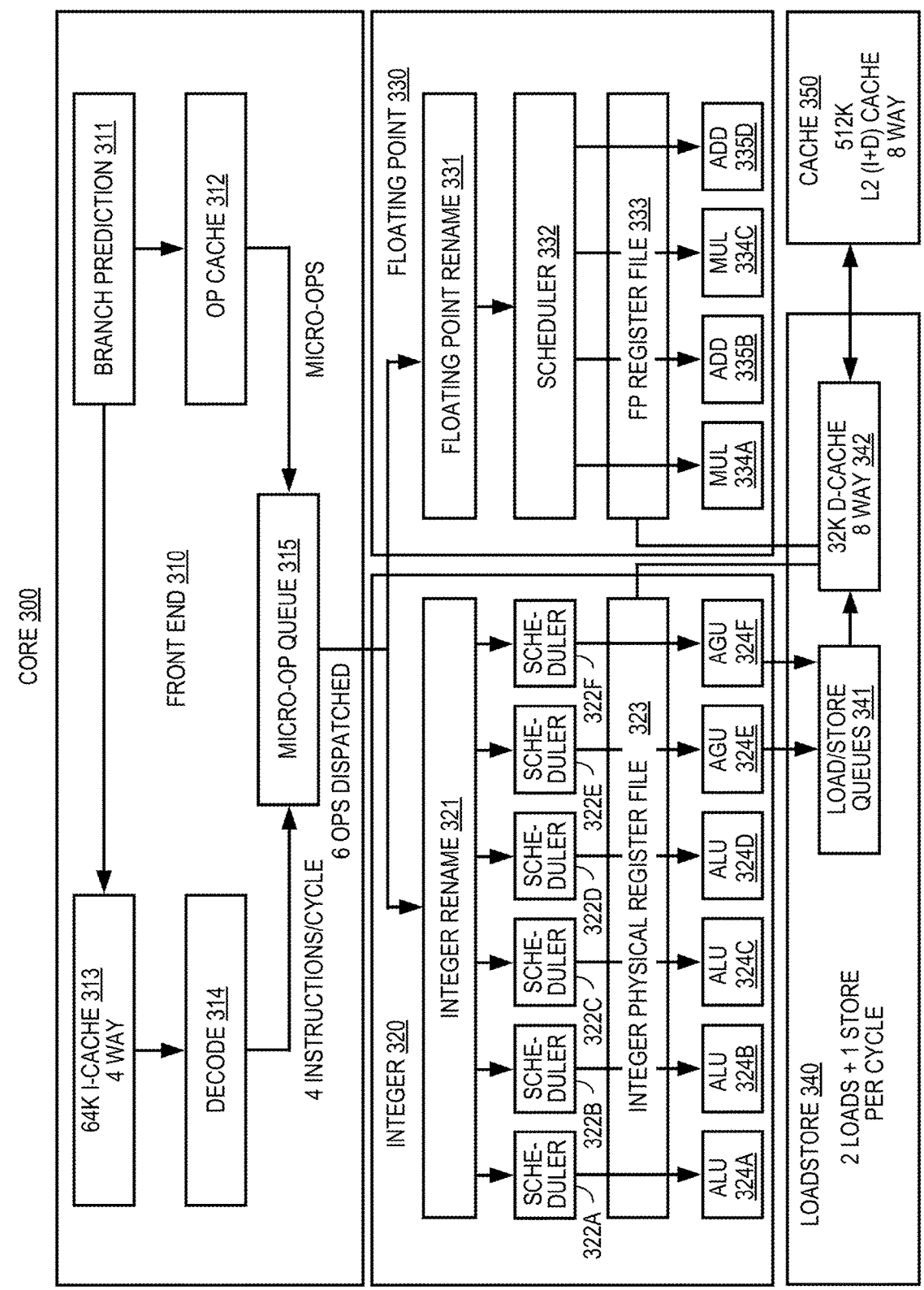
FIG. 3 is a block diagram of an illustrative out-of-order issue/execution processor core that may be included in a processor according to embodiments of the invention.

FIG. 3 is a block diagram of an illustrative out-of-order issue/execution processor core that may be included in a processor according to embodiments of the invention. In FIG. 3, processor core 300 includes front-end unit 310, integer unit 320, FP unit 330, load-store unit 340, and level 2 (L2) cache unit 350. FIG. 3 is provided for illustrative purposes, and as such, shows various units arranged and named according to one of many approaches that are possible according to embodiments of the present invention. Any one or more embodiments may be illustrated in one or more ways. Each unit shown in FIG. 3 may include circuitry and/or structures that may be included in other units in other representations of embodiments. For example, front-end unit 310 may additionally or alternatively be illustrated and described as including a fetch unit, such as fetch unit 400 in FIG. 4, and a decode unit, such as decode unit 500 in FIG. 5; any or all of integer unit 320, FP unit 330, and load-store unit 340 may additionally or alternatively be illustrated and described, separately or collectively, as one or more execution units; and so on. Furthermore, various units within core 300 may be coupled in various ways; therefore, for convenience, different figures may show units within different larger units; for example, a particular unit may be shown within a first larger unit in a first figure and within a second larger unit in a second figure.

In FIG. 3, front-end unit 310 includes branch prediction unit 311, micro-operation-cache (op-cache) unit 312, instruction cache (i-cache) unit 313, decode unit 314, and micro-operation (micro-op) queue unit 315. Branch prediction unit 311 includes branch prediction circuitry, such as a branch-target buffer (BTB), to reduce average branch delay and is coupled to op-cache unit 312 and i-cache unit 313. Op-cache unit 312 includes an op-cache in which to cache micro-ops associated with instructions. I-cache 313 unit includes an i-cache, which in an embodiment may be a 64K, four-way i-cache, in which to cache instructions. I-cache unit 313 is coupled to decode unit 314 to provide cached instructions to be decoded. Decode unit 314 includes decoding circuitry, such as an instruction decoder, to decode instructions. In an embodiment, front-end unit 310 may fetch and decode unit 314 may decode up to four instructions per clock cycle. Op-cache unit 312 and decode unit 314 are each coupled to micro-op queue unit 315 to provide two paths for loading micro-ops into micro-op queue unit 315. Micro-op queue unit 315 includes a micro-op queue, which in an embodiment may dispatch six micro-ops per cycle to one or more execution units.

Also in FIG. 3, integer unit 320 includes integer rename unit 321; integer scheduler units 322A, 322B, 322C, 322D, 322E, and 322F (collectively, integer scheduler units 322); integer physical register file 323; arithmetic-logic units (ALUs) 324A, 324B, 324C, and 324D (collectively, ALUs 324); and address generation units (AGUs) 325A and 325B (collectively, AGUs 325). Integer rename unit 321 is coupled to micro-op queue unit 315 to receive one or more micro-ops to be executed, in whole or in part, by one or more of ALUs 324 and/or AGUs 325. Integer rename unit 321 includes register renaming circuitry and is also coupled to integer scheduler units 322, which in turn are coupled to integer physical register file 323, to provide for integer-register renaming. Integer scheduler units 322 include scheduling circuitry for scheduling micro-ops to be executed, in whole or in part, by one or more of ALUs 324 and/or AGUs 325. Integer physical register file 323 includes a file of physical integer registers, which in an embodiment may include 168 physical integer registers. Each of ALUs 324 and AGUs 325 are coupled to physical register file 323 to receive values to be used as inputs in the execution of micro-ops and/or to provide values as outputs of the execution of micro-ops.

Also in FIG. 3, FP unit 330 includes FP rename unit 331, FP scheduler unit 332, FP register file 333, FP multipliers 334A and 334B (collectively, FP multipliers 334), and FP adders 335A and 335B (collectively, FP adders 335). FP rename unit 331 is coupled to micro-op queue unit 315 to receive one or more micro-ops to be executed, in whole or in part, by one or more of FP multipliers 334 and/or FP adders 335. FP rename unit 331 includes register renaming circuitry and is also coupled to FP scheduler unit 332, which in turn are coupled to FP register file 333, to provide for FP-register renaming. FP scheduler unit 332 includes scheduling circuitry for scheduling micro-ops to be executed, in whole or in part, by one or more of FP multipliers 334 and/or FP adders 335. Each of FP multipliers 334 and FP adders 335 are coupled to FP register file 333 to receive values to be used as inputs in the execution of micro-ops and/or to provide values as outputs of the execution of micro-ops.

Also in FIG. 3, load-store unit 340 includes load-store queue unit 341 and data cache (d-cache) unit 342. Load-store queue unit 341 may include any number of load and/or store queues, in an embodiment providing for two loads and one store per clock cycle, coupled to AGUs 325 to receive memory addresses for load and/or store operations. D-cache unit 342 includes a d-cache, which in an embodiment may be a 32K, eight-way level 1 (L1) d-cache, in which to cache data, coupled to integer physical register file 323, FP register file 333, and load-store queue unit 341 to receive and provide data generated by and to be used in the execution of micro-ops.

Also in FIG. 3, L2 cache unit 350 includes an L2 cache, which in an embodiment may be a 512K, eight-way cache, in which to cache instructions and data.

Figure 4:
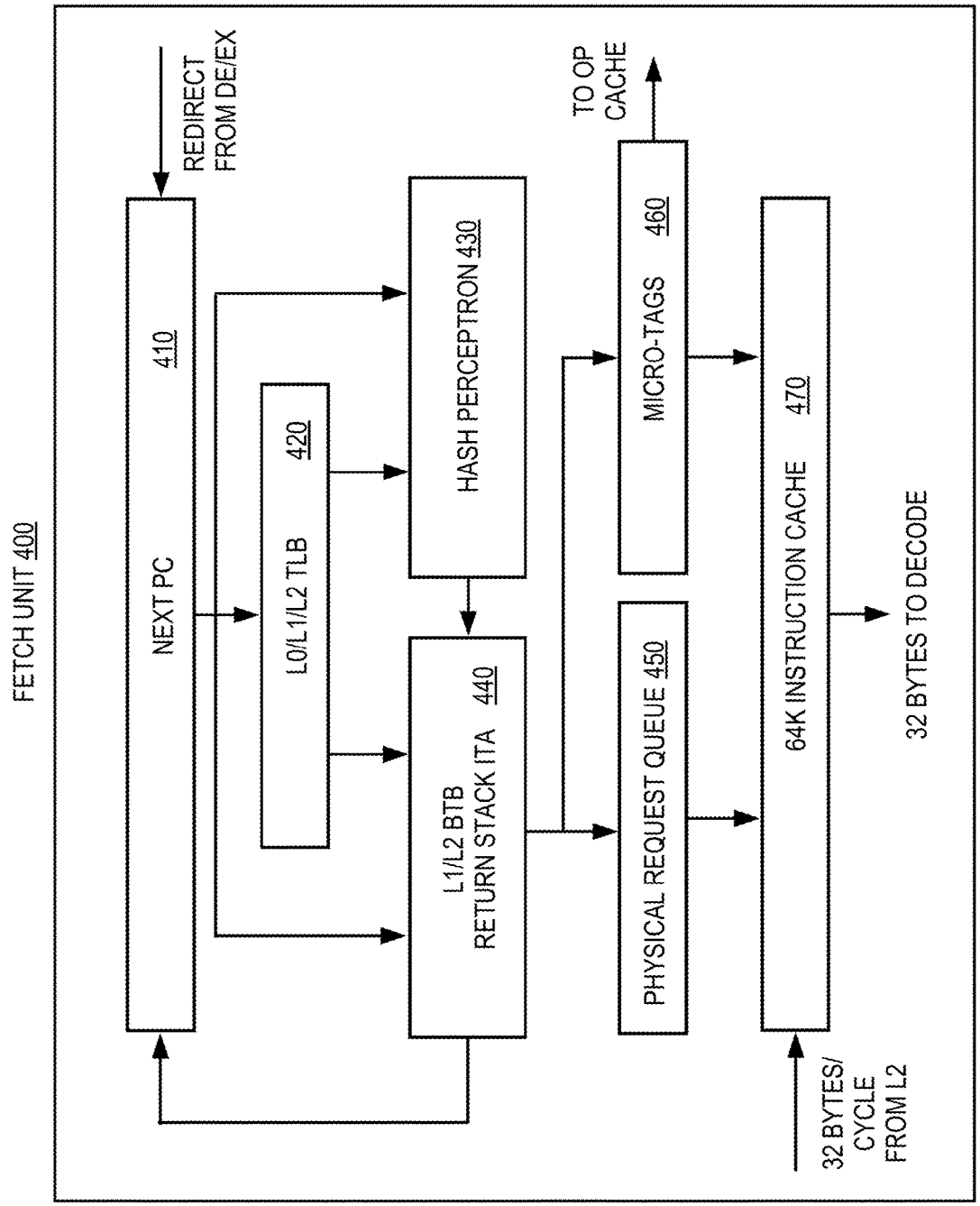
FIG. 4 is a block diagram of an illustrative fetch unit that may be included in a processor core, such as that of FIG. 3, and/or a processor according to embodiments of the invention.

FIG. 4 is a block diagram of an illustrative fetch unit that may be included in a processor core, such as core 300 of FIG. 3, and/or a processor according to embodiments of the invention. In FIG. 4, fetch unit 400 includes next-program-count (PC) unit 410, translation lookaside buffer (TLB) unit 420, hash perceptron unit 430, BTB return stack indirect target array (ITA) unit 440, physical request queue unit 450, micro-tag unit 460, and i-cache unit 470.

Figure 5:
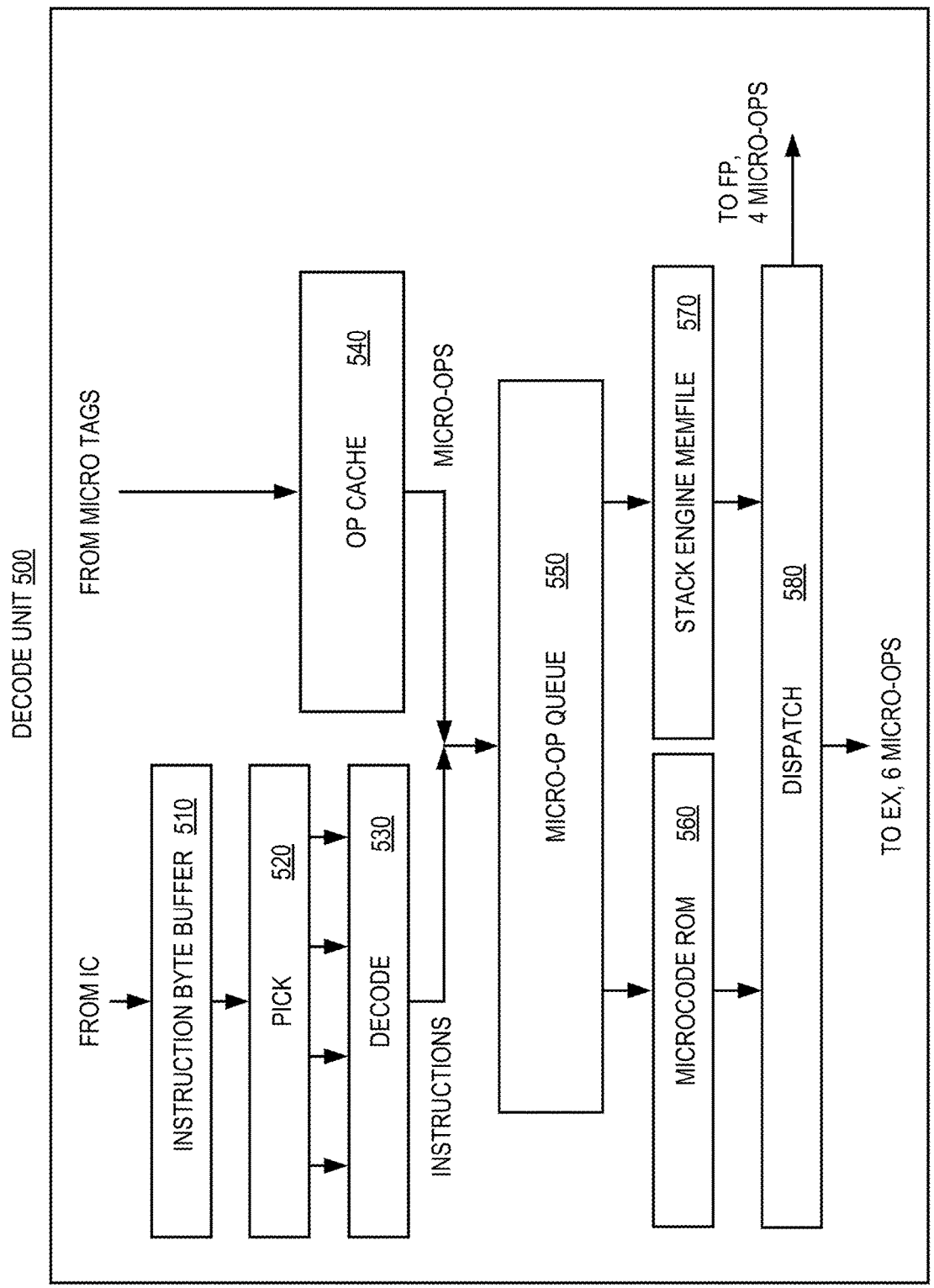
FIG. 5 is a block diagram of an illustrative decode unit that may be included in a processor core, such as that of FIG. 3, and/or a processor according to embodiments of the invention.

FIG. 5 is a block diagram of an illustrative decode unit that may be included in a processor core, such as core 300 of FIG. 3, and/or a processor according to embodiments of the invention. In FIG. 5, decode unit 500 includes instruction byte buffer unit 510, pick unit 520, decode unit 530, op-cache unit 540, micro-op queue unit 550, microcode read-only memory (ROM) unit 560, stack engine memory file (memfile) unit 570, and dispatch unit 580.

Figure 6:
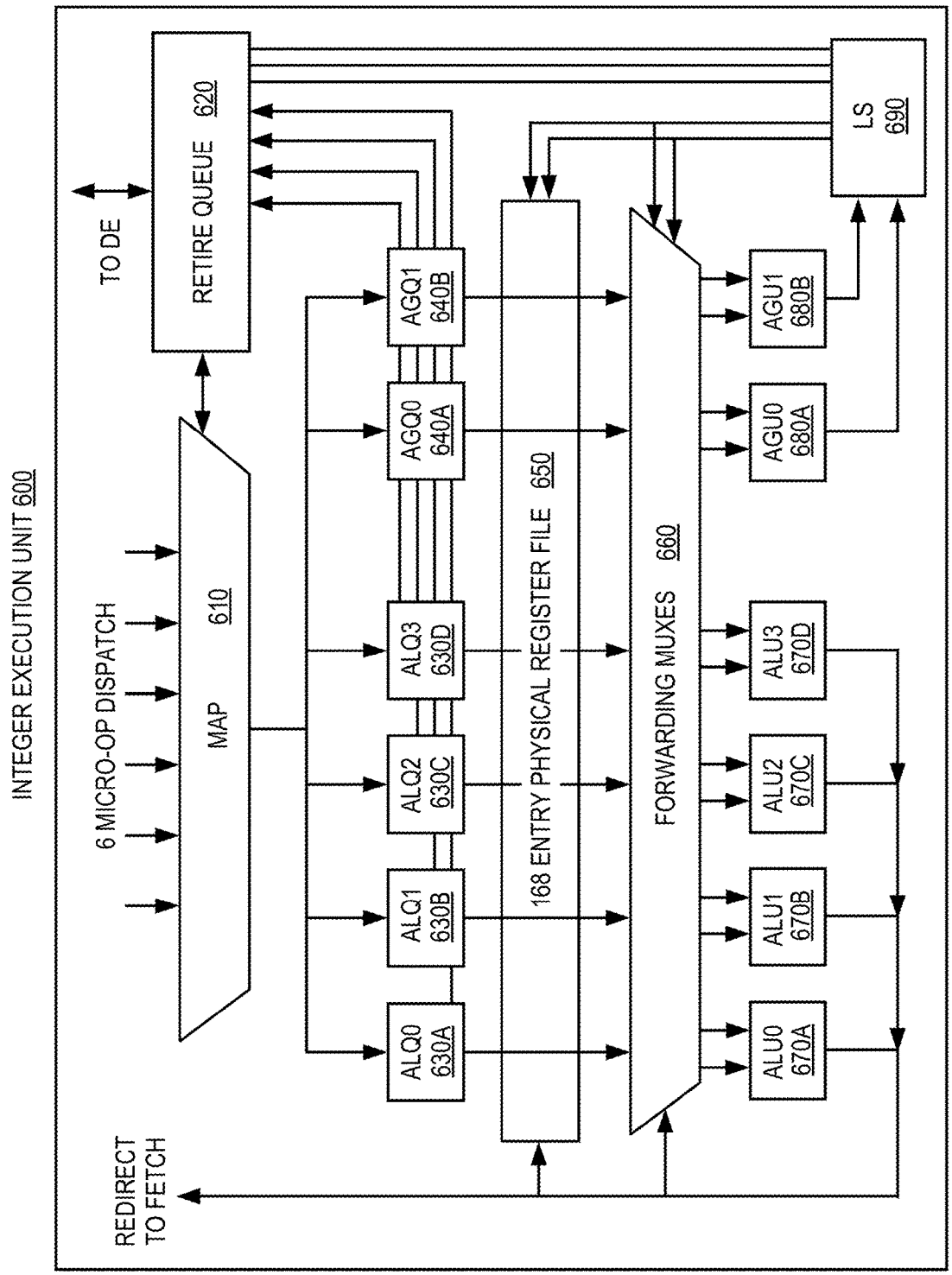
FIG. 6 is a block diagram of an illustrative integer execution unit that may be included in a processor core, such as that of FIG. 3 and/or a processor according to embodiments of the invention.

FIG. 6 is a block diagram of an illustrative integer execution unit that may be included in a processor core, such as core 300 of FIG. 3, and/or a processor according to embodiments of the invention. In FIG. 6, integer execution unit 600 includes map unit 610; retire queue unit 620; arithmetic-logic queue (ALQ) units 630A, 630B, 630C, and 630D (collectively, ALQs 630); address generation queue (AGQ) units 640A and 640B (collectively, AGQs 640); physical register file unit 650, forwarding multiplexer (mux) unit 660; ALUs 670A, 670B, 670C, and 670D (collectively, ALUs 670); AGUs 680A and 680B (collectively, AGUs 680); and load-store unit 690.

Figure 7:
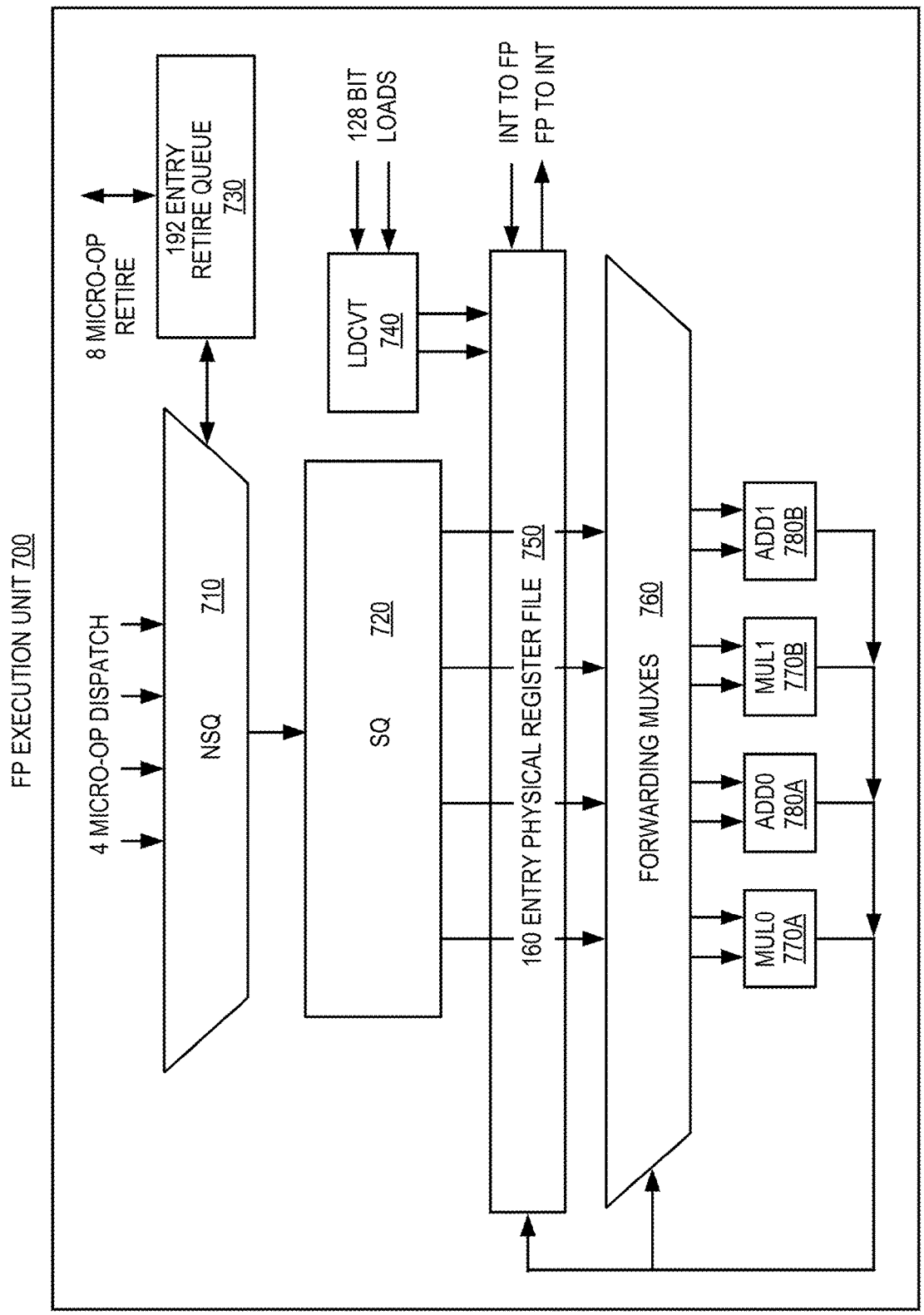
FIG. 7 is a block diagram of an illustrative floating-point (FP) execution unit that may be included in a processor core, such as that of FIG. 3, or a processor according to embodiments of the invention.

FIG. 7 is a block diagram of an illustrative FP execution unit that may be included in a processor core, such as core 300 of FIG. 3, or a processor according to embodiments of the invention. In FIG. 7, FP execution unit 700 includes non-schedulable micro-op queue unit 710, schedulable micro-op queue unit 720, retire queue unit 730, FP convert unit 740, FP physical register file 750, forwarding mux unit 760, FP multipliers 770A and 770B (collectively, FP multipliers 770), and FP adders 780A and 780B (collectively, FP adders 780).

Figure 8:
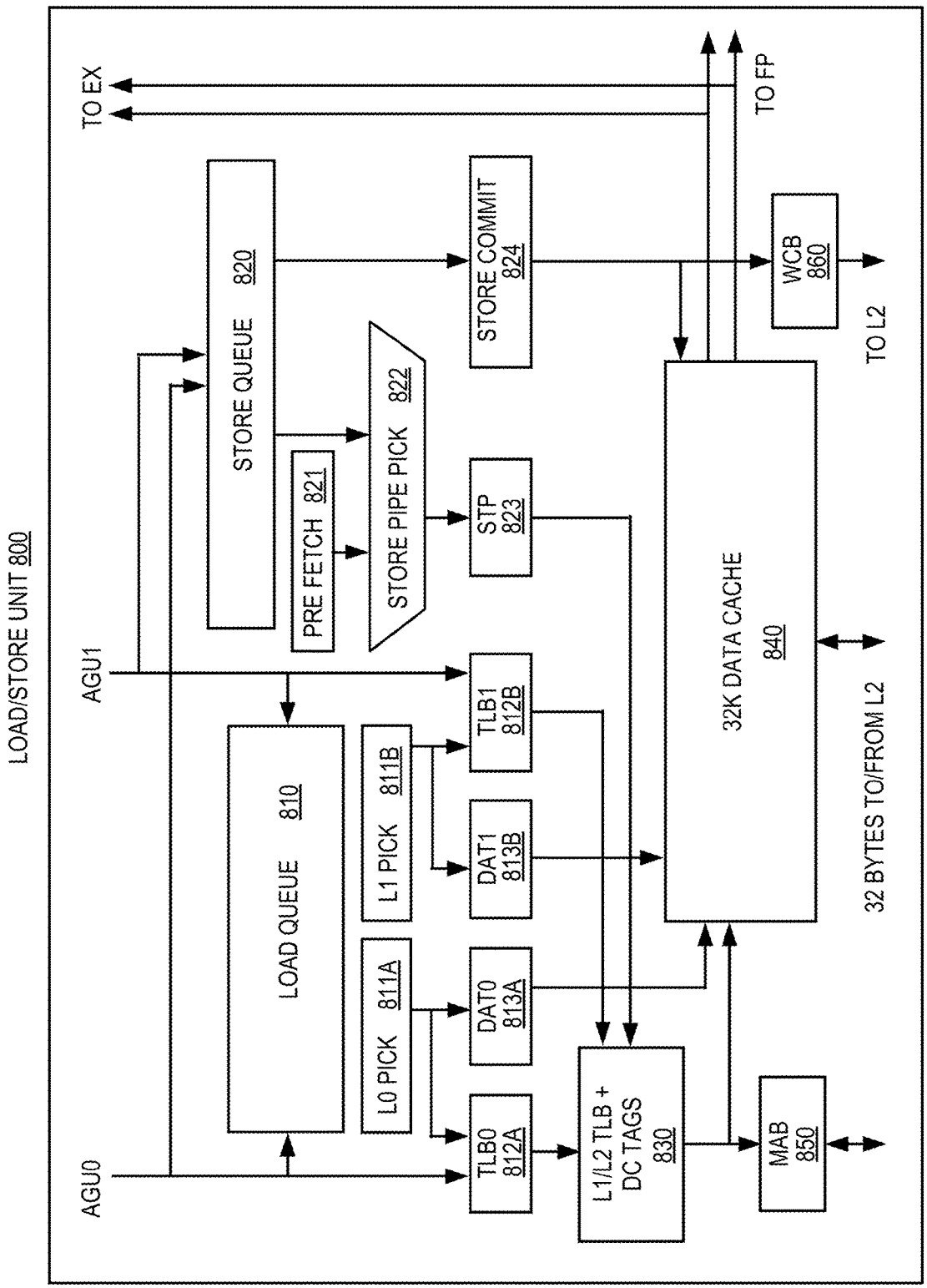
FIG. 8 is a block diagram of an illustrative load/store unit that may be included in a processor core, such as that of FIG. 3, or a processor according to embodiments of the invention.

FIG. 8 is a block diagram of an illustrative load/store unit that may be included in a processor core, such as core 300 of FIG. 3, or a processor according to embodiments of the invention. In FIG. 8, load/store unit 800 includes load queue unit 810, load-pipe pick units 811A and 811B (collectively, load pick units 811), TLB units 812A and 812B, (collectively, TLB units 812), data pipe units 813A and 813B (collectively, data pipe units 813), store queue unit 820, pre-fetch unit 821, store-pipe pick units 822), store pipe unit 823, store commit unit 824, L1/L2 TLB and data cache tag array 830, L1 data cache 840, memory-address buffer 850, and write-combining buffer 860.

Figure 9:
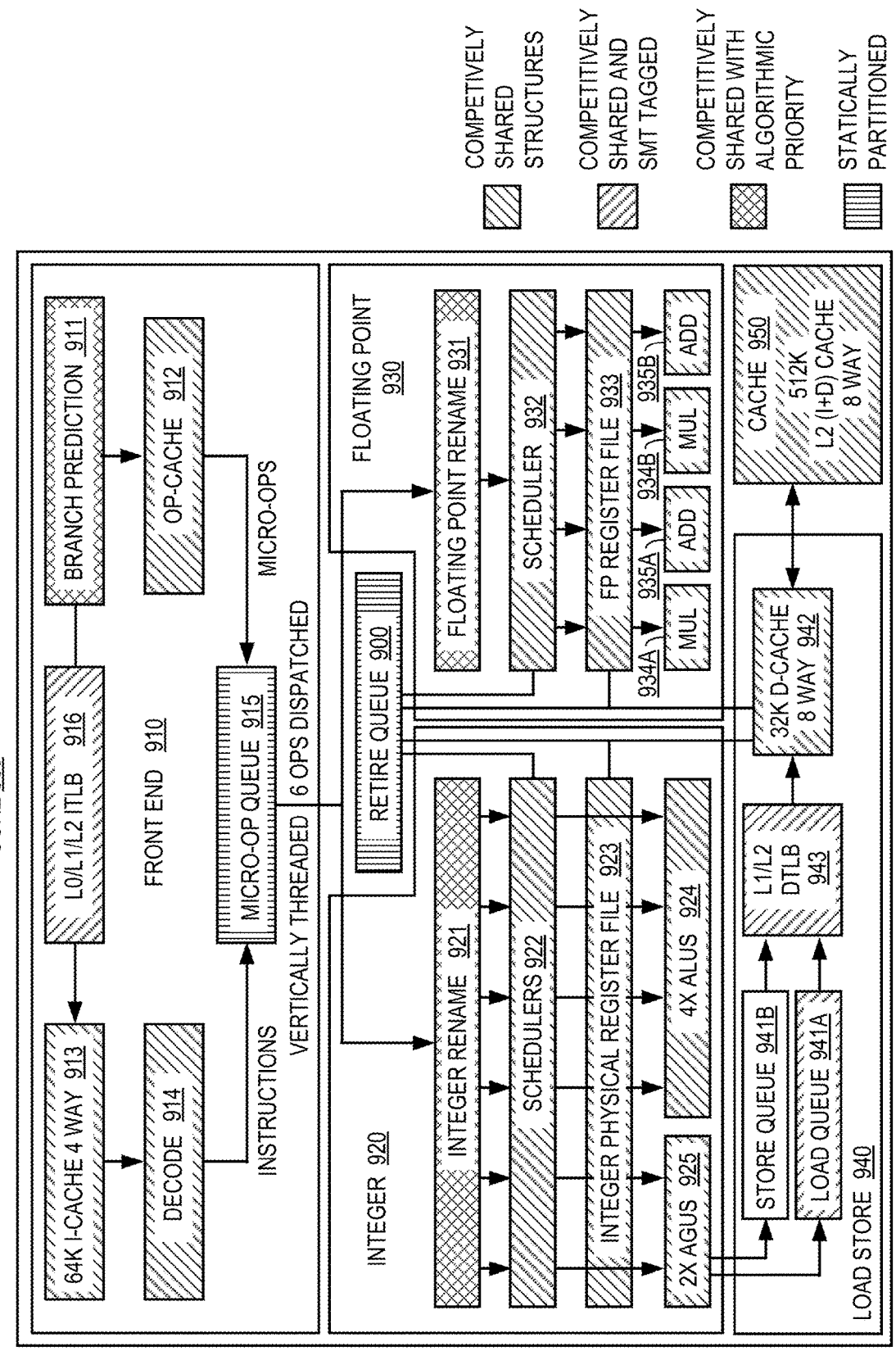
FIG. 9 is a block diagram of an illustrative out-of-order issue/execution processor core, such as that of FIG. 3, supporting simultaneous multi-threading (SMT) in a processor according to embodiments of the invention.

FIG. 9 is a block diagram of an illustrative out-of-order issue/execution processor core, such as core 300 of FIG. 3, supporting SMT in a processor according to embodiments of the invention. In FIG. 9, processor core 900 includes front-end unit 910, integer unit 920, FP unit 930, load-store unit 940, L2 cache unit 950, and retire unit 960. Front-end unit 910 includes branch prediction unit 911, op-cache unit 912, i-cache unit 913, decode unit 914, micro-op queue unit 915, and instruction TLB unit 916. Integer unit 920 includes integer rename unit 921, integer scheduler unit 922, integer physical register file 923, ALUs 924, and AGUs 925. FP unit 930 includes FP rename unit 931, FP scheduler unit 932, FP register file 933, FP multipliers 934A and 934B (collectively, FP multipliers 934), and FP adders 935A and 935B (collectively, FP adders 935). Load-store unit 940 includes load queue unit 941A and store queue unit 941B (collectively, load-store queue unit 941), data cache (d-cache) unit 942, and TLB unit 943. Retire unit 960 includes a retire queue.

SMT Features

Processor cores according to embodiments of the invention may include various features to support SMT. A number of such features are described separately using non-limiting examples below, but embodiments may include any combination of such features.

Static Partitioning of Resources

A processor core may support an SMT static partitioning feature according to some exemplary embodiments. Threads may be assigned to available resources which are statically shared in a simultaneous multithreading pipeline. In some embodiments, threads may be assigned to available resources using techniques such as a patterned based algorithm to improve performance and efficiency. In some embodiments, this feature may improve computer systems by providing a more efficient resource sharing between threads for statically shared resources. It may also use available resources that would otherwise have remained unused due to SMT static partitioning.

For example, resources in a pipeline may be statically shared, e.g., 50%-50%, between two threads to provide equal resources to both threads. In some embodiments, different percentages of available resources may be assigned to each thread, e.g., based on workload patterns. For example, if one thread is stalling for longer time than the other thread and there are empty entries available for the other thread, the available entries can be assigned to the stalled thread rather than keeping them empty in a statically shared resource.

In some embodiments, more than one thread could have a similar pattern. In such cases, a priority scheme may be used to assign resources in the case of a tie between threads. Tie-breaking may, for example, be performed by random selection, selecting the lower numbered thread, selecting the higher numbered thread, and/or selecting alternating threads.

Figure 10:
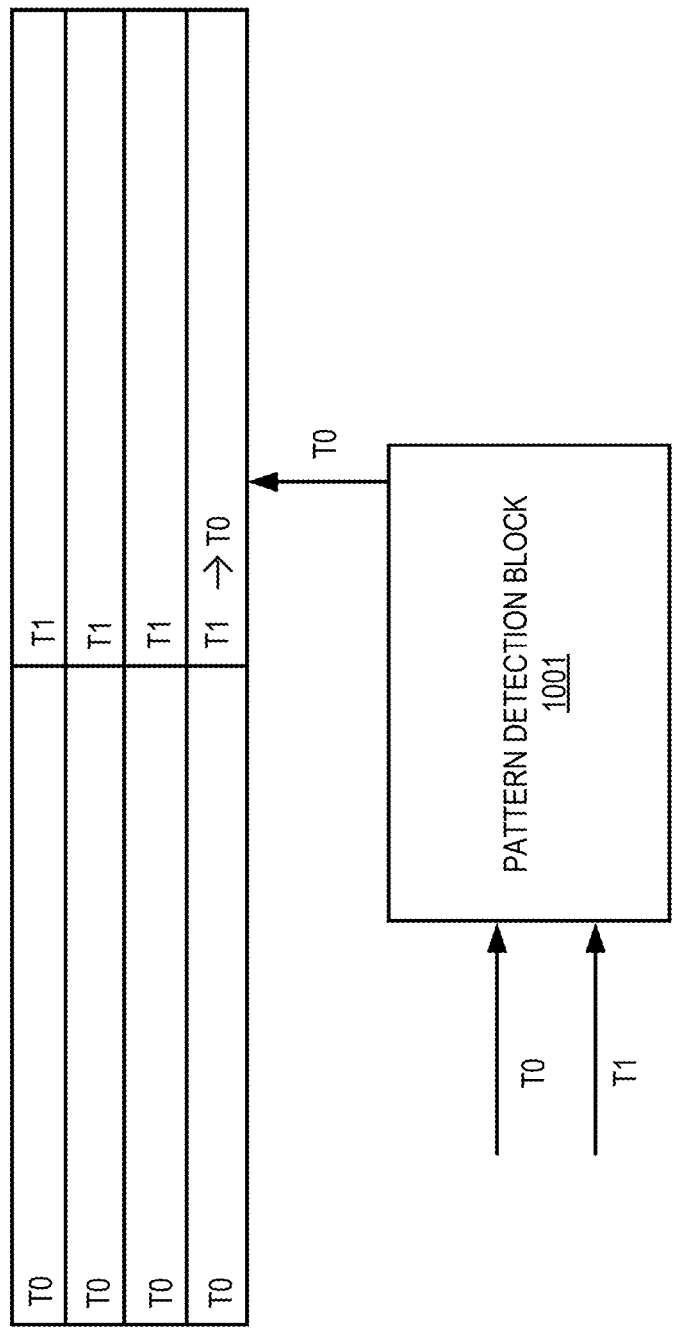
FIG. 10 is a block diagram illustrating an SMT static partitioning feature that may be included in a processor according to some embodiments.

FIG. 10 is a block diagram illustrating an SMT static partitioning feature that may be included in a processor according to some embodiments. SMT static partitioning feature may include a Pattern Detection Block 1001 according to an exemplary embodiment. First and second resources may be statically assigned to threads T0 and T1. A lookup pattern base table may determine that thread T1 has a long stall time. Pattern Detection Block can then adjust the statically assigned resources based on the pattern input. For example, the second resource, which was statically assigned to T1, can be assigned to T0.

In some embodiments, dynamic partitioning may be applied to other statically partitioned resources such as an instruction translation lookaside buffer (ITLB).

Figure 11:
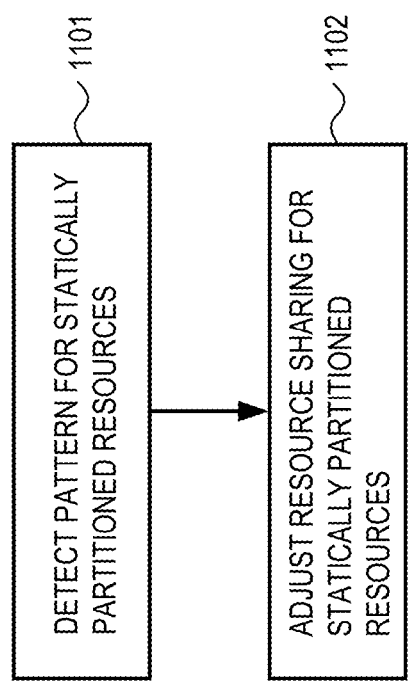
FIG. 11 is a flow diagram illustrating a method for an SMT static partitioning feature that may be performed by a processor according to some embodiments.

FIG. 11 is a flow diagram illustrating a method for an SMT static partitioning feature that may be performed by a processor according to some embodiments. In some embodiments, the method may comprise detecting patterns such as thread stalls for a statically shared resource in the pipeline, as illustrated in box CQB01. The method may further comprise adjusting the sharing (e.g., 50-50 sharing), as illustrated in box CQB02. The method adjusting may, for example, be based on length of stalls or some other similar events.

Summary of Some Embodiments

An embodiment may include a processor configured to detect a pattern for at least one of a first and second statically partitioned resource; and adjust an allocation of at least one of the first and second statically partitioned resource.

In some embodiments, one or more of the following apply. The first and second statically partitioned resource of pipeline may be resources of a simultaneous multithreading pipeline. The first and second statically partitioned resources may be allocated between a first and a second thread. The processor may be further configured to assign the first and second resources based on a patterned based algorithm. The processor may be further configured to assign at least one of the first and second resources based on one or more workload patterns. The processor may be further configured to assign at least one of the first and second resources based on a determination of whether at least one of the first and second threads has stalled for a longer period of time than the other. The processor may be further configured to assign at least one of the first and second resources based on a determination of whether there are empty entries associated with at least one of the first and the second resources that are available and assign at least one of the first and the second threads to the at least one of the first and the second resources that are available. The processor may be further configured to assign at least one of the first and second resources based on a priority scheme. The processor may be further configured to determine whether a stall has occurred based on a look up pattern base table. The first and second statically partitioned resources may be resources of an instruction translation lookaside buffer (ITLB).

An embodiment may include a method comprising detecting at least one of a pattern for a first and second statically partitioned resource; and adjusting an allocation of at least one of the first and second statically partitioned resource.

In some embodiments, one or more of the following apply. The first and second statically partitioned resource may be resources of a simultaneous multithreading pipeline. The first and second statically partitioned resources may be allocated between a first and a second thread. The method may further comprise assigning the first and second resources based on a patterned based algorithm. The method may further comprise assigning at least one of the first and second resources based on one or more workload patterns. The method may further comprise assigning at least one of the first and second resources based on a determination of whether at least one of the first and second threads has stalled for a longer period of time than the other. The method may further comprise assigning at least one of the first and second resources based on a determination of whether there are empty entries associated with at least one of the first and the second resources that are available and assigning at least one of the first and the second threads to the at least one of the first and the second resources that are available. The method may further comprise assigning at least one of the first and second resources based on a priority scheme. The method may further comprise determining whether a stall has occurred based on a look up pattern base table. The first and second statically partitioned resources may be resources of an instruction translation lookaside buffer (ITLB).

An embodiment may include a non-transitory machine-readable medium storing at least one instruction which when executed by a processor causes the processor to perform a method, the method comprising detecting at least one of a pattern for a first and second statically partitioned resource; and adjusting an allocation of at least one of the first and second statically partitioned resource.

In some embodiments, one or more of the following apply. The first and second statically partitioned resource may be resources of a simultaneous multithreading pipeline. The first and second statically partitioned resources may be allocated between a first and a second thread. The method may further comprise assigning the first and second resources based on a patterned based algorithm. The method may further comprise assigning at least one of the first and second resources based on one or more workload patterns. The method may further comprise assigning at least one of the first and second resources based on a determination of whether at least one of the first and second threads has stalled for a longer period of time than the other. The method may further comprise assigning at least one of the first and second resources based on a determination of whether there are empty entries associated with at least one of the first and the second resources that are available and assigning at least one of the first and the second threads to the at least one of the first and the second resources that are available. The method may further comprise assigning at least one of the first and second resources based on a priority scheme. The method may further comprise determining whether a stall has occurred based on a look up pattern base table. The first and second statically partitioned resources may be resources of an instruction translation lookaside buffer (ITLB).

An embodiment may include a system including a memory and a processor, the processor configured to detect a pattern for at least one of a first and second statically partitioned resource; and adjust an allocation of at least one of the first and second statically partitioned resource.

In some embodiments, one or more of the following apply. The first and second statically partitioned resource may be resources of a simultaneous multithreading pipeline. The first and second statically partitioned resources may be allocated between a first and a second thread. The processor may be further configured to assign the first and second resources based on a patterned based algorithm. The processor may be further configured to assign at least one of the first and second resources based on one or more workload patterns. The processor may be further configured to assign at least one of the first and second resources based on a determination of whether at least one of the first and second threads has stalled for a longer period of time than the other. The processor may be further configured to assign at least one of the first and second resources based on a determination of whether there are empty entries associated with at least one of the first and the second resources that are available and assign at least one of the first and the second threads to the at least one of the first and the second resources that are available. The processor may be further configured to assign at least one of the first and second resources based on a priority scheme. The processor may be further configured to determine whether a stall has occurred based on a look up pattern base table. The first and second statically partitioned resources may be resources of an instruction translation lookaside buffer (ITLB).

Competitive Sharing of Resources

A processor core may support SMT with competitive sharing of resources according to embodiments of the invention. A circuit, structure, or other resource in the core may be shared by multiple threads based on a policy in which threads compete for priority. In the embodiment of FIG. 9, each of the following resources may be shared between or among threads accord based on a competitive policy: branch prediction unit 911, op-cache unit 912, i-cache unit 913, decode unit 914, instruction TLB unit 916, integer rename unit 921, integer scheduler unit 922, integer physical register file 923, ALUs 924, AGUs 925, FP rename unit 931, FP scheduler unit 932, FP register file 933, FP multipliers 934A and 934B, FP adders 935A and 935B, load queue unit 941A, d-cache unit 942, and TLB unit 943.

Some of these resources, such as a buffer in integer rename unit 921, integer scheduler unit 922, FP rename unit 931, FP scheduler unit 932, or load queue unit 941A, may have entries, subunits, or other parts that may be separately allocated to a thread. For convenience, this type of resource may be referred to as a divisible resource, and this type of allocation may be referred to as allocation-in-part. Others, such as each individual ALU of ALUs 924, each individual AGU of AGUs 925, FP multiplier 934A, FP multiplier 934B, FP adder 935A, or FP adder 935B, may only be allocated in full for a particular clock cycle, set of consecutive clock cycles to complete an operation, or other period of time or duration of operation. For convenience, this type of resource may be referred to as an indivisible resource, and this type of allocation may be referred to as allocation-in-full.

Figure 12:
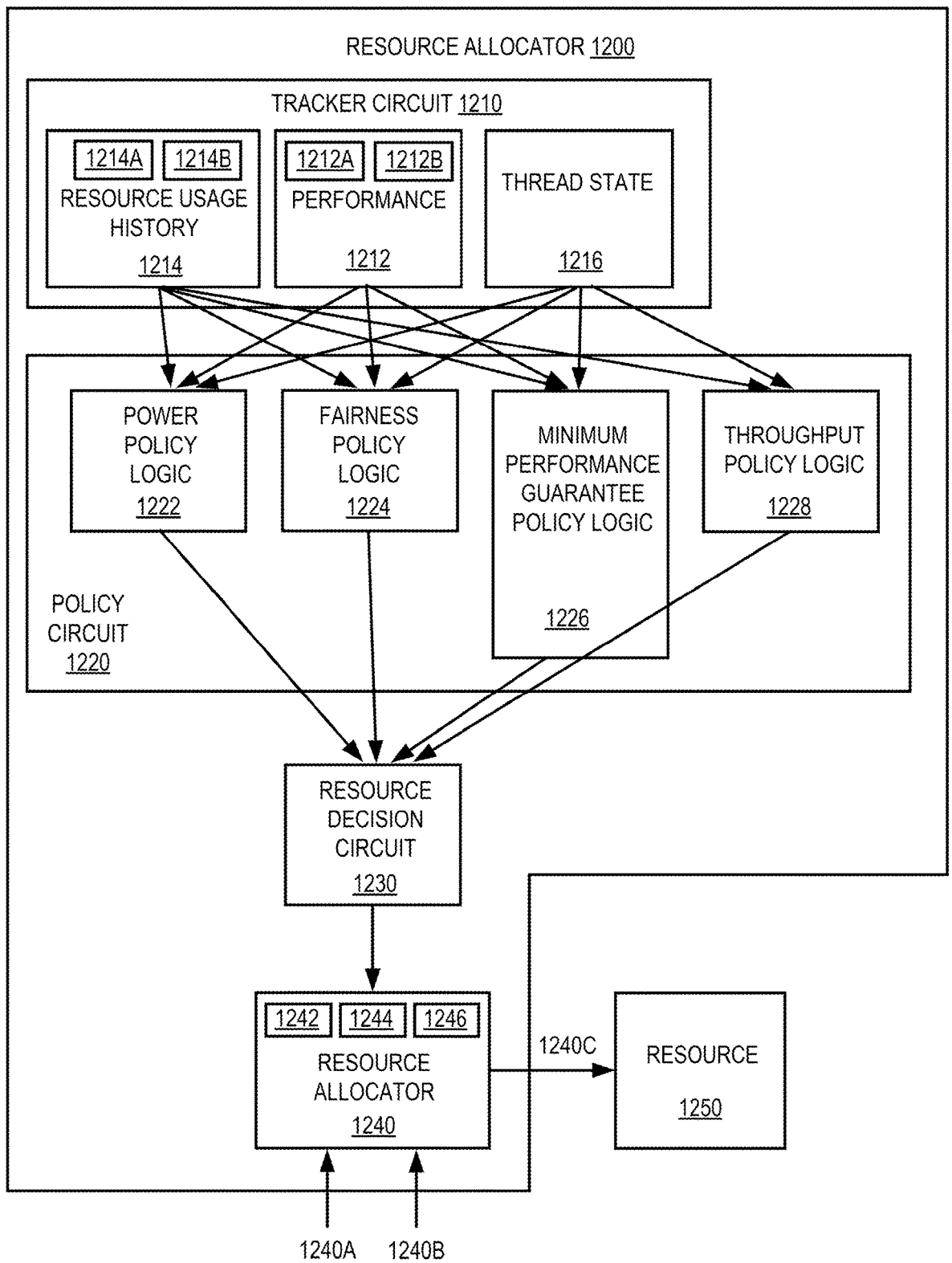
FIG. 12 is a block diagram illustrating a resource allocator that may be included in a processor according to some embodiments.

FIG. 12 is a block diagram illustrating a resource allocator 1200 that may be included in a processor according to embodiments of the invention. Resource allocator 1200 may include circuitry, structures, and/or hardware to allocate a core circuit, structure, unit, or resource, or any portion thereof, to a particular thread. In embodiments, resource allocator 1200 may be implemented to allocate a single resource and/or multiple resources. In either case, a processor or processor core may include multiple instances of one or more embodiments of resource allocator 1200, each to allocate any one or more resources, each including any one or more of the blocks shown in FIG. 12, and each to implement any one or more resource allocation policies or combinations of resource allocation policies.

Resource allocator 1200 may include tracker circuit 1210, policy circuit 1220, decision circuit 1230, and allocator circuit 1240. Tracker circuit may include one or more of performance history circuit 1212, usage history circuit 1214, and thread state circuit 1216. Policy circuit 1220 may include one or more of power policy circuit 1222, fairness policy circuit 1224, performance guarantee policy circuit 1226, and throughput policy circuit 1228. Embodiments may include, combine, and/or implement each of these circuits in various ways according to the types and number of resources to be allocated and the policies desired.

Performance history circuit 1212 may include circuitry, structures, and/or hardware to monitor, track, record, and/or report the performance of threads in one or more ways. In an embodiment, performance history circuit 1212 may include one or more hardware counters 1212A per thread to count one or more measures of performance per thread, such as instructions retired per some measure of time or duration. For example, the measure of time or duration may be a window of clock cycles, where the size of the window (e.g., represented by the letter 'N') may be fixed (e.g., hardwired), configurable (e.g., by hardware or firmware), and/or programmable (e.g., by software). In an embodiment, N may be 1024.

Performance history circuit 1212 may also include one or more hardware comparators 1212B to compare the performance, as measured by counters 1212A, of a thread to one or more other threads. For example, at the end of each window of N clock cycles, hardware comparators 1212B may compare the number of instructions retired during the window by a first thread to that of a second thread, and counters 1212A may be reset for the next window. During that next window, the result of the comparison from the previous window may be used by policy circuit 1220 and/or decision circuit 1230 as described below. In embodiments, the comparison result may be a ranking of threads (e.g., which thread retired more instructions), the comparison result may be a ratio (e.g., a calculation or approximated calculation of the ratio of the number of instructions retired by a first thread to the number of instructions retired by the second thread), and/or any other measurement or calculation.

Embodiments may include more than one counter per thread. For example, two separate counters may be provided per thread: a first counter to track instructions identified as "power-hungry" (e.g., the execution of which typically consumes more power than other instructions) and a second counter to count other (i.e., non-power-hungry) instructions. For example, AVX-512 FMA instructions (as defined below) may be identified as power-hungry and tracked (possibly along with other power-hungry instructions) using a separate counter, Usage history circuit 1214 may include circuitry, structures, and/or hardware to monitor, track, record, and/or report the usage of resources by threads. In an embodiment, usage history circuit 1214 may include one or more hardware counters 1214A to count usage of a resource per thread, and one or more hardware comparators 1214B to compare usage of a resource between threads. One or more results from counters 1214A and/or comparators 1214B may be used by policy circuit 1220 and/or decision circuit 1230 as described below.

For example, for a divisible resource such as a buffer, a counter may count the number of entries occupied by a thread. The count to be used for further calculations and/or allocation decisions may be a current count, reported or used directly at any point in time, and/or may be an average count, averaged over a window (e.g., a window of size N as described above). For an indivisible resource, the count to be used for further calculations and/or allocation decisions may be a time-averaged or time-weighted counted (e.g., the number of times a thread has used a resource within a time window, where the count is reset at the end of each time window, or where the count is right-shifted (to divide by a power of two) at the end of each time window). Results based on any of these counts may be the counts themselves, per-thread rankings of counts, and/or thread-to-thread ratios of counts.

Thread state circuit 1216 may include circuitry, structures, and/or hardware to monitor, track, record, and/or report state of a thread. For example, thread state circuit 1216 may report whether a thread is currently stalled, such as due to a long latency L2/L3 or other cache miss.

Historical and current information reported by tracker circuit 1210 may be used in resource allocation calculations and decisions according to policies specified by policy circuit 1220. These policies may include any types of policies, with any priorities, in any combinations, including considerations of power consumption, fairness, minimum performance guarantees, and throughput.

Power policy circuit 1222 may include circuitry, structures, and/or hardware to implement one or more power policies and/or favor or select a thread based on the policy or policies. These policies may include any types of power policies, with any priorities, in any combinations. For example, a thread that is using fewer power-hungry instructions or a thread that is making slower progress may be favored or selected.

Fairness policy circuit 1224 may include circuitry, structures, and/or hardware to implement one or more fairness policies and/or favor or select a thread based on the policy or policies. For example, a thread that has lower recent performance, lower occupancy of a divisible resource, and/or lower recent usage of an indivisible resource may be favored or selected.

Performance guarantee policy circuit 1226 may include circuitry, structures, and/or hardware to implement one or more minimum performance guarantee policies and/or favor or select a thread based on the policy or policies. For example, a thread that is making progress below a certain minimum threshold may be favored or selected based on a performance guarantee policy.

Throughput policy circuit 1228 may include circuitry, structures, and/or hardware to implement one or more throughput policies and/or favor or select a thread based on the policy or policies. For example, a thread that is making relatively more or faster progress than other threads may be favored or selected.

Any or all of power policy circuit 1222, fairness policy circuit 1224, performance guarantee policy circuit 1226, throughput policy circuit 1228, and/or any other policy circuit may include individual storage locations or registers in which to store information and/or criteria to enable, modify (e.g., strengthen or weaken the importance of a policy or one or more criteria or measured used by a policy), or otherwise dynamically affect a policy. Embodiments may also or instead include a central or shared storage location or register for this information. Any one or more of individual or group storage locations are represented as policy register 1220A. In embodiments, any such storage location or register may be configurable (e.g., by hardware or firmware) or programmable (e.g., by software).

Decision circuit 1230 may include circuitry, structures, and/or hardware to receive information, results, and/or signals from tracker circuit 1210 and information, criteria, and/or signals from policy circuit 1220 to use, weight, prioritize, filter, compare, combine, override, or otherwise process to generate information that may result in choosing a thread to which to allocate a resource and/or one or more indications or signals regarding that decision. For example, in an embodiment including a throughput policy and a minimum performance guarantee, the throughput policy may favor a first thread, but decision circuit 1230 may override that preference and choose a second thread to help meet a minimum performance guarantee for the second thread. In embodiments, resource allocator 1200 may include multiple instances of one or more embodiments of decision circuit 1230, each for any resource or group of resources, and each to implement any one or more resource allocation policies or combinations of resource allocation policies, and each to implement any one or more approaches or combinations of approaches described below, where each may be configured or programmed to choose a thread according to any approach or combination of approaches (e.g., each may assign a different weight to information received from each separate policy circuit in policy circuit 1220).

In embodiments including an indivisible resource, decision circuit 1230 may determine which thread has priority for the dynamic allocation-in-full of the indivisible resource. In embodiments including a divisible resource, decision circuit 1230 may determine which thread has priority for the dynamic allocation-in-part of the divisible resource and/or part of the divisible resource, and/or how much (e.g., how many buffer entries) of the divisible resource to allocate to a thread.

In an embodiment, decision circuit 1230 may generate or provide one or more information, decision results, indicators, and/or signals, for example by storing them in one or more storage locations accessible by allocator circuit 1240 and/or sending them directly to allocator circuit 1240, which may identify a single thread that has priority over any number of other threads or may specify a priority ranking of two or more threads.

Allocator circuit 1240 may include circuitry, structures, and/or hardware to receive information, decision results, indicators, and/or signals from decision circuit 1230 to act on, finalize, and/or implement resource allocation decisions, for example, by responding to a decision, from decision circuit 1230, that a first thread has priority over a second thread, to send one or more signals to direct the allocation of a resource (e.g., resource 1250), in full or in part, to that thread. To do so, allocator circuit 1240 may send one or more signals (e.g., a "go" signal 1240C) to a dispatch or other circuit that allow(s) a particular thread to use an indivisible resource or to use one or more parts of a divisible resource.

In embodiments, allocator circuit 1240 may also receive one or more requests (e.g., requests 1240A and 1240B) to use a resource. The requests may be signals and/or any other type of indicates from threads, from the resource, and/or from any type of dispatch circuitry associated with a thread or a resource. In embodiments, allocator circuit 1240 may choose or arbitrate between or among thread requests, e.g., using information, decision results, indicators, and/or signals from decision circuit 1230, to determine which thread is to be allocated the resource.

In embodiments, allocator circuit 1240 may include circuitry, structures, and/or hardware to act on allocation decisions from decision circuit 1230 subject to or based on additional information or constraints. For example, allocator circuit 1240 may include a set of fixed, configurable, or programmable storage locations or registers 1242, with one register per thread, that indicates how many parts of a divisible resource (e.g., how many entries of a buffer) are dedicated to each thread, a set of counters 1244, one per thread, to track how many of each part are currently in use by each thread, and a set of comparators 1246, one per thread, to check if a thread is using its full allocation. Allocator circuit 1240 may use results from comparators 1246 to accept or reject allocation decisions from decision circuit 1230. Instead or additionally, an embodiment may include storage for an indicator for each part of a divisible resource (e.g., a bit or field of each entry in a buffer), to indicate which thread (or threads) is allowed to use that part of that resource, and allocator circuit 1240 may use the stored indicator to accept or reject allocation decisions from decision circuit 1230.

Summary of Some Embodiments

An embodiment of the invention may include a processor comprising a resource allocator and a resource. including a tracker circuit, a policy circuit, a decision circuit, and an allocator circuit. The tracker circuit may be to track at least one of performance history of the resource, usage history of the resource, and a thread state, The policy circuit may be to provide policy information for implementing a resource allocation policy. The decision circuit may be to choose a thread based on an output of the tracker circuit and the policy information. The allocator circuit may be to use an output of the decision circuit to allocate the resource to the thread.

Algorithmic Competitive Sharing of Resources

A processor core may support an algorithmic SMT feature according to embodiments. In some embodiments, this feature solves the problem of thread assignment to available resources which are competitively shared in the pipeline. In some embodiments, this problem is solved using a priority algorithm. In some embodiments, a branch predictor block in a pipeline may be competitively shared and can use a priority algorithm for efficient entry allocation. In some embodiments, a priority algorithm may be implemented in hardware and/or software. In some embodiments, the thread assignment may be performed with two or more threads. In some embodiments, the thread assignment may assign a most efficient thread to an available resource in the pipeline to achieve a highest instructions per clock (IPC) and/or pipeline throughput. In some embodiments, this feature may provide a best known algorithm to prioritize a thread allocation to an available resource. As the number of thread increases and/or context switches between threads increase, the feature may provide further benefits by efficiently allocating resources.

Figure 13:
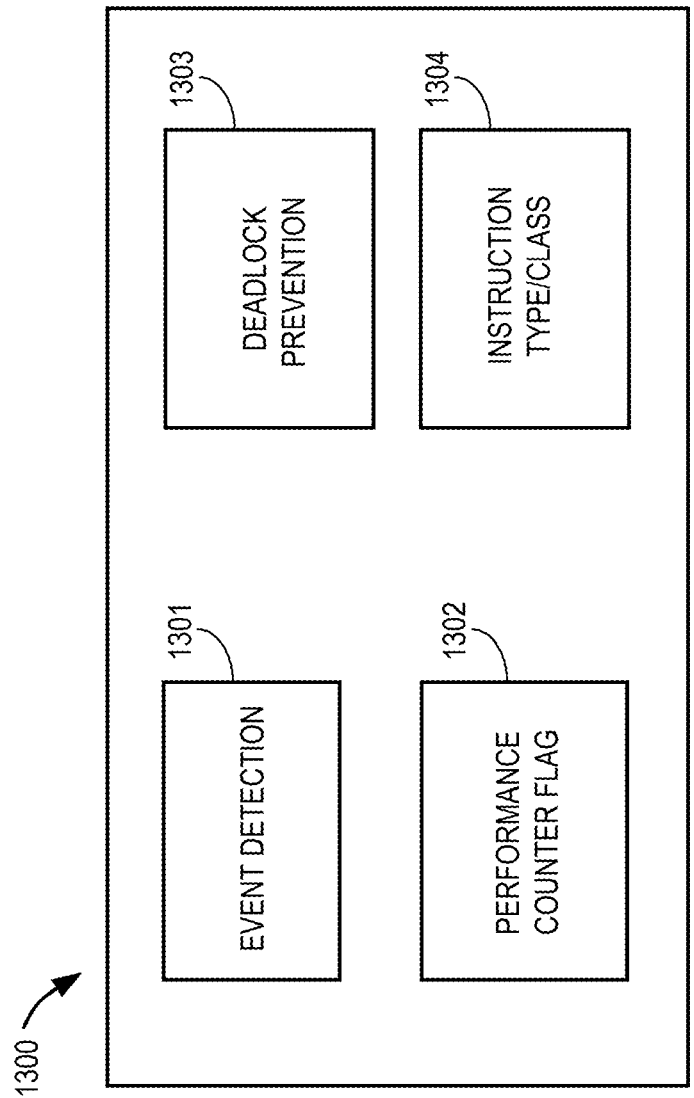
FIG. 13 is a block diagram illustrating an algorithmic SMT feature that may be included in a processor 1300 according to embodiments.

FIG. 13 is a block diagram illustrating an algorithmic SMT feature that may be included in a processor 1300 according to embodiments. Priority algorithm hardware may, for example, include management based on dynamic behavior. The priority hardware may comprise at least one of an event detection block 1301, a performance counter flag block 1302, a deadlock prevention block 1303, and an instruction type/class block 1304. The event detection block 1301 may, for example, detect one or more events, such as a nuke, frequency of clear (e.g., JEClear and CRClear), frequency of BR, interrupt, and cache misses. The performance counter flag block 1302 may, for example, count one or more of the following: instructions retired, code misses, L2/L3 misses. The deadlock prevention block 1303 may prevent deadlock states. The instruction type/class block 1304 may, for example, allow a floating point instruction to retire. In some embodiments, one or more of the forgoing may be implemented in software and/or firmware. Additionally, in some embodiments, software may allow an operating system (OS) and/or a virtual machine manager (VMM) to set priorities.

In some embodiments, a priority algorithm may have learning capabilities such as machine learning. Learning capability may provide more intelligent thread selection and may be adaptive based, for example, on historical data and/or patterns being collected.

In some embodiments, there may be more than one thread with a similar event. In some embodiments, a priority scheme can be used in cases where there is tie between threads. Tie-breaking may, for example, be performed by random selection, selecting the lower numbered thread, selecting the higher numbered thread, and/or selecting alternating threads.

Figure 14:
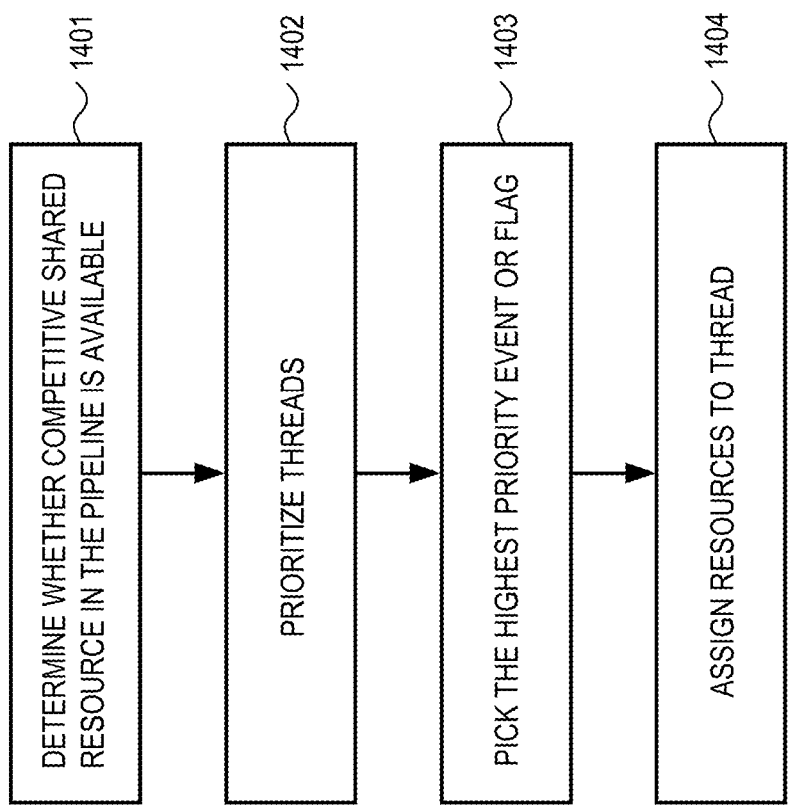
FIG. 14 is a flow diagram illustrating a method for an algorithmic SMT feature that may be performed by a processor according to embodiments.

FIG. 14 is a flow diagram illustrating a method for an algorithmic SMT feature that may be performed by a processor according to embodiments. The method may comprise determining whether competitive shared resource in the pipeline is available, as illustrated in 1401. The method may further comprise prioritizing threads, as illustrated in 1402. For example, threads may be prioritized if there is more than one event. The method may further comprising picking the highest priority event or flag, as illustrated in 1403. For example, the highest priority event or flag may be selected based on an assigned algorithm. The method may further comprise assigning resources to a thread, as illustrated in 1404. For example, resources may be assigned to the most desirable thread based on the priority algorithm.

Figure 15:
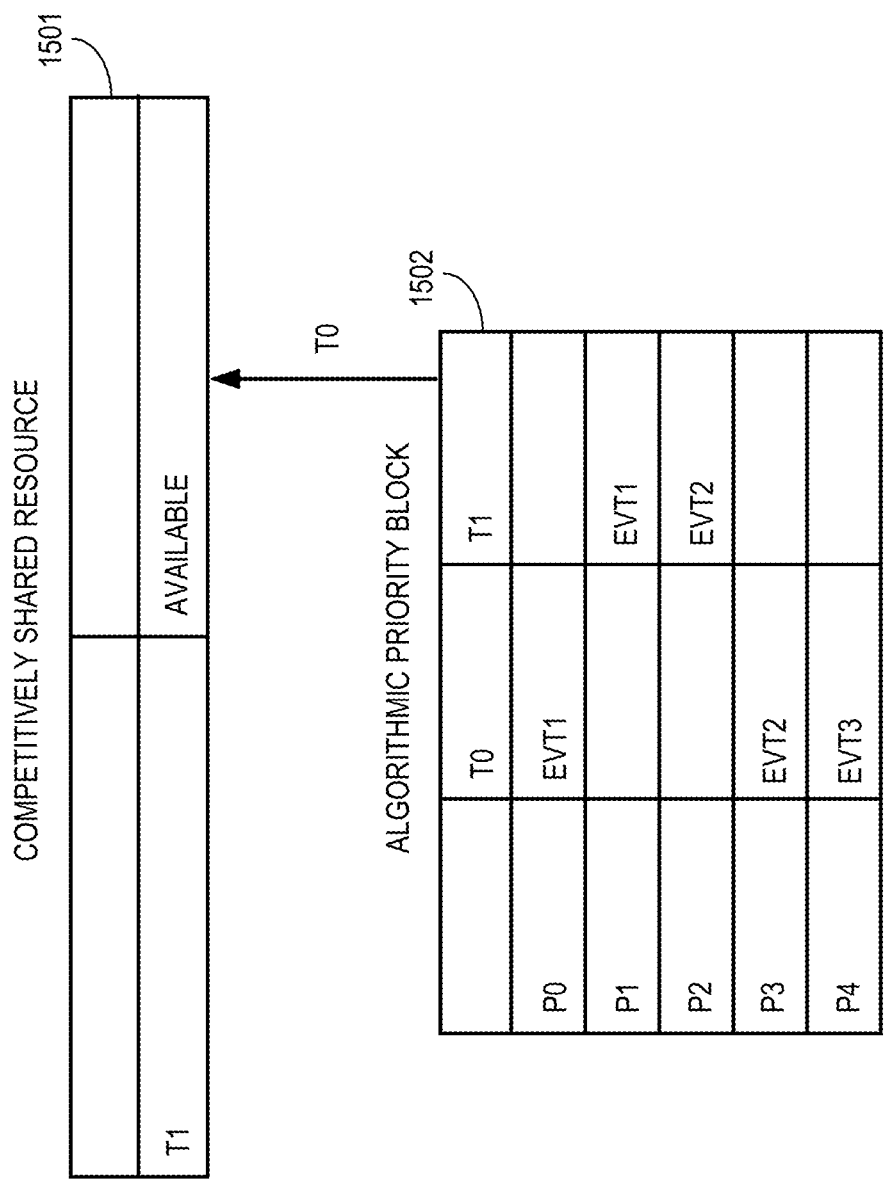
FIG. 15 is a block diagram illustrating an algorithmic SMT feature that may be included in a processor according to embodiments.

FIG. 15 is a block diagram illustrating an algorithmic SMT feature that may be included in a processor according to embodiments. FIG. 15 shows an allocation of a thread, e.g., thread T0, to a competitively shared resource based on an algorithmic priority block. For example, the feature may determine that a competitively shared resource 1501 is available, e.g., in accordance with box 1401 in FIG. 14. The algorithmic priority block 1502 may prioritize if there are more than one event, e.g., events Evt1 and Evt2, e.g., in accordance with box 1402 in FIG. 14. The algorithmic priority block 1502 may also pick the highest priority event or flag based on assigned algorithm, e.g., in accordance with box 1403 in FIG. 14. The algorithmic priority block 1502 may also assign a resource, e.g., 1501 to a most disable thread, e.g., T0 based on the priority algorithm.

In some embodiments, a priority algorithm may comprise an integer rename and/or a floating point rename algorithm. The priority algorithm may comprise event based determinations based on events such as Nuke, Clear, and interrupt. The priority algorithm may comprise a performance counter, which may count occurrences such as instructions retired and code misses. The priority algorithm may comprise limiting physical registers, using deadlock prevention, and/or determining cache misses. The priority algorithm may comprise determining instruction types and classes. The priority algorithm may comprise allocating registers, for example, allocating a floating point wordline more of the floating point registers. The priority algorithm may comprise managing priority through software. For example, the priority algorithm may allow an operating system and/or a virtual machine manager to provide priority. The priority algorithm may comprise hardware managed priority, e.g., based on dynamic behavior.

Figure 16:
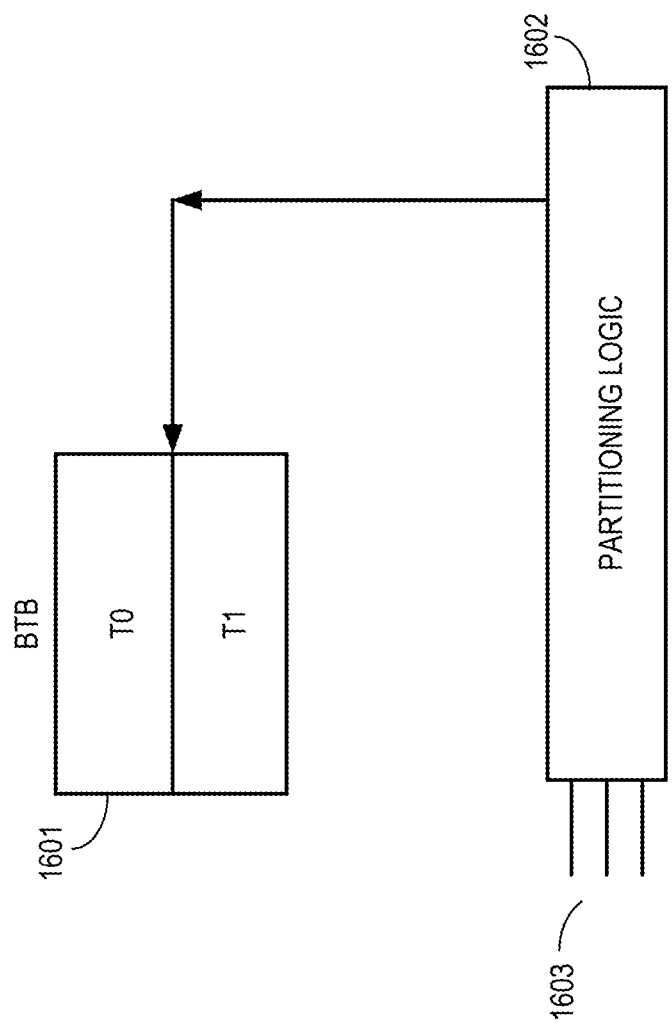
FIG. 16 shows a block diagram implementing a branch predictor priority algorithm in accordance with an exemplary embodiment.

In some embodiments, a priority algorithm may comprise a branch predictor algorithm. In some embodiments the branch predictor algorithm may control action of branch target buffers (BTB) based on one or more of the following: frequency of clears (e.g., JEClears and CRClears), frequencies of branches (e.g., all, taken, not taken), properties other than branches (e.g., instructions retired, L2/L3 misses). The priority algorithm may comprise managing priority through software. For example, the priority algorithm may allow an operating system and/or a virtual machine manager to provide priority. The priority algorithm may comprise hardware managed priority, e.g., based on dynamic behavior. FIG. 16 shows a block diagram implementing a branch predictor priority algorithm in accordance with an exemplary embodiment. The partitioning logic 1602 may receive inputs 1603 such as frequency of clears (e.g., JEClears and CRClears), frequencies of branches (e.g., all, taken, not taken), properties other than branches (e.g., instructions retired, L2/L3 misses). The partitioning logic 1602 may allocate entries of the branch target buffers (BTB) 1601 based the inputs 1603.

Summary of Some Embodiments

An embodiment may include a processor configured to identify an available competitively shared resource; select a thread based at least in part on a priority algorithm; and assign the selected thread to the available competitively shared resource.

In some embodiments, one or more of the following apply. In some embodiments, the processor may be further configured to competitively share branch prediction and to use the priority algorithm for entry allocation. In some embodiments, the processor may be further configured to assign a second thread based on the priority algorithm. In some embodiments, the processor may be further configured to assign a most efficient thread to the available resource in the pipeline to increase at least one of instructions per clock (IPC) and pipeline throughput. In some embodiments, the processor may be further configured to provide a best known algorithm to prioritize a thread allocation to the available resource. In some embodiments, the processor may be further configured to prioritize when two or more events are detected. In some embodiments, the processor may be further configured to select at least one of a highest priority event and flag based on an assigned algorithm.

In some embodiments, the processor may comprise an event detection block, a performance counter flag block, a deadlock prevention block, and an instruction type/class block. In some embodiments, the event detection block may detect at least one of a nuke, frequency of clear, frequency of BR, an interrupt, and a cache miss. In some embodiments, the performance counter flag block may count at least one of instructions retired, code misses, and L2/L3 misses. In some embodiments, the deadlock prevention block may prevent deadlock states. In some embodiments, the instruction type/class block may allow a floating point instruction to retire. In some embodiments, the processor may be further configured to allow at least one of an operating system (OS) and a virtual machine manager (VMM) to set priorities. In some embodiments, the priority algorithm may have at least one learning capability. In some embodiments, the at least one learning capability may be adaptive based on at least one of historical data and workload patterns.

In some embodiments, the priority algorithm may comprise at least one of an integer rename and a floating point rename algorithm. The priority algorithm may comprise event based determinations. The event based determination may comprise one or more of a nuke, a clear, and an interrupt. The priority algorithm may comprise a performance counter. The performance counter may count occurrences. The occurrences may be one or more of instructions retired and code misses. The priority algorithm may comprise one or more of limiting physical registers, using deadlock prevention, and determining cache misses. The priority algorithm may comprise determining instruction types and classes. The priority algorithm may comprise allocating registers. Allocating registers may comprise allocating a floating point wordline more of the floating point registers. The priority algorithm may comprise managing priority through software. The priority algorithm may allow one or more of an operating system and a virtual machine manager to provide priority. The priority algorithm may comprise hardware managed priority. The hardware managed priority may be based on dynamic behavior.

In some embodiments, a priority algorithm may comprise a branch predictor algorithm. In some embodiments, the branch predictor algorithm may control action of branch target buffers (BTB) based at least in part on one or more of the following: frequency of clears, frequencies of branches, properties other than branches. The clears may comprise one or more of JEClears and CRClears. The frequencies of branches may comprise one or more of all, taken, not taken. The properties other than branches may comprise one or more of instructions retired, L2/L3 misses. The priority algorithm may comprise managing priority through software. The priority algorithm may allow one or more of an operating system and a virtual machine manager to provide priority. The priority algorithm may comprise hardware managed priority. The hardware managed priority may be based at least on part on dynamic behavior. The priority algorithm may comprise using partitioning logic to receive inputs. The inputs may comprise one or more of frequency of clears, frequencies of branches, properties other than branches. The partitioning logic may allocate entries of the branch target buffers (BTB) based the inputs.

An embodiment may include a method comprising identifying an available competitively shared resource; selecting a thread based at least in part on a priority algorithm; and assigning the selected thread to the available competitively shared resource.

In some embodiments, one or more of the following apply. In some embodiments, the method may further comprise competitively sharing branch prediction and using the priority algorithm for entry allocation. In some embodiments, the method may further comprise assigning a second thread based on the priority algorithm. In some embodiments, the method may further comprise assigning a most efficient thread to the available resource in the pipeline to increase at least one of instructions per clock (IPC) and pipeline throughput. In some embodiments, the method may further comprise providing a best known algorithm to prioritize a thread allocation to the available resource. In some embodiments, the method may further comprise prioritizing when two or more events are detected. In some embodiments, the method may further comprise selecting at least one of a highest priority event and flag based on an assigned algorithm.

In some embodiments, the method may further comprise using an event detection block, a performance counter flag block, a deadlock prevention block, and an instruction type/class block. In some embodiments, the method may further comprise using the event detection block to detect at least one of a nuke, frequency of clear, frequency of BR, an interrupt, and a cache miss. In some embodiments, the method may further comprise using the performance counter flag block to count at least one of instructions retired, code misses, and L2/L3 misses. In some embodiments, the method may further comprise using the deadlock prevention block prevent deadlock states. In some embodiments, the method may further comprise using the instruction type/class block to allow a floating point instruction to retire. In some embodiments, the method may further comprise allowing at least one of an operating system (OS) and a virtual machine manager (VMM) to set priorities. In some embodiments, the priority algorithm may have at least one learning capability. In some embodiments, the at least one learning capability may be adaptive based on at least one of historical data and workload patterns.

In some embodiments, the priority algorithm may comprise at least one of an integer rename and a floating point rename algorithm. The priority algorithm may comprise event based determinations. The event based determination may comprise one or more of a nuke, a clear, and an interrupt. The priority algorithm may comprise a performance counter. The performance counter may count occurrences. The occurrences may be one or more of instructions retired and code misses. The priority algorithm may comprise one or more of limiting physical registers, using deadlock prevention, and determining cache misses. The priority algorithm may comprise determining instruction types and classes. The priority algorithm may comprise allocating registers. Allocating registers may comprise allocating a floating point wordline more of the floating point registers. The priority algorithm may comprise managing priority through software. The priority algorithm may allow one or more of an operating system and a virtual machine manager to provide priority. The priority algorithm may comprise hardware managed priority. The hardware managed priority may be based on dynamic behavior.

In some embodiments, a priority algorithm may comprise a branch predictor algorithm. In some embodiments, the branch predictor algorithm may control action of branch target buffers (BTB) based at least in part on one or more of the following: frequency of clears, frequencies of branches, properties other than branches. The clears may comprise JEClears. The frequencies of branches may comprise one or more of all, taken, not taken. The properties other than branches may comprise one or more of instructions retired, L2/L3 misses. The priority algorithm may comprise managing priority through software. The priority algorithm may allow one or more of an operating system and a virtual machine manager to provide priority. The priority algorithm may comprise hardware managed priority. The hardware managed priority may be based at least on part on dynamic behavior. The priority algorithm may comprise using partitioning logic to receive inputs. The inputs may comprise one or more of frequency of clears, frequencies of branches, properties other than branches. The partitioning logic may allocate entries of the branch target buffers (BTB) based the inputs.

An embodiment may include a non-transitory machine-readable medium storing at least one instruction which when executed by a processor causes the processor to perform a method, the method comprising identifying an available competitively shared resource; selecting a thread based at least in part on a priority algorithm; and assigning the selected thread to the available competitively shared resource.

In some embodiments, one or more of the following apply. In some embodiments, the method may further comprise competitively sharing branch prediction and using the priority algorithm for entry allocation. In some embodiments, the method may further comprise assigning a second thread based on the priority algorithm. In some embodiments, the method may further comprise assigning a most efficient thread to the available resource in the pipeline to increase at least one of instructions per clock (IPC) and pipeline throughput. In some embodiments, the method may further comprise providing a best known algorithm to prioritize a thread allocation to the available resource. In some embodiments, the method may further comprise prioritizing when two or more events are detected. In some embodiments, the method may further comprise selecting at least one of a highest priority event and flag based on an assigned algorithm.

In some embodiments, the method may further comprise using an event detection block, a performance counter flag block, a deadlock prevention block, and an instruction type/class block. In some embodiments, the method may further comprise using the event detection block to detect at least one of a nuke, frequency of clear, frequency of BR, an interrupt, and a cache miss. In some embodiments, the method may further comprise using the performance counter flag block to count at least one of instructions retired, code misses, and L2/L3 misses. In some embodiments, the method may further comprise using the deadlock prevention block prevent deadlock states. In some embodiments, the method may further comprise using the instruction type/class block to allow a floating point instruction to retire. In some embodiments, the method may further comprise allowing at least one of an operating system (OS) and a virtual machine manager (VMM) to set priorities. In some embodiments, the priority algorithm may have at least one learning capability. In some embodiments, the at least one learning capability may be adaptive based on at least one of historical data and workload patterns.

In some embodiments, the priority algorithm may comprise at least one of an integer rename and a floating point rename algorithm. The priority algorithm may comprise event based determinations. The event based determination may comprise one or more of a nuke, a clear, and an interrupt. The priority algorithm may comprise a performance counter. The performance counter may count occurrences. The occurrences may be one or more of instructions retired and code misses. The priority algorithm may comprise one or more of limiting physical registers, using deadlock prevention, and determining cache misses. The priority algorithm may comprise determining instruction types and classes. The priority algorithm may comprise allocating registers. Allocating registers may comprise allocating a floating point wordline more of the floating point registers. The priority algorithm may comprise managing priority through software. The priority algorithm may allow one or more of an operating system and a virtual machine manager to provide priority. The priority algorithm may comprise hardware managed priority. The hardware managed priority may be based on dynamic behavior.

In some embodiments, a priority algorithm may comprise a branch predictor algorithm. In some embodiments, the branch predictor algorithm may control action of branch target buffers (BTB) based at least in part on one or more of the following: frequency of clears, frequencies of branches, properties other than branches. The clears may comprise one or more of JEClears and CRClears. The frequencies of branches may comprise one or more of all, taken, not taken. The properties other than branches may comprise one or more of instructions retired, L2/L3 misses. The priority algorithm may comprise managing priority through software. The priority algorithm may allow one or more of an operating system and a virtual machine manager to provide priority. The priority algorithm may comprise hardware managed priority. The hardware managed priority may be based at least on part on dynamic behavior. The priority algorithm may comprise using partitioning logic to receive inputs. The inputs may comprise one or more of frequency of clears, frequencies of branches, properties other than branches. The partitioning logic may allocate entries of the branch target buffers (BTB) based the inputs.

An embodiment may include a system including a memory and a processor, the processor configured to identify an available competitively shared resource; select a thread based at least in part on a priority algorithm; and assign the selected thread to the available competitively shared resource.

In some embodiments, the priority algorithm may comprise at least one of an integer rename and a floating point rename algorithm. The priority algorithm may comprise event based determinations. The event based determination may comprise one or more of a nuke, a clear, and an interrupt. The priority algorithm may comprise a performance counter. The performance counter may count occurrences. The occurrences may be one or more of instructions retired and code misses. The priority algorithm may comprise one or more of limiting physical registers, using deadlock prevention, and determining cache misses. The priority algorithm may comprise determining instruction types and classes. The priority algorithm may comprise allocating registers. Allocating registers may comprise allocating a floating point wordline more of the floating point registers. The priority algorithm may comprise managing priority through software. The priority algorithm may allow one or more of an operating system and a virtual machine manager to provide priority. The priority algorithm may comprise hardware managed priority. The hardware managed priority may be based on dynamic behavior.

In some embodiments, a priority algorithm may comprise a branch predictor algorithm. In some embodiments, the branch predictor algorithm may control action of branch target buffers (BTB) based at least in part on one or more of the following: frequency of clears, frequencies of branches, properties other than branches. The clears may comprise one or more of JEClears and CRClears. The frequencies of branches may comprise one or more of all, taken, not taken. The properties other than branches may comprise one or more of instructions retired, L2/L3 misses. The priority algorithm may comprise managing priority through software. The priority algorithm may allow one or more of an operating system and a virtual machine manager to provide priority. The priority algorithm may comprise hardware managed priority. The hardware managed priority may be based at least on part on dynamic behavior. The priority algorithm may comprise using partitioning logic to receive inputs. The inputs may comprise one or more of frequency of clears, frequencies of branches, properties other than branches. The partitioning logic may allocate entries of the branch target buffers (BTB) based the inputs.

In some embodiments, one or more of the following apply. In some embodiments, the processor may be further configured to competitively share branch prediction and to use the priority algorithm for entry allocation. In some embodiments, the processor may be further configured to assign a second thread based on the priority algorithm. In some embodiments, the processor may be further configured to assign a most efficient thread to the available resource in the pipeline to increase at least one of instructions per clock (IPC) and pipeline throughput. In some embodiments, the processor may be further configured to provide a best known algorithm to prioritize a thread allocation to the available resource. In some embodiments, the processor may be further configured to prioritize when two or more events are detected. In some embodiments, the processor may be further configured to select at least one of a highest priority event and flag based on an assigned algorithm.

In some embodiments, the processor may comprise an event detection block, a performance counter flag block, a deadlock prevention block, and an instruction type/class block. In some embodiments, the event detection block may detect at least one of a nuke, frequency of clear, frequency of BR, an interrupt, and a cache miss. In some embodiments, the performance counter flag block may count at least one of instructions retired, code misses, and L2/L3 misses. In some embodiments, the deadlock prevention block may prevent deadlock states. In some embodiments, the instruction type/class block may allow a floating point instruction to retire. In some embodiments, the processor may be further configured to allow at least one of an operating system (OS) and a virtual machine manager (VMM) to set priorities. In some embodiments, the priority algorithm may have at least one learning capability. In some embodiments, the at least one learning capability may be adaptive based on at least one of historical data and workload patterns.

In some embodiments, the priority algorithm may comprise at least one of an integer rename and a floating point rename algorithm. The priority algorithm may comprise event based determinations. The event based determination may comprise one or more of a nuke, a clear, and an interrupt. The priority algorithm may comprise a performance counter. The performance counter may count occurrences. The occurrences may be one or more of instructions retired and code misses. The priority algorithm may comprise one or more of limiting physical registers, using deadlock prevention, and determining cache misses. The priority algorithm may comprise determining instruction types and classes. The priority algorithm may comprise allocating registers. Allocating registers may comprise allocating a floating point wordline more of the floating point registers. The priority algorithm may comprise managing priority through software. The priority algorithm may allow one or more of an operating system and a virtual machine manager to provide priority. The priority algorithm may comprise hardware managed priority. The hardware managed priority may be based on dynamic behavior.

In some embodiments, a priority algorithm may comprise a branch predictor algorithm. In some embodiments, the branch predictor algorithm may control action of branch target buffers (BTB) based at least in part on one or more of the following: frequency of clears, frequencies of branches, properties other than branches. The clears may comprise one or more of JEClears and CRClears. The frequencies of branches may comprise one or more of all, taken, not taken. The properties other than branches may comprise one or more of instructions retired, L2/L3 misses. The priority algorithm may comprise managing priority through software. The priority algorithm may allow one or more of an operating system and a virtual machine manager to provide priority. The priority algorithm may comprise hardware managed priority. The hardware managed priority may be based at least on part on dynamic behavior. The priority algorithm may comprise using partitioning logic to receive inputs. The inputs may comprise one or more of frequency of clears, frequencies of branches, properties other than branches. The partitioning logic may allocate entries of the branch target buffers (BTB) based the inputs.

Thread Switching

A processor core may support an SMT thread switching feature according to embodiments of the invention. In a processor core implementing SMT with shared resources, SMT may involve choosing which of two or more threads to select at various stages in the processor issue/execution pipeline. Embodiments of the invention including an SMT thread switching feature may be desired to provide for this selection to be influenced by priorities among performance, fairness, and other factors (e.g., increasing performance, decreasing power consumption and implementing power-saving features, and improving fairness, minimum performance guarantees, throughput, instructions per clock (IPC), instructions per unit time, quality of service, time and/or memory efficiency, to list just a few of the applicable criteria). For example, in an issue/execution pipeline of processor core 900, arbitration may be used to select a thread on which branch predictor 911 is to begin prediction, a thread for which to look up a prediction in i-TLB 916, a thread for which to look up an i-TLB translation in i-cache 913, a thread for which to decode bytes from i-cache 913 in decoder 914, a thread for which to read from op-cache 912, a thread for which to read from micro-op queue 915, etc.

Figure 17:
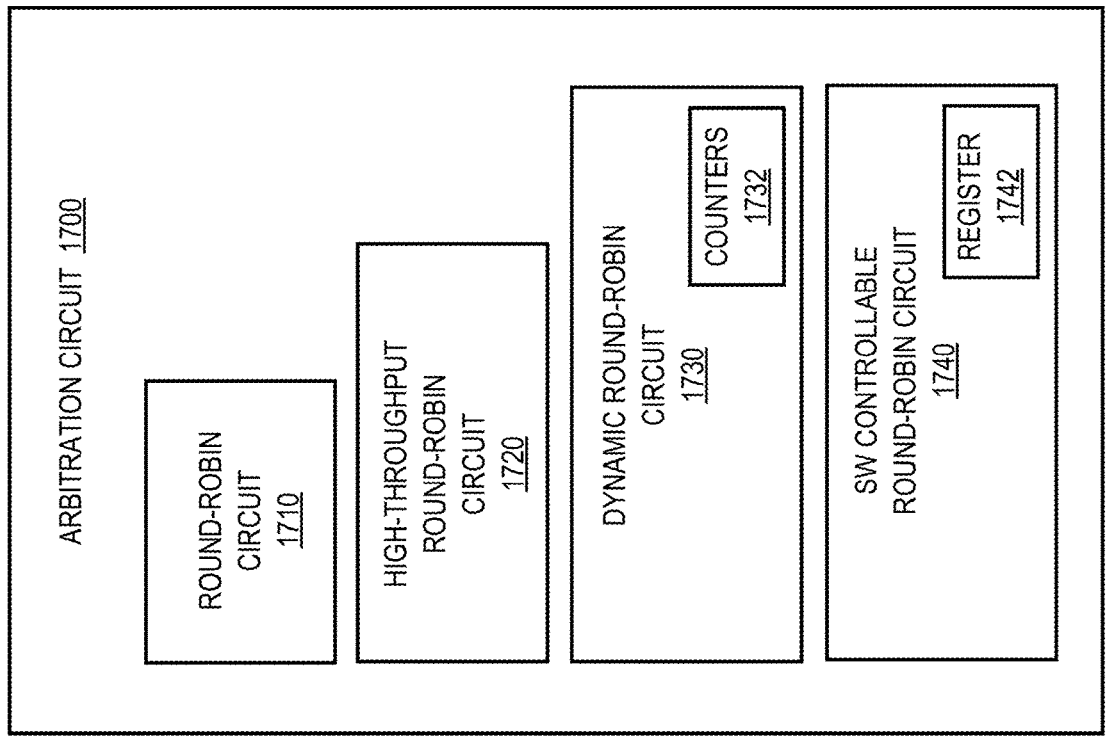
FIG. 17 is a block diagram illustrating an arbitration circuit for an SMT thread switching feature that may be included in a processor according to embodiments.

FIG. 17 is a block diagram illustrating an arbitration circuit 1700 for an SMT thread switching feature that may be included in a processor according to embodiments of the invention. Arbitration circuit 1700 may include circuitry, structures, and/or hardware to choose which of two or more threads to select for advancement at any of various stages in a processor issue/execution pipeline. A processor or processor core may include multiple instances of one or more embodiments of arbitration circuit 1700, each for any one or more pipeline stages or resources, each including any one or more of the blocks shown in FIG. 17, and each to implement any one or more approaches or combinations of approaches described below. Furthermore, all or part of any instance of arbitration circuit 1700 may be included, integrated, or incorporated in other circuitry, structures, and/or hardware of a processor or processor core, such as resource allocation, scheduling, or sharing circuitry.

Arbitration circuit 1700 may include simple round-robin circuit 1710, high-throughput round-robin circuit 1720, dynamic round-robin circuit 1730, and software-controllable round-robin circuit 1740, along with any other circuitry desired to implement any other round-robin or other scheme(s).

Simple round-robin circuit 1710 may include circuitry, structures, and/or hardware to perform a simple round-robin scheme to select a thread. For example, it may implement a scheme in which the selection constantly alternates between choices; i.e., thread 0, then thread 1, then thread 0, then thread 1, and so on; or thread 0, thread 1, thread 2, thread 0, thread 1, thread 2, and so on; etc.

High-throughput round-robin circuit 1720 may include circuitry, structures, and/or hardware to perform a modified round-robin scheme to select a thread based on a desire to prioritize throughput over other possible factors (such as fairness). For example, it may implement a simple round-robin scheme (e.g., as described above) as long as each thread has work available at the thread-switching point, otherwise, it may choose the thread that has work available. In an embodiment with more than two threads from which to choose, it may drop from the simple round-robin scheme any thread without work available.

Dynamic round-robin circuit 1730 may include circuitry, structures, and/or hardware to perform a dynamically modifiable round-robin scheme to select a thread based on the dynamic behavior of threads. Dynamic round-robin circuit 1730 may include and/or use performance counters, other hardware counters, or other structures (any of which are represented as 1732) to provide information upon which to base a decision (e.g., heuristic). A ratio or other criteria upon which to base thread selection to favor a thread, as well as an indication of which measures of dynamic behavior are to be used, may be fixed (e.g., hardwired), configurable (e.g., by hardware or firmware), or programmable (e.g., by software). For example, a first thread may be favored or selected over a second thread by a 2:1 ratio (e.g., thread 0, thread 0, thread 1, thread 0, thread 0, thread 1, and so on). Examples of factors or criteria to determine that one thread is favored over another thread are: mispredict rate, instructions per cycle, cache miss rate, etc.)

Software-controllable round-robin circuit 1740 may include circuitry, structures, and/or hardware to perform a modified round-robin scheme to select a thread based on a priority provided by software (e.g., and operating system or virtual machine monitor), which may have more information about desired system behavior than is otherwise available to software. The indication, along with a ratio at which to favor and/or any other information regarding which scheme to use or how to implement it (e.g., whether and how to combine software-controllable round-robin with dynamic and/or modifiable round-robin) may be provided in a programmable storage location or register 1742 within or accessible to arbitration circuit 1700.

In embodiments, combinations of approaches are possible. For example, software may provide (e.g., using the circuitry and/or techniques for software-controllable round-robin), a hint as to which thread to favor, and hardware (e.g., the circuitry or techniques of dynamic round-robin), may determine, based on thread behavior and/or heuristics, may determine a ratio according to which to favor that thread.

Summary of Some Embodiments

An embodiment of the invention may include a processor comprising an arbitration circuit. The arbitration circuit may include a first round-robin circuit and a second round-robin circuit. The first round-robin circuit may be to implement a simple round-robin thread switching scheme. The second round-robin circuit may be to implement a dynamically modified round-robin thread switching scheme.

Deadlock Avoidance

A processor core may support an SMT deadlock avoidance feature according to embodiments of the invention. Sharing of resources might, in some circumstances, lead to a thread making slow progress due to being starved of one or more resources, making no progress due to being unable to advance (e.g., retire an instruction), and/or any other deadlock-type situation. As a result, the user experience might include noticeably slower performance or an error, failure, or crash. Embodiments of the invention including a deadlock avoidance feature may be desired to reduce deadlock-type situations and improve user experience. Other benefits of these embodiments may include, e.g., increasing performance, decreasing power consumption and implementing power-saving features, and improving fairness, minimum performance guarantees, throughput, instructions per clock (IPC), instructions per unit time, quality of service, time and/or memory efficiency, to list just a few of the applicable criteria.

Figure 18:
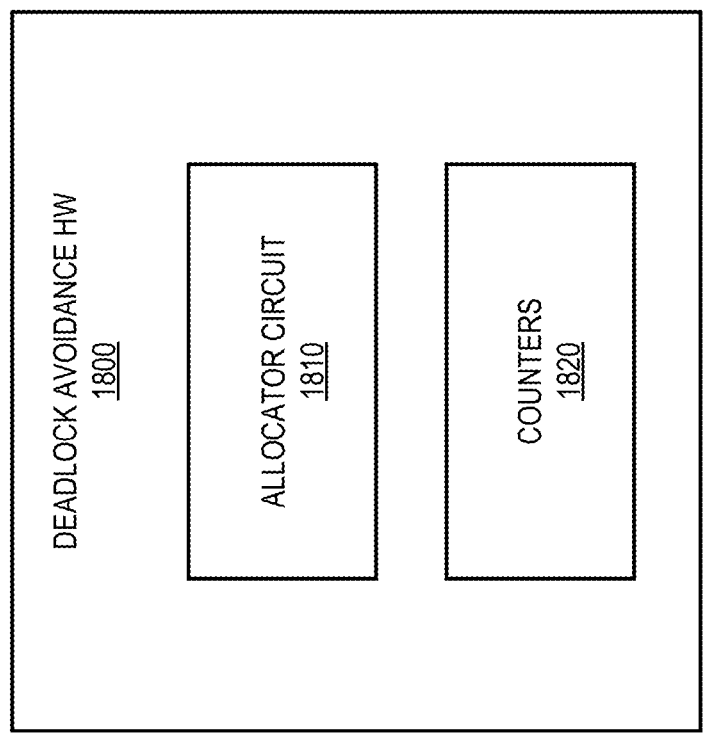
FIG. 18 is a block diagram illustrating a deadlock avoidance hardware 1800 that may be included in a processor according to embodiments o.

FIG. 18 is a block diagram illustrating a deadlock avoidance hardware 1800 that may be included in a processor according to embodiments of the invention. Deadlock avoidance hardware 1800 may include circuitry, structures, and/or hardware to affect the allocation and usage of core circuits, structures, units, and resources, and portions thereof, to reduce the incidence of deadlock-type situations. In embodiments, deadlock avoidance hardware 1800 may be implemented to avoid a deadlock involving a single resource and/or multiple resources. In either case, a processor or processor core may include multiple instances of one or more embodiments of deadlock avoidance hardware 1800, each for any one or more resources, each including any one or more of the blocks shown in FIG. 18, and each to implement any one or more approaches or combinations of approaches described below. Furthermore, all or part of any instance of deadlock avoidance hardware 1800 may be included, integrated, or incorporated in other circuitry, structures, and/or hardware of a processor or processor core, such as resource allocation, scheduling, or sharing circuitry.

Deadlock avoidance hardware 1800 may include allocator circuit 1810, which may include circuitry, structures, and/or hardware to allocate resources to threads. An embodiment or instance of an embodiment of allocator circuit 1810 may represent or correspond to an embodiment or instance of an embodiment of allocator circuit 1240 in FIG. 12.

Deadlock avoidance hardware 1800, allocator circuit CGA10, and/or any other part of a processor or processor core may include circuitry, structure, and/or hardware to dynamically disable, block, or otherwise prevent allocator circuit CGA10 from allocating a resource, or a part of a divisible resource, to any one or more particular threads. For example, in an embodiment including any type of round-robin scheme, such as those described above, to choose or arbitrate between or among thread requests, blocking a particular thread from using a resource may be accomplished by temporarily dropping that thread from the round-robin scheme. Embodiments may include an AND gate having a thread request signal (e.g., 1240A, 1240B) as one input and the complement of a thread block signal (e.g., generated by circuitry based on resource usage counters 1820, as described below, or any other information, state, or signals), such that the output of the AND gate may indicate whether a thread is to be allocated a resource or to be considered as a candidate for which a resource is to be allocated.

Deadlock avoidance hardware 1800 may also include resource usage counter 1820. In an embodiment, resource usage counter 1820 may be a per-thread hardware counter to count the number of parts (e.g., entries) of a divisible resource (e.g., buffer, queue, scheduler, reservation station) that are being occupied or used by a particular thread. For a particular resource, an instance of resource usage counter 1820 for a particular thread may be incremented in response to allocator circuit 1810 allocating an entry to that thread, decremented in response to the entry being deallocated or removed, and cleared in response to the resource being flushed. Allocator circuit 1810 may be dynamically disabled or blocked (e.g., as described above) from allocating an entry to a thread in response to the count for that thread reaching or exceeding a threshold.

The threshold may be chosen to be less than the total number of entries in the resource to prevent any single thread from using all entries at the same time, which might result in a deadlock-type situation. The threshold may also be chosen or adjusted based on other factors or criteria, including those related to tolerance for approaching deadlock-type situations and/or desire to prioritize throughput or other measures or factors of performance. The threshold may be fixed (e.g., hardwired), configurable (e.g., by hardware or firmware), or programmable (e.g., by software).

In an embodiment, a divisible resource may be logically partitioned for particular threads and groups of threads. For example, in a divisible resource having a set of N entries, a subset of N1 entries (where N1 is less than N) may be reserved for use only by a first thread, a subset of N2 entries (where N2 is less than N) may be reserved for use only by a second, and the remaining subset of N−(N1+N2) entries may be allocated to either thread. In embodiments, this approach may be enforced by one or more instances of allocator circuit 1810.

In an embodiment in which completion of a load depends on reading data out of a cache, each cache entry may include a bit to indicate that the entry is locked by a thread that includes a load from that entry. Replacement of entries with that indicator bit set may be prevented until the bit is cleared in connection with completion of the load or the thread experiences a pipeline flush event (e.g., a mispredicted branch). In embodiments, this approach may be enforced by one or more instances of allocator circuit 1810.

In an embodiment, resource usage counter 1820 may be a per-thread hardware counter to count the number of clock cycles that, for the oldest entry in a retire queue for a particular thread, that thread (the stalled thread) has been waiting for a corresponding dispatch to an indivisible resource (the condition involves the retire queue because the thread needs a dispatch slot and a writeback slot). Allocator circuit 1810, in response to the count for the stalled thread reaching or exceeding a threshold, may be dynamically disabled or blocked (e.g., as described above) from allocating an operation from a different thread to the scheduler for the indivisible resource. Alternatively, dispatch of any operations to the indivisible resource may be disabled or blocked for a given number of clock cycles.

These approaches may prevent a deadlock-type situation over the use of an indivisible resource, such as an execution unit, that may perform different operations consuming a range of clock cycles. For example, it may allow an operation that may complete in a single cycle to use a resource that might otherwise be kept busy completing a succession of multiple-cycle operations.

The threshold may be fixed (e.g., hardwired), configurable (e.g., by hardware or firmware), or programmable (e.g., by software). It may be chosen and/or dynamically adjusted based on various factors or criteria, including those related to throughput and those related to fairness. For example, if fairness is a priority, then the threshold may be gradually reduced to more aggressively allow each thread to make progress; if throughput is a priority, it may be gradually increased to more aggressively allow threads that are making progress to continue without interruption.

Summary of Some Embodiments

An embodiment of the invention may include a processor comprising deadlock avoidance hardware and a resource. The deadlock avoidance hardware may include an allocator circuit and a resource usage counter. The allocator circuit may be to determine whether to allocate the resource to a thread based on an output from the resource usage counter.

Datapath Features

Processor cores according to embodiments of the invention may include various features to support an instruction set architecture (ISA) with a datapath that is narrower than that provided for by the ISA. A number of such features are described separately using non-limiting examples below, but embodiments may include any combination of such features.

A processor core may support a feature allowing operations on operands of a larger size (e.g., loads/stores/arithmetic operations on operands that are 256 bits in side) by breaking these operations up into multiple micro-operations (μops) that operate on smaller operands (e.g., multiple μops that operate on values that are 128 bits in size). Such a feature may be desirable for a variety of reasons: for example, a processor may support an instruction set architecture that involves larger operand sizes, but may use a microarchitecture based on smaller operand sizes. Additionally or alternatively, a processor may support an instruction set architecture that involves larger operand sizes and have a register file including registers of this larger size, but may include execution units that can only handle data in smaller chunks. Additionally or alternatively, a processor may have a larger-size register file, execution units, and load/store ports, but performing μops using operands of a smaller size may be desirable for, e.g., power-saving or scheduling purposes. Other potential benefits of a processor including the features described below include, but are not limited to, increasing performance, decreasing power consumption and implementing power-saving features, and improving fairness, minimum performance guarantees, throughput, instructions per clock (IPC), instructions per unit time, quality of service, and time and/or memory efficiency, to list just a few of the applicable criteria.

256 to 128 Bit Datapath Loads and Stores

A processor core may support a feature allowing 256-bit loads and stores using 128-bit micro-operations (μops), according to embodiments of the invention. In some embodiments, a processor may support a 256-bit instruction set architecture, but may use a 128-bit microarchitecture, including a 128-bit register file. In other embodiments, a processor may have a 256-bit instruction set architecture and a 256-bit register file, but may include load and/or store ports that can only handle data in 128-bit chunks.

Figure 19:
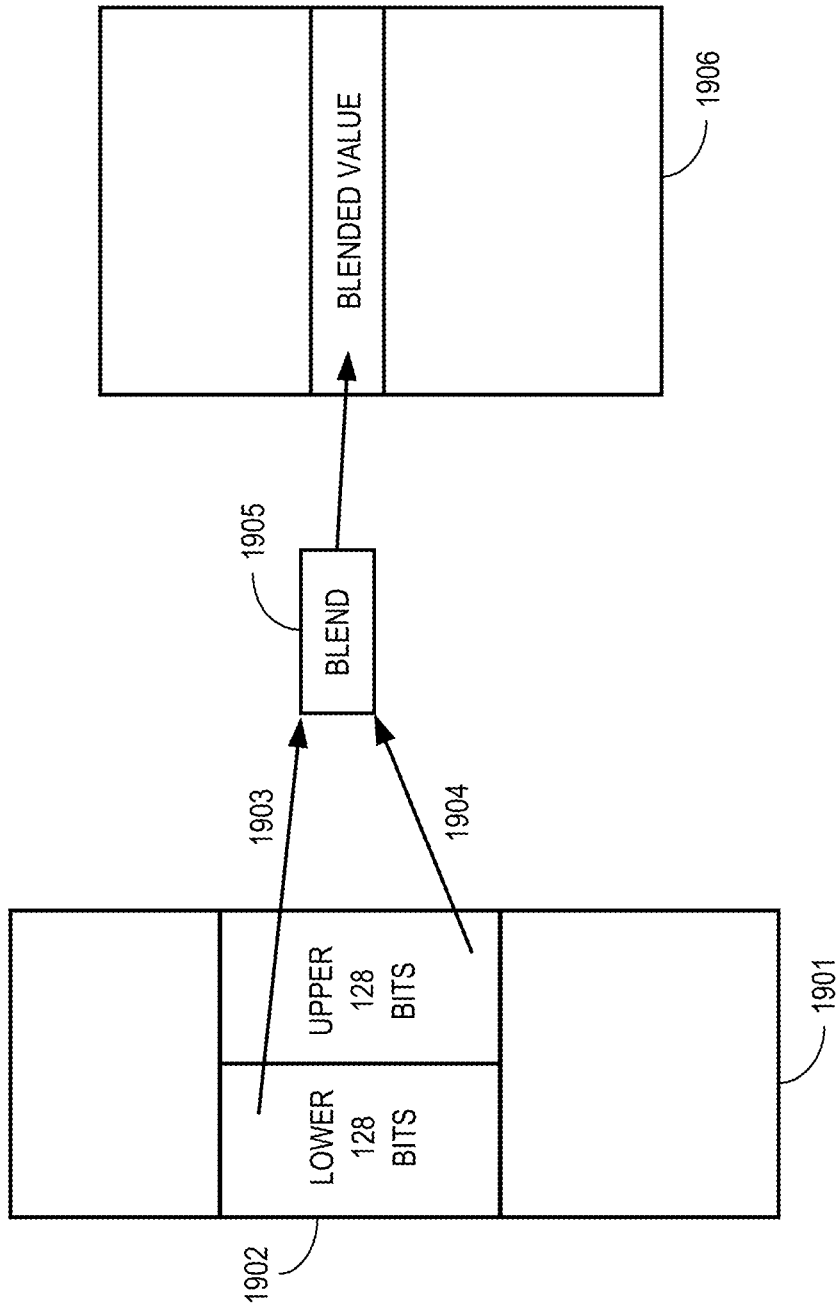
FIG. 19 is a diagram showing a 256-bit load to a 256-bit register file using a pair of 128-bit μops, according to some embodiments.

FIG. 19 is a diagram showing a 256-bit load to a 256-bit register file using a pair of 128-bit μops, according to some embodiments. Memory 1901 includes a series of 256-bit values, such as the value stored in memory location 1902. A first μop 1903 retrieves the lower half of the value stored in memory location 1902, and a second μop 1904 retrieves the upper half of the value stored in memory location 1902. The two halves of the value stored in memory location 1902 are blended together (1905) and the result of the blend operation is placed in 256-bit register file 1906.

Figure 20:
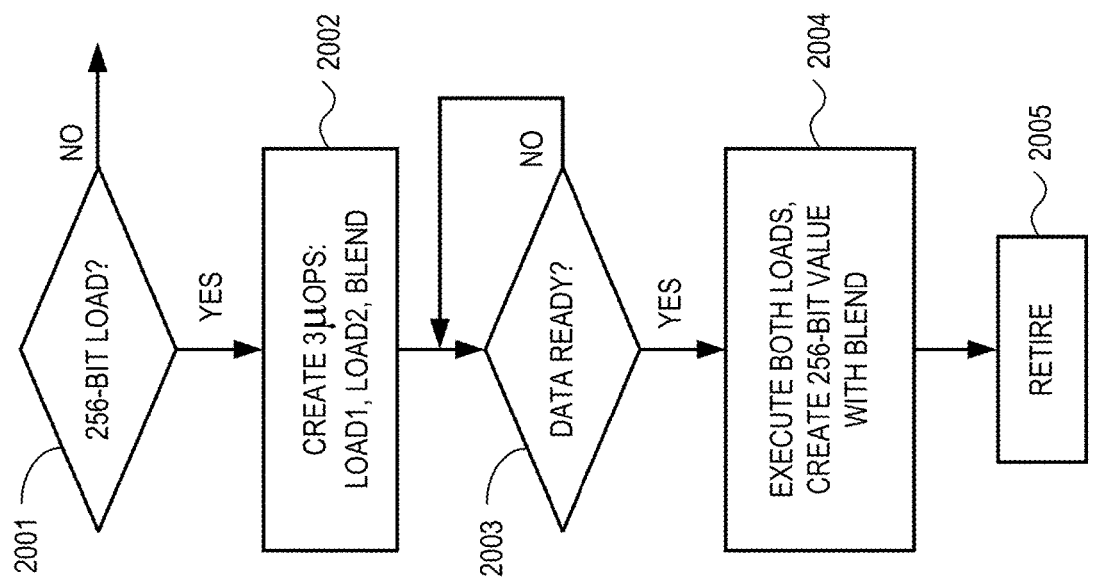
FIG. 20 is a diagram illustrating a process for loading a 256-bit to a 256-bit register file using a pair of 128-bit μops, according to some embodiments.

FIG. 20 is a flow diagram representing the process described above with reference to FIG. 19, according to some embodiments. During the process of decoding an instruction (2001) if a 256-bit load is detected, 3 μops are generated (box 2002), including a first load μop, a second load μop, and a blend μop. The μops are scheduled to be executed, and for each μop, the processor may wait until the data to be loaded/blended is ready (2003). When the first load μop is executed, the processor may retrieve the lower half of the value stored in memory location 1902, as shown in box 2004. When the second load μop is executed, the processor may retrieve the upper half of the value stored in memory location 1902, as shown in box 2004. When the blend μop is executed, the two retrieved halves of the value stored in memory location 1902 are combined and placed in a 256-bit register file, as shown in box 2004. Finally, the decoded instructions are retired upon completion, as shown in box 2005.

Figure 21:
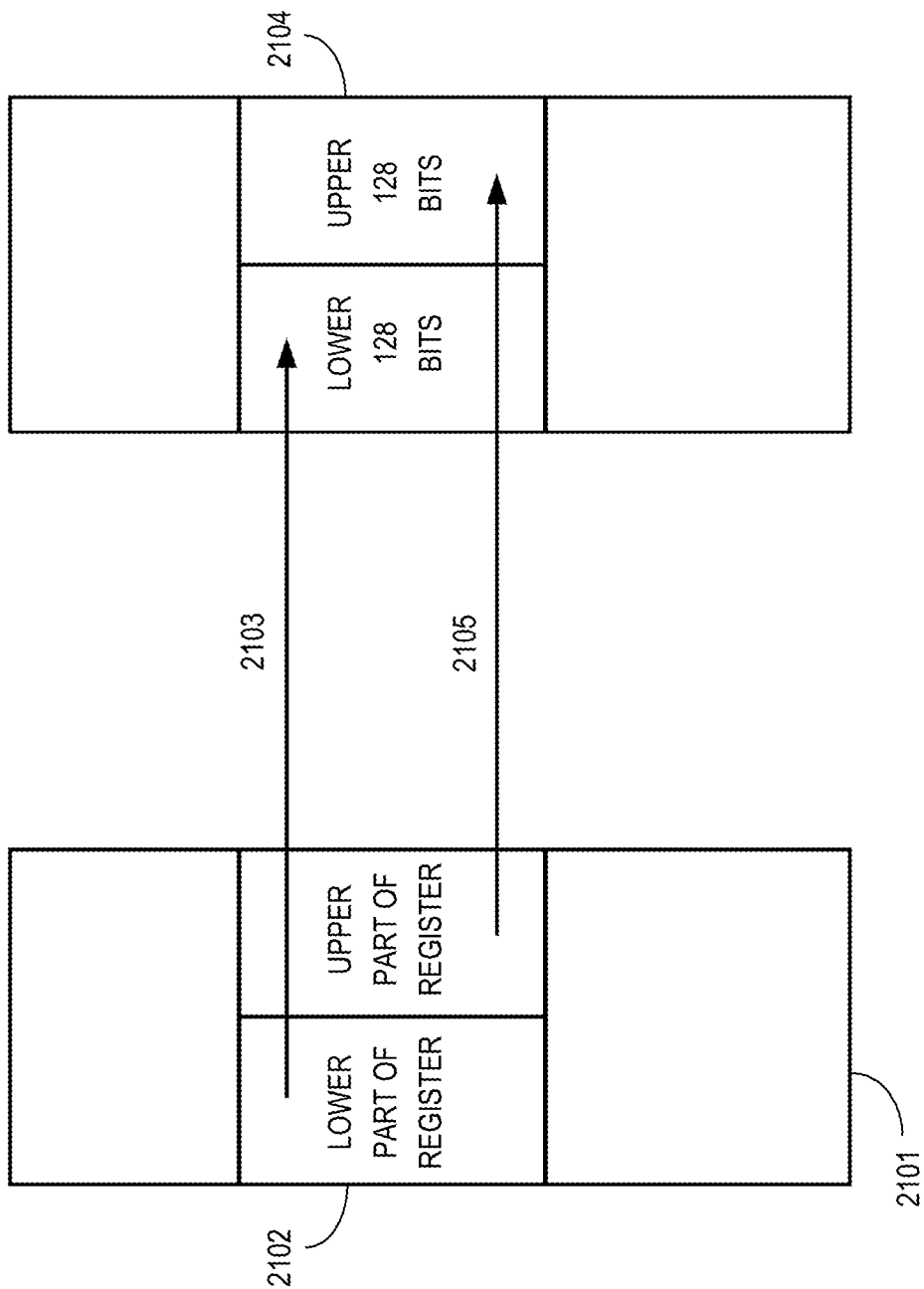
FIG. 21 is a diagram showing a 256-bit store from a 256-bit register file using 128-bit μops, according to some embodiments.

In some embodiments, a value may be stored from a 256-bit register file into memory using 128-bit μops. FIG. 21 is a diagram illustrating this process. A 256-bit register file 2101 includes registers that are 256-bits wide, such as register 2102. A first store μop, 2103, retrieves the lower half of the value stored in register 2102 and stores it in the lower half of memory location 2104. A second store μop, 2105, retrieves the upper half of the value stored in register 2102 and stores it in the upper half of memory location 2104.

Figure 22:
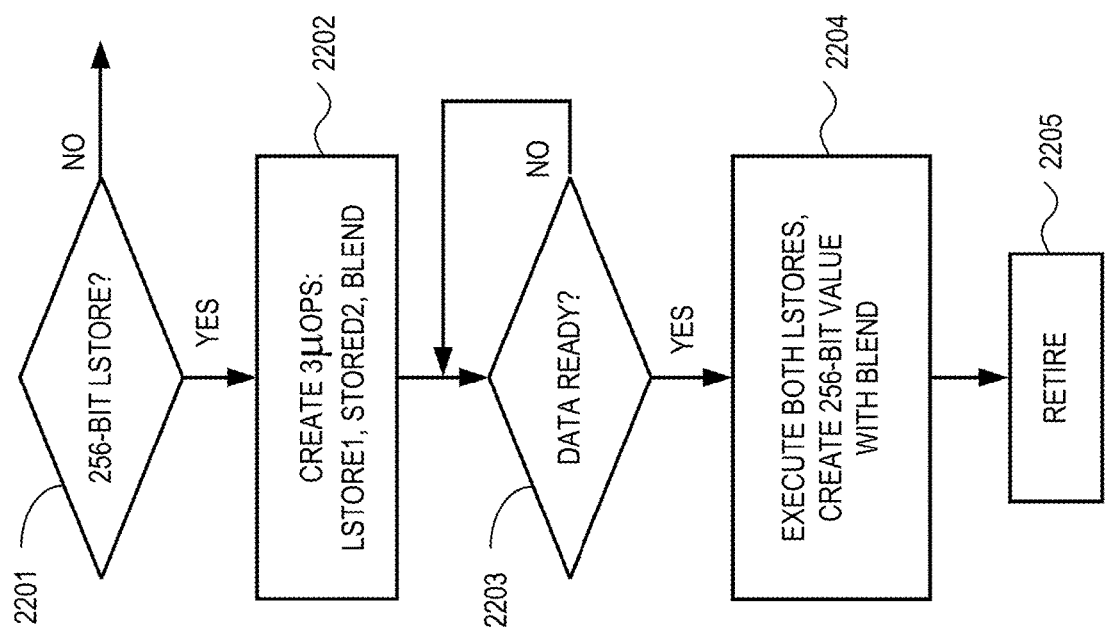
FIG. 22 is a diagram illustrating a process for storing a 256-bit from a 256-bit register file using a pair of 128-bit μops, according to some embodiments

FIG. 22 is a flow diagram representing the process described above with reference to FIG. 21, according to some embodiments. During the process of decoding an instruction (2201) if a 256-bit store is detected, 2 μops are generated (box 2202), including a first store μop and a second store μop. The μops are scheduled to be executed, and for each μop, the processor may wait until the data to be stored is ready (2203). When the first store μop is executed, the processor may retrieve the lower half of the value stored in register 2102, as shown in box 2204, and write it into the lower half of the memory location 2104. When the second store μop is executed, the processor may retrieve the upper half of the value stored in register 2102, as shown in box 2204, and write it into the upper half of the memory location 2104. Finally, the decoded instructions are retired upon completion, as shown in box 2205.

In some embodiments, a 256-bit load instruction may load a 256-bit value into two 128-bit registers by executing two μops, a first μop to load the lower half of the 256-bit value into a first 128-bit register, and a second μop to load the upper half of the 256-bit value into a second 128-bit register.

In some embodiments a load is accomplished using a single μop that is "double-pumped"—i.e., that is executed twice, once to load the lower half of a value from memory, and a second time to load the upper half of a value from memory. In some embodiments, a store is accomplished using a single μop that is "double-pumped"—i.e., executed once to store the lower half of a register to memory, and once to store the upper half of a register to memory. In some embodiments, the μops used to implement a 256-bit load and/or store may be scheduled according to vector scheduling algorithms. In some embodiments, gang scheduling techniques may be used to schedule the multiple μops involved in a load and/or a store for execution on separate execution units.

The load/store features described above are not limited to performing loads and/or stores using memory, load ports, or register files of any particular size. For example, the techniques described above may be used to perform 512-bit loads and/or stores using underlying hardware that operates on 256 bits at a time]

256 to 128 Bit Datapath In-Lane Execution

A processor core may support a feature allowing 256-bit arithmetic operations using 128-bit micro-operations (μops), according to embodiments of the invention. In some embodiments, a processor may support a 256-bit instruction set architecture, but may use a 128-bit microarchitecture, including a 128-bit register file. In other embodiments, a processor may have a 256-bit instruction set architecture and a 256-bit register file, but may include execution units that can only handle data in 128-bit chunks. In some embodiments, a processor may have a 256-bit register file, execution units, and load/store ports, but it may be desirable for, e.g., power-saving or scheduling purposes, to implement 256-bit arithmetic operations using multiple 128-bit μops.

Figure 23:
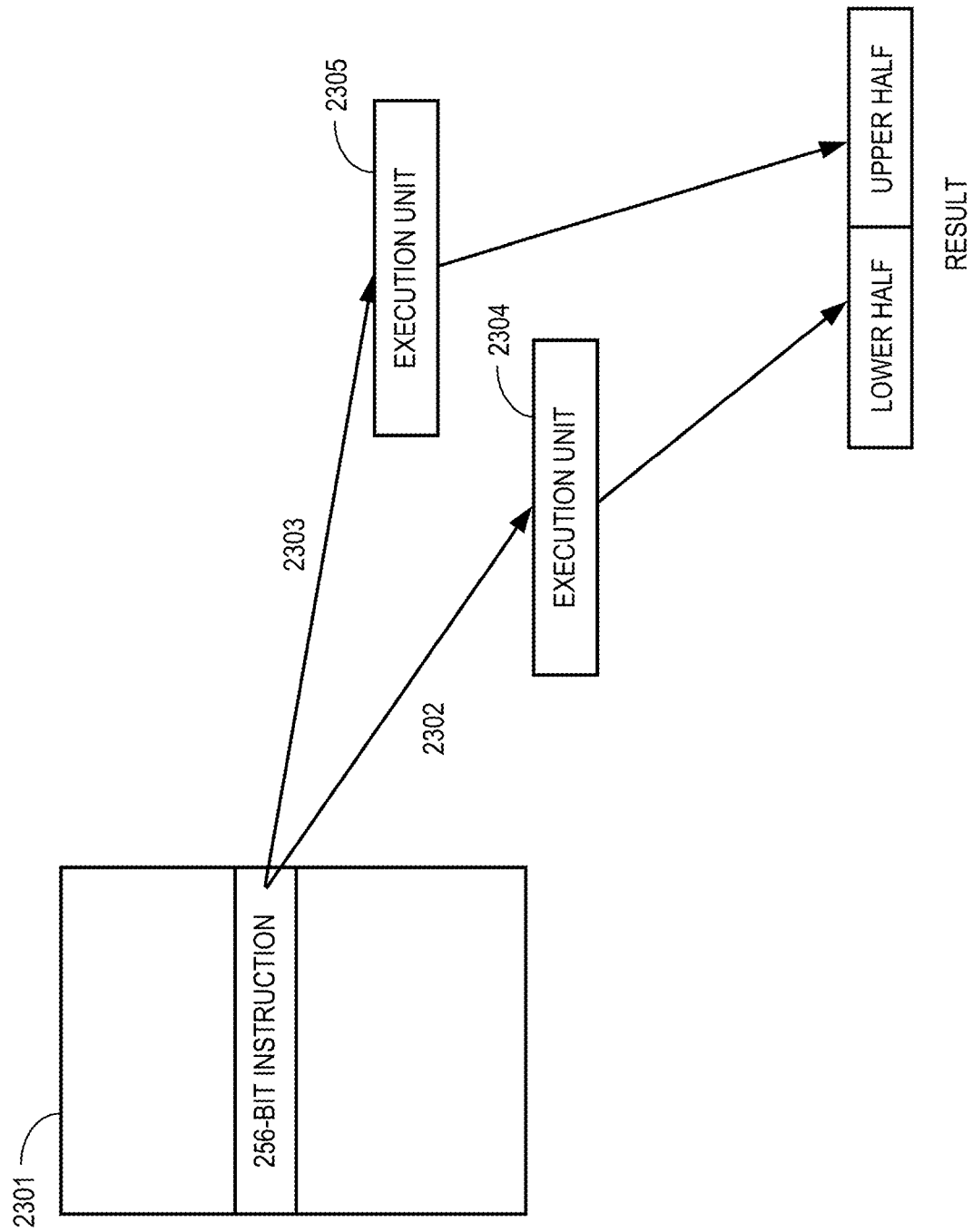
FIG. 23 is a block diagram illustrating a feature for allowing 256-bit arithmetic operations using 128-bit micro-operations according to some embodiments.

FIG. 23 illustrates this process according to some embodiments. A 256-bit instruction 2301 is decoded by splitting it into 2 128-bit μops 2302 and 2303, which are then scheduled independently for execution on one or more 128-bit execution units 2304, 2305. According to the embodiment shown in FIG. 23, the first 128-bit μop 2302 may execute an instruction using the lower halves of the 256-bit operands provided to the 256-bit arithmetic instruction and the processor may then store the result in the lower half of a 256-bit destination register. The second 128-bit μop 2303 may execute an instruction using the upper halves of the 256-bit operands provided to the 256-bit arithmetic instruction and the processor may then store the result in the upper half of a 256-bit destination register.

According to some embodiments, partitioning the 256-bit instruction into a pair of 128-bit μops bases the lower half of the result solely on the lower halves of the 256-bit instruction's operands, and the upper half of the result is based solely on the upper halves of the 256-bit instruction's operands (i.e., "in-lane" operations). In these in-lane scenarios, the two 128-bit μops may be scheduled independently of each other, because the result of the 256-bit instruction can be expressed as two independent results of two separate 128-bit μops.

In some embodiments, each of the 128-bit μops represent the same instruction (e.g., an ADD instruction), and the 256-bit instruction can be implemented using a single 128-bit μop that is "double-pumped,"—i.e., executed twice, once to calculate the lower half of the result, and once to calculate the upper half of the result. In some embodiments, the 256-bit instruction can be "split" into two distinct μops, which are independently scheduled and executed on one or more execution units. In some embodiments, the 256-bit instruction can be executed using two execution units simultaneously, each executing a 128-bit μop (this procedure is sometimes known in the art as "gang scheduling").

The in-lane execution features described above are not limited to executing instructions using memory values, load ports, execution units or register files of any particular size. For example, the techniques described above may be used to perform 512-bit operations using underlying hardware that operates on 256 bits at a time, or to perform 1024-bit operations using underlying hardware that operates on 512 bits at a time.

256 to 128 Bit Datapath Cross-Lane Execution

In some embodiments, the 256-bit instruction to be executed cannot be partitioned into two completely independent 128-bit μops, because the lower half of the result depends on values stored the upper halves of the operands, and/or the upper half of the result depends on values stored in the lower halves of the operands (i.e., "cross-lane" operations).

Figure 24:
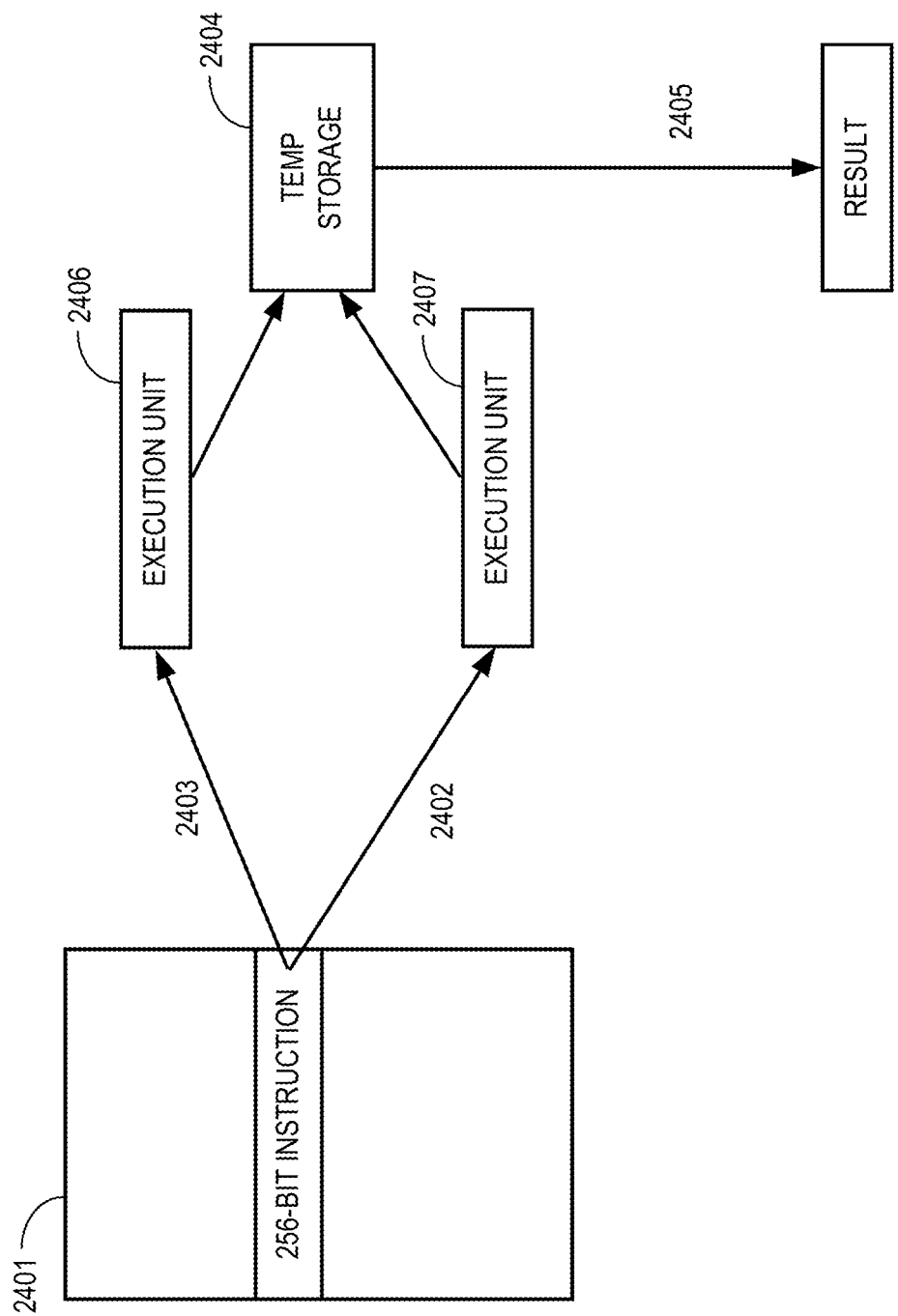
FIG. 24 is a block diagram illustrating cross-lane operations using a temporary storage area to store partial results according to some embodiments.

Cross-lane operations may be implemented using a temporary storage area to store partial results, which are then combined into a final result and stored in a destination register. FIG. 24 illustrates this process according to some embodiments of this feature. A cross-lane 256-bit instruction QJA01 is decoded by splitting it into 2 128-bit μops QJA02 and QJA03, which are then scheduled independently for execution on one or more 128-bit execution units QJA06, QJA07. A temporary storage area QJA04 is used to store partial results produced by μops QJA02 and QJA03. These temporary results are used by a third μop, QJA05, to produce a final result.

In some embodiments, each of the 128-bit μops QJA02 and QJA03 represent the same instruction, and may be implemented using a single 128-bit μop that is "double-pumped,"—i.e., executed twice, once to calculate a first partial result which is stored in the temporary storage area QJA04, and once to calculate a second partial result, which is stored in the temporary storage area QJA04. In some embodiments, the 256-bit instruction can be "split" into two distinct μops, which are independently scheduled and executed on one or more execution units, the partial results of which are stored in a temporary storage area. In some embodiments, the 256-bit instruction can be executed using two execution units simultaneously, each executing a 128-bit μop (this procedure is sometimes known in the art as "gang scheduling"). In some embodiments, a 256-bit μop may be executed using a "special" execution unit with 256-bit capabilities, eliminating the need for a temporary storage area (e.g., temporary storage area QJA04).

The cross-lane execution features described above are not limited to executing instructions using memory values, load ports, execution units or register files of any particular size. For example, the techniques described above may be used to perform 512-bit operations using underlying hardware that operates on 256 bits at a time, or to perform 1024-bit operations using underlying hardware that operates on 512 bits at a time.

Additional Independent and Combinable Features

Processor cores according to embodiments of the invention may include various additional features to support increased performance and/or decreased power consumption. A number of such features are described separately using non-limiting examples below, but embodiments may include any combination of such features.

Micro-Op Cache

A processor core may support a micro-op cache feature according to embodiments. In some embodiments, the micro-op cache feature may include allocation, replacement policy and different structure types (e.g., physical, virtual, etc.). The intelligent allocation in the micro-op cache feature may detect a type of instructions, such as loop stream or complex instructions with microcode sequencer (MS) flow, vs simple instructions and allocate accordingly. The micro-op cache feature may also cover adding a victim cache for future potential re-use and/or for determining how many micro-ops to assign per cache line. In some embodiments, the micro-op cache may be used to save decoded instructions (micro-ops) in a micro-op buffer for later reuse of the decoded instructions. In some embodiments, use of the micro-op buffer may shorten the pipeline by avoiding multiple (e.g., at least two) cycles of an instruction cache lookup and decode stage. It may also save power by using micro-ops already available and decoded in the micro-op buffer. In some embodiments, there could be more than one thread with a similar event (e.g., micro-of type, micro-op decode difficulty, micro-op use patterns), and a priority scheme may be used in cases where there is tie between threads to allocate resources to the micro-op cache. In some embodiments, the micro-op cache feature may provide intelligent allocation, replacement policy, and/or configuration for micro-op cache to achieve the highest IPC and/or instruction throughput in the pipeline.

Figure 25:
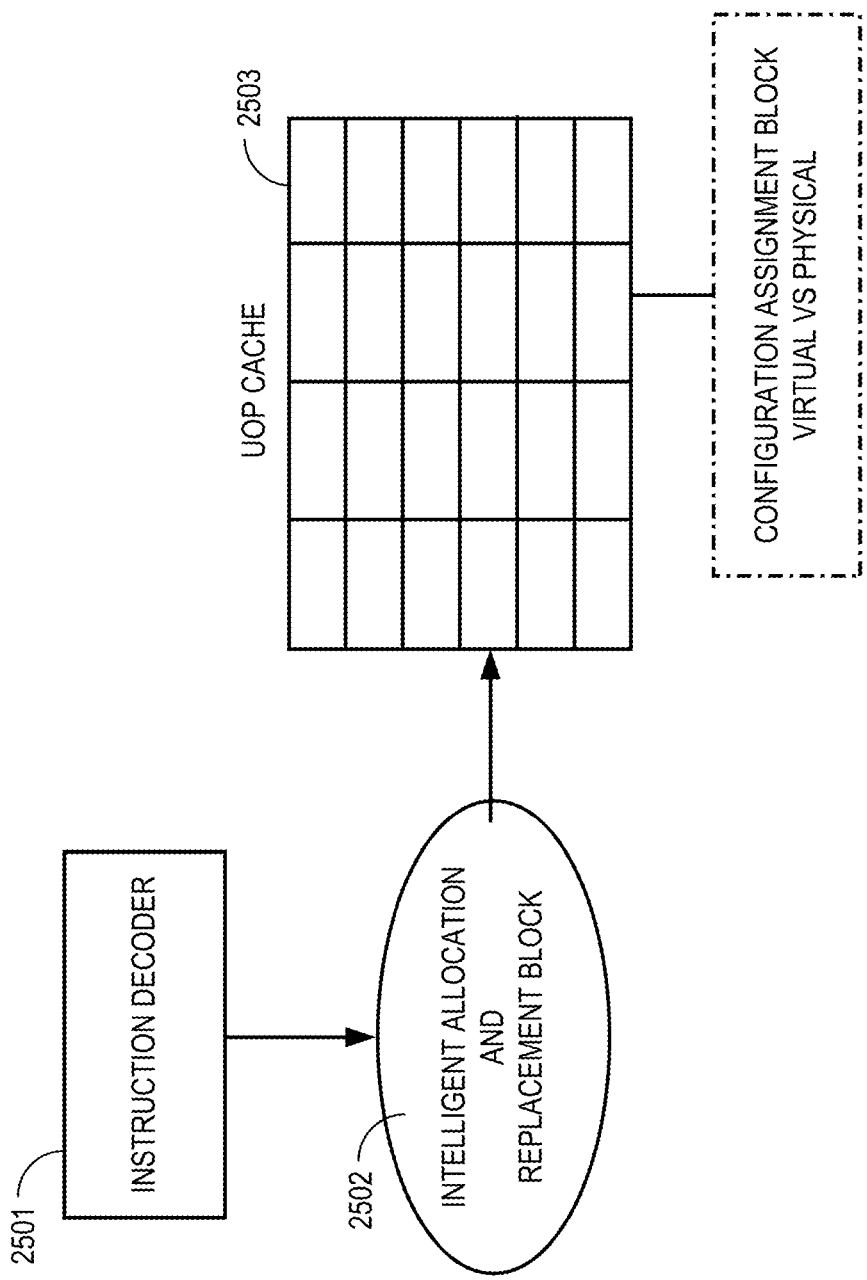
FIG. 25 is a block diagram illustrating a micro-op cache feature that may be included in a processor according to embodiments.

FIG. 25 is a block diagram illustrating a micro-op cache feature that may be included in a processor according to embodiments. A micro-op cache feature may comprise one or more of the following: an instruction decoder 2501, an intelligent allocation and replacement block 2502, and a micro-op cache 2503. An intelligent allocation and replacement block 2502 may receive instruction from the instruction decoder 2501. The instruction decoder 2501 may also be omitted and the intelligent allocation and replacement block 2502 may receive an already decoded instruction. The intelligent allocation and replacement block 2502 may algorithmically determine what types of instructions to allocate, such as complex instruction (e.g., with MS flow), loop stream, etc. The intelligent allocation and replacement block 2502 may determine where to allocate an instruction in the micro-op cache KQA03 and may allocate the instruction in the determined location. In some embodiments, the intelligent allocation and replacement block 2502 may, for example, algorithmically determine what types of instructions to allocate based on one or more of the following: historical use patterns for instructions, frequency of use, decode difficulty, and decode time. Intelligent allocation and replacement block may, for example determine where to store instructions in the micro-op cache based on one or more of the following parameters: least recently used instructions information, historical use patterns for instructions, frequency of use, decode difficulty, whether instruction is part of a loop and whether other instructions from the loop are stored, and decode time of instructions stored in the micro op cache. These parameters may, for example, be stored in the intelligent allocation and replacement block, in the micro-op cache, and/or elsewhere (e.g., in a separate table).

Figure 26:
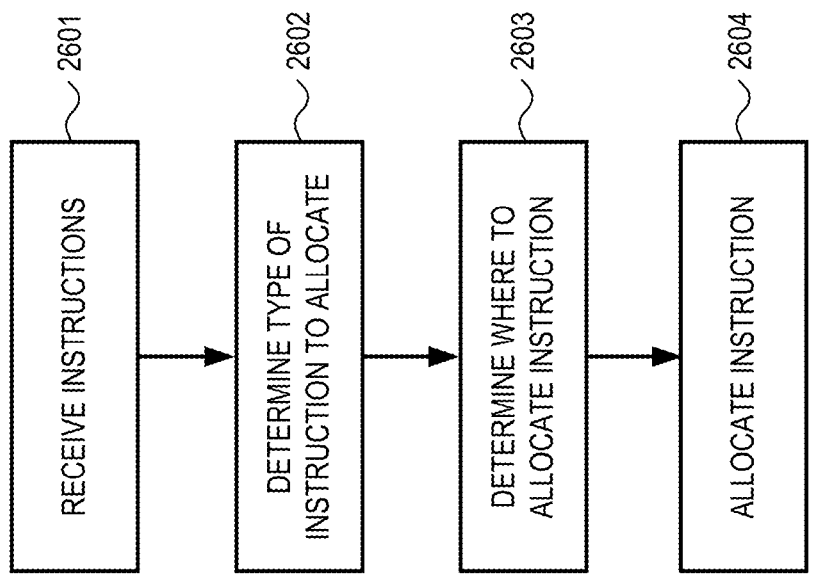
FIG. 26 is a flow diagram illustrating a method for a micro-op cache feature that may be performed by a processor according to embodiments.

FIG. 26 is a flow diagram illustrating a method for a micro-op cache feature that may be performed by a processor according to embodiments. The method may comprise receiving instructions as shown in box 2601. The method may further comprise algorithmically determining what types of instructions to allocate, such as complex instruction, loop stream, etc., as shown in box 2602. The method may further comprise determining where to allocate an instruction in a micro-op cache as shown in box 2603. The method may further comprise allocating the instruction in the determined location of the micro-op cache as shown in box 2604.

Figure 27:
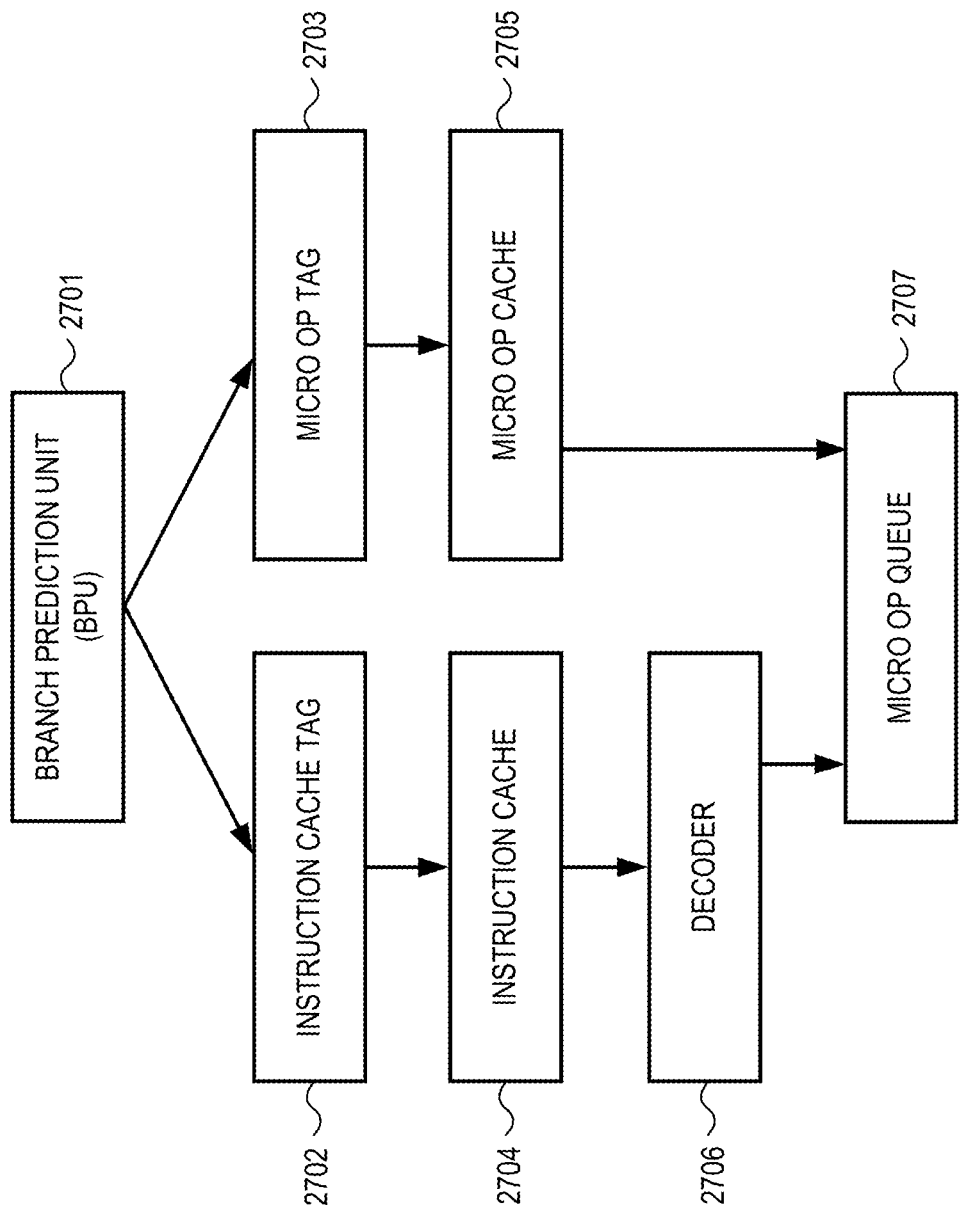
FIG. 27 is a block diagram illustrating a micro-op cache feature that may be included in a processor according to embodiment.

FIG. 27 is a block diagram illustrating a micro-op cache feature that may be included in a processor according to embodiments. The micro-op cache feature may comprise one or more of a branch prediction unit (BPU) 2701, an instruction cache tag 2702, a micro op tag 2703, an instruction cache 2704, a micro op cache 2705, a decoder 2706, and a micro op queue 2707. BPU 2701 may perform branch prediction (e.g., to determine whether to perform conditional operations). As illustrated on the left side of FIG. 27, instruction cache tag 2702 may, for example, receive an instruction tag from the BPU 2701 and determine an instruction associated with the instruction tag. The instruction may be retrieved from the instruction cache 2704 and decoded by the decoder 2706. The micro op queue 2707 may then receive the decoded instruction from the decoder 2706. As illustrated on the right side of FIG. 28, the micro op tag 2703 may receive an instruction tag from the BPU 2701 and determine an associated micro op tag. The micro op cache 2705 can then be checked to determine whether the micro-op associated with the micro op tag is stored in the micro op cache 2705 and to retrieve the micro op from the micro op cache 2705. Micro ops may be decoded and stored in the micro op cache 2705, for example, as described above in connection with FIGS. 25 and 26. The micro-op cache feature may be physical and/or virtual. The micro-op cache feature may comprise shortening the pipeline. For example, as illustrated in FIG. 27, in the case where micro-ops have been previously decoded and stored in the micro-op cache, the pipeline on the right side is shorter than the pipeline on the left side because a decode operation may not need to be performed when the micro op is already stored in the micro op cache. The micro-op cache feature may comprise next line prediction within the micro op cache 2705. The micro-op cache feature may store MS flows in the micro op cache 2705. The micro-op cache feature may use replacement policies to determine which micro-ops to store in the cache and which micro-ops to replace with new micro-ops. The micro-op cache feature may determine the types of instructions to allocate into the micro-op cache 2705, e.g., loop stream and/or complex instructions. The micro-op cache feature may prioritize micro-operations. The micro-op cache feature may comprise a victim cache (not shown). The victim cache may store instructions for potential re-use, such as instructions that were difficult to decode.

Figure 28:
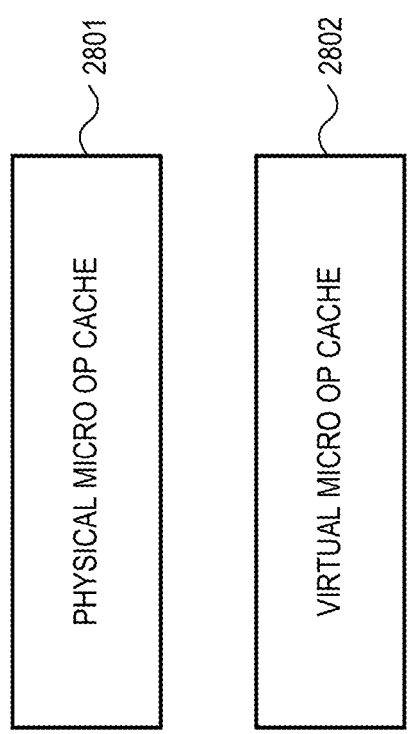
FIG. 28 is a block diagram illustrating a micro-op cache feature that may be included in a processor according to embodiments.

FIG. 28 is a block diagram illustrating a micro-op cache feature that may be included in a processor according to embodiments. The micro-op cache feature may comprise one or more of a physical micro op cache 2801 and a virtual micro op cache 2802. The physical micro op cache 2801 may, for example, store micro-ops in physical memory using a physical address space. The virtual micro op cache may, for example, store micro ops in virtual memory using a virtual address space. The physical micro op cache 2801 and/or the virtual micro op cache 2802 may be flushed, e.g., on context and/or mode switch. The physical micro op cache 2801 and/or the virtual micro op cache 2802 may be shared competitively.

Summary of Some Embodiments

An embodiment may include a processor configured to algorithmically determine a type of instruction to allocate to a micro op cache; determine a location to allocate an instruction of the determined type to the micro op cache; and allocate the instruction to the determined location.

In some embodiments, one or more of the following apply. In some embodiments, the processor is further configured to cause an intelligent allocation and replacement block to receive an instruction from an instruction decoder. In some embodiments, the determined instruction type is at least one of a complex instruction and a loop stream. In some embodiments, the processor may comprise one or more of a branch prediction unit (BPU), an instruction cache tag, a micro op tag, an instruction cache, a micro op cache, and a decoder, and a micro op queue. In some embodiments, the micro op cache may comprise next line prediction. In some embodiments, the processor is configured to store MS flows in the micro op cache. In some embodiments, the processor is configured to prioritize micro operations. In some embodiments, the processor comprises a victim cache. In some embodiments, the micro op cache comprises at least one of a physical micro op cache and a virtual micro op cache. In some embodiments, the at least one of the physical micro op cache and the virtual micro op cache may be shared competitively. In some embodiments, the determination of what type of instruction to allocate to a micro op cache may be based at least in part on one or more of the following: historical use patterns, frequency of use, decode difficulty, and decode time. In some embodiments, the determination of the location to allocate the instruction of the determined type to the micro op cache may be based on one or more of the following: least recently used instructions information, historical use patterns for instructions, frequency of use, decode difficulty, loop status information, and decode time of instructions stored in the micro op cache.

An embodiment may include a method comprising algorithmically determining a type of instruction to allocate to a micro op cache; determining a location to allocate an instruction of the determined type to the micro op cache; and allocating the instruction to the determined location.

In some embodiments, one or more of the following apply. In some embodiments, the method may further comprise causing an intelligent allocation and replacement block to receive an instruction from an instruction decoder. In some embodiments, the determined instruction type is at least one of a complex instruction and a loop stream. In some embodiments, the method may further comprise using one or more of a branch prediction unit (BPU), an instruction cache tag, a micro op tag, an instruction cache, a micro op cache, and a decoder, and a micro op queue. In some embodiments, the micro op cache may comprise next line prediction. In some embodiments, the method may further comprise storing MS flows in the micro op cache. In some embodiments, the method may further comprise prioritizing micro operations. In some embodiments, the method may further comprise using a victim cache. In some embodiments, using the micro op cache comprises using at least one of a physical micro op cache and a virtual micro op cache. In some embodiments, the method may further comprise competitively sharing at least one of the physical micro op cache and the virtual micro op cache. In some embodiments, the determination of what type of instruction to allocate to a micro op cache may be based at least in part on one or more of the following: historical use patterns, frequency of use, decode difficulty, and decode time. In some embodiments, the determination of the location to allocate the instruction of the determined type to the micro op cache may be based on one or more of the following: least recently used instructions information, historical use patterns for instructions, frequency of use, decode difficulty, loop status information, and decode time of instructions stored in the micro op cache.

An embodiment may include a non-transitory machine-readable medium storing at least one instruction which when executed by a processor causes the processor to perform a method, the method comprising algorithmically determining a type of instruction to allocate to a micro op cache; determining a location to allocate an instruction of the determined type to the micro op cache; and allocating the instruction to the determined location.

In some embodiments, one or more of the following apply. In some embodiments, the method may further comprise causing an intelligent allocation and replacement block to receive an instruction from an instruction decoder. In some embodiments, the determined instruction type is at least one of a complex instruction and a loop stream. In some embodiments, the method may further comprise using one or more of a branch prediction unit (BPU), an instruction cache tag, a micro op tag, an instruction cache, a micro op cache, and a decoder, and a micro op queue. In some embodiments, the micro op cache may comprise next line prediction. In some embodiments, the method may further comprise storing MS flows in the micro op cache. In some embodiments, the method may further comprise prioritizing micro operations. In some embodiments, the method may further comprise using a victim cache. In some embodiments, using the micro op cache comprises using at least one of a physical micro op cache and a virtual micro op cache. In some embodiments, the method may further comprise competitively sharing at least one of the physical micro op cache and the virtual micro op cache. In some embodiments, the determination of what type of instruction to allocate to a micro op cache may be based at least in part on one or more of the following: historical use patterns, frequency of use, decode difficulty, and decode time. In some embodiments, the determination of the location to allocate the instruction of the determined type to the micro op cache may be based on one or more of the following: least recently used instructions information, historical use patterns for instructions, frequency of use, decode difficulty, loop status information, and decode time of instructions stored in the micro op cache.

An embodiment may include a system including a memory and a processor, the processor configured to algorithmically determine a type of instruction to allocate to a micro op cache; determine a location to allocate an instruction of the determined type to the micro op cache; and allocate the instruction to the determined location.

In some embodiments, one or more of the following apply. In some embodiments, the processor is further configured to cause an intelligent allocation and replacement block to receive an instruction from an instruction decoder. In some embodiments, the determined instruction type is at least one of a complex instruction and a loop stream. In some embodiments, the processor may comprise one or more of a branch prediction unit (BPU), an instruction cache tag, a micro op tag, an instruction cache, a micro op cache, and a decoder, and a micro op queue. In some embodiments, the micro op cache may comprise next line prediction. In some embodiments, the processor is configured to store MS flows in the micro op cache. In some embodiments, the processor is configured to prioritize micro operations. In some embodiments, the processor comprises a victim cache. In some embodiments, the micro op cache comprises at least one of a physical micro op cache and a virtual micro op cache. In some embodiments, the at least one of the physical micro op cache and the virtual micro op cache may be shared competitively. In some embodiments, the determination of what type of instruction to allocate to a micro op cache may be based at least in part on one or more of the following: historical use patterns, frequency of use, decode difficulty, and decode time. In some embodiments, the determination of the location to allocate the instruction of the determined type to the micro op cache may be based on one or more of the following: least recently used instructions information, historical use patterns for instructions, frequency of use, decode difficulty, loop status information, and decode time of instructions stored in the micro op cache.

Move Elimination

A processor core may support a move elimination feature according to embodiments of the invention. For many processors, executing a move instruction usually involves moving a value from one register to another register, or moving an immediate to a register. Because of the frequency of such move instructions, processor performance may be increased if move instructions are efficiently processed.

Most instructions operate on several source operands and generate results. They name, either explicitly or through an indirection, the source and destination locations where values are read from or written to. A name may be either a logical (architectural) register or a location in memory.

Usually, the number of physical registers available for a processor exceeds the number of logical registers, so that register renaming may be utilized to increase performance. In particular, for out-of-order processors, register renaming allows instructions to be executed out of their original program order. Thus, for many out-of-order processors, a move instruction is renamed so that logical register named in the original move instruction are renamed to physical registers.

Renaming a logical register involves mapping a logical register to a physical register. These mappings may be stored in a Register Alias Table (RAT). A RAT maintains the latest mapping for each logical register. A RAT is indexed by logical registers, and provides mappings to corresponding physical registers.

Figure 29:
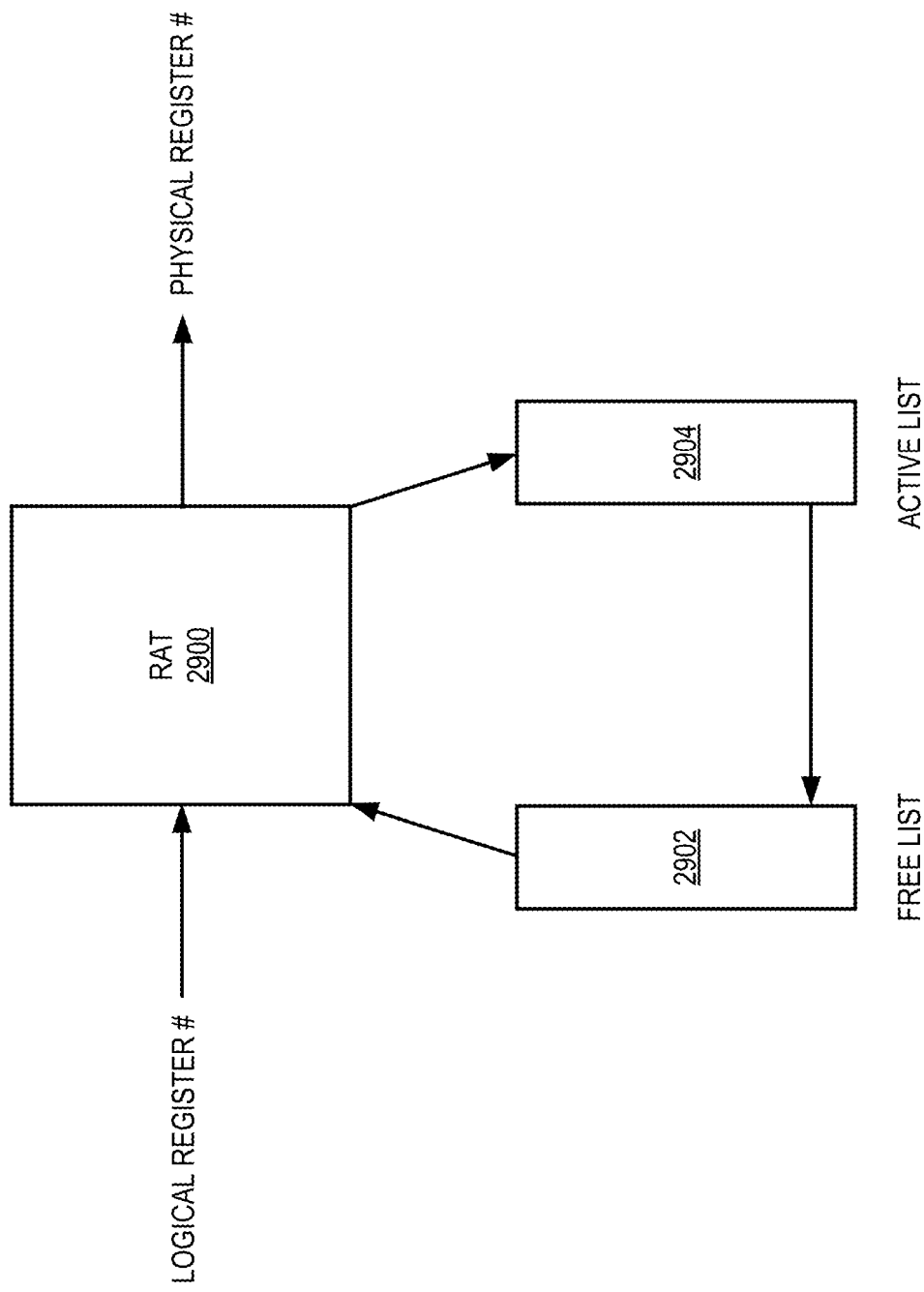
FIG. 29 is a block diagram illustrating a register renaming and dependency tracking scheme involving a register alias table (RAT) according to embodiments.

Illustrated in FIG. 29 is a register renaming and dependency tracking scheme involving three structures RAT 2900, active list (AL) 2902, and free list (FL) 2904. For each logical register specified by a renamed instruction, an unused physical register from FL 2904 is allocated and RAT 2900 is updated with this new mapping. Physical registers are free to be used again (i.e., reclaimed) once they are not referenced any more by instructions in the current instruction window.

Based on the data structures depicted in FIG. 29, one method for register reclaiming is to reclaim a physical register only when the instruction that evicted it from RAT 110, i.e., the instruction that created a new mapping to the physical register, retires. As a result, whenever a new mapping updates RAT 2900, the evicted old mapping is pushed into AL 2902. (An AL entry is associated with each instruction in the instruction window.) When an instruction retires, the physical register of the old mapping recorded in AL 2902, if any, is reclaimed and pushed into FL 2904. This cycle is depicted in FIG. 29.

For many instructions, one of the source registers is also used as a destination register. If the value stored in this source register is needed by subsequent (in program order) instructions, a register-move instruction may be inserted prior to the subsequent instruction to copy the source operand in the source register to another logical location so that it can be accessed by the subsequent instruction.

Another reason for the insertion of register-move instructions is to set the parameter values in the appropriate registers prior to a procedure call.

As a result, the number of register-move instructions may be quite significant. Therefore, it may be desirable to provide for the efficient execution of register-move instructions with efficient register renaming and reclaiming schemes.

In FIG. 1B, the register renaming functional unit is indicated as rename/allocator unit 152, and the physical registers are indicated as physical register files unit 158. In FIG. 3, the register renaming functional units are indicated as integer rename unit 321 and FP rename unit 331, and the physical registers are indicated by integer physical register file 323 and FP register file 333. Every logical register has a mapping to a physical register, where the mapping is stored in RAT 2900 as an entry. An entry in RAT 2900 is indexed by a logical register and contains a pointer to a physical register.

During renaming of an instruction, current entries in the RAT provide the required mapping for renaming the source logical register(s) of the instruction, and a new mapping is created for the destination logical register of the instruction. This new mapping evicts the old mapping in the RAT, and the RAT is updated with the new mapping.

Table 1 illustrates an example of register renaming. In Table 1, four instructions in original program order are provided in the first column. Renamed instructions are indicated in the second column. Next to each renamed instruction are the current entries in the RAT after the instruction renaming. The final column provides the mapping evicted by instruction renaming. For simplicity, only three logical registers, LRa, LRb, and LRb, are considered. A physical register is denoted by PRi where i is an integer. The first entry in Table 1 provides the current state of the RAT before the first listed instruction is renamed.

For example, in Table 1 the first instruction LRa+2→LRa (indicating that the immediate 2 is added to the value in logical register LRa and the result is stored in logical register LRa) is renamed to PR1+2→PR2, where physical register PR2 was assumed to be available. For this instruction, a new mapping LRa 4 PR2 was created and the old mapping LRa→PR1 was evicted from the RAT.

Note that there is a true dependence of the second and fourth instructions upon the first instruction, and a true dependence of the third instruction upon the second instruction. However, register renaming has removed the output dependency between the second and fourth instructions, as well as the anti-dependency between the third and fourth instructions, so that the second, third, and fourth instructions may be executed out of order, provided the execution order follows the various true dependencies.

TABLE 1

| INSTRUCTION | Renamed Instruction | RAT | EVICTED MAPPING |
|---|---|---|---|
| . . . | . . . | LRa → PR1<br>LRb → PR11<br>LRc → PR10 | . . . |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRc → PR10 | LRb → PR11 |
| LRb + 2 → LRc | PR12 + 2 → PR13 | LRa → PR2<br>LRb → PR12<br>LRc → PR13 | LRc → PR10 |
| LRa + 5 → LRb | PR2 + 5 → PR14 | LRa → PR2<br>LRb → PR14<br>LRc → PR13 | LRb → PR12 |

Renamed instructions are place in the instruction window buffer. Entries in the instruction window buffer contain the opcode of the renamed instruction, as well as other fields to be described later. For this embodiment, the results of instructions are not stored in the instruction window buffer but reside in the physical register file.

The instruction window buffer allows for instruction retirement in original program order. For complex instruction set computer (CISC) architectures, a complex instruction is retired when all micro-instructions making up the complex instruction are retired together. The instruction window buffer is operated as a circular buffer, where a first pointer points to the next instruction to be retired and a second pointer points to the next available entry for a newly decoded instruction. Incrementing of the pointers in done in modulo-N arithmetic, where N is the number of available entries in the buffer. When an instruction retires, the first pointer is incremented. The pointers are incremented by one for each decoded instruction in reduced instruction set computer (RISC) architectures, and may be incremented by more than one for CISC architectures.

For a store instruction that writes its result to a memory location, the data cache is updated upon instruction retirement. For an instruction that writes its result to a logical register, no write need be done on retirement because there are no registers dedicated as logical registers. For such an instruction, the physical register file has the result of the retiring instruction in the physical register to which the destination logical register was mapped when the instruction was renamed.

The scheduler schedules instructions to execution units for execution. The scheduling function may, for example, be realized by reservation stations implementing Tomasulo's algorithm (or variations thereof). Execution units may retrieve data from or send data to the data cache or the physical register file, depending on the instruction (or micro-instruction) to be executed.

In other embodiments of the invention, the information content contained in the data structures of the physical register file and the instruction window buffer may be realized by different functional units. For example, a re-order buffer may replace the instruction window buffer and the physical register file, so that results are stored in the re-order buffer, and in addition, registers in a register file are dedicated as logical registers. For this type of embodiment, the result of an instruction specifying a write to a logical register is written to a logical register upon instruction retirement.

We now distinguish two types of move instructions: register-to-register moves and immediate-to-register moves. In a register-to-register move, a value is moved from one register, the source logical register, to another register, the destination logical register. In an immediate-to-register move, an immediate value is moved to a logical register.

In embodiments of the invention, move instructions are executed by mapping more than one logical register to the same physical register. The execution of a register-to-register move instruction is performed by mapping the destination logical register of the move instruction to the physical register mapped by the source logical register of the move instruction.

The execution of an immediate-to-register move instruction may be performed by accessing a value-matching cache. Entries in a value-matching cache are indexed by values, where a cache entry associates a value with a physical register storing that value. The value matching cache may have fewer entries than the number of physical registers. If there is a hit in the value matching cache, then the destination logical register of the move instruction is mapped to the physical register indicated by the value-matching cache. If there isn't a hit, then the move execution is performed as in prior art architectures, and the value-matching cache is updated.

The physical register file may itself serve the function of a value-matching cache, such that the value-matching cache is not needed. In this case, the register file would need an extra port to perform parallel tag matching, where the tag is the value stored in a physical register.

As discussed above, register-to-register move instructions and immediate-to-register move instructions (provided there is a hit in the value-matching cache for the latter type of move) are executed by creating multiple mappings in which more than one logical register is mapped to the same physical register. Effectively, such move instructions are "eliminated" in the sense that they no longer are performed by execution units. Instead move eliminations are performed during the renaming stage. These instructions remain in the instruction buffer window ready to be retired. Dependency graphs are collapsed since instructions dependent on such move instructions are made directly dependent on the real producer (dependencies are redirected). There may also be a reduction in the requirement for physical registers, and there may be fewer writes into the register file.

Idiom elimination mechanisms similarly effect instruction operations without passing them down a traditional out-of-order pipeline. Idioms are instances of general purpose instructions coded to achieve a specific effect, often in a more optimized way compared to explicit instructions. Move idioms include any instruction constructed to place the contents of a source register into a destination register with no other effects, such as R1=ADD R0, #0. Zero idioms similarly are general purpose instructions coded to set a register to zero, such as R0=XOR R0, R0. No-ops (NOPs) are instructions defined to have no effect on architectural state, including explicit NOP opcode and NOP idioms such as R0=ADD R0, #0.

Embodiments of the invention may be desired to improve on existing move elimination and idiom elimination techniques by saving micro-op renaming/allocation bandwidth, increasing performance, decreasing power consumption and implementing power-saving features, and improving fairness, minimum performance guarantees, throughput, instructions per clock (IPC), instructions per unit time, quality of service, time and/or memory efficiency, and expanding coverage of move eliminations to more instruction types.

In embodiments, the results of on-the-fly move elimination and idiom elimination operations on an instruction stream may be cached into a decoded micro-op cache, such as micro-op cache 133 or 312. Therefore, rediscovery of the necessary conditions and repeat of the operations that eliminate the original instructions from the pipeline may be avoided.

The eliminated instructions may be replaced with metadata stored in the micro-op cache that achieves the same effect as the eliminated instructions. When the micro-op cache is written, the results of the move elimination or idiom elimination are converted to metadata so that the micro-ops may be removed from the micro-op cache and thus optimized out of the delivered micro-op stream. Since the on-the-fly instruction elimination mechanism have already done the work to identify the opportunities, the micro-op cache build may be modified to scan and remove the affected micro-ops. The metadata includes information needed to perform the renaming operations, plus relevant architectural information, such as the existence of event boundaries and effects of performance monitoring counters. For example, the metadata may indicate how many instructions were eliminated, and/or, for a CISC architecture, how many micro-ops were eliminated for each instruction, and/or that an end-of-macro-instruction happened after an instruction that was eliminated. Metadata may be stored in a field in an entry for a micro-op before and/or after eliminated micro-ops.

In an embodiment, move elimination may be expanded to include zero-extend and sign-extend operations. For example, R0=MOV.ZE R1 may be move eliminated, even though it is not a simple move.

In an embodiment, RAT 3000 may be extended as shown in FIG. 30 to include zero idioms, sign extension, and zero extension. The RAT is extended with following three bits: Z, when set, the rest of the RAT entry is ignored and the logical register is treated as zero; SE, when set, the value of the logical register is the sign-extended version of the physical register file identifier (PRF ID) stored in the entry; and ZE, when set, the value of the logical register is the zero-extended version of the PRF ID stored in the entry.

Figure 31:
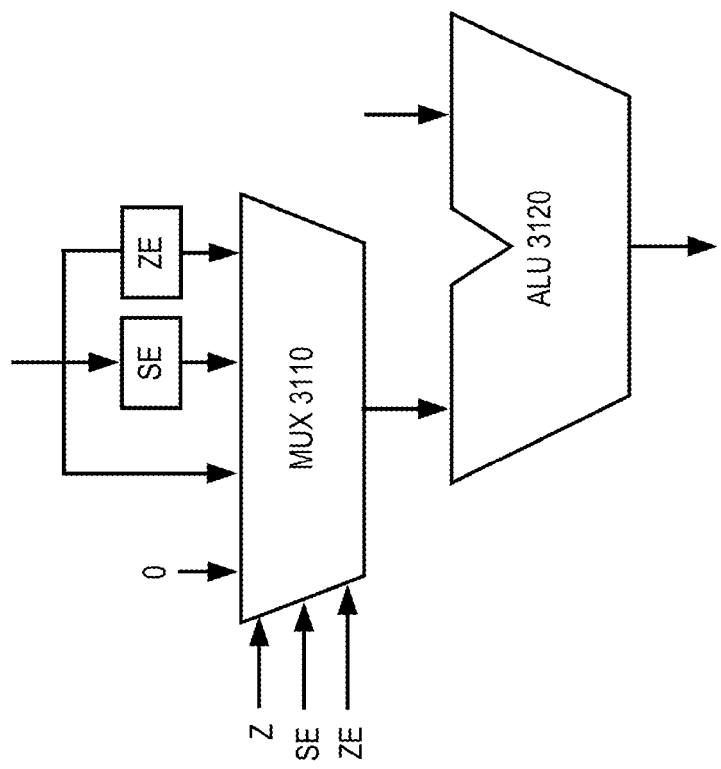
FIG. 31 is a block diagram illustrating reading extended RAT bits during register renaming and passing them down the pipeline with the micro-op that read the register according to embodiments.

Then, as illustrated in FIG. 31, the Z, SE, and ZE bits may be read during register renaming and passed down the pipeline with the micro-op that read the register. The bits are interpreted prior to operation of ALU 3120 to create the correct result. In FIG. 31, the left source path is conceptually augmented to include interpretation of the Z, SE, and ZE bits by multiplexer 3110. Based on these bits, the source is used unmodified from the bypass network or physical register file, replaced with a zero, used after sign-extension, or used after zero-extension.

Summary of Some Embodiments

An embodiment of the invention may include a processor comprising a micro-operation cache including a plurality of entry locations. At least one entry location may include a first field and a second field. The first field may be to store a first micro-operation. The second field may be to store metadata to indicate the elimination of a second micro-operation from a stream of micro-operations to be decoded from a stream of instructions, where the second micro-operation is to result from a decode of a move instruction.

An embodiment of the invention may include a processor comprising a register alias table including a plurality of entries. At least one entry may include a field in which to store one of a zero indicator, a sign-extend indicator, and a zero-extend indicator. The zero indicator is to indicate that a source operand is to be replaced with a zero. The sign-extend indicator is to indicate that the source operand is to be used after sign-extension. The zero-extend indicator is to indicate that the source operand is to be used after zero-extension.

Virtual Register Renaming

A processor core may support a virtual register renaming feature according to embodiments. In some embodiments, a 256 bit operand ymmi may be stored in a 128 bit register file. The upper half of the 256 bit operand may be stored in the 128 bit register file as 128 bit operand ymmihigh. The lower half of the 256 bit operand may be stored in the 128 bit register file as the 128 bit operand xmmi (ymmilow) by virtually renaming the lower half of the 256 bit operand. In some embodiments, this feature advantageously allows for implementing a wider ISA on a smaller physical register by renaming halves of the instruction. In some embodiments, use of smaller physical registers improves the computer system by providing more flexibility, power savings, and better performance because, for example, portions of the instructions can be accessed individually. In some embodiments, other sizes of instructions and registers may be used (e.g., 512 bit operands with 256 bit registers). In some embodiments, operands may be divided into smaller pieces, e.g., thirds, quarters, eighths, sixteenths. For example, the virtual register renaming feature could, for example, be used to remain a 512 bit operand as eight parts to be stored in a 64 bit register file.

Figure 32:
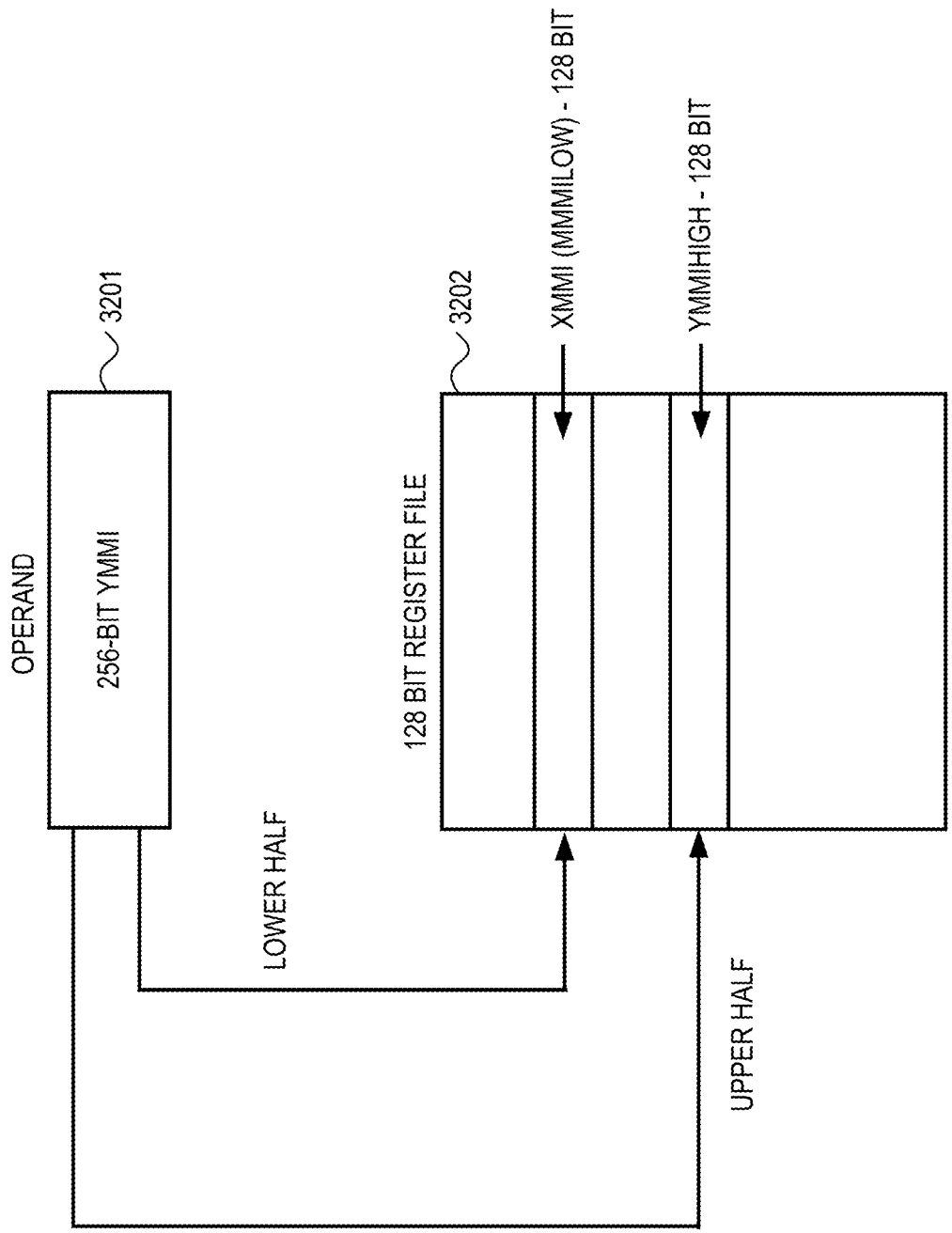
FIG. 32 is a block diagram illustrating a virtual register renaming feature that may be included in a processor according to embodiments.

FIG. 32 is a block diagram illustrating a virtual register renaming feature that may be included in a processor according to embodiments. The virtual register renaming feature may comprise an operand 3201 such as a 256 bit operand ymmi. The virtual register renaming feature may further comprise a 128 bit register file 3201. The 256 bit operand ymmi 3201 may be stored in a 128 bit register file 3202. The upper half of the 256-bit operand 3201 may be stored in the 128 bit register file 3202 as 128 bit operand ymmihigh. The lower half of the 256 bit operand 3201 may be stored in the 128 bit register file 3202 as the 128 bit operand xmmi (ymmilow) by virtually renaming the lower half of the 256 bit operand.

Figure 33:
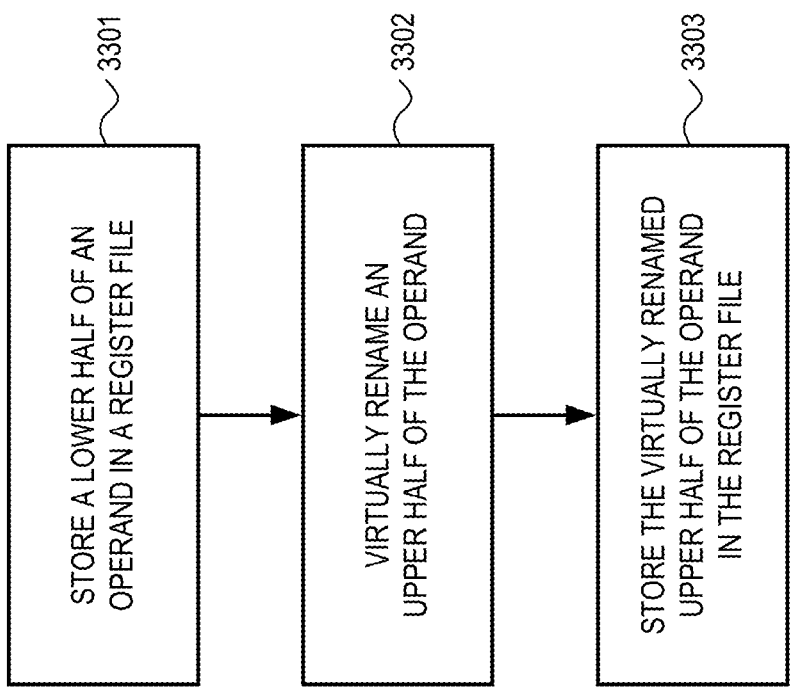
FIG. 33 is a flow diagram illustrating a method for a virtual register renaming feature that may be performed by a processor according to embodiments.

FIG. 33 is a flow diagram illustrating a method for a virtual register renaming feature that may be performed by a processor according to embodiments. The method comprises storing a lower half of an operand in a register file as shown in 3301. The method further comprises virtually rename an upper half of the operand as shown in 3302. The method further comprises storing the virtually renamed upper half of the operand in the register file. In further embodiments, other modifications are possible. For example, the lower have of the operand may be virtually renamed instead of or in addition to virtually renaming the upper half. Additionally, the operations may be performed in different orders. For example, the storing of the non-virtually renamed half may be performed before or after the virtual renaming and/or storing of the virtually renamed half. Additionally, the virtually renamed half may be virtually renamed and then stored or vice-versa.

Summary of Some Embodiments

An embodiment may include a processor configured to store a first half of an operand in a register file; virtually rename a second half of the operand; and store the virtually renamed second half of the operand in the register file. In some embodiments, one or more of the following apply. The operand may be a 256 bit operand. The register file may be a 128 bit register file.

An embodiment may include a method comprising storing a first half of an operand in a register file; virtually renaming a second half of the operand; storing the virtually renamed second half of the operand in the register file. In some embodiments, one or more of the following apply. The operand may be a 256 bit operand. The register file may be a 128 bit register file.

An embodiment may include a non-transitory machine-readable medium storing at least one instruction which when executed by a processor causes the processor to perform a method, the method comprising storing a first half of an operand in a register file; virtually renaming a second half of the operand; storing the virtually renamed second half of the operand in the register file. In some embodiments, one or more of the following apply. The operand may be a 256 bit operand. The register file may be a 128 bit register file.

An embodiment may include a system including a memory and a processor, the processor configured to store a first half of an operand in a register file; virtually rename a second half of the operand; and store the virtually renamed second half of the operand in the register file. In some embodiments, one or more of the following apply. The operand may be a 256 bit operand. The register file may be a 128 bit register file.

FMA Fission and Fusion

A processor core may support fission and fusion of multiply-add instructions and operations according to embodiments of the invention. In various embodiments, a processor core may support an instruction set having any one or more add, multiply, fused multiply-add (FMAD), and/or fused multiply-accumulate (FMAC) instructions (where FMAD and/or FMAC may be referred to as FMA) to operate on FP values. Such a core may include any one or more of an adder circuit, a multiplier circuit, and/or an FMA circuit to perform FP add, multiply, and/or FMA operations in response to these instructions. Separate instructions and/or circuitry may be provided to operate on integer values (e.g., FMAC) and FP values (e.g., FMAD), and embodiments may be described with reference to one or the other (integer or FP); however, various embodiments of the invention may include either or both.

Embodiments of the invention provide for converting FMA instructions/operations into pairs of add and multiply instructions/operations (fission) and/or converting pairs of add and multiply instructions/operations into FMA instructions/operations (fusion) between and/or within various stages in an instruction issue/execution pipeline. This feature may be generally referred to as FMA fission/fusion or dynamic FMA fission/fusion.

Embodiments of the invention including FMA fission/fusion may be desired for many reasons, including: providing the capability to execute FMA instructions and/or perform FMA operations in a core having an adder circuit and a multiplier circuit, but no FMA circuit; providing the capability to execute a multiply instruction and an add instruction using an FMA operation to increase throughput through one or more core resources; providing the capability to dynamically split FMA instructions or operations into multiply operations and add operations to reduce the critical path in a loop and increase the instructions per cycle; and providing the possibility of optimizing, on a stage-by-stage basis, an FMA-capable pipeline for a desired combination of performance, complexity, and power (e.g., increasing performance, decreasing power consumption and implementing power-saving features, and improving fairness, minimum performance guarantees, throughput, instructions per clock (IPC), instructions per unit time, quality of service, time and/or memory efficiency, to list just a few of the applicable criteria).

Figure 34:
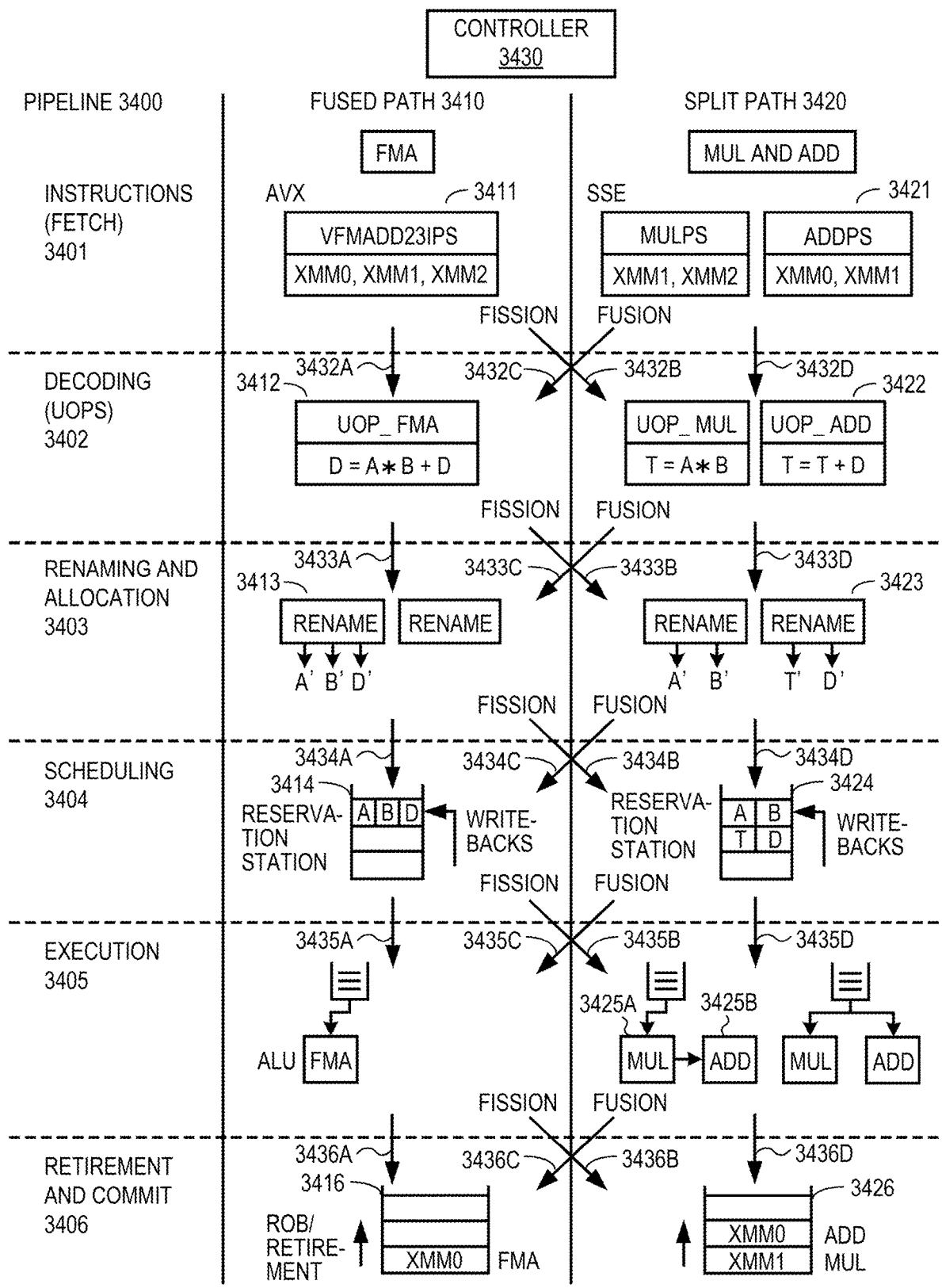
FIG. 34 is a block diagram illustrating an issue/execution pipeline that may be implemented in a processor core supporting a fused multiply-add (FMA) fission/fusion feature according to embodiments of the invention.

FIG. 34 is a block diagram illustrating an issue/execution pipeline 3400 that may be implemented in a processor core supporting an FMA fission/fusion feature according to embodiments of the invention. In FIG. 34, pipeline 3400 includes instruction fetch stage 3401, instruction decode stage 3402, rename/allocate stage 3403, schedule stage 3404, execute stage 3405, and retire/commit stage 3406. Pipeline 3400 is provided for illustrative purposes, and may be implemented and/or modified in a variety of ways in various embodiments of the invention. Therefore, the following description of pipeline 3400 may refer to various blocks shown in other figures described in this specification.

For example, instruction fetch stage 3401 may include using an instruction fetch circuit (e.g., 138, 400) to identify (e.g., using next-PC register 410) an instruction or the memory location of an instruction to be fetched and to fetch the instruction from an i-cache (e.g., 134, 313, 470, 913) or other memory location; instruction decode stage 3402 may include using an instruction decode circuit (e.g., 140, 314, 500, 914) to decode (e.g., using decoder 530) the instruction; rename/allocate stage 3403 may include using a rename/allocator circuit (e.g., 152, 331, 931) to rename register operands and/or to allocate storage locations and/or tags for register renaming; schedule stage 3404 may include using a scheduler circuit (e.g., 156, 332, 932) to schedule operations and/or micro-ops (e.g., from decoder 140, 314, 530, or 614 or micro-op cache 133, 312, 540, or 912) associated with the instruction for execution; execute stage 3405 may include using an execute circuit (e.g., 162, 334, 335, 770, 780, 934, 935) to execute operations and/or micro-ops (e.g., from decoder 140, 314, 530, or 614 or micro-op cache 133, 312, 540, or 912) associated with the instruction; and retire/commit stage 3406 may include using a retirement circuit (e.g., 154, 730, 960) to retire the instruction and/or commit its result to a physical register file (e.g., 158, 333, 750, 933) or memory. Each stage shown in FIG. 34 may represent one or more stages and/or clock cycles in various embodiments.

FIG. 34 also shows fused path 3410 and split path 3420, each representing an embodiment of a path through pipeline 3400. Fused path 3410 may include circuits, structures, and/or hardware to process, perform, and/or execute an FMA instruction, operation, and/or micro-op as a fused instruction, operation, and/or micro-op, as described using illustrative embodiments below. Split path 3420 may include circuits, structures, and/or hardware to process, perform, and/or execute a multiply and an add instruction, operation, and/or micro-op as separate instructions, operations, and/or micro-ops, as described using illustrative embodiments below. Furthermore, split path 3420 may include circuits, structures, and/or hardware to process, perform, and/or execute an FMA instruction, operation, and/or micro-op as a multiply and an add instruction, operation, and/or micro-op; and fused path 3410 may include circuits, structures, and/or hardware to process, perform, and/or execute a multiply and an add instruction, operation, and/or micro-op as a fused instruction, operation, and/or micro-op.

Therefore, FIG. 34 conceptually illustrates a set of core resources that may be used to process, perform, and/or execute fused and/or separate multiply and add instructions, operations, and micro-operations. Various embodiments may include various subsets of these resources to support various capabilities, as will be further described below. Also, implementations may include various additional resources not shown in FIG. 34 that may be provided and/or configured to practice various embodiments of the invention.

FIG. 34 also shows FMA fission/fusion controller 3430, which may represent a programmable, configurable, or hardwired controller or control structure, including one or more control circuits and/or software programmable or hardware configuration registers to generate control signals to direct the flow of instructions, operations, micro-ops, operands, values, and/or other data through and/or between fused path 3410 and/or split path 3420. These control signals may provide for one or more paths through pipeline 3400 that include a combination of resources in fused path 3410 and split path 3420. These control signals may provide for dynamic FMA fission/fusion by causing an FMA instruction, operation, and/or micro-op to be processed, performed, and/or executed as a fused instruction, operation, and/or micro-op in response to a first condition and as separate multiply and add instructions, operations, and/or micro-ops in response to a second condition and/or by causing separate multiply and add instructions, operations, and/or micro-ops to be processed, performed, and/or executed as a fused instruction, operation, and/or micro-op in response to a third condition and as separate multiply and add instructions, operations, and/or micro-ops in response to a fourth condition.

For example, an FMA instruction may be fetched by hardware in fused path 3410, and controller 3430 may generate one or more control signals to route the instruction to hardware in split path 3420 to decode the instruction into two separate micro-ops, a multiply micro-op and an add micro-op. Although shown as an independent block in FIG. 34, in various embodiments controller 3430 may be integrated or included within another control structure in a processor core or may be omitted entirely (e.g., in an embodiment in which the core provides only one possible path, examples of which are described below).

In FIG. 34, fused path 3410 includes fetcher 3411, decoder 3412, renamer 3413, scheduler 3414, fused multiply-adder 3415, and re-order buffer/retire queue (ROB/RQ) 3416; and split path 3420 includes fetcher 3421, decoder 3422, renamer 3423, scheduler 3424, multiplier 3425A and adder 3425B, and re-order buffer/retire queue (ROB/RQ) 3426.

Fetcher 3411 may include circuitry and/or structures to fetch an FMA instruction (e.g., an AVX (as defined below) instruction such as VFMADD132PS, VFMADD213PS, VFMADD231PS, VFMADD132PD, VFMADD213PD, VFMADD231PD, VFMADD132SS, VFMADD213SS, VFMADD231SS, VFMADD132SD, VFMADD213SD, VFMADD231SD, VFMSUB132PS, VFMSUB213PS, VFMSUB231PS, VFMSUB132PD, VFMSUB213PD, VFMSUB231PD, VFMSUB132SS, VFMSUB213SS, VFMSUB231SS, VFMSUB132SD, VFMSUB213SD, VFMSUB231SD, VFNMADD132PS, VFNMADD213PS, VFNMADD231PS, VFNMADD132PD, VFNMADD213PD, VFNMADD231PD, VFNMADD132SS, VFNMADD213SS, VFNMADD231SS, VFNMADD132SD, VFNMADD213SD, VFNMADD231SD, VFNMSUB132PS, VFNMSUB213PS, VFNMSUB231PS, VFNMSUB132PD, VFNMSUB213PD, VFNMSUB231PD, VFNMSUB132SS, VFNMSUB213SS, VFNMSUB231SS, VFNMSUB132SD, VFNMSUB213SD, VFNMSUB231SD, VFMADDSUB132PS, VFMADDSUB213PS, VFMADDSUB231PS, VFMADDSUB132PD, VFMADDSUB213PD, VFMADDSUB231PD, VFMSUBADD132PS, VFMSUBADD213PS, VFMSUBADD231PS, VFMSUBADD132PD, VFMSUBADD213PD, or VFMSUBADD231PD).

An FMA instruction fetched by fetcher 3411 may have three operands. For example, a VFMADD231PS instruction may have a first operand (xmm1 or ymm1), a second operand (xmm2 or ymm2), and a third operand (xmm3 or ymm3), where xmm and ymm registers that may be specified by these operands are described below. These registers may hold scalar or packed values, and for a convenient description of an embodiment, the letter 'd' may be used to refer to the source/destination register or a portion of the register specified by the xmm1 operand and/or a value stored or to be stored in this register or a portion of this register; the letter 'a' may be used to refer to the source register or a portion of the register specified by the xmm2 operand and/or a value stored or to be stored in this register or a portion of this register; and the letter 'b' may be used to refer to the source register or a portion of the specified by the xmm3 operand and/or a value stored or to be stored in this register or a portion of this register. Therefore, a conceptual representation of an operation to be performed in response to a VFMADD231PS instruction, where a, b, and d may also be referred to as operands, is d=a*b+d. Furthermore, although this description refers to operands as registers, embodiments may use memory locations instead of registers for any or all operands.

Fetcher 3421 may include circuitry, structures, and/or hardware to fetch a multiply instruction (e.g., an SSE (streaming single-instruction-multiple-data extension) instruction such as MULPS, MULPD, MULSS, or MULSD) and an add instruction (e.g., an SSE instruction such as ADDPS, ADDPD, ADDSS, or ADDSD), each having two operands For example, a MULPS instruction may have a first operand (xmm1) and a second operand (xmm2), and an ADDPS instruction may have a first operand (xmm1) and a second operand (xmm2), where, in general, each of the MULPS xmm1, MULPS xmm2, ADDPS xmm1, and ADDPS xmm2 operands may be different registers. However, in an embodiment of the invention, fetcher 3421 may pair a MULPS instruction with an ADDPS instruction when it is determined that the ADDPS instruction depends on the MULPS instruction (i.e., the MULPS result is an input to the ADDPS). For example, with 'a' as the MULPS xmm1 operand and 'b' as the MULPS xmm2 operand, the corresponding multiply operation a=a*b, and if a is next used as an ADDPS xmm2 operand, with 'd' as the ADDPS xmm1 operand, the corresponding add operation is d=d+a, and fetcher 3421 may pair the MULPS and ADDPS instructions. In embodiments, the pairing and/or determining whether the condition for pairing is satisfied may be performed in response to a control signal from controller 3430.

Fetcher 3411 may be coupled or connected, as represented by arrow 3432A, to decoder 3412 and/or, as represented by arrow 3432B, to decoder 3422. Fetcher 3421 may be coupled or connected, as represented by arrow 3432C, to decoder 3412 and/or, as represented by arrow 3432D, to decoder 3422. The coupling or connecting and/or the decoder operation may be static (e.g., hardwired) or dynamic (e.g., depending on control signals from 3430) in various embodiments.

Decoder 3412 may include circuitry, structures, and/or hardware to decode an FMA instruction, received from fetcher 3411, into an FMA micro-op having three operands (e.g., d, a, and b). Instead or additionally, decoder 3412 may include circuitry, structures, and/or hardware to decode a paired multiply and add instruction, received from fetcher 3421, into an FMA micro-op having three operands (e.g., d, a, and b).

Decoder 3422 may include circuitry, structures, and/or hardware to decode an FMA instruction, received from fetcher 3411, into a multiply micro-op having two operands and an add micro-op having two operands. Instead or additionally, decoder 3422 may include circuitry, structures, and/or hardware to decode a paired multiply and add instruction from fetcher 3421 into a multiply micro-op having two operands and an add micro-op having two operands. For example, the multiply micro-op may be represented as t=a*b and the add micro-op as d=d+t, where a new operand 't' may be introduced to serve as the destination of the multiply operation and a source for the add operation.

Decoder 3412 may be coupled or connected, as represented by arrow 3433A, to renamer 3413 and/or, as represented by arrow 3433B, to renamer 3423. Decoder 3422 may be coupled or connected, as represented by arrow 3433C, to renamer 3413 and/or, as represented by arrow 3433D, to renamer 3423. The coupling or connecting and/or the renamer operation may be static (e.g., hardwired) or dynamic (e.g., depending on control signals from 3430) in various embodiments.

Renamers 3413 and/or 3423 may include circuitry, structures, and/or hardware, such as a re-order buffer, to rename register operands and/or to allocate storage locations and/or tags for register renaming, for example to accommodate out-of-order processing. In embodiments, to eliminate register conflicts (e.g., for a, b, t, and/or d), renamer 3413 may rename operands for the FMA operation (e.g., as a', b', and/or d'); and/or renamer 3423 may rename operands for the multiply operation (e.g., as a' and/or b') and for the add operation (e.g., as t' and/or d').

Renamer 3413 may be coupled or connected, as represented by arrow 3434A, to scheduler 3414, and/or, as represented by arrow 3434B, to scheduler 3424. Renamer 3423 may be coupled or connected, as represented by arrow 3434C, to scheduler 3414 and/or, as represented by arrow 3434D, to scheduler 3424. The coupling or connecting and/or the scheduler operation may be static (e.g., hardwired) or dynamic (e.g., depending on control signals from 3430) in various embodiments.

Schedulers 3414 and/or 3424 may include circuitry, structures, and/or hardware, such as a reservation station, to schedule operations and/or micro-ops for execution. In embodiments, scheduler 3414 may schedule, in a reservation station for an FP execution circuit, an FMA operation to be executed with the operands a, b, and d, and/or scheduler 3424 may schedule, in a reservation station for an FP execution circuit, a multiply operation to be executed with the operands a and b and an add operation to be executed with the operands t and d.

Scheduler 3414 may be coupled or connected, as represented by arrow 3435A, to fused multiply/adder 3415, and/or, as represented by arrow 3435B, to multiplier 3425A or both multiplier 3425A and adder 3425B. Scheduler 3424 may be coupled or connected, as represented by arrow 3434C, to fused multiply/adder 3415, and/or, as represented by arrow 3434D, to multiplier 3425A or both multiplier 3425A and adder 3425B. The coupling or connecting and/or the scheduler operation may be static (e.g., hardwired) or dynamic (e.g., depending on control signals from 3430) in various embodiments.

Fused multiply/adder 3415, multiplier 3425A, and adder 3425B may include circuitry, structures, and/or hardware to perform a fused-multiply-add operation, a multiply operation, and an add operation, respectively. In an embodiment, multiplier 3425A may be coupled to a reservation station to receive two inputs (e.g., a and b) for a multiply operation and coupled to adder 3425B to provide its output (e.g., t) to be used as one of two inputs (e.g., t and d) for an add operation. In this embodiment, the precision of a dedicated fused multiply-adder (e.g., according to IEEE standard 754) may be obtained by sending the unrounded multiply result to the adder. In another embodiment, multiplier 3425A may be coupled to a reservation station to receive two inputs (e.g., a and b) for a multiply operation that generates an output (e.g., t), and adder 3425A may be coupled to the reservation station to receive two inputs for an add operation (e.g., t and d). In this embodiment, the precision of a dedicated fused multiply-adder may be obtained by increasing the width of the internal storage locations for the intermediate result (e.g., t) or by using a microcode assist or trap to provide special handling.

Fused multiply-adder 3415 may be coupled or connected, as represented by arrow 3436A, to ROB/RQ 3416, and/or, as represented by arrow 3436B, to ROB/RQ 3426. Adder 3425B may be coupled or connected, as represented by arrow 3436C, to ROB/RQ 3416, and/or, as adder 3425B or both multiplier 3425A and adder 3425B may be coupled or connected, as represented by arrow 3436D, to ROB/RQ 3426. The coupling or connecting and/or the scheduler operation may be static (e.g., hardwired) or dynamic (e.g., depending on control signals from 3430) in various embodiments.

ROB/RQ 3416 and/or ROB/RQ 3426 may include circuitry, structures, and/or hardware, such as a re-order buffer and/or a retirement queue, to retire instructions and/or commit results. In an embodiment, ROB/RQ 3416 may retire an FMA instruction and commit its result (e.g., xmm1). In an embodiment, ROB/RQ 3426 may retire a multiply instruction and an add instruction and commit their results (e.g., MULPS xmm1, ADDPS xmm1, respectively). In an embodiment, ROB/RQ 3416 may commit the result of an FMA operation that has been created by fusion of a separate multiply and a separate add instruction, so long as the result of the separate multiply operation is not desired (e.g., expected according to the instruction set architecture). In an embodiment, ROB/RQ 3426 may commit, as the result of an FMA instruction, the result of an add operation that has been created by fission of the FMA instruction. In a processor core according to embodiments of the invention, the result of the add instruction will be the same as the result of a corresponding FMA instruction.

As illustrated in FIG. 34, embodiments may provide for FMA fission or fusion at various stages of an issue/execution pipeline. In an embodiment, fission at decode stage 3402 may provide for fused multiply-add instructions to be executed in a core without a dedicated fused multiply-adder. In an embodiment, fusion at decode stage 3402, rename/allocate stage 3403, schedule stage 3404, execute stage 3405, and/or retire stage 3406 may provide for greater throughput through hardware resources (one instruction/operation/micro-op instead of two instructions/operations/micro-ops). In an embodiment, fission at rename/allocate stage 3403 may provide for reduced complexity in the renaming hardware by restricting the number of operands to two instead of three. In an embodiment, fusion at rename/allocate stage 3403 and/or schedule stage 3404 may provide for the use of fewer entries in renaming, re-ordering, and/or scheduling storage to allow deeper out-of-order execution windows and/or the discovery of greater instruction level parallelism. In an embodiment, fission at schedule stage 3404 may provide for reduced hardware complexity by limiting the number of out-of-order wake-up sources to two per entry instead of three. In an embodiment, fission at schedule stage 3404 and/or execution stage 3405 may provide for reduced latency by allowing separate parts of an FMA operation to execute at different times to limit the critical path to that of the slowest part instead of the sum of the two parts. In an embodiment, fusion at execution stage 3405 may provide for increased performance, increased precision, and/or reduced power by using a dedicated fused multiply-adder.

Figure 35:
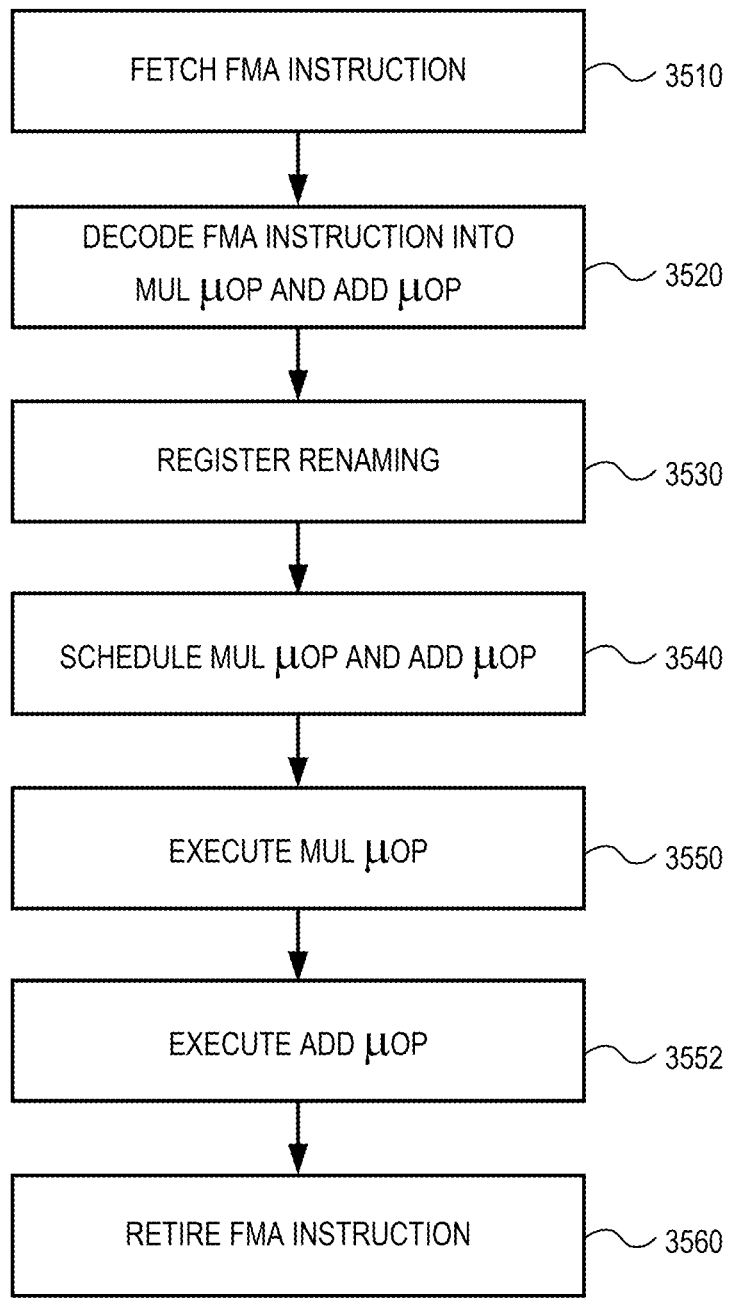
FIG. 35 is a flow diagram illustrating a method for FMA fission/fusion that may be performed by a processor according to embodiments of the invention.

FIG. 35 is a flow diagram illustrating a method for FMA fission/fusion that may be performed by a processor according to embodiments of the invention. In block 3510 of method 3500 of FIG. 35, an instruction fetch circuit (e.g., 138, 400) may fetch an instruction from an i-cache (e.g., 134, 313, 470, 913) or other memory location. For example, the instruction may be an instance of an FMA instruction such as VFMADD231PS, having a first operand ('d'), a second operand ('a'), and a third operand ('b'), to which a processor is to respond by performing an FMA operation (e.g., d=a*b+d).

In block 3520, an instruction decode circuit or decoder (e.g., 140, 314, 500, 914) that is hardwired, configured, or programmed to perform fission of FMA instructions may decode the instruction into multiple separate micro-ops, a multiply micro-op and an add micro-op. The decoder may select particular operands from the FMA instruction and/or from another micro-op, assign one or more of them to one or more of the separate micro-ops, and/or create new operands for one or more of the separate micro-ops. For example, the decoder may select the FMA instruction's 'a' and 'b' operands as source operands for a multiply micro-op and create a 't' operand as the destination operand for the multiply micro-op, to which the processor is to respond by performing the multiply operation t=a*b; and the decoder may select the FMA instruction's 'd' operands and the multiply micro-op's 't' operand as source operands for an add micro-op and select the FMA instruction's 'd' operand as the destination operand for the add micro-op, to which the processor is to respond by performing the add operation d=d*t.

In block 3530, a register renaming circuit (e.g., 152, 331, 931) may rename any of the operands, allocate storage locations and/or tags for register renaming (e.g., in a re-order buffer) and/or implement the assignment of the output of the multiply micro-op (e.g., 't') as an input to the add micro-op.

In block 3540, a scheduler circuit (e.g., 156, 332, 932) may schedule the separate micro-ops for execution, e.g., in a reservation station for an FP unit. In an embodiment, multiple separate micro-ops decoded from the same instance of an instruction (e.g., a multiply and an add micro-op decoded from an FMA instruction) may be scheduled in a reservation station for dispatch in a specified order (e.g., the add micro-op may be scheduled for dispatch only after dispatch and/or completion of the multiple micro-op).

In block 3550, an execute circuit (e.g., 162, 334, 770, 934) may execute one of the separate micro-ops. For example, FP multiplier 334A, 334B, 770A, 770B, 934A, or 934B may execute the multiply micro-op.

In block 3552, an execute circuit (e.g., 162, 335, 780, 935) may execute the other of the separate micro-ops. For example, FP adder 335A, 335B, 780A, 780B, 935A, or 935B may execute the add micro-op.

In block 3560, a retirement circuit (e.g., 154, 730, 960) may retire the instruction and/or commit its result to a physical register file (e.g., 158, 333, 750, 933) or memory. In an embodiment, block 3560 may include retirement of only one of the separate micro-ops decoded from an instruction. For example, an FMA instruction may be retired and/or its result committed by retiring a corresponding add micro-op from a re-order buffer and committing its result (e.g., d).

Summary of Some Embodiments

An embodiment of the invention may include a processor comprising a plurality of circuits arranged in a pipeline. The plurality of circuits may include a decoder to decode a fused multiply-add instruction into at least two separate micro-operations. The plurality of circuits may also include a multiplier to operate on a first of the two separate micro-operations and an adder to operate on a second of the two separate micro-operations.

Specific Processor Architectures

Figure 36:
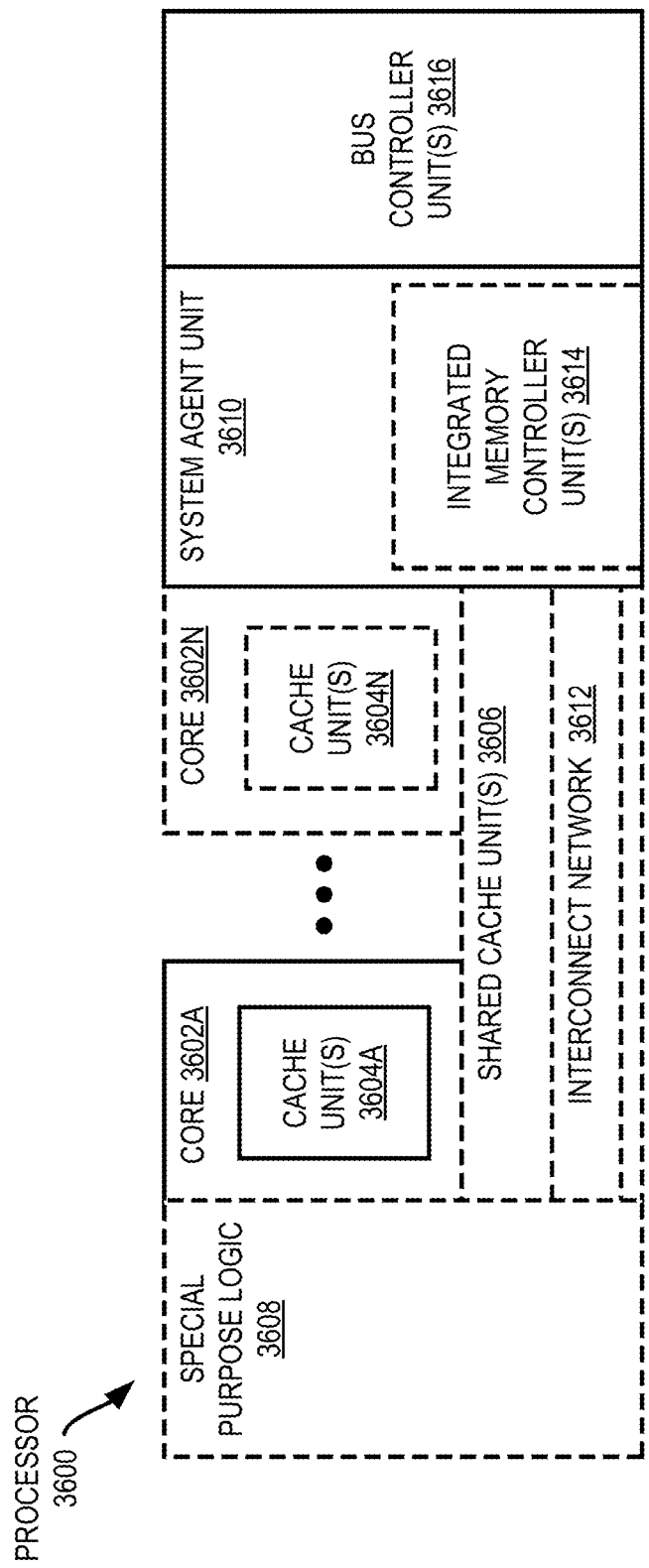
FIG. 36 is a block diagram of a processor that may have more than one core, may have an integrated memory controller, and may have integrated graphics according to embodiments of the invention.

FIG. 36 is a block diagram of a processor 3600 that may have more than one core, may have an integrated memory controller, and may have integrated graphics according to embodiments of the invention. The solid lined boxes in FIG. 36 illustrate a processor 3600 with a single core 3602A, a system agent 3610, a set of one or more bus controller units 3616, while the optional addition of the dashed lined boxes illustrates an alternative processor 3600 with multiple cores 3602A-N, a set of one or more integrated memory controller unit(s) 3614 in the system agent unit 3610, and special purpose logic 3608.

Thus, different implementations of the processor 3600 may include: 1) a CPU with the special purpose logic 3608 being integrated graphics and/or scientific (throughput) logic (which may include one or more cores), and the cores 3602A-N being one or more general purpose cores (e.g., general purpose in-order cores, general purpose out-of-order cores, a combination of the two); 2) a coprocessor with the cores 3602A-N being a large number of special purpose cores intended primarily for graphics and/or scientific (throughput); and 3) a coprocessor with the cores 3602A-N being a large number of general purpose in-order cores. Thus, the processor 3600 may be a general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device. The processor may be implemented on one or more chips. The processor 3600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3606, and external memory (not shown) coupled to the set of integrated memory controller units 3614. The set of shared cache units 3606 may include one or more mid-level caches, such as level 2 (L2), level 3 (L3), level 4 (L4), or other levels of cache, a last level cache (LLC), and/or combinations thereof. While in one embodiment a ring based interconnect unit 3612 interconnects the integrated graphics logic 3608 (integrated graphics logic 3608 is an example of and is also referred to herein as special purpose logic), the set of shared cache units 3606, and the system agent unit 3610/integrated memory controller unit(s) 3614, alternative embodiments may use any number of well-known techniques for interconnecting such units. In one embodiment, coherency is maintained between one or more cache units 3606 and cores 3602-A-N.

In some embodiments, one or more of the cores 3602A-N are capable of multi-threading. The system agent 3610 includes those components coordinating and operating cores 3602A-N. The system agent unit 3610 may include for example a power control unit (PCU) and a display unit. The PCU may be or include logic and components needed for regulating the power state of the cores 3602A-N and the integrated graphics logic 3608. The display unit is for driving one or more externally connected displays.

The cores 3602A-N may be homogenous or heterogeneous in terms of architecture instruction set; that is, two or more of the cores 3602A-N may be capable of execution the same instruction set, while others may be capable of executing only a subset of that instruction set or a different instruction set.

Figure 37:
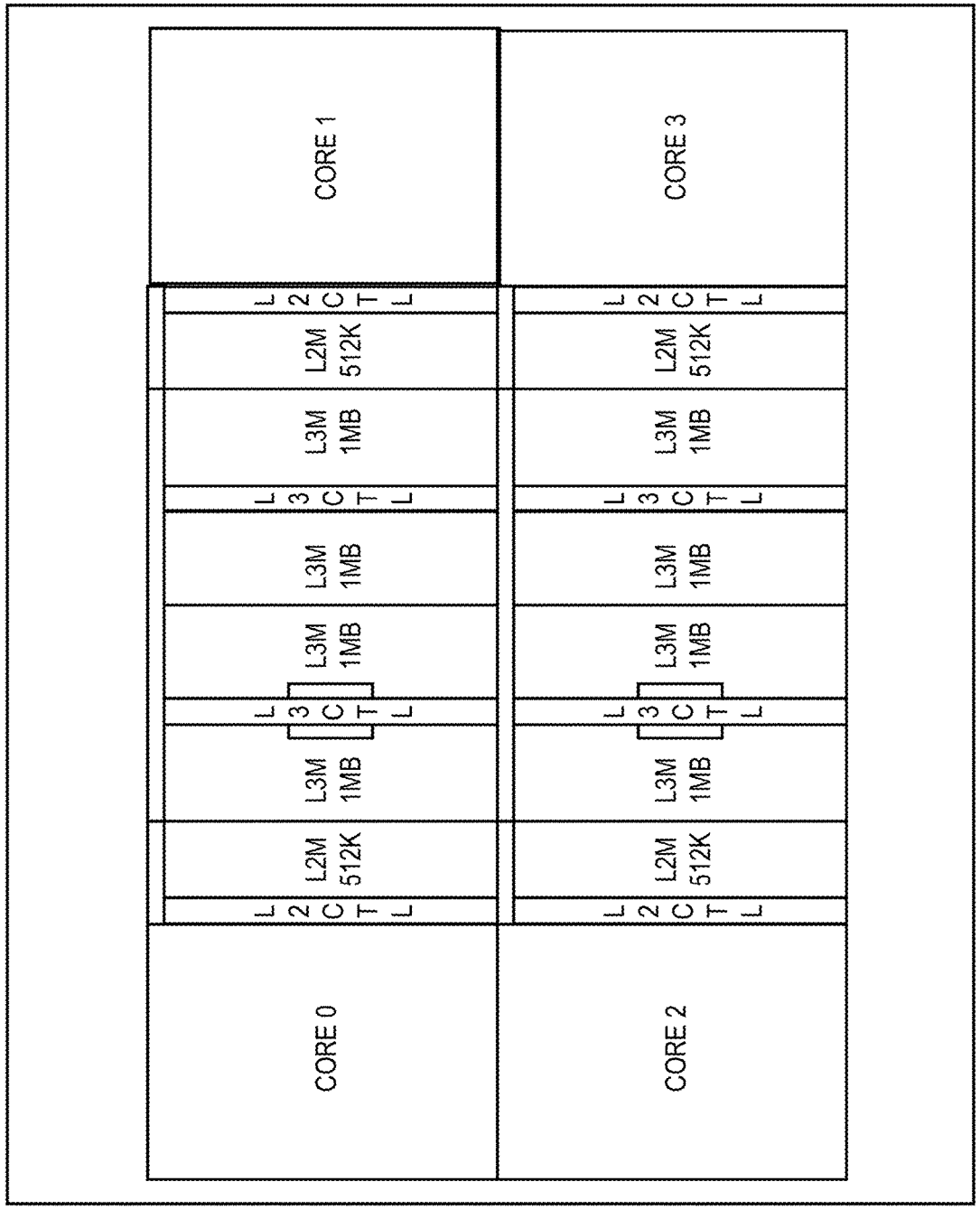
FIG. 37 is a block diagram of an illustrative central processing unit (CPU) complex that may be included in a processor according to embodiments of the invention.

FIG. 37 is a block diagram of an illustrative central processing unit (CPU) complex that may be included in a processor according to embodiments of the invention. In an embodiment, the L3 cache is an 8 MB 16-way cache split over a four-core module (referred to as a CPU complex or CCX), affording a 2 MB "slice" of L3 cache per core. However, the L3 cache slices in a CCX are implemented such that the L3 cache is a shared cache. Multiple CCXs may be included in a single processor (e.g., two CCXs form a 16 MB L3 cache). The 8 MB caches on each CCX are separate, so they act as a last level cache per four-core module with the appropriate hooks into the other L3 cache to determine if data is needed (the protocols involved in the L3 cache design allow each core to access the L3 cache of each other core). Thus, these L1, L2, and L3 caches are coherent caches, with the L3 cache slices within a CCX and between CCXs being connected by a cache coherent interconnect (also referred to as a cache coherent fabric).

Figure 38:
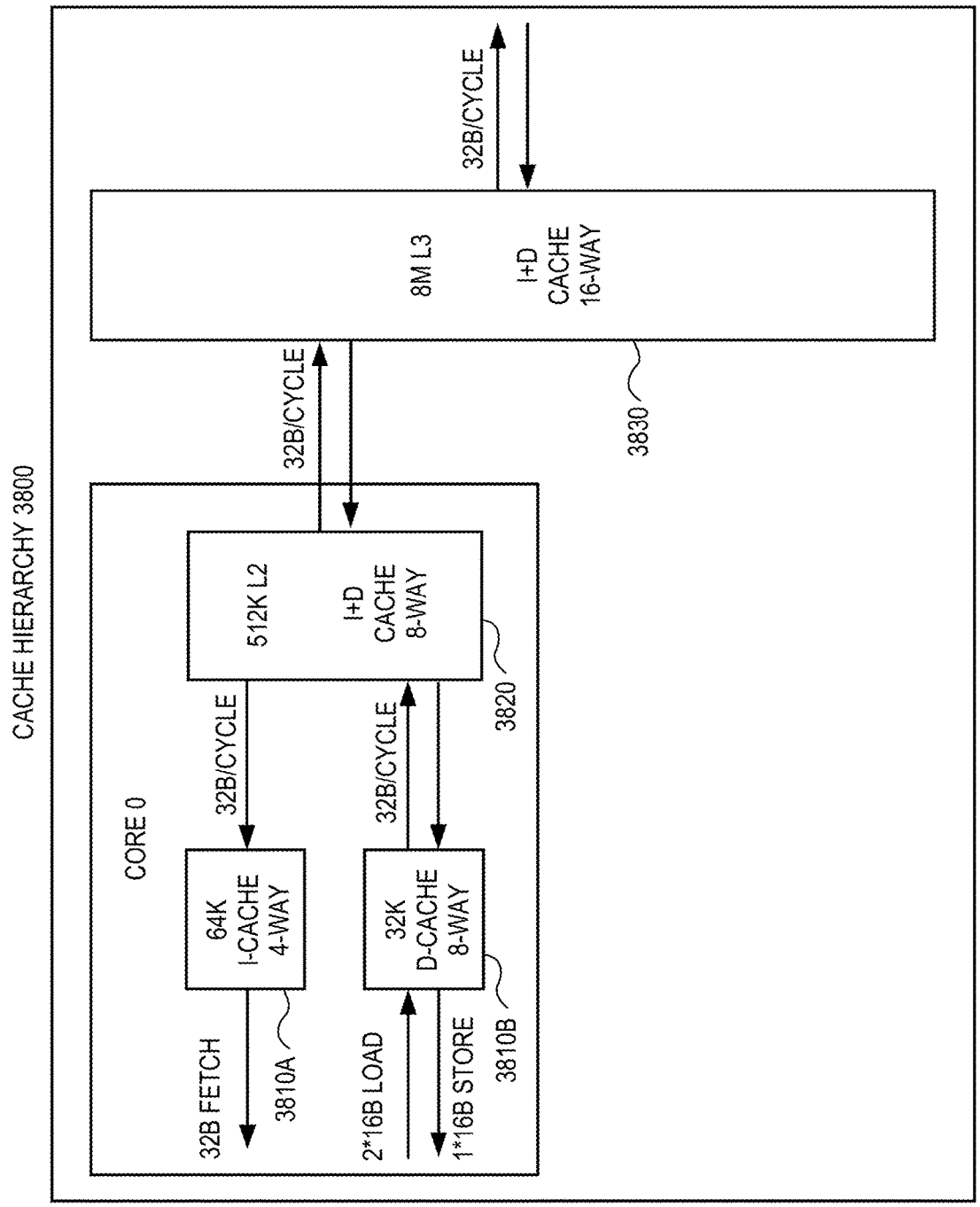
FIG. 38 is a block diagram of an illustrative cache hierarchy that may be included in a processor according to embodiments of the invention.

FIG. 38 is a block diagram of an illustrative cache hierarchy that may be included in a processor according to embodiments of the invention. In FIG. 38, cache hierarchy 3800 includes L1 i-cache 3810A and L1 d-cache 3810B (collectively, L1 cache 3810), L2 instruction and date cache 3820, and level 3 (L3) instruction and data cache 3830. In an embodiment, both L1 cache 3810 and L2 cache 3820 are private/local writeback caches, while L3 cache 3830 is a victim cache. In an embodiment, L1 i-cache 3810A is a 64

KB 4-way cache, L1 d-cache 3810B is a 32 KB 8-way cache, L2 cache 3820 is a 512 KB 8-way cache, and level 3 (L3) cache 3830 is an 8 MB 16-way cache.

Memory Organization Features

Processor cores, processors, and systems according to embodiments of the invention may include various features related to the organization and use of memory. A number of such features are described separately using non-limiting examples below, but embodiments may include any combination of such features.

Cache Line Zeroing

Some embodiments include an instruction whose execution causes a cache line sized write of zeros at a memory address. Such an instruction may be referred to as a cache line zeroing instruction, CLZERO instruction, CLZEROING instruction, cache line initialization instruction, CLINIT instruction, etc. In one embodiment, the cache line zeroing instruction is a macro-instruction executed by a core, such as core 190 and/or core 5300. Specifically, the decoder 140 and/or the decoder 5314 would be implemented to decode such a macro-instruction into one or more relatively lower-level instructions or control signals (e.g., one or more microinstructions, micro-operations (micro-ops), micro-code entry points, decoded instructions or control signals) that cause the memory access unit(s) 164 and/or the address generation unit(s) 325/load-store unit 340, respectively, to perform the operation.

A cache line zeroing instruction has the advantage of being a faster and more deterministic way to zero a cache line because it does not need to use a request for ownership (RFO) operation or at least does not need the data back or returned. An RFO operation is an operation in cache coherency protocols that combines a read and an invalidate broadcast (a read operation with intent to write to that memory address), and thus causes all other coherent caches to set the state of such a cache line to the cache coherency protocol state of "invalid." For example, an RFO operation is typically issued by a processor trying to write into a cache line that is in the shared (S) or invalid (I) states of the MESI protocol. The MESI protocol uses the cache coherency protocol states of "modified," "exclusive," "shared," and "invalid." In contrast, an implementation of a cache line zeroing instruction does not require that a line be read and returned to the issuing agent because it is zeroing the data; in fact, in some embodiments, the issuing agent does not have to have ownership of the data.

Different embodiments may implement the cache line zeroing instruction to indicate a memory address in different ways. For example, the cache line zeroing instruction may be implemented to indicate address information explicitly (e.g., via an immediate, one or more fields), indirectly (e.g., by specifying one or more registers in which address information is stored), and/or implicitly (e.g., one or more designated registers). The memory address information may be a memory address or be information used in combination with other information (e.g., information from a segment register, etc.) to generate a memory address. While in some embodiments the memory address is aligned on a cache line boundary, alternative embodiments may also support the memory address being between cache line boundaries and treated as indicating the cache line between those boundaries. The address information may either represent absolute memory address information or relative memory address information, which may indicate a memory location relative to a base memory address or other memory location. In addition, different indirect memory addressing modes may optionally be used. As one specific example, the instruction may implicitly indicate a register (e.g., a general-purpose register) that is used to store relative memory address information that may be combined with additional memory address information stored in another implicit register (e.g., a code, data, or extended segment register) to generate the final memory address used to identify the memory address. This is just one example. Other forms of the address information are also possible.

Different embodiments may implement different sized cache lines (e.g., 32 bytes, 64 bytes) and/or a given embodiment may implement more than one cache line size. For example, embodiments may support a cache line zeroing instruction that is: 1) implemented for a specific cache line size (and thus it does not need to designate a cache line size); 2) implemented to use a current cache size where different types of cores have different cache line sizes (e.g., the current cache size may be indicated via a value in a register); or 3) implemented to have a field to indicate a cache line size. In some embodiments, the instruction allows for the indication of a size parameter that indicates one or more cache lines (i.e., a multiple of a cache line size). In some embodiments, there is additionally or instead, a ZERO instruction that allows for the indication of a size parameter that is not be tied to a cache line size (e.g. just indicates a # of bytes) as this enables software to be unaware of the cache line size (if the size is not a multiple of a cache line size (e.g. specified in bytes and the # of bytes is 112 even though cache line size is 64 bytes), embodiments could either zero up to the cache line or issue an RFO for just the remaining data in that last line).

In some embodiments, the cache line zeroing instruction is atomic. Thus, either the entire cache line of zeros will be stored in its entirety, or none of it, not just a portion (i.e., a completion atomicity guaranty). The atomicity may also guarantee that the zeros written by a cache line zeroing instruction will not be interleaved with data stored by other stores. The atomicity may be with respect to other accesses so that any such accesses will either observe all of the data stored in its entirety, or none of the data stored, but not just a portion. The atomicity may also be with respect to a power failure, system crash, reboot, or other such event, so that even in the face of such events, either all the zeros are stored, or none of the zeros are stored, not just a portion. There are various possible uses of such an atomic operation. One example of such a use is to atomically update a piece of data in a database. Another example of such a use is to atomically update a piece of shared data in a multi-processing environment. Yet another example of such a use is to atomically store data to a location to replace a lock, a semaphore, to update a shared variable, to synchronize, to coordinate, or the like. Still other uses of such an atomic store operation are contemplated and will be apparent to those skilled in the art and having the benefit of the present disclosure.

Exemplary Memory Hierarchies

Figure 39:
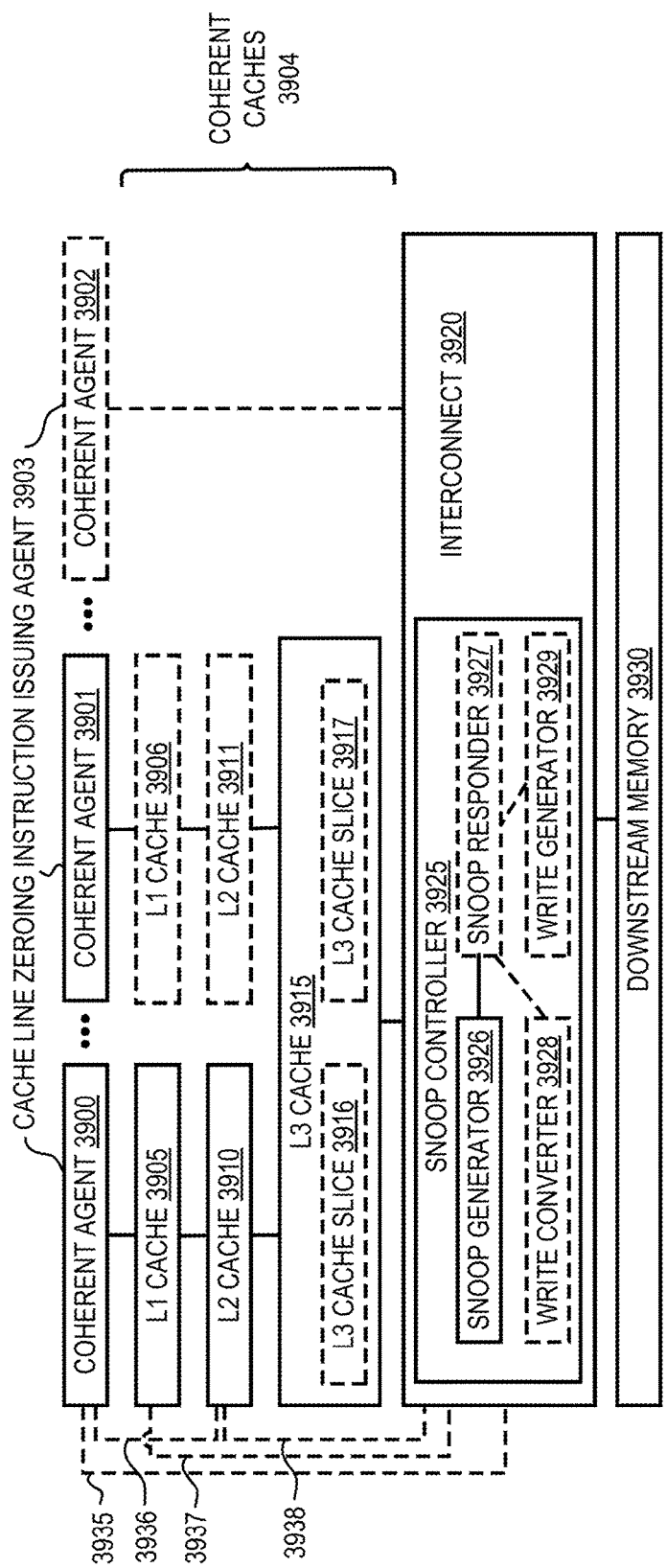
FIG. 39 is a block diagram illustrating a memory hierarchy within which a cache line zeroing instruction may be implemented according to embodiments.

FIG. 39 is a block diagram illustrating a memory hierarchy within which a cache line zeroing instruction may be implemented according to embodiments of the invention. The illustrated memory hierarchy can be implemented in conjunction with various processor cores, core clusters, CCXs, processors, computer architectures, etc. By way of specific embodiments, an implementation of the cache zeroing instruction will be described with reference to the memory hierarchy of FIG. 39 in conjunction with the core/CCX of FIGS. 3, 8, 38, and 37. This is for illustrative purposes, and the cache zeroing instruction may be implemented in different memory hierarchies and/or in conjunction with different cores, core clusters, etc.

FIG. 39 illustrates a coherent agent 3900 and a coherent agent 3901, as well as the possibility of other coherent agents as represented by " . . . " and coherent agent 3902 using a dashed box. The memory hierarchy in FIG. 39 includes coherent caches 3904A, an interconnect 3920, and downstream memory 3930. Different embodiments may implement different numbers of caches and cache levels as part of coherent caches 3904A. The coherent agents and the coherent caches are part of a cache coherence domain within which cache coherency is maintained using a cache coherency protocol (e.g., the MESI protocol which uses the cache coherency protocol states of "modified," "exclusive," "shared," and "invalid"; the MESIF protocol which adds the cache coherency protocol state of "forward"; the MOESI protocol which instead adds the cache coherency protocol state of "Owned"; and other such cache coherency protocols).

The coherent agent 3900 is coupled to the interconnect 3920 through one or more caches at successively lower levels of a cache hierarchy. A cache hierarchy includes a cache that is at the highest level of the cache hierarchy and that is coupled to the coherent agent 3900, a cache (e.g., an L3 cache 3915) that is at a lowest level of the cache hierarchy and that is coupled to the interconnect 3920 (and thus, this cache is referred to as the lowest level cache or last level cache (LLC)), and zero or more caches (e.g., an L2 cache 3910) that are at mid-level(s) of the cache hierarchy coupled to one of the caches at a higher level and one of the caches at a lower level (e.g., FIG. 39 illustrates the coherent agent 3900 coupled to L1 cache 3905, which is coupled to L2 cache 3910, which is coupled to L3 cache 3915, which is coupled to the interconnect 3920).

The coherent agent 3901 is also coupled to the interconnect through one or more levels of caches. FIG. 39 illustrates the coherent agent 3901 coupled to an optional L1 cache 3906, which is coupled to an optional L2 cache 3911, which is coupled to the L3 cache 3915. In addition, FIG. 3902 also illustrates that optional coherent agent 3902 may be coupled directly to the interconnect 3920 (i.e., no have any coherent caches).

In addition to or in lieu of the connectivity including the coherent agents being coupled to the interconnect 3920 through successive levels of caches, certain embodiments implement other connectivity to allow for direct or more direct communication (e.g., couple the coherent agent 3900 directly to the interconnect 3920, couple the coherent agent 3900 directly to the L2 cache 3910, couple the L1 cache 3905 directly to the interconnect 3920, and/or couple the L2 cache 3910 directly to the interconnect 3920 as respectively illustrated by dashed lines 3935, 3936, 3937, and 3938).

The interconnect 3920 is coupled to the downstream memory 3930 (e.g., through a set of one or more memory controllers (not shown)). The downstream memory 3930 is at a lower level of the memory hierarchy than the coherent caches 3904, and may include one or more types of memory and/or a hierarchy of memories (e.g., volatile memory and/or non-volatile memory, main memory, memory mapped input/output (MMIO), memory-side cache(s), two level memory (2LM), DRAM, flash, phase change memory, 3D Xpoint™).

The interconnect 3920 (also referred to as a cache coherent interconnect, a fabric, an interconnect, part of an uncore, interconnect network, interconnect unit(s)) includes a snoop controller 3925 to issue snoops to the coherent caches 3904 and receive any responses therefrom. The snoop controller 3925 includes a snoop generator 3926 to issue snoops, and, in some embodiments, a snoop responder 3927 to receive any responses. In addition, the snoop controller 3925 in certain embodiments includes a write generator 3929 (to effectively generate a cache line sized write of all zeros) and/or a write converter QOS28 (to effectively convert a cache line of data received responsive to a snoop to all zeros). In addition, while in one embodiment the interconnect 3920 is illustrated as being between the L3 cache 3915 and the downstream memory 3930, alternative embodiments may implement the interconnect 3920 at another location (e.g., between the L2 caches and the L3 cache, with either a set or one or more memory controllers to the downstream memory 3930 off the interconnect 3920 (e.g., as a home agent) or a set or one or more memory controllers between the L3 cache 3915 and the downstream memory 3930). The interconnect 3920 (e.g., as part of the snoop controller 3925) may include other items, such as a snoop filter (not shown).

Different embodiments may be implemented with different numbers of the coherent agents as general purpose cores (also known as central processing units (CPUs)). For example, in some embodiments, the coherent agent 3900 is a core, the coherent agent 391 is a core, there are zero or more additional coherent agents that are cores, and there are zero or more additional coherent agents that are other types of agents (e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, to name just a few examples).

In some embodiments, the coherent agents and the coherent caches 3904 are implemented as in FIGS. 38 and 37. For example, in a CCX, there are 4 coherent agents that are cores, a private/local L1 cache per core, a private/local L2 cache per core, and a shared L3 cache; and there can be multiple CCXs coupled together in a single processor. The L1 and L2 caches are write back caches, the L2 caches are inclusive caches, and the L3 cache is a victim cache. In addition, the L3 cache 3915 is split into slices between multiple coherent agents (e.g., 2 MB per core over 4 cores, totaling 8 MB) within a module (a CCX), and optionally between one or more such modules (e.g., two CCXs, each with 8 MB, to form a 16 MB L3 cache). FIG. 39 illustrates this with L3 cache slice 3916 of coherent agent 3900 and L3 cache slice 3917 of coherent agent 3901. The interconnect 3920 may, for example, represent: 1) just an interconnect within a CCX; 2) an interconnect within and between CCXs; 3) separate interconnects within different CCXs, as well as an interconnect(s) between CCXs. Different embodiments may implement the interconnect 3920 differently, including one or more of a ring, multiple rings, point to point links, shared buss(es), etc. In embodiments that implement a home agent and caching agents, the interconnect 3920 is considered to include the caching agents.

One or more, or all, of the coherent agents in FIG. 39 may be implemented to execute a cache line zeroing instruction (see the possible cache line zeroing instruction issuing agent 3903 being identified as any of coherent agent 3900, 3901, and 3902). The coherent agent that is currently executing a cache line zeroing instruction is the "issuing agent," "issuing coherent agent," or "first agent", and its caches are referred to as the Lx cache of the issuing agent (where x may be a 1, 2, or 3; and where the L3 cache is implemented with slices, it is the L3 cache slice of the issuing agent). In the discussion below, this will be coherent agent 3900. A coherent agent that is not currently executing a cache line zeroing instruction is referred to as the "coherent but no issuing agent," "non-issuing agent," "non-issuing coherent agent," or "second agent" (as discussed above, there may be multiple second agents, but one will be discussed below for simplicity), and its caches are referred to as the Lx cache of the second agent (where x may be a 1, 2, or 3; and where the L3 cache is implemented with slices, it is the L3 cache slice of the second agent). In the discussion below, this will be coherent agent 391.

Exemplary Cache Architecture

Figure 40:
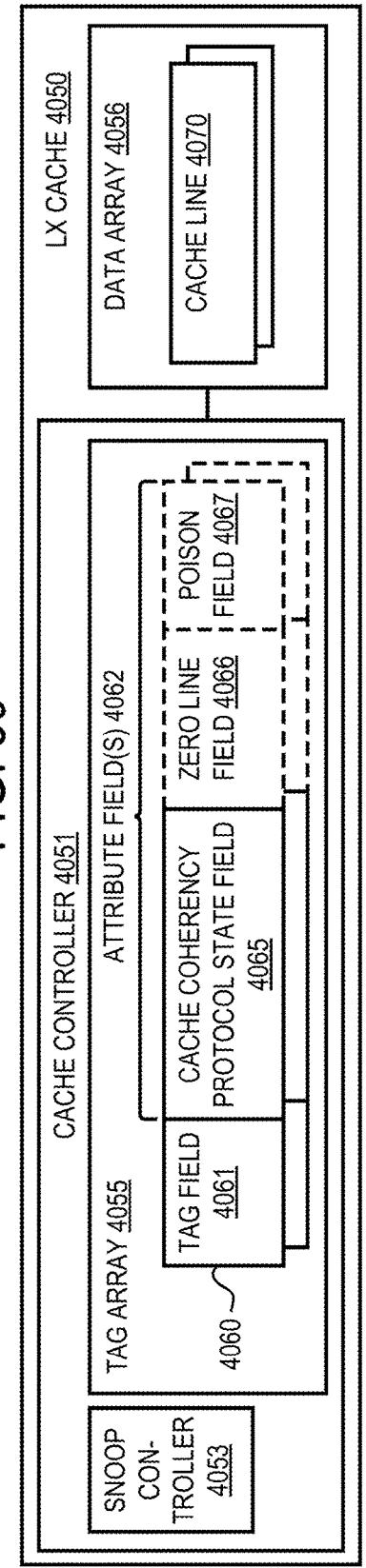
FIG. 40 is a block diagram illustrating a cache in a processor that implements a cache line zeroing instruction according to embodiments.

FIG. 40 is a block diagram illustrating a cache in a processor that implements a cache line zeroing instruction according to embodiments of the invention. FIG. 40 includes a Lx cache 4050, where x indicates the level in the cache hierarchy (e.g., 1, 2, 3). Lx cache 4050 includes a cache controller 4051 to control the operation of the cache, including detecting hits/misses, causing writes/reads to cache lines, receiving snoops (and thus, in some embodiments the cache controller 4051 includes a snoop interface, and in some embodiments, a snoop controller 4043), etc. The cache controller 4055 with entries 4060 (which includes what is sometimes referred to as the "tag state"), and the Lx cache 4050 includes a data array 4056 with corresponding cache lines 4070. Each of the entries 4060 includes a tag field 4061 to store a tag used to determine whether a given address hits or misses the data in the corresponding one of the cache lines 4070. In addition, each of the entries 4060 includes a set of one or more attribute field(s) 4062 (sometimes referred to as "tag state") to store attributes of the data stored in the corresponding one of the cache lines 4070. The attribute field(s) 4062 include a cache coherency protocol state field 4065 to store a value indicating a current cache coherency protocol state of the data stored in the corresponding one of the cache lines 4070. The attribute field(s) 4062 may optionally include other fields, such as a zero-line field 4066, a poison field 4067, an error correction code field (not shown). While FIG. 40 illustrates the attribute field(s) 4062 being in the tag array, alternative embodiments may implement these field(s) in a separate state array (not shown). In one embodiment, a given cache line may have multiple poison indications (e.g., one for the two 32 byte chunks of a 64-byte cache line) in the poison field 4067. While FIG. 40 illustrates a separate poison field 4067, alternative embodiments may encode the poison indications into another field (e.g. the error correction code (ECC) field or cache coherency protocol state field).

Responsive to a hit in the cache (e.g., based on a tag in the tag field 4061), the cache controller 4051 includes circuitry (e.g., cache coherency protocol state circuitry or other circuitry) to respond to the cache coherency protocol state in the cache coherency protocol state field 4056 for the hit (e.g., the cache coherency protocol state field 4056 corresponding to the tag field 4061 whose tag matched); which response differs between embodiments and based on various factors (e.g., whether the cache lookup was initiated responsive to a write command, a read command, a snoop (and possibly the type of snoop)). For example, in some embodiments, the response is to determine whether the cache coherency protocol state is one that grants the cache authority to modify the cache line (e.g., a "modified" or "exclusive" state) responsive to a write command and/or certain types of snoops as discussed in more detail below. In some embodiments, the cache controller 4051 includes: 1) hit-miss circuitry (not shown) to determine whether there is a hit or miss in the cache responsive to a command (e.g., a write command, a read command, a snoop command); 2) the snoop controller 4043 coupled to a snoop interface (not shown) to receive snoops and to transmit response messages to the snoops; and 3) cache line read circuitry (not shown) and cache line write circuitry (not shown).

Techniques to Configure a Cache Line to Indicate all Zeros

While some embodiments are implemented to configure a cache line to indicate all zeros by writing over the data in the cache line with zeros (first technique), alternative embodiments may configure a cache line to indicate all zeros using other techniques (the second-fourth techniques described below are examples). Such other techniques may be implemented for a variety of reasons, such as the size of a cache line is typically larger than the width of some busses/structures within a core (e.g., one or more of the intermediate buffers, such load queue 810, store queue 820, write combining buffer (WCB) 860) and/or writing over the data in a cache line with zeros consumes power and increases complexity of the cache.

The second technique is to invalidate the cache line in the way of the cache in which that cache line currently resides, and write a cache line of zeros into a different way of the cache.

The third and fourth techniques involve changing the tag state rather than the data in the data array 4056, and these can be used in one or more of the cache levels and/or in the interconnect. The third technique is to implement a field (referred to as a zero-line field 4066) for each of the cache lines (e.g., in the attribute field(s) 4062), and the value in this field (which may be one bit) indicates whether: 1) the cache line should be treated as having the value of the data stored in that cache line; or 2) the cache line should be treated as being all zeros (regardless of the actual data stored in that cache line). In such embodiments, reads (including evictions) of that cache line will either pass the value of the zero-line field 4066 to another structure that supports such a zero-line field or convert the data to zeros. The data would also be converted before is it used by one of the coherent agents (e.g., coherent agent 3900) on a read. While in some such embodiments the data is also converted before being written to downstream memory QO30, alternative embodiments also implement a zero-line field in the downstream memory 3930 or an alternative memory structure managed by the memory controller.

The fourth technique is like the third, but rather than implementing a separate field, implements a new encoding in an existing one of the attribute field(s) (e.g., a new encoding in a cache coherency protocol state field or the error correct code (ECC) syndrome field).

Certain embodiments may implement a cache to, as part of configuring a cache line to indicate all zeros, modify the cache coherency protocol state of that cache line to "modified" or "owned" (or in the case of using a new encoding in the cache coherency state field to indicate zero line, then to the zero-line state) and cause any poison indication(s) to be ignored (data no longer poisoned) or cleared. Thus, another advantage of a cache line zeroing instruction is that it may be used to clear out poisoned lines consistently.

On a related note, a mechanism to force a cache line to zero may be implemented only in certain cache levels (e.g., a subset of the L1 caches, L2 caches and the L3 caches, such as only in the L1 cache and not in the L2 or L3 caches), and a given cache level that lacks such a mechanism may be implemented to configure a cache line to indicate all zeros by sending it to a different cache level that has the mechanism (e.g., a higher cache level (e.g., the L1 caches) is implemented to configure a cache line to indicate all zeros by evicting the data to a lower cache level (e.g., the L2 caches) that can do the zeroing; a lower cache level (e.g., the L2 caches) is implemented to configure a cache line to indicate all zeros by forwarding it to a higher level cache (e.g., the L1 caches) that can do the zeroing). As described in more detail below, different embodiments may implement the zeroing of a cache line responsive to a write and/or a snoop. In embodiments that implement zeroing of a cache line responsive to both a write and a snoop, a given cache level could be implemented to do the zeroing responsive to only one of a write or a snoop (but not both), and could push/evict or forward the data to a lower or higher level cache that can do the zeroing responsive to the other of a write and a snoop.

Triggering a Cache to Configure a Cache Line to Indicate all Zeros

Regardless of the technique implemented in a cache to configure a cache line to indicate all zeros (see above), triggering a cache to configure a cache line to indicate all zeros could be responsive to a message sent from the interconnect to one of the caches, by the issuing agent on its own, or by the issuing agent responsive to a message sent from the interconnect.

In the case of the issuing agent (on its own or responsive to a message from the interconnect) triggering a cache to configure a cache line to indicate all zeros, different embodiments may use different techniques, including techniques to implement the cache line zeroing instruction to be atomic in the case where a cache line is wider (e.g., 32 bytes, 64 bytes) than the natively supported data width of an issuing agent (e.g., 32 bits, 64 bits, 128 bits, 256 bits, 512 bits, 1024 bits). The natively supported data width may manifest itself in different ways in different embodiments. In some embodiments, the natively supported data width may represent the width in bits of the widest set of registers, and/or the width of the operand(s) that are to be operated on the by the instructions. In some embodiments, the natively supported data width may represent the width of the arithmetic and/or logical execution units (e.g., when it has the same width of the operands indicated by the instructions such that multiple portions of the operands are not sequentially pumped through it (double pumped or more)). In some embodiments, the natively supported data width may represent the width of a bus (e.g., a load pipe). The amount of data that can be atomically stored may be limited by the width of one or more internal structure of the issuing agent (e.g., busses, intermediate buffers).

Thus, in some embodiments in which the issuing agent (on its own or responsive to a message from the interconnect) does the triggering (of a cache to configure a cache line to indicate all zeros), the issuing agent either: 1) implements a zero-line field in other structures, such as one or more of the intermediate buffers (e.g., the store queue 820 and the write combining buffer (WCB) 860); or 2) implements a new command (e.g., a micro-op, control signal, micro-instruction), which does not carry the cache line of zeros but indicates a cache line sized write of zeros, that can pass through the intermediate buffers (e.g., the store queue 820 and write combining buffer (WCB) 860). As such, where the cache line size is wider (e.g., 32 bytes, 64 bytes) than the natively supported data width of an issuing agent, a cache line of zeros can be represented in these narrower structures. The conversion to a line of zeros is performed when the zero line (as indicated by the zero-line field or new command/micro-op) is being sent to a structure that is lower in the memory hierarchy and that does not support the zero-line field or the new command (e.g., the conversion to a line of zero may be performed when the zero line is sent to the data cache 840 (which may perform another of the above techniques), sent from the write combining buffer 8600, sent by the L3 cache to the interconnect, or sent by the interconnect (e.g., via a memory controller) to the downstream memory).

As another example, in some embodiments in which the issuing agent (on its own or responsive to a message from the interconnect) does the triggering (of a cache to configure a cache line to indicate all zeros), the issuing agent sequentially writes smaller chucks (e.g., 16 bytes at a time, 32 bytes at a time) of zeros in an intermediate buffer (e.g., the store queue 820, the write combining buffer (WCB) 860, a separate staging buffer (not shown)) that does not respond to snoops (or does not respond to snoops while the chunks are being written) and that gets evicted responsive to enough chunks having been written to equal the size of a cache line (and not earlier) so that the chunks are written concurrently; thereby implementing the cache line zeroing instruction atomically.

Other Aspects

Different embodiments may implement a cache line zeroing instruction with different ordering (e.g., weakly ordered, strongly ordered, an ordering that is weaker the weakly ordered, an ordering that is stronger than strongly ordered). In the case of a cache line zeroing instruction that is weakly ordered, embodiments may implement the instruction such that it is auto-evicting.

The cache line zeroing instruction may be implemented such that it will not configure a cache line to indicate all zeros before retirement of that instruction. In such embodiments, there is a mechanism to ensure that the cache line zero instruction has completed and the cache line is configured to indicate all zeros for all readers (e.g., one or more of a fence instruction, a lock instruction, an architecturally serializing instruction, a younger store being GO (strongly ordered), younger load being GO (stricter than strongly ordered)).

The cache line zeroing instruction may be treated like a store for the purposes of page table walks (including virtualization tables (e.g., Extended Page Tables (EPT) (in which the A and D bits will be updated), shadow page tables) and will fault if not writeable.

Figure 41:
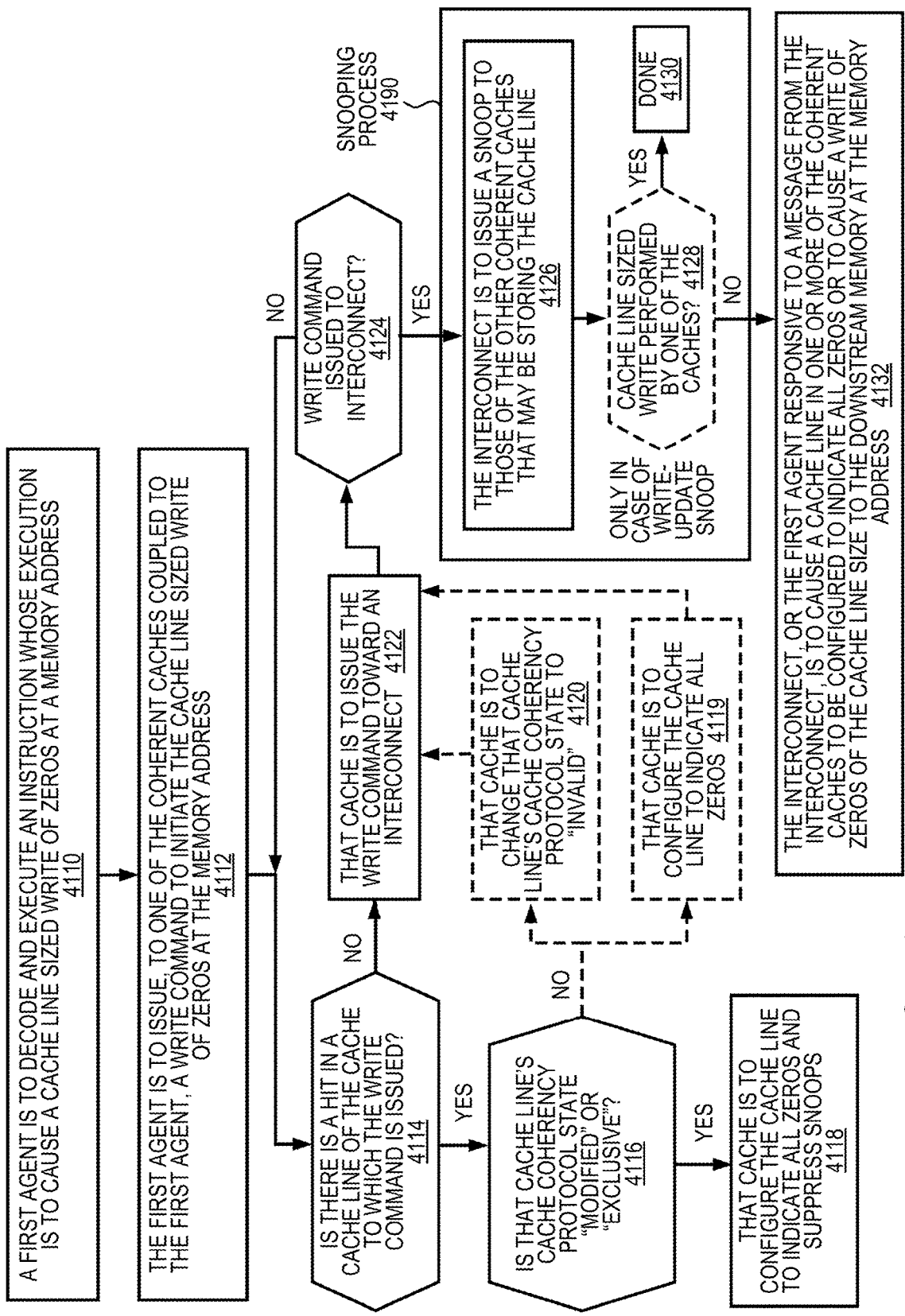
FIG. 41 is a flow diagram illustrating embodiments of the invention that first attempt to write to a cache of the issuing agent before using snoops.

Embodiments that First Attempt to Write to a Cache of the Issuing Agent Before Using Snoops FIG. 41 is a flow diagram illustrating embodiments of the invention that first attempt to write to a cache of the issuing agent before using snoops. As discussed above, the first agent 3900 is to decode and execute an instruction whose execution is to cause a cache line sized write of zeros at a memory address (block 4110). Responsive to the decoding and executing of the instruction, the first agent is to issue, to one of the coherent caches coupled to the first agent (e.g., the L1 cache 3905), a write command to initiate the cache line sized write of zeros at the memory address (in which case, the first agent is also referred to as the issuing agent) (block 4112). In some embodiments, the first agent includes a decode unit (e.g., decoder 140, decoder 314) to decode the instruction whose execution is to cause the cache line sized write of zeros at a memory address. The first agent also includes an execution unit (e.g., memory access unit(s) 164, load-store unit 340), responsive to the decode unit, to issue the command to initiate the cache line sized write of zeros at the memory address.

When there is a hit for a cache line of the cache (e.g., the L1 cache 3905) to which the command is issued (block 4114) and that cache line's cache coherency protocol state is one that grants the cache the authority to modify the cache line without broadcasting to other caches (e.g., "modified" or "exclusive") (block 4116), then that cache is to configure the cache line to indicate all zeros and suppress snoops (block 4118). Different embodiments may implement caches to configure the cache line to indicate all zeros as previously described in the section titled "Techniques to configure a cache line to indicate all zeros." In some embodiments, if there is a hit for a cache line of the cache (e.g., the L1 cache 3905) to which the command is issued (block 4114), the cache line is still zeroed for one or more other cache coherency protocol states (e.g., one or more of "owned," "forward," or "shared"). For any state for which this is done, control passes to block 4119; for any state for which this is not done control, passes to block 4120. Thus, in the embodiments in which control passes to block 4119 for any state that is not "modified," "exclusive," and "invalid," then block 4120 is not implemented; and vice versa. However, embodiments may be implemented in which control passes to block 4119 or 4120 depending on the state. In block 4119, that cache is to configure the cache line to indicate all zeros; from block 4119, control passes to block 4122 (described in more detail later herein) in which the cache is to issue the write command toward the interconnect (depending on the embodiment, to the next cache level, or to the interconnect to issue snoops (e.g., a write-update snoop (also referred to as a write-zero snoop or a write-and-zero snoop), a write-invalidate snoop (also referred to as an invalidate-even-if-modified snoop), or a snoop that indicates to invalidate and write back (also referred to as a writeback-and-invalidate snoop)). It is possible that the write command passed to the next cache level or interconnect will indicate that a line with a state other than "modified" or "exclusive" was configured to indicate all zeros. One usage of this modified write command is so that if a "shared" line is configured to all zeros and its state is changed to either "modified" or "owned", then a write-update snoop would not be sent out. In that situation, the interconnect could issue a different snoop type (e.g. a write-invalidate snoop or a writeback-and-invalidate snoop). In block 4120, the cache is to change that cache line's cache coherency protocol state to "invalid" and control passes to block 4122. If there is a cache miss (block 4114), then control passes to block 4122.

By way of specific example regarding the forward or owned state, when a cache of the issuing agent has the cache line in the forward or owned state, that cache line may be in other caches in the shared state. As such, if the cache line is zeroed in block 4119, then a snoop may be sent to either invalidate those other cache lines that are in the shared state or to configure to indicate all zeros those other cache lines that are in the shared state. Alternatively, the cache line in the forward or owned state could be invalidated (or clean evict and invalidate) (block 4120) and a new line created that is modified and zeroed or owned and zeroed. That new line that is zeroed could be inserted (filled) into the same cache as the cache line that was found in the forward or owned state (e.g., in a different set or way of that cache), or it could be inserted into a different cache (e.g., if the cache line was found in the forward or owned state in the L2 cache or L3 cache, the cache line may be invalidated and a new line of modified and zeroed or owned and zeroed created in the L1 cache).

In block 4122, the cache is to issue the write command toward the interconnect. This write command may be issued directly to the interconnect 3920, or may be sent to one or more lower levels of the caches of the first agent. By way of examples: 1) in some embodiments, the write command is issued directly to the interconnect (i.e., skipping any caches at lower levels of the cache hierarchy—e.g., from the L1 cache 3905 directly to the interconnect 3920, skipping any lower level caches (e.g., the L2 cache OQA10, the L3 cache OQA15)—in which case, the write command is used for data L1 cache of the first agent, while snoops (described next) are used for the instruction L1 cache, the L2 cache and L3 cache (more specifically, the L3 cache slice 3916 if implemented) of the first agent, as well as for the caches of the second agent); 2) in some embodiments, the write command is issued to the L2 cache 3910 which repeats the above, and if it does not configure a cache line to indicate all zeros, issues the write command directly to the interconnect 3920—in which case, the write command is used for L1 cache and L2 cache of the first agent, while snoops (described next) are used for the L3 cache (more specifically, the L3 cache slice 3916 if implemented) of the first agent and the caches of the second agent; 3) in some embodiments, the write command is issued to the L2 cache 3910 which repeats the above, and if it does not configure a cache line to indicate all zeros, issues the write command to the L3 cache 3915 (more specifically, the L3 cache slice 3916 if implemented), and if it does not configure a cache line to indicate all zeros, to the interconnect 3920—in which case, the write command is used for the caches of the first agent, while snoops (described next) are used for the caches of the second agent. In certain embodiments, the cache(s) to which the write commands are issued includes a cache controller implemented to, responsive to the above discussed write commands, determine whether or not there are cache hits, configure cache lines to indicate all zeros (different embodiments may implement caches to configure the cache line to indicate all zeros as previously described in the section titled "Techniques to configure a cache line to indicate all zeros"), and issue the write commands toward the interconnect on cache misses. In one specific example, responsive to a cache line hit, in the L2 cache 3910 (of the issuing agent), that is modified, exclusive, and/or owned, the L2 cache is implemented to configure a cache line to indicate all zeros by forwarding the task to the L1 cache.

The snoop controller 3925 of the interconnect 3920, responsive to the write command, is implemented to initiate a snooping process (block 4190) to locate any caches that may be storing the cache line. To implement the snooping process 4190, the snoop controller 3925 is implemented (e.g., via the snoop generator 3926) to issue a snoop to those of the coherent caches that may be storing the cache line (block 4126) (in other words, those of the coherent caches for which it must be determined if there is a hit). In some embodiments, the coherent caches that may be storing the cache line are those of the coherent caches: 1) to which the write command was not previously issued; and 2) in embodiments that implement a snoop filter (not shown) in the interconnect 3920, which the snoop filter indicates the cache might contain the line (i.e., for which the snoop filter does not suppress the snoop). This may include the one or more levels of caches (e.g., the L1 cache 3906, the L2 cache 3911, the L3 cache 3915) coupling the second agent 3901 to the interconnect 3920; as well as any of the caches (e.g., the L2 cache 3910, the L3 cache 3915) that couple the first agent 3900 (the issuing agent) to the interconnect 3920, that did not receive the write command (i.e., caches that were skipped), and that, in embodiments that implement a snoop filter (not show) in the interconnect 3920, the snoop filter indicates might contain the line (i.e., the snoop filter does not suppress the snoop). In embodiments where a snoop is issued to one or more of the caches coupling the first agent to the interconnect, each such snoop may also be referred to as a back snoop. As part of the snooping process 4190, different embodiments may be implemented to issue different types of snoops depending on the situation, or issue just one type of snoop. There are a variety of possible snoops types that may be used (e.g., a write-update snoop (also referred to as a write-zero snoop or a write-and-zero snoop), a write-invalidate snoop (also referred to as an invalidate-even-if-modified snoop), a snoop that indicates to invalidate and write back (also referred to as a writeback-and-invalidate snoop), a snoop that writes out any cache line that hits but does not send the data back to the first agent and does not result in the data being read from the downstream memory, a prior art snoop (e.g., an RFO)) as discussed in more detail later herein. Specifically, where write-update snoops are used, the snoop controller 3925 is also implemented to determine whether the cache line sized write was performed by one of the caches responsive to one of the write-update snoops (shown as dashed block 4128) as part of the snooping process 4190; if so, the process is complete (block 4130); otherwise, control passes to block 4132. Block 4128 is dashed as it is not used when the other types of snoops are used for the snooping process 4190.

The write command and the snoops operate to handle cases where there is a cache line that contains the data to be zeroed in one or more of the caches. The cache line sized write of zeros may have been performed by one of the caches responsive to the write command (as described above), or, in embodiments that issue write-update snoops, by one of the caches responsive to one of the write-update snoops as described in more detail below. If the cache line sized write of zeros has not been performed by any of the caches, then in block 4132 the interconnect 3920 (e.g., via the write generator 3929 of the snoop controller 3925), or the first agent (the issuing agent) responsive to a message from the interconnect 3920, causes a cache line in one or more of the coherent caches (e.g., the L1 cache 3905, the L2 cache 3910, the L3 cache 3915) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the memory address. As indicated above and in more detail below, in certain embodiments the snoop controller 3925 includes a snoop responder 3927 (and optionally a write converter 3928 and a write generator 3929) responsible for this action. In certain embodiments, the first agent (e.g., through the execution unit (e.g., memory access unit(s) 164, load-store unit 340) or other hardware structure) performs its roll (if any) in this action. In an alternative embodiment, the interconnect 3920 instructs a memory controller to cause the write of zeros to the downstream memory.

As described above in the section titled "Triggering a cache to configure a cache line to indicate all zeros," different embodiments may implement the issuing agent differently to cause the triggering of a cache to configure a cache line to indicate all zeros (e.g., to ensure atomicity where a cache line is wider (e.g., 32 bytes, 64 bytes) than the natively supported data width of an issuing agent, implementing a zero-line field in other structures (e.g., the intermediate buffers), implementing a new command (which does not carry the cache line of zeros but indicates a cache line sized write of zeros) that can pass through the intermediate buffers, or implementing a sequential writes of smaller chucks (e.g., 16 bytes at a time, 32 bytes at a time) of zeros in an intermediate buffer (e.g., the store queue 8200, the write combining buffer (WCB) 8600, a separate staging buffer (not shown)) that does not respond to snoops (or does not respond to snoops while the chunks are being written) and that gets evicted responsive to enough chunks having been written to equal the size of a cache line (and not earlier) so that the chunks are written concurrently).

Embodiments that Rely on Snoops of the Coherent Caches

Figure 42:
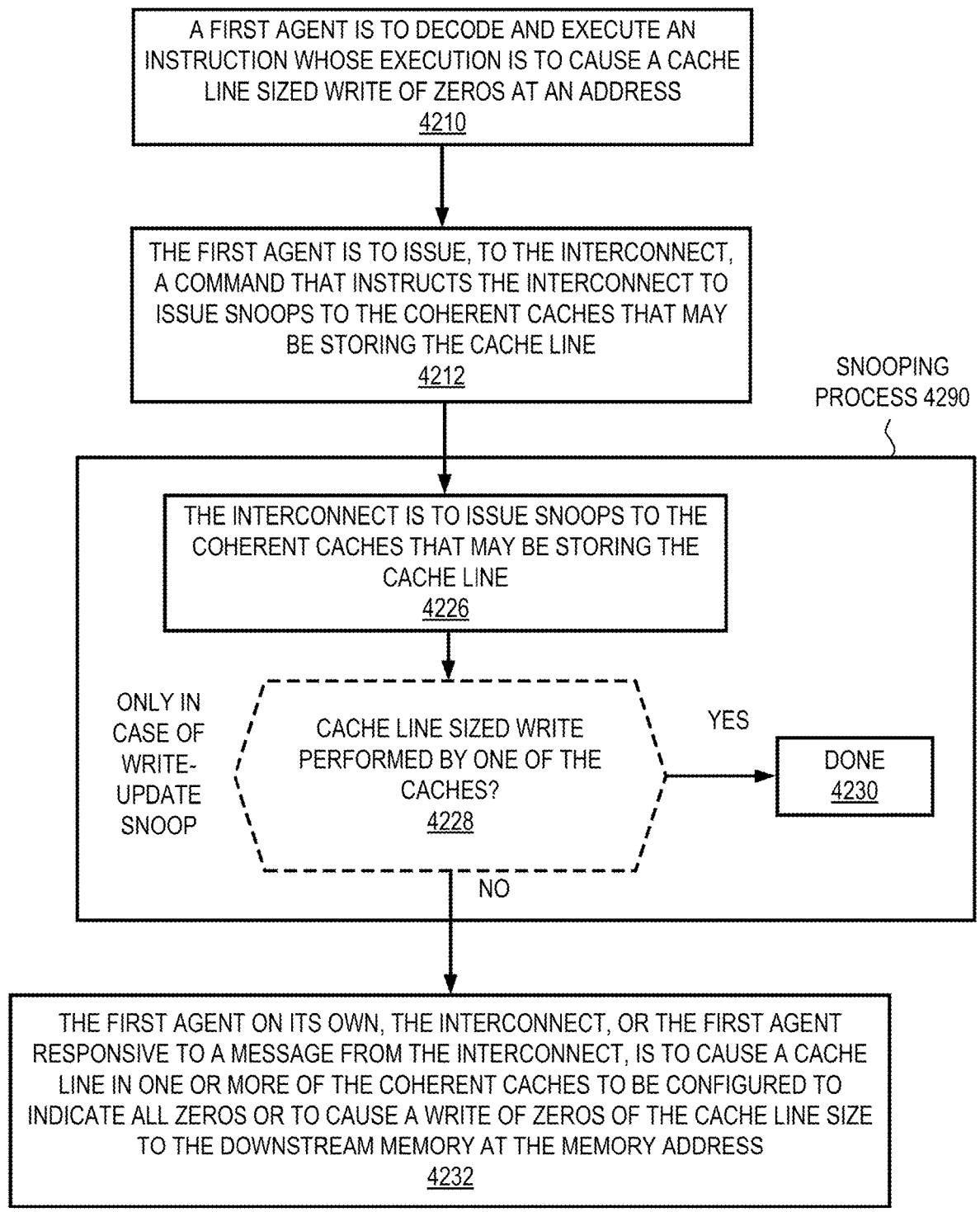
FIG. 42 is a flow diagram illustrating embodiments of the invention that rely on snoops of the coherent caches.

FIG. 42 is a flow diagram illustrating embodiments of the invention that rely on snoops of the coherent caches (they do not first attempt to write to a cache of the issuing agent). As discussed above, the first agent 3900 is to decode and execute an instruction whose execution is to cause a cache line sized write of zeros at a memory address (block 4210). Responsive to the decoding and executing of the instruction, the first agent is to issue, to the interconnect 3920, a command to initiate the cache line sized write of zeros at the memory address (in which case, the first agent is also referred to as the issuing agent) (block 4212). In some embodiments, the first agent includes a decode unit (e.g., decoder 140, decoder 314) to decode the instruction whose execution is to cause the cache line sized write of zeros at a memory address. The first agent also includes an execution unit (e.g., memory access unit(s) 164, load-store unit 340), responsive to the decode unit, to issue the command to initiate the cache line sized write of zeros at the memory address.

The command from the first agent/issuing agent 3900 is issued to the interconnect 3920 (block 4212), and the interconnect 3920, responsive to the command, is implemented to initiate a snooping process (block 4290) to locate any caches that may be storing the cache line. To implement the snooping process 4290, the interconnect 3920 (e.g., via the snoop controller 3925) is implemented (e.g., via the snoop generator 3926) to issue a snoop to those of the coherent caches that may be storing the cache line (block 4226) (in other words, those of the coherent caches for which it must be determined if there is a hit). In some embodiments, the coherent caches that may be storing the cache line are those of the coherent caches: 1) any of the coherent caches (e.g., the L1 cache 3905, the L2 cache 3910, the L1 cache 3906, the L2 cache 3911, the L3 cache 3915) in embodiments that do not implement a snoop filter (not shown) in the interconnect 3920; or 2) those of the coherent caches for which a snoop filter (not shown) in the interconnect 3920 indicates the cache might contain the line (i.e., the snoop filter does not suppress the snoop) in embodiments that implement such a snoop filter. In embodiments where a snoop is issued to one or more of the caches coupling the first agent to the interconnect, each such snoop may also be referred to as a back snoop. As before, as part of the snooping process 4290, different embodiments may issue different types of snoops depending on the situation, or issue just one type of snoop. There are a variety of possible snoops types that may be used (e.g., a write-update snoop (also referred to as a write-zero snoop or a write-and-zero snoop), a write-invalidate snoop (also referred to as an invalidate-even-if-modified snoop), a snoop that indicates to invalidate and write back (also referred to as a writeback-and-invalidate snoop), a snoop that writes out any cache line that hits but does not send the data back to the first agent and does not result in the data being read from the downstream memory, a prior art snoop (e.g., an RFO) as discussed in more detail later herein. Specifically, where write-update snoops are used, the snoop controller 3925 is also implemented to determine whether the cache line sized write was performed by one of the caches responsive to one of the write-update snoops (shown as dashed block 4228) as part of the snooping process 4290; if so, the process is complete (block 4230);

otherwise, control passes to block 4232. Block 4228 is dashed as it is not used when the other types of snoops are used for the snooping process 4290.

In an alternative embodiment, block 4212 is replaced with the first agent being implemented to issue a snoop command to those of the coherent caches that may be storing the cache line (in which case, block 4226 is not present, and flow passes to block 4228 in embodiments that use write-update snoops or to block 4232 otherwise).

The snoops operate to handle cases where there is a cache line that contains the data to be zeroed in one or more of the caches. In embodiments that issue write-update snoops, the cache line sized write of zeros may have been performed by one or more of the caches. If the cache line sized write of zeros has not been performed by any of the caches, then in block 4232 the first agent on its own, the interconnect 3920 (e.g., via the write generator 3929), or the first agent responsive to a message from the interconnect 3920, causes a cache line in one or more of the caches (e.g., the L1 cache 3905, the L2 cache 3910, the L3 cache 3915) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address. As indicated above and in more detail below, in certain embodiments the snoop controller 3925 includes a snoop responder 3927 (and optionally a write converter 3928 and a write generator 3929) to perform its role (if any) in this action. In certain embodiments, the first agent (e.g., through the execution unit (e.g., memory access unit(s) 164, load-store unit 340) or other hardware structure) performs its role (if any) in this action. In an alternative embodiment, the interconnect 3920 instructs a memory controller to cause the write of zeros to the downstream memory.

As described above in the section titled "Triggering a cache to configure a cache line to indicate all zeros," different embodiments may implement the issuing agent differently to cause the triggering of a cache to configure a cache line to indicate all zeros (e.g., to ensure atomicity where a cache line is wider (e.g., 32 bytes, 64 bytes) than the natively supported data width of an issuing agent, implementing a zero-line field in other structures (e.g., the intermediate buffers), implementing a new command (which does not carry the cache line of zeros but indicates a cache line sized write of zeros) that can pass through the intermediate buffers, or implementing a sequential writes of smaller chucks (e.g., 16 bytes at a time, 32 bytes at a time) of zeros in an intermediate buffer (e.g., the store queue 8200, the write combining buffer (WCB) 8600, a separate staging buffer (not shown)) that does not respond to snoops (or does not respond to snoops while the chunks are being written) and that gets evicted responsive to enough chunks having been written to equal the size of a cache line (and not earlier) so that the chunks are written concurrently).

Different Types of Snoops

As previously indicated, as part of the snooping process 4190 or the snooping process 4290, different embodiments may issue different types of snoops depending on the situation, or issue just one type of snoop. There are a variety of possible snoops types that may be used (e.g., a write-update snoop (also referred to as a write-zero snoop or a write-and-zero snoop), a write-invalidate snoop, a snoop that indicates to invalidate and write back (also referred to as an invalidate-even-if-modified snoop), a snoop that writes out any cache line that hits but does not send the data back to the first agent and does not result in the data being read from the downstream memory, a prior art snoop (e.g., an RFO)). As indicated previously, any one of these different types of snoops may be used in conjunction with any the above embodiments discussed with regard to FIGS. 41 and 42. More detail regarding the different types of snoops will now be described.

Figure 43:
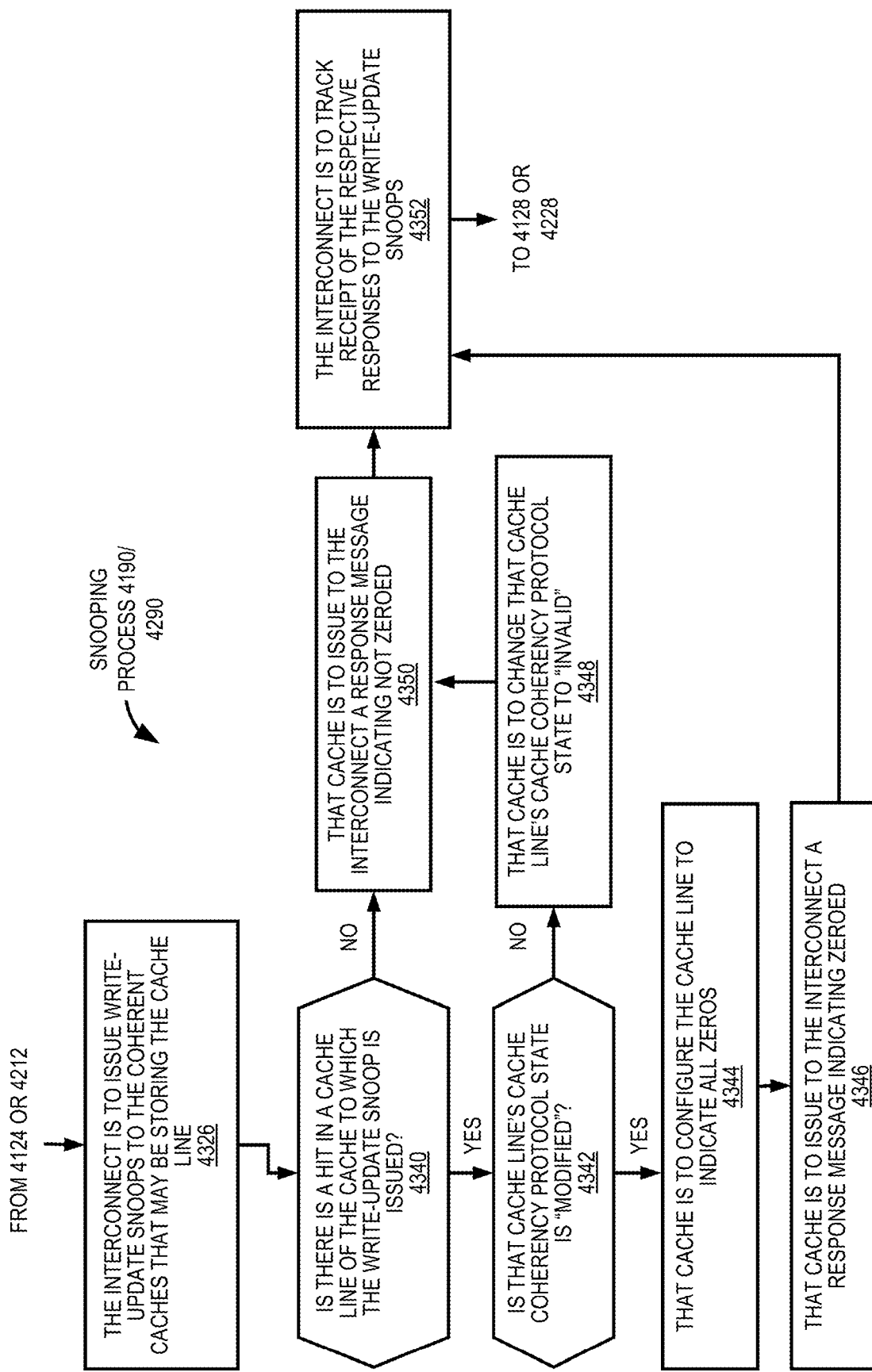
FIG. 43 is a flow diagram illustrating embodiments of the invention that use write-update snoops to implement the snoop process.

Write-update snoops: FIG. 43 is a flow diagram illustrating embodiments of the invention that use write-update snoops (also referred to as write-zero snoops or write-and-zero snoops) to implement the snoop process 4190 or 4290. In the context of FIGS. 41 and 42, flow respectively passes from block 4124 or block 4212 to block 4326, which performs block 4126 or 4226 using a write-update snoop. The interconnect 3920 (e.g., via the snoop generator 3926 of the snoop controller 3925) is implemented to issue write-update snoops to those of the coherent caches that may be storing the cache line (block 4326) (in other words, those of the coherent caches for which it must be determined if there is a hit). When there is a hit for a cache line of a cache (e.g., the L1 cache, the L2 cache, and/or the L3 cache slice of the first agent, and the L1 cache, the L2 cache, and the L3 cache slice of the second agent) to which a write-update snoop is issued (block 4340), then that cache is to: 1) if the hitting cache line's cache coherency protocol state is "modified" (and in some embodiments, one or more of "forward", "exclusive," "owned," and/or "shared") (block 4342), configure the cache line to indicate all zeros (block 4344) (different embodiments may implement caches to configure the cache line to indicate all zeros as previously described in the section titled "Techniques to configure a cache line to indicate all zeros") and issue to the interconnect 3920 a response message indicating zeroed (in some embodiments that support zeroing of a hitting cache line that is in the shared state, the response message also distinguishes the state of the cache line—such as modified-and-zero or owned-and-zero versus shared-and-zero (the latter indicating that the original state was "shared" and the cache has configured the cache line to indicate all zeros and its state is still "shared"); in an alternative embodiment that support zeroing of a cache line in the shared state, a response message indicating not zeroed (as in block 4350) is sent when the original state was "shared" and the cache has configured the cache line to indicate all zeros and its state is still "shared")) (4346); and 2) otherwise, configure that cache line's cache coherency protocol state to "invalid" (block 4328) and issue a response message indicating not zeroed to the interconnect (block 4350). When there is not a hit for a cache line of the cache to which a write-update snoop is issued (block 4340), then the cache issues a response message indicating not zeroed to the interconnect (block 4350). Thus, in some embodiments, a coherent cache may be implemented such that a write command or write-and-zero snoop that hits a cache line in any of the modified, owned, exclusive, and forward states will cause the cache to configure the cache line to be zeroed (and change its state to modified (modified-and-zeroed) or owned (owned-and-zeroed)). In alternative embodiments, such a cache may do so for only a subset of the modified, owned, exclusive, and forward states; in which case, it would cause any hit cache line that is in the modified, owned, exclusive or forward states and that is not being changed to modified-and-zeroed or owned-and-zeroed, to be changed to the invalid state responsive to a write-and-zero snoop. As such, in some embodiments, all or a subset of the coherent caches are implemented to, for all or a subset of the modified, exclusive, owned, or forward states, cause a cache line to be zeroed (and its state change to modified (modified-andzeroed) or owned (owned-and-zeroed)) responsive to a write command or write-and-update (aka write-and-zero) snoop that hits in that cache. Embodiments that support zeroing of a hitting cache line that is in the shared state and leaving it in the shared state will do so only when any Modified, Exclusive, Owned or Forward line that is hit in other caches are changed to Owned and Zeroed or invalidated instead of changed to Modified and Zeroed. In certain embodiments, a cache implemented to respond to a write-update snoop includes the cache controller 4051 (e.g., via the snoop controller 4053), responsive to the write-update snoops, to determine whether or not there are cache hits, configure cache lines that hit to indicate all zeros (different embodiments may implement caches to configure the cache line to indicate all zeros as previously described in the section titled "Techniques to configure a cache line to indicate all zeros"), and issue the response messages to the interconnect 3920.

After issuing the write-update snoops, the interconnect 3920 (e.g., via the snoop responder 3927 of the snoop controller 3925) is implemented to track receipt of the respective response messages (block 4352) (e.g., in one embodiment the snoop generator 3926 indicates to the snoop responder 3927 information for it to track receipt of the respective response messages). From block 4352, control passes to either block 4128 or block 4228 depending on whether an embodiment of FIG. 41 or 42 is being implemented. The cache line sized write of zeros may have been performed by one of the caches responsive to one of the write-update snoops (however, in embodiments that implement zeroing of a cache line in the "shared" state and none of the response messages reflect one of the cache lines being owned-and-zero or modified-and-zero, then the cache line write of zeros is not considered to have been performed by one of the caches responsive to one of the write-update snoops). If the cache line sized write of zeros has not been performed by any of the caches (block 4128 and block 4228) (all the response messages indicate not zeroed; or in embodiments that implement zeroing of a cache line in the "shared" state and none of the response messages reflect one of the cache lines being owned-and-zero or modified-and-zero), then either block 4132 or block 4232 is performed—namely, the interconnect 3920 (e.g., via the write generator 3929 of the snoop controller QO25), or the first agent (e.g., through the execution unit (e.g., memory access unit(s) 164, load-store unit 340) or other hardware structure) responsive to a message from the interconnect 3920, causes a cache line in one of the caches (e.g., the L1 cache, the L2 cache, the L3 cache) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address.

As illustrated above, the use of a write-update snoop, as opposed to the use of an RFO operation, is advantageous in that it does not require that a line be read and returned to the issuing agent and does require ownership of the data be given to the issuing agent (when the conditions of 4340 and 4342 are met, the write-update snoop causes the cache line to be zeroed in the cache of another coherent agent). Thus, an advantage of embodiments that use write-update snoops is that they can directly update a local cache of another agent (e.g., the second agent/non-issuing agent). For example, this allow for relatively fast communication—such as updating a variable that another agent is spinning on.

As indicated previously, write-update snoops may be used in conjunction with the embodiments of FIGS. 41 and 42. By way of example, one specific embodiment will be described that implements write-update snoops in one of the embodiments from FIG. 41. In this specific embodiment, the issuing agent 3900 first attempts to write to the L1 cache 3905 of the issuing agent 3900; and if snoops are required, the interconnect 3920 issues write-update snoops to those of the coherent caches that may be storing the cache line as described above. Thus, the L1 caches are implemented to respond to write commands as described above; the L1 caches, L2 caches, and the L3 caches (more specifically, the L3 cache slices if implemented) are implemented to respond to write-update snoops as described above; the interconnect 3920 is implemented to issue the write-update snoops responsive to the write commands (e.g., via the snoop generator 3926 of the snoop controller 3925) and to respond to the response messages (e.g., via the snoop responder 3927 of the snoop controller 3925) as described above; and the interconnect 3920 (e.g., via the write generator 3929 of the snoop controller QO25), or the first agent (e.g., through the execution unit (e.g., memory access unit(s) 164, load-store unit 340) or other hardware structure) responsive to a message from the interconnect, is implemented to cause a cache line in one of the caches (e.g., the L1 cache 3905, the L2 cache 3910, or the L3 cache 3915 (more specifically, the L3 cache slice 3916 if implemented) of the first agent) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the memory address.

Figure 44:
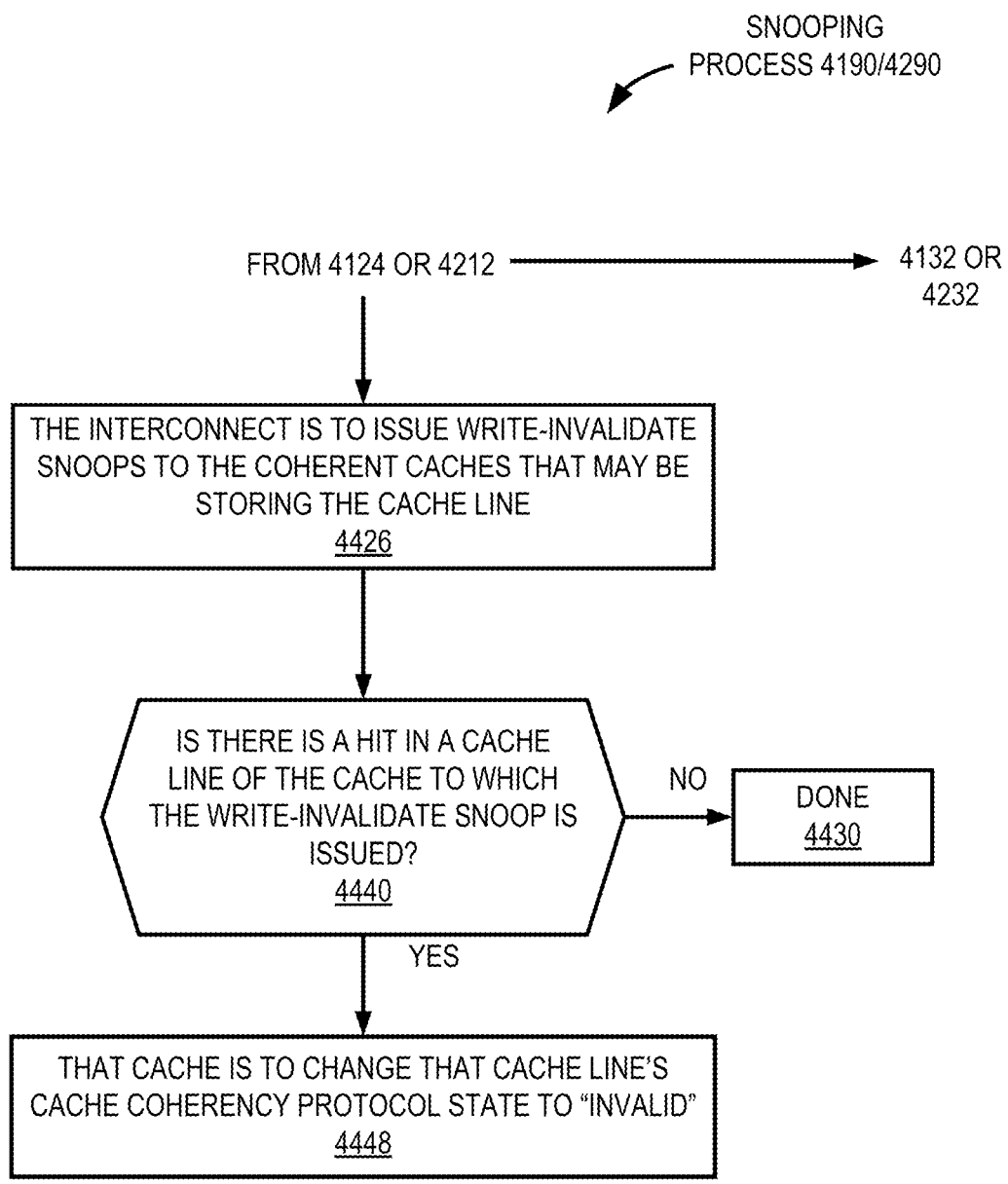
FIG. 44 is a flow diagram illustrating embodiments of the invention that use write-invalidate snoops to implement the snoop process.

Write-invalidate snoops: FIG. 44 is a flow diagram illustrating embodiments of the invention that use write-invalidate snoops (also referred to as "invalidate-even-if-modified" snoops) to implement the snoop process 4190 or 4290. In the context of FIGS. 41 and 42, flow respectively passes from block 4124 or block 4212 to block 4426, which performs block 4126 or 4226 using write-invalidate snoops. The interconnect 3920 (e.g., via the snoop generator 3926 of the snoop controller 3925) is implemented to issue write-invalidate snoops to those of the coherent caches that may be storing the cache line (block 4426) (in other words, those of the coherent caches for which it must be determined if there is a hit). When there is a hit for a cache line of a cache (e.g., the L1 cache, the L2 cache, and/or the L3 cache slice of the first agent, and the L1 cache, the L2 cache, and the L3 cache slice of the second agent) to which a write-invalidate snoop is issued (block 4440), then that cache is to make the cache coherency protocol state indicate "invalid" (even if in the current state is "modified") (block 4448); the cache need not configure the cache line to indicate all zeros (different embodiments may implement caches to configure the cache line to indicate all zeros as previously described in the section titled "Techniques to configure a cache line to indicate all zeros") or issue a response message to the interconnect if the invalidate completes in fixed time (if the invalidate does not complete in fixed time, then one embodiments has the snooped caches send response messages that indicate the snoop is complete). When there is not a hit for a cache line of the cache to which a write-invalidate snoop is issued (4440), then that cache in one embodiment does nothing (block 4430).

In addition, in the context of FIGS. 41 and 42, flow respectively passes from block 4124 or block 4212 to block 4132 or 4232 (blocks 4128 and 4228 are not implemented when write-invalidate snoops are used). In block 4132 or 4232, the first agent (e.g., through the execution unit (e.g., memory access unit(s) 164, load-store unit 340) or other hardware structure) on its own, the interconnect 3920 (e.g., via the write generator 3929 of the snoop controller QO25), or the first agent (e.g., through the execution unit (e.g., memory access unit(s) 164, load-store unit 340) or other hardware structure) responsive to a message from the interconnect, causes a cache line in one of the caches (e.g., the L1 cache 3905, the L2 cache 3910, or the L3 cache 3915 (more specifically, the L3 cache slice 3916 if implemented) of the first agent) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address.

As illustrated above, the use of a write-invalidate snoop, as opposed to the use of an RFO operation, is advantageous in that it does not require that a cache line be read and returned to the issuing agent because the issuing agent will be zeroing the data.

As indicated previously, write-invalidate snoops may be used in conjunction with the embodiments of FIGS. 41 and 42. By way of example, one specific embodiment will be described that implements write-invalidate snoops in one of the embodiments from FIG. 41. In this specific embodiment, the issuing agent 3900 first attempts to write to the L1 cache 3905 of the issuing agent 3900; and if snoops are required, the interconnect 3920 issues write-invalidate snoops to those of the coherent caches that may be storing the cache line as described above. Thus, the L1 caches are implemented to respond to write commands as described above; the L1 caches, L2 caches, and the L3 cache (more specifically, the L3 cache slices if implemented) are implemented to respond to write-invalidate snoops as described above; the interconnect 3920 is implemented to issue the write-invalidate snoops responsive to the write commands; and the first agent (e.g., through the execution unit (e.g., memory access unit(s) 164, load-store unit 340) or other hardware structure) on its own, the interconnect 3920 (e.g., via the write generator 3929 of the snoop controller QO25), or the first agent (e.g., through the execution unit (e.g., memory access unit(s) 164, load-store unit 340) or other hardware structure) responsive to a message from the interconnect, are implemented to cause a cache line in one of the caches (e.g., the L1 cache 3905, the L2 cache 3910, or the L3 cache 3915 (more specifically, the L3 cache slice 3916 if implemented) of the first agent) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the memory address.

Figure 45:
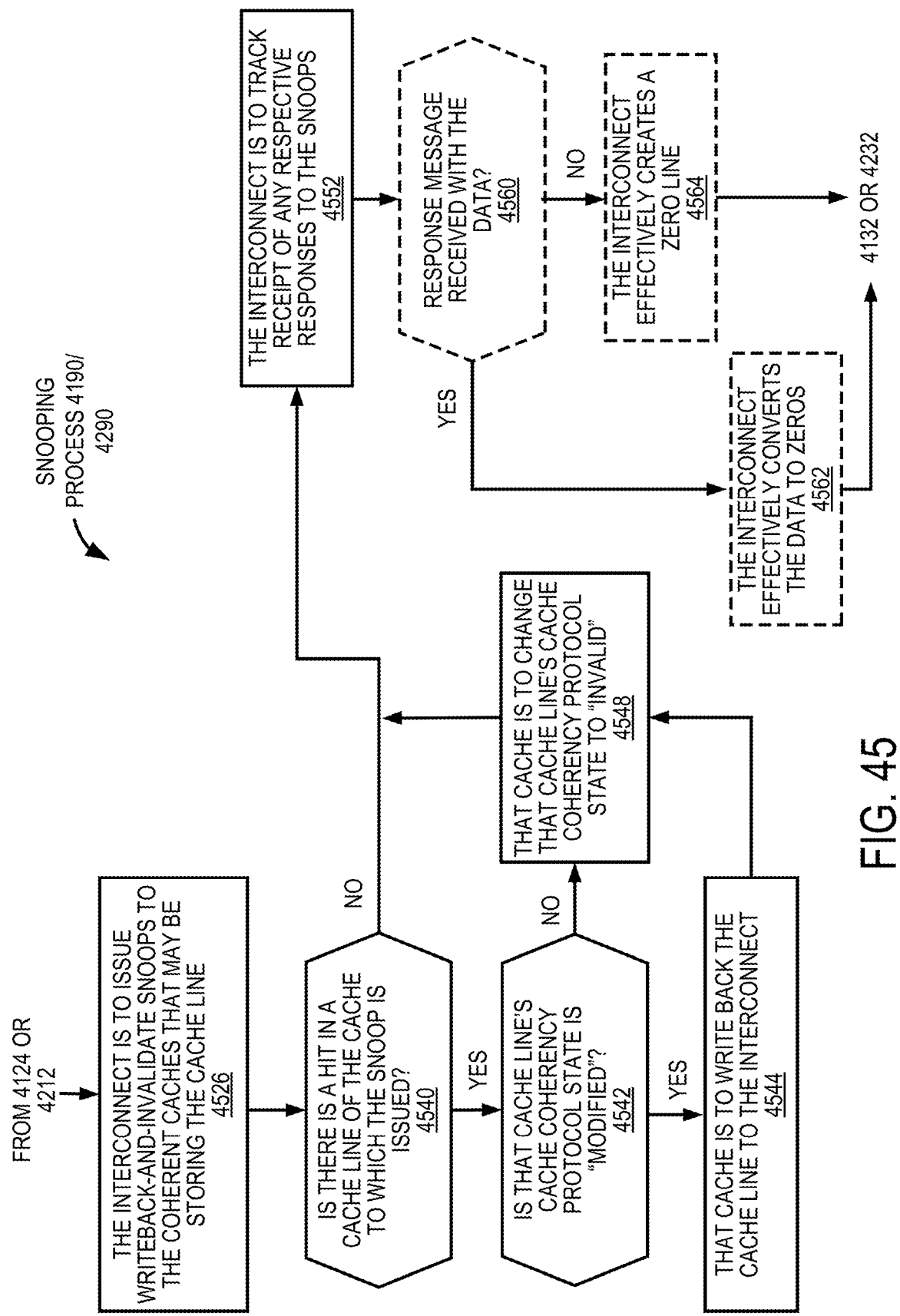
FIG. 45 is a flow diagram illustrating embodiments of the invention that use snoops that invalidate and write back to implement the snoop process.

Snoops that invalidate and write back: FIG. 45 is a flow diagram illustrating embodiments of the invention that use snoops, which invalidate and write back (also referred to as "writeback-and-invalidate snoops"), to implement the snoop process 4190 or 4290. In the context of FIGS. 41 and 42, flow respectively passes from block 4124 or block 4212 to block 4526, which performs block 4126 or 4226 using a writeback-and-invalidate snoop (a snoop that invalidates and write backs). The interconnect 3920 (e.g., via the snoop generator 3926 of the snoop controller 3925) is implemented to issue writeback-and-invalidate snoops to those of the coherent caches that may be storing the cache line (block 4526) (in other words, those of the coherent caches for which it must be determined if there is a hit). When there is a hit for a cache line of a cache (e.g., the L1 cache, the L2 cache, and/or the L3 cache slice of the first agent, and the L1 cache, the L2 cache, and the L3 cache slice of the second agent) to which such a snoop is issued (block 4540), then that cache is to: 1) if the cache coherency protocol state of the cache line is "modified" (block 4542) (and in some embodiments, "clean-evict"), write back the cache line to the interconnect 3920 (block 4544); and regardless 2) make the cache coherency protocol state of the cache line indicate "invalid" (block 4548) (the cache need not configure the cache line to indicate all zeros). When there is not a hit for a cache line of the cache to which the snoop is issued (block 4540), then the cache in one embodiment does nothing (control passes to block 4552). In certain embodiments, a cache implemented to respond to such a snoop includes the cache controller 4051, responsive to such snoops, to determine whether or not there are cache hits, write back modified cache lines (e.g., those that hit and have a cache coherency protocol state of "modified") to the interconnect 3920, and modify the cache coherency protocol states of cache lines to "invalid."

After issuing the snoops, the interconnect 3920 (e.g., via the snoop responder 3927 of the snoop controller 3925) is implemented to track receipt of any respective response messages (block 4552) (e.g., in one embodiment the snoop generator 3926 indicates to the snoop responder 3927 information for it to track receipt of any respective response messages). If a response message is received with the data (block 4560) (i.e., the data from the modified cache line), then the interconnect 3920 is optionally implemented (e.g., via the write converter 3928 of the snoop controller 3925) to effectively convert the data to zeros (block 4562). Otherwise, the interconnect 3920 is optionally implemented (e.g., via the write generator 3929 of the snoop controller 3925) to effectively creates a zero line (block 4564). Control passes from blocks 4562 and 4564 to either block 4132 or block 4232 (blocks 4128 and 4228 are not implemented when snoops that invalidate and write back are used) depending on whether an embodiment of FIG. 41 or 42 is being implemented. In block 4132 or 4232, the first agent (e.g., through the execution unit (e.g., memory access unit(s) 164, load-store unit 340) or other hardware structure) on its own, the interconnect 3920 (e.g., the snoop controller QO25), or the first agent (e.g., through the execution unit (e.g., memory access unit(s) 164, load-store unit 340) or other hardware structure) responsive to a message from the interconnect 3920, causes a cache line in one of the caches (e.g., the L1 cache, the L2 cache, the L3 cache) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address. In one embodiment, blocks 4560 and 4562 are not implemented, and block 4564 is always performed. In another embodiment, block 4562 is not performed, written back data is sent to the first agent, and the first agent zeros the data. In another embodiment, blocks 4560, 4562, and 4564 are not performed, and the first agent zeros the data.

As illustrated above, the use of a snoop that invalidates and write backs, as opposed to the use of an RFO operation, is advantageous in that it does not require that a cache line be read and returned to the issuing agent because the issuing agent will be zeroing the data.

As previously described, the above is begun responsive to the first agent issuing the command to initiate the cache line sized write of zeros at an address aligned on a cache line boundary (e.g., block 4112 or 4212). As previously described, this command may take the form of a write command (e.g., block 4112 or 4212). In other embodiments, this command may be a read command (e.g., block 4212); in which case, a cache line in one of the caches (e.g., the L1 cache, the L2 cache, the L3 cache) is caused to be configured to indicate all zeros by: 1) the interconnect 3920 (e.g., the snoop controller 3925) being implemented to respond to the read command from the first agent with a response to the first agent indicating a zero line (which line will have its cache coherency protocol state set to modified or exclusive); and 2) the first agent being implemented to put the result of its read command into a cache (cause a cache (e.g., the L1 cache 3905) to configure a cache line to indicate all zeros (different embodiments may implement caches to configure the cache line to indicate all zeros as previously described in the section titled "Techniques to configure a cache line to indicate all zeros"), but not into an architectural register file of the first agent.

As indicated previously, the snoops that indicate to invalidate and write back may be used in conjunction with the embodiments of FIGS. 41 and 42. By way of example, one specific embodiment will be described that implements such snoops in one of the embodiments from FIG. 41. In this specific embodiment, the issuing agent 3900 first attempts to write to the L1 cache 3905 of the issuing agent 3900; and if snoops are required, the interconnect 3920 issues the snoops to those of the coherent caches that may be storing the cache line as described above. Thus, the L1 caches are implemented to respond to write commands as described above; the L1 caches, L2 caches, and the L3 cache (more specifically, the L3 cache slices if implemented) are implemented to respond to the snoops as described above; the interconnect 3920 is implemented to issue the snoops responsive to write commands, optionally implemented to effectively convert to zero any received data responsive to the snoops (e.g., via the write converter 3928 of the snoop controller 3925), and optionally implemented to effectively create a zero line if no data is received responsive to the snoops (e.g., write generator 3929 of the snoop controller 3925; and the first agent (e.g., through the execution unit (e.g., memory access unit(s) 164, load-store unit 340) or other hardware structure) on its own, the interconnect 3920 (e.g., via the snoop controller QO25), or the first agent (e.g., through the execution unit (e.g., memory access unit(s) 164, load-store unit 340) or other hardware structure) responsive to a message from the interconnect, is implemented to cause a cache line in one of the caches (e.g., the L1 cache 3905, the L2 cache 3910, or the L3 cache 3915 (more specifically, the L3 cache slice 3916 if implemented) of the first agent) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the memory address.

Figure 46:
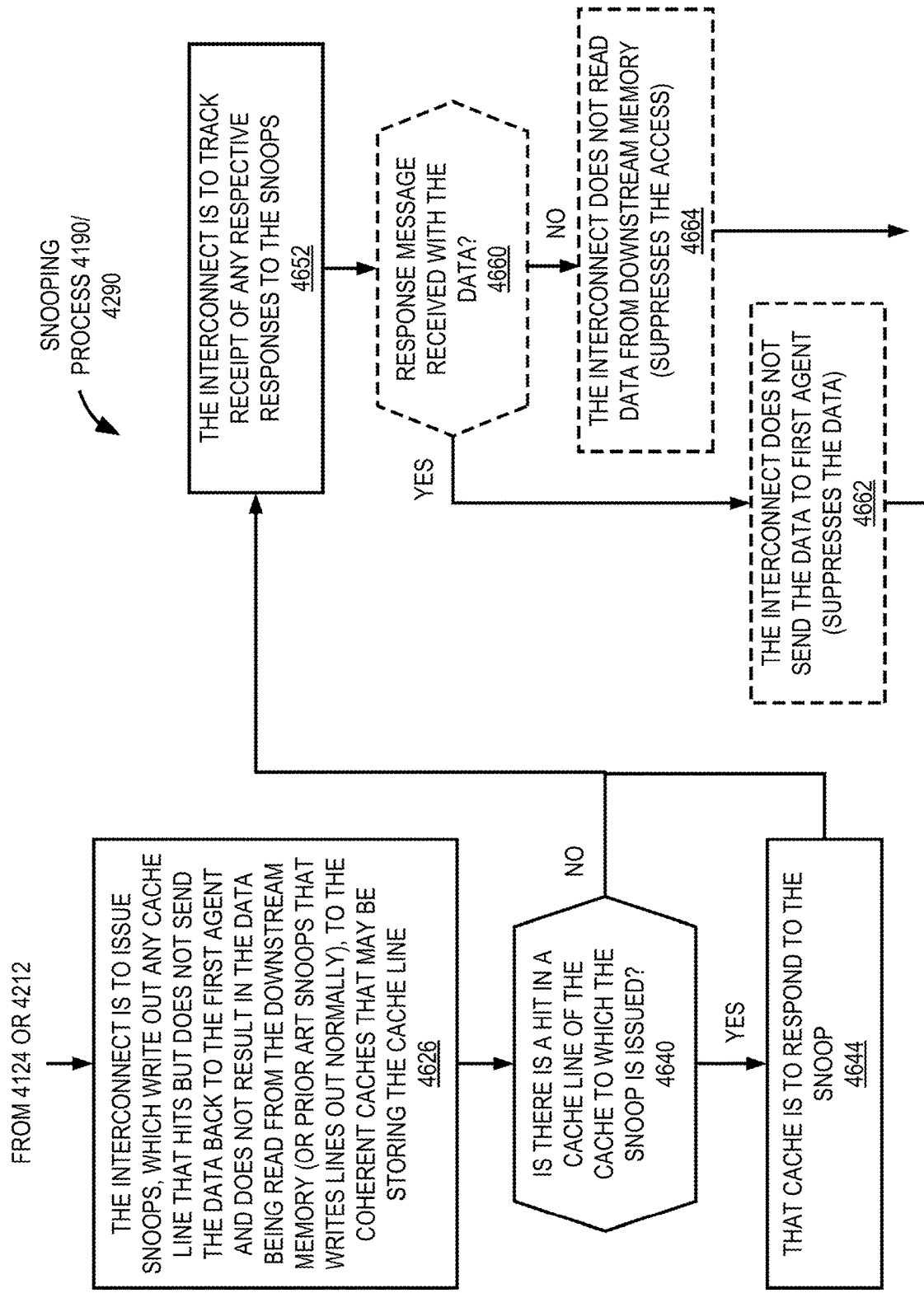
FIG. 46 is a flow diagram illustrating embodiments of the invention that use snoops that write out any cache line that hits but does not send the data back to the first agent and does not result in the data being read from the downstream memory to implement the snoop process.

Snoops that write out any cache line that hits but does not send the data back to the first agent and does not result in the data being read from the downstream memory, or Prior art snoops that writes lines out normally (an RFO): FIG. 46 is a flow diagram illustrating embodiments of the invention that use snoops, which write out any cache line that hits but does not send the data back to the first agent and does not result in the data being read from the downstream memory (or prior art snoops that writes lines out normally—e.g., an RFO operation), to implement the snoop process 4190 or 4290. In the context of FIGS. 41 and 42, flow respectively passes from block 4124 or block 4212 to block 4526, which performs block 4126 or 4226 using such a snoop. The interconnect 3920 (e.g., via the snoop generator 3926 of the snoop controller 3925) is implemented to issue such snoops to those of the coherent caches that may be storing the cache line (block 4626) (in other words, those of the coherent caches for which it must be determined if there is a hit). When there is a hit for a cache line of a cache (e.g., the L1 cache, the L2 cache, and/or the L3 cache slice of the first agent, and the L1 cache, the L2 cache, and the L3 cache slice of the second agent) to which such a snoop is issued (block 4640), then that cache is to respond to the snoop (4644). In some embodiments, the caches are implemented to respond to such snoops as a prior art cache would normally respond according to the implemented cache coherency protocol. While in some embodiments a new type of snoop is used, in other a prior art snoop (e.g., a RFO operation) is used—in which case, incorporating the cache line zeroing instruction into an existing processor design requires no modification or a small modification to the caches depending (see above section titled "Triggering a cache to configure a cache line to indicate all zeros"). When there is not a hit for a cache line of the cache to which the snoop is issued (4640), then the cache in one embodiment does nothing (control passes to block 4652).

After issuing the snoops, the interconnect 3920 (e.g., via the snoop responder 3927 of the snoop controller 3925) is implemented to track receipt of any respective response messages (e.g., in one embodiment the snoop generator 3926 indicates to the snoop responder 3927 information for it to track receipt of any respective response messages). If a response message is received with the data (block 4660) (e.g., the data from a modified cache line), then the interconnect 3920 (e.g., via the snoop responder 3927 of the snoop controller 3925) is implemented to not send the data to the issuing agent or any of the caches of the issuing agent (block 4662). If a response message with the data is not received (4660), the interconnect 3920 (e.g., via the snoop responder 3927 of the snoop controller 3925) is implemented to not read the data from the downstream memory since it is not needed (block 4664).

Control passes from blocks 4662 and 4664 to either block 4132 or 4232 (blocks 4128 and 4228 are not implemented when such snoops are used) depending on whether an embodiment of FIG. 41 or 42 is being implemented. In block 4132 or 4232, the first agent (e.g., through the execution unit (e.g., memory access unit(s) 164, load-store unit 340) on its own (block 4232 only), the interconnect 3920 (e.g., the snoop controller QO25), or the first agent (e.g., through the execution unit (e.g., memory access unit(s) 164, load-store unit 340) or other hardware structure) responsive to a message from the interconnect 3920, causes a cache line in one of the caches (e.g., the L1 cache, the L2 cache, the L3 cache) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address. In an embodiment in which block 4662 is not implemented (the data is sent back to the first agent) and/or block 4664 is not implemented (downstream memory is accessed and the data returned to the first agent), then the first agent zeros the data.

As illustrated above, even if an RFO operation is used, the illustrated embodiments are advantageous in that they work with an existing cache design, which supports an RFO operation, with no or little modification.

As indicated previously, these types of snoops may be used in conjunction with the embodiments of FIGS. 41 and 42. By way of example, one specific embodiment will be described that implements such snoops in one of the embodiments from FIG. 42. In this specific embodiment, the issuing agent 3900 is to issue the command to initiate the cache line sized write of zeros at a memory address directly to the interconnect 3920 (skipping the caches of the issuing agent/first agent), the interconnect 3920 (e.g., via the snoop generator 3926 of the snoop controller 3925) is implemented to issue the snoops to those of the coherent caches that may be storing the cache line as described above; if a response message is received with the data (i.e., the data from the modified cache line), then the interconnect 3920 is optionally implemented (e.g., via the snoop responder 3927 of the snoop controller 3925) to not send the data to the issuing agent or any caches of the issuing agent; if a response message with the data is not received, the interconnect 3920 (e.g., via the snoop responder 3927 of the snoop controller 3925) is optionally implemented to not read the data from the downstream memory since it is not needed; and the issuing agent (the first agent) on its own, or the first agent responsive to a message from the interconnect, causes a cache line in one of the caches (e.g., the L1 cache, the L2 cache, the L3 cache) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address. Thus, in certain embodiments, the L1 caches, L2 caches, and the L3 caches (more specifically, the L3 cache slices if implemented) are implemented to respond to the snoops as described above; the interconnect 3920 is implemented to issue the snoops responsive to the commands (e.g., via the snoop generator 3926 of the snoop controller 3925) and respond to responsive data from the caches (e.g., via the snoop responder 3927 of the snoop controller 3925) as described above; the issuing agent is implemented to send the command to initiate the cache line sized write of zeros at a memory address directly to the interconnect 3920; and the issuing agent (the first agent) on its own, or the first agent responsive to a message from the interconnect, causes a cache line in one of the caches (e.g., the L1 cache, the L2 cache, the L3 cache) to be configured to indicate all zeros (different embodiments may implement caches to configure the cache line to indicate all zeros as previously described in the section titled "Techniques to configure a cache line to indicate all zeros") or causes a write of zeros of the cache line size to the downstream memory at the address. In one specific embodiment, the issuing agent (the first agent) on its own causes a cache line in one of the caches (e.g., the L1 cache, the L2 cache, the L3 cache) to be configured to indicate all zeros.

Multiple Sockets

As previously described, the interconnect 3920 may, for example, represent: 1) just an interconnect within a CCX; 2) an interconnect within and between CCXs; 3) separate interconnects within different CCXs, as well as an interconnect(s) between CCXs. As discussed herein, a system may be implemented with one or more of the above processors (each including one or more CCXs) (see below section titled "Exemplary Computer Architectures). Such a system may include one or more sockets (as known as a CPU socket or CPU slot) that each comprise one or more mechanical components providing mechanical and electrical connections. In systems with multiple sockets (e.g. a server), the sockets are connected by a set of one or more interconnects (also referred to as socket-to-socket interconnects). Different embodiments may implement the set of socket-to-socket interconnects differently, including one or more of a ring, multiple rings, point to point links (e.g., point-to-point links, such as QuickPath Interconnect (QPI), UltraPath Interconnect (UPI), HyperTransport (HP)), shared buss(es), etc. This set of socket-to-socket interconnects may be viewed as part of the interconnect 3920 or as separate depending on the embodiment. In some embodiments, this set of interconnects is implemented to support the same communications (write commands, snoops, response messages, etc.) discussed above with regard the interconnect 3920; where each of these communications may have the same or a different format when sent over a socket-to-socket interconnect. In other embodiments, one or more of these communications (e.g., one or more of the snoop types and/or response messages) is converted when sent socket-to-socket. For example, some embodiments may use a write-update snoop within a processor(s) in a single socket, but convert such a snoop to a write-invalidate or writeback-and-invalidate snoop when it is sent to another socket. An advantage of such embodiments is that the decision whether to generate a new zeroed cache line is only within a socket (as such, there is no need for a "zeroed" or "not zeroed" indication from the other sockets).

Summary of Some Embodiments

One embodiment of the invention may include a processor comprising a first coherent agent, a second coherent agent, and an interconnect. The first agent is coupled to the interconnect through a cache of the first agent. The second agent is coupled to the interconnect through a cache of the second agent. The first agent is to decode and execute an instruction whose execution is to cause a cache line sized write of zeros at a memory address. The first agent is to issue, to the cache of the first agent, a write command to initiate the cache line sized write of zeros at the memory address. The cache of the first agent, when there is a hit for a cache line responsive to receiving the write command and that cache line's cache coherency protocol state is a modified state or an exclusive state, to configure that cache line to indicate all zeros. The cache of the first agent, when there is a cache miss responsive receiving to the write command, to issue the write command toward the interconnect. The interconnect, responsive to receiving the write command, to issue a snoop to the cache of the second agent. The interconnect, or the first agent responsive to a message from the interconnect, to cause a cache line in the cache of the first agent to be configured to indicate all zeros when the write command and the snoop did not cause the cache line write of zeros to be performed.

In addition, the following may apply: In some embodiments, the cache of the first agent, when there is a hit for a cache line responsive to receiving the write command and that cache line's cache coherency protocol state is not the modified state or the exclusive state, to make that cache line's cache coherency protocol state be an invalid state and issue the write command toward the interconnect.

Another embodiment of the invention may include a processor comprising a decoder to decode an instruction to zero a cache line. The processor also comprising an execution unit, coupled to the decoder and responsive to the decode of the instruction, to issue a write command to initiate a cache line sized write of zeros at a memory address. The processor also comprising a coherent cache, coupled to the execution unit, to receive the write command, to determine whether there is a hit in the coherent cache responsive to the write command, to determine whether a cache coherency protocol state of the hit cache line is a modified state or an exclusive state, to configure a cache line to indicate all zeros when the cache coherency protocol state is the modified state or the exclusive state, and to issue the write command toward an interconnect when there is a miss responsive receiving to the write command. The interconnect, responsive to receipt of the write command, to issue a snoop to each of a plurality of other coherent caches for which it must be determined if there is a hit. The interconnect, or the execution unit responsive to a message from the interconnect, to cause a cache line in one of the coherent caches to be configured to indicate all zeros when the write command and the snoop did not cause the cache line write of zeros to be performed.

In addition, the following may apply: In some embodiments, the coherent cache also to make that cache line's cache coherency protocol state be an invalid state and issue the write command toward the interconnect when the cache coherency protocol state of the hit cache line is not the modified state or the exclusive state. In some embodiments, the decoder and the execution unit are part of a first core, and the plurality of coherent caches includes a coherent cache of a second core.

Another embodiment of the invention may include a processor comprising a first core to issue a write command responsive to execution of a cache line zeroing instruction. The first core also comprising a level 1 (L1) cache coupled to receive the write command, to determine whether there is a hit or a miss in the cache responsive to the write command, and to determine responsive to the hit whether a cache coherency protocol state of a cache line that hit is one that grants the cache authority to modify the cache line without a broadcast to other caches. The L1 cache is to configure the cache line to indicate all zeros responsive to the hit when a cache coherency protocol state of a cache line that hit is one that grants the cache authority to modify the cache line without a broadcast to other caches. The L1 cache to issue the write command toward the interconnect responsive to the miss. The interconnect, coupled to the first core and responsive to the write command, to issue a snoop to those of a plurality of other caches for which it must be determined if there is a hit. The first core, the interconnect, or the first core responsive to a message from the interconnect, to cause a cache line in the cache or one of the plurality of other caches to be configured to indicate all zeros when the write command and the snoop did not cause the cache line write of zeros to be performed.

In addition, the following may apply: In some embodiments, the L1 cache may also to make the cache coherency protocol state be invalid and issue the write command toward an interconnect responsive to the hit when the cache coherency protocol state of the cache line that hit is not one that grants the cache authority to modify the cache line without a broadcast to other caches. In some embodiments, each of the plurality of other caches, responsive to the snoop, may also be implemented to determine whether there is a hit or a miss in that other cache, and to determine responsive to the hit whether a cache coherency protocol state of a cache line that hit in that other cache is one that grants the cache authority to modify the cache line without a broadcast to other caches. Each of the plurality of other caches to: configure a cache line in that cache to indicate all zeros and issue a response message indicating zeroed responsive to the hit when a cache coherency protocol state of the cache line that hit in that cache is one that grants the cache authority to modify the cache line that hit in that cache without a broadcast to other caches; and issue a response message indicating not zeroed responsive to the miss or responsive to the hit when the cache coherency protocol state of the cache line that hit in that cache is not one that grants the cache authority to modify the cache line that hit in that cache. The interconnect to determine track receipt of the response messages to determine if the snoop caused one of the plurality of other caches to be configured to indicate all zeros.

Another embodiment of the invention may include a processor comprising a first coherent agent, a second coherent agent, and an interconnect. The first agent is coupled to the interconnect through a cache of the first agent. The second agent is coupled to the interconnect through a cache of the second agent. The first agent is to decode and execute an instruction whose execution is to cause a cache line sized write of zeros at a memory address. The first agent is to issue, to the interconnect, a command. The interconnect, responsive to receiving the command, is to issue a snoop to the cache of the first agent and the cache of the second agent. The first agent, the interconnect, or the first agent responsive to a message from the interconnect, to cause a cache line in the cache of the first agent to be configured to indicate all zeros when the snoop did not cause the cache line write of zeros to be performed.

Another embodiment of the invention may include a processor comprising a decoder to decode an instruction to zero a cache line. The processor also comprising an execution unit, coupled to the decoder, to issue a command responsive to the decode of the instruction. The interconnect, responsive to receipt of the command, to issue a snoop to each of a plurality of coherent caches for which it must be determined if there is a hit. The execution unit on its own, the interconnect, or the execution unit responsive to a message from the interconnect, to cause a cache line in one of the plurality of coherent caches coupled to the execution unit to be configured to indicate all zeros when the snoop did not cause the cache line write of zeros to be performed.

Another embodiment of the invention may include a processor comprising a first core to issue a command responsive to execution of a cache line zeroing instruction. The processor also comprising an interconnect, coupled to a level 3 (L3) cache that is shared, a level 2 (L2) cache of the first core, and a level 1 (L1) cache of the first core, to issue responsive to the command a snoop to those of a plurality of coherent caches for which it must be determined if there is a hit. In some embodiments, the plurality of coherent caches includes the L1 cache of the first core, the L2 cache of the first core, the L3 cache, an L1 cache of a second core, and an L2 of the second core. The first core on its own, the interconnect, or the first core responsive to a message from the interconnect, to cause a cache line in one of the plurality of coherent caches coupled to the first core to be configured to indicate all zeros.

PTE Coalescing

A processor core may support a page table coalescing feature according to some exemplary embodiments, allowing multiple smaller memory pages to be coalesced into a single, effective, larger memory page. In some embodiments, for example, eight 4 KB memory pages may be coalesced into a single 32 KB memory page. In other embodiments, 16 4 KB memory pages may be coalesced into a single 64 KB memory page.

Current computer architectures allow virtual memory pages of various sizes. For example, an x86 architecture may allow pages of 4 KB, 2 MB, and 1 GB. A processor implementing such an architecture may provide a translation lookaside buffer (TLB) for each of these page sizes, providing a mapping of virtual addresses to physical addresses. When attempting to translate a virtual address to a physical one, the processor may search each of the applicable TLBs to determine whether any of them contains an entry corresponding to the virtual address. If an entry is found (i.e., a "TLB hit"), the entry is retrieved from the TLB in which it is found, and the translation from a virtual to a physical address proceeds.

If no entry corresponding to the virtual address is found in any of the TLBs present on the processor (i.e., a "TLB miss"), the processor may attempt to locate an entry in the page table that corresponds to the virtual address. If an entry is found (i.e., a "page table hit"), the entry is retrieved from the page table and inserted into the appropriate TLB. The translation from a virtual to a physical address may then be retried, yielding a TLB hit.

If no entry corresponding to the virtual address is found in the page table (i.e., a "page table miss") it may indicate that there is currently no physical address in memory that corresponds to the provided virtual address. In this event, the processor may cause the page corresponding to the virtual address to be loaded from other storage (e.g., a disk) into memory at a particular physical address, and may insert a mapping from the provided virtual address to this physical address into the page table. A subsequent attempt to translate the provided virtual address will result in a page table hit, which will cause a corresponding entry to be added to the appropriate TLB.

A difficulty with some current processor architectures is a lack of granularity in allowable page sizes. For example, as explained above, some processor architectures allow pages of 4 KB, 2 MB, and 1 GB, providing a relatively "coarse" spread between page sizes.

According to some embodiments, this difficulty may be addressed by coalescing multiple smaller pages, yielding an intermediate page size that is, e.g., larger than 4 KB, but smaller than 2 MB. In some embodiments, this may be achieved by opportunistically coalescing, e.g., eight 4 KB pages to create a single effective 32 KB page under certain conditions. In some embodiments, the eight 4 KB pages must be aligned to a 32 KB address boundary.

In some embodiments, the eight 4 KB pages must be contiguous in one or both of (a) virtual; and (b) physical address spaces. For example, some embodiments may require that bits 12-14 of virtual address VA and physical address PA are equal to each other. That is, in some embodiments, smaller pages are coalesced into a larger one only if, for each of the smaller pages, VA[14:12]==PA[14:12].

In some embodiments, smaller pages are coalesced into a larger one only if each of the smaller pages has the same permission bits. In some embodiments, when smaller pages are coalesced into a larger one, the operating system may combine the accessed/dirty bits corresponding to each of the smaller pages into a single value, by, e.g., performing a logical OR operation on all of the smaller pages' accessed/dirty bits. In some embodiments, when smaller pages are coalesced into a larger one, the operating system may set only the appropriate 4 KB page dirty/accessed bits, thereby tracking which portions of the larger page have been accessed and/or are dirty.

Figure 47:
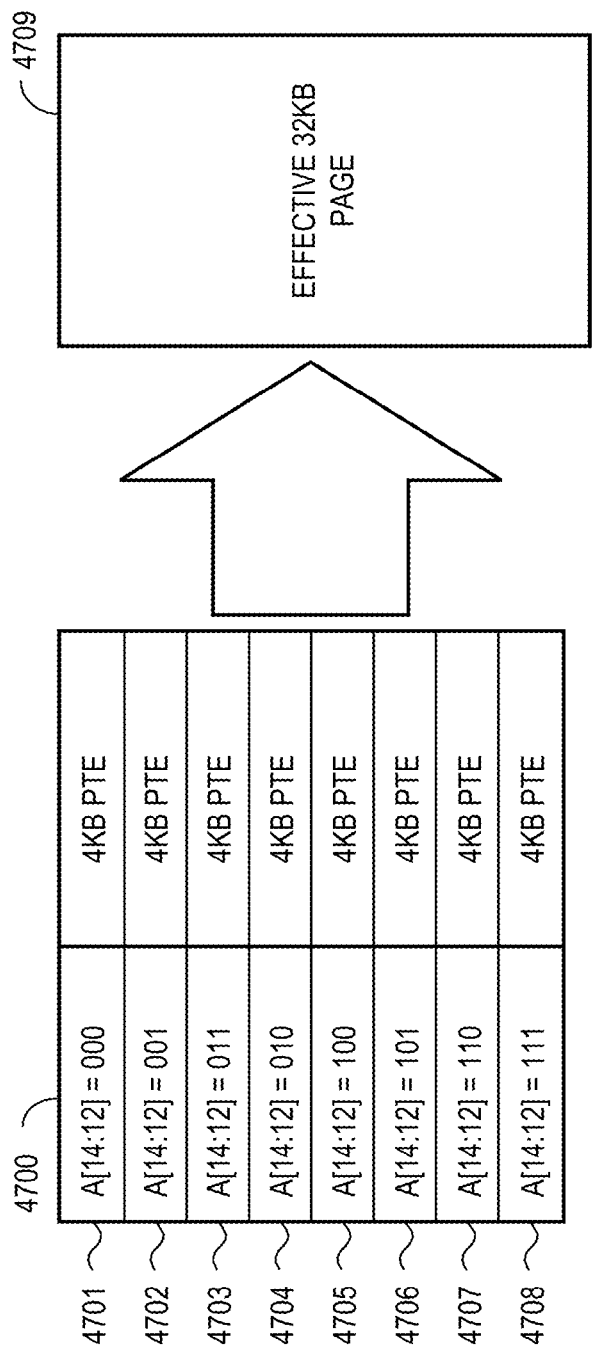
FIG. 47 is a diagram illustrating a page coalescing feature that may be included in a processor according to some embodiments.

FIG. 47 is a diagram illustrating a page coalescing feature that may be included in a processor according to some embodiments. Block 4700 represents a portion of a page table containing eight entries 4701-4708, each corresponding to pages that are 4 KB in size. As FIG. 47 shows, the eight entries 4701-08 have contiguous addresses, with bits 12-14 of the eight Addresses taking the consecutive values 000, 001, 010, 011, 100, 101, 110, and 111. According to some embodiments, as shown in FIG. 47, these eight 4 KB pages may be combined into effective 32 KB page 4709.

In some embodiments, effective 32 KB page 4709 may be denoted by including an additional bit in each page table entry (PTE), indicating that the eight 4 KB pages should be treated as an effective 32 KB page. In some embodiments, effective 32 KB page 4709 may be denoted by an additional bit in the page directory entry corresponding to the page table entries 4701-08, indicating that the eight 4 KB pages should be treated as an effective 32 KB page. In some embodiments, upon each access to one of the eight 4 KB pages, the consecutive, aligned addresses of the eight 4 KB pages may be detected by the hardware and treated as an effective 32 KB page.

Figure 48:
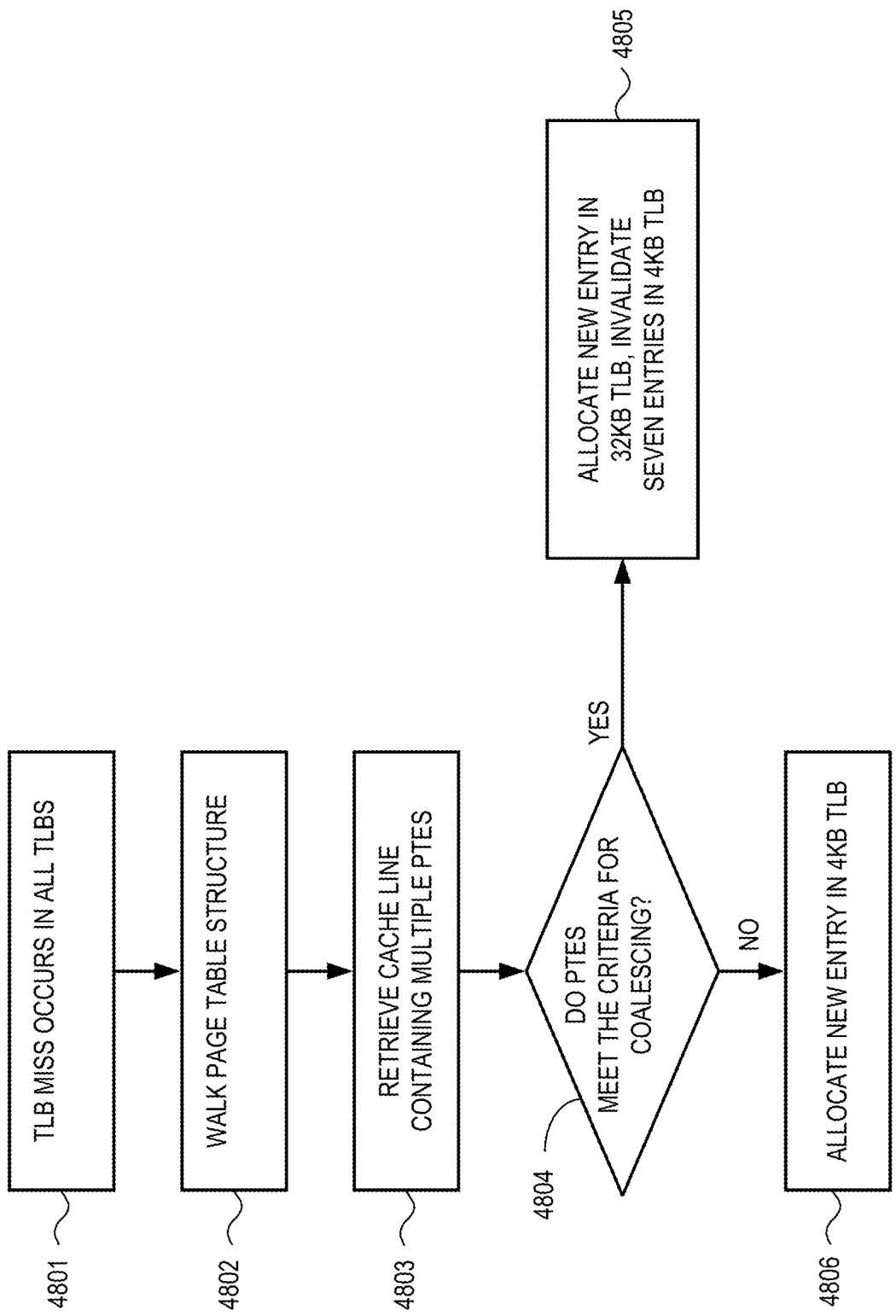
FIG. 48 is a flow diagram that illustrates a method for coalescing page table entries into a single effective page according to some embodiments.

Detecting whether multiple smaller pages meet the criteria for coalescing into an effective larger page may be achieved using a variety of methods. For example, FIG. 48 is a flow diagram that illustrates a method for coalescing page table entries into a single effective page. On a TLB miss in all TLBs (e.g., all 4 KB, 32 KB, 2 MB, and 1 GB TLBs) as shown in box 4801, the processor may walk the page tables according to the hierarchical structure of the page directory (e.g., using the x86 page table definition), as shown in box 4802. Upon determining the location of the appropriate page table entry, the processor may then retrieve a cache line containing multiple page table entries (box 4803). For example, in some embodiments, the processor may retrieve eight page table entries in a cache line.

Upon retrieval of the multiple page table entries in the cache line, the processor may test whether the page table entries correspond to pages that meet the requirements for coalescing, as shown in 4804. For example, the processor may test whether the pages' addresses are consecutive in virtual and/or physical memory. In some embodiments, the processor may further test whether the values of the pages' permission bits are the same. In some embodiments, the processor may determine whether the pages' addresses are aligned to a 32 KB boundary.

If the multiple page table entries in the cache line meet the criteria for coalescing into a single combined page (for example, an effective 32 KB page) an entry corresponding to the combined page may be placed into the appropriate TLB (for example, the 32 KB TLB), and the entries in the cache line that were combined into a single entry are invalidated, as shown in box 4805. If the multiple page table entries do not meet the criteria for coalescing into a single combined page, then the virtual-to-physical address translation may continue per usual, by allocating an entry in the TLB corresponding to the smaller (e.g., 4 KB) TLB, as shown in box 4806.

In some embodiments, the processor may determine whether to coalesce multiple smaller pages based on the contents of the relevant TLB. For example, after a 4 KB TLB miss, the processor may detect whether the corresponding 4 KB page may be coalesced with additional entries that are present in the TLB (e.g., seven other TLB entries corresponding to 4 KB pages). If the entry corresponding to the provided address can be combined with others to create an effective larger page (e.g., an effective 32 KB page), the existing TLB entries to be combined are invalidated, and an entry is created corresponding to the effective larger page in the appropriate TLB (e.g., in the TLB corresponding to 32 KB pages). In some embodiments, a separate TLB corresponding to the combined effective page size is not used, and instead information relating to the virtual-to-physical address translation for combined pages are stored in the TLB corresponding to the smaller page size (e.g., the 4 KB page TLB). In some embodiments, this information may be encoded in the TLB corresponding to the smaller page size using additional bits reserved for that purpose.

In some embodiments, the above features may be used in conjunction with an operating system that allocates pages using an algorithm optimized for page coalescing as described above. Existing operating systems have algorithms designed for allocating, e.g., 4 KB, 2 MB, and/or 1 GB pages. Operating systems that may be used in conjunction with some embodiments may use additional algorithms that are designed for allocating combined pages (e.g., effective pages of 32 KB).

The page coalescing features described above are not limited to combining a particular number of pages of a particular size, but may be used to coalesce varying numbers of pages of various sizes. For example, some embodiments may coalesce 16 4 KB pages, forming effective combined pages of 64 KB. Some embodiments may additionally support effective combined pages of multiple sizes (e.g., combined pages of 32 KB and 64 KB). In some embodiments, pages of multiple sizes (e.g., pages of 4 KB and 32 KB) may be combined into a single effective page (e.g., an effective 64 KB page).

Exemplary Computer Architectures

FIGS. 49-52 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), general-purpose processors, server processors or processing elements for use in a server-environment, coprocessors (e.g., security coprocessors) high-throughput MIC processors, GPGPU's, accelerators (such as, e.g., graphics accelerators, cryptographic accelerators, fixed function accelerators, machine learning accelerators, networking accelerators, or computer vision accelerators), field programmable gate arrays, or any other processor or processing device, graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 49:
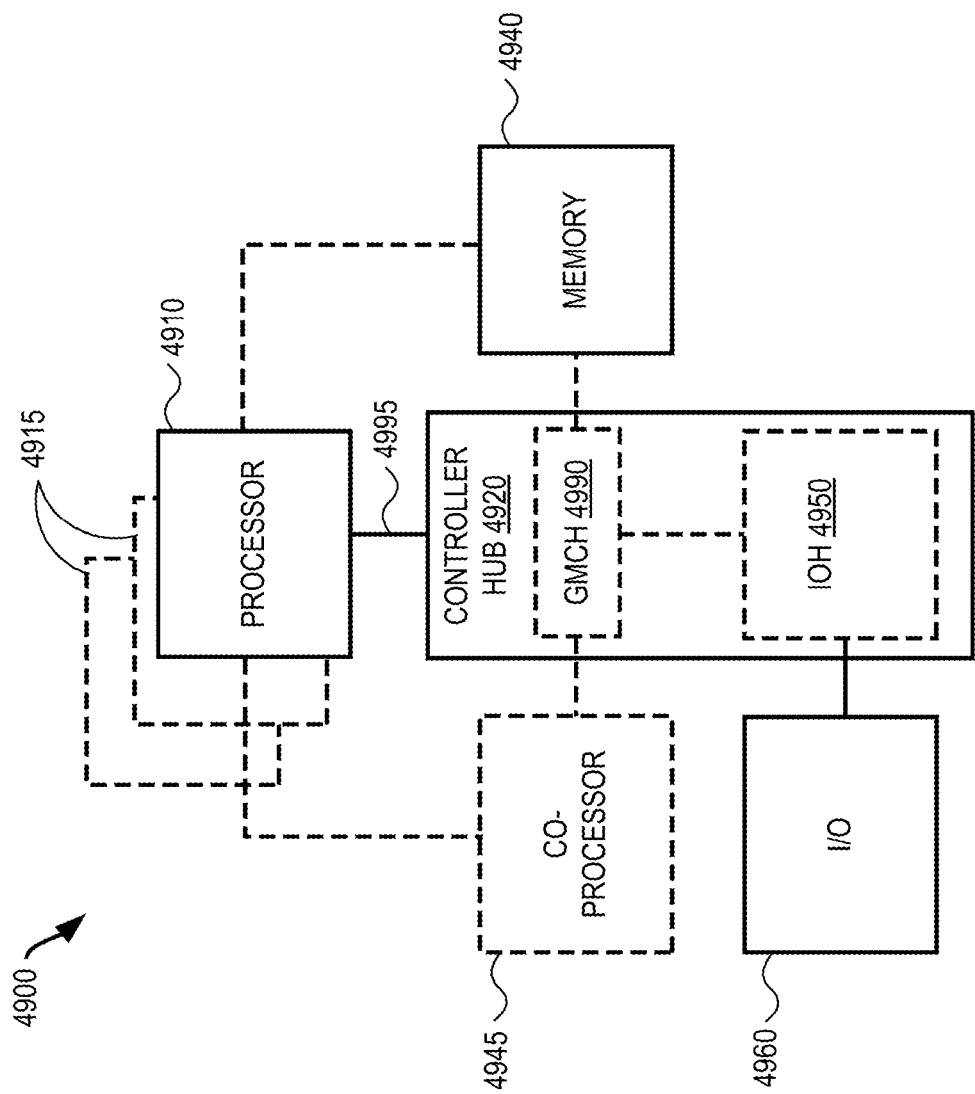
FIGS. 49-52 are block diagrams of exemplary computer architectures.

Referring now to FIG. 49, shown is a block diagram of a system 4900 in accordance with one embodiment of the present invention. The system 4900 may include one or more processors 4910, 4915, which are coupled to a controller hub 4920. In one embodiment, the controller hub 4920 includes a graphics memory controller hub (GMCH) 4990 and an Input/Output Hub (IOH) 4950 (which may be on separate chips); the GMCH 4990 includes memory and graphics controllers to which are coupled memory 4940 and a coprocessor 4945; the IOH 4950 couples input/output (I/O) devices 4960 to the GMCH 4990. Alternatively, one or both of the memory and graphics controllers are integrated within the processor (as described herein), the memory 4940 and the coprocessor 4945 are coupled directly to the processor 4910, and the controller hub 4920 in a single chip with the IOH 4950.

The optional nature of additional processors 4915 is denoted in FIG. 49 with broken lines. Each processor 4910, 4915 may include one or more of the processing cores described herein and may be some version of the processor 3600.

The memory 4940 may be, for example, dynamic random access memory (DRAM), phase change memory (PCM), or a combination of the two. For at least one embodiment, the controller hub 4920 communicates with the processor(s) 4910, 4915 via a multi-drop bus, such as a front-side bus (FSB), point-to-point interface such as QuickPath Interconnect (QPI), or similar connection 4995.

In one embodiment, the coprocessor 4945 is a special-purpose processor (including, e.g., general-purpose processors, server processors or processing elements for use in a server-environment, coprocessors such as security coprocessors, high-throughput MIC processors, GPGPU's, accelerators, such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device). In one embodiment, controller hub 4920 may include an integrated graphics accelerator.

There can be a variety of differences between the physical resources 4910, 4915 in terms of a spectrum of metrics of merit including architectural, microarchitectural, thermal, power consumption characteristics, and the like.

In one embodiment, the processor 4910 executes instructions that control data processing operations of a general type. Embedded within the instructions may be coprocessor instructions. The processor 4910 recognizes these coprocessor instructions as being of a type that should be executed by the attached coprocessor 4945. Accordingly, the processor 4910 issues these coprocessor instructions (or control signals representing coprocessor instructions) on a coprocessor bus or other interconnect, to coprocessor 4945. Coprocessor(s) 4945 accept and execute the received coprocessor instructions.

Figure 50:
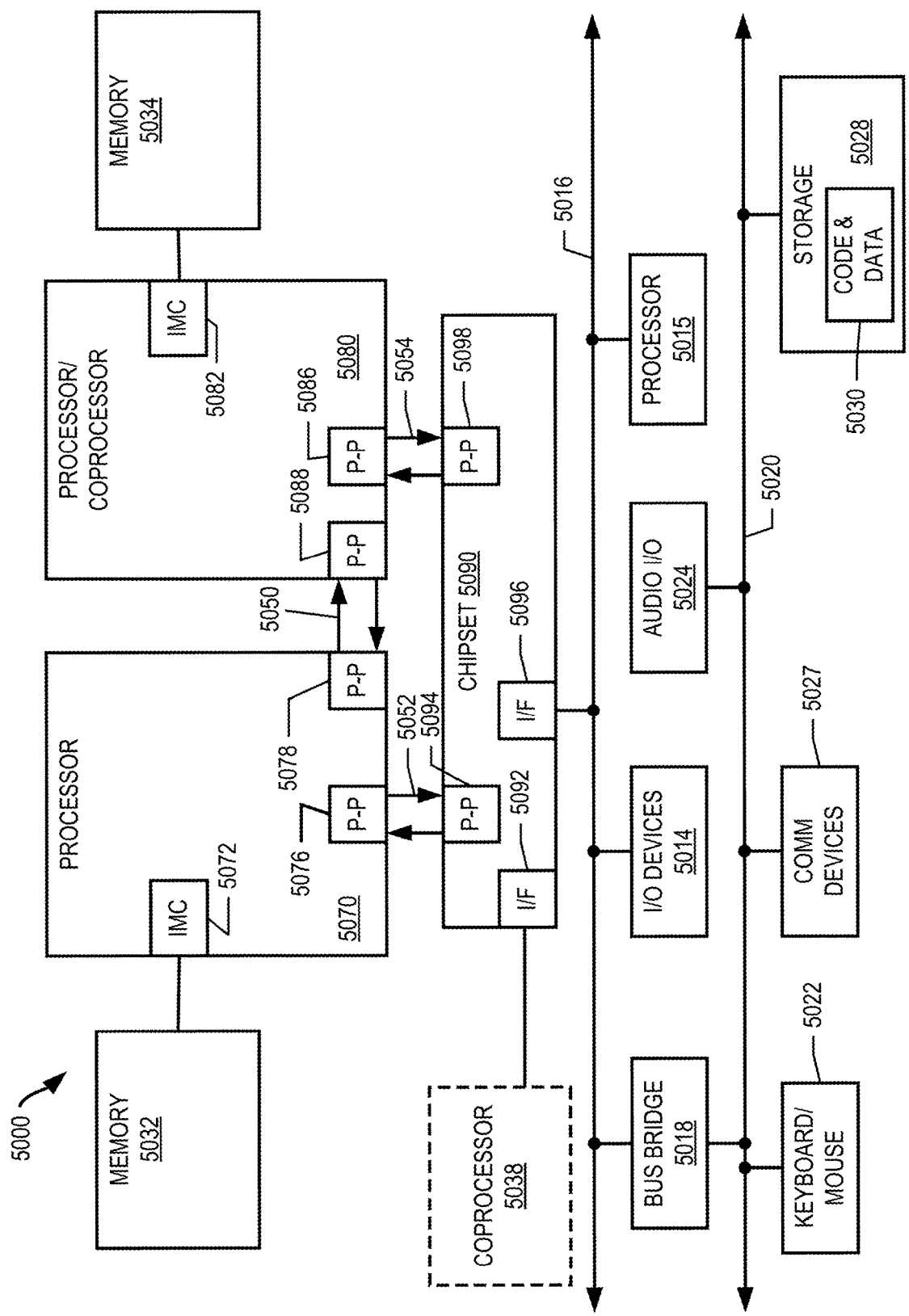

Referring now to FIG. 50, shown is a block diagram of a first more specific exemplary system 5000 in accordance with an embodiment of the present invention. As shown in FIG. 50, multiprocessor system 5000 is a point-to-point interconnect system, and includes a first processor 5070 and a second processor 5080 coupled via a point-to-point interconnect 5050. Each of processors 5070 and 5080 may be some version of the processor 3600. In one embodiment of the invention, processors 5070 and 5080 are respectively processors 4910 and 4915, while coprocessor 5038 is coprocessor 4945. In another embodiment, processors 5070 and 5080 are respectively processor 4910 coprocessor 4945.

Processors 5070 and 5080 are shown including integrated memory controller (IMC) units 5072 and 5082, respectively. Processor 5070 also includes as part of its bus controller unit's point-to-point (P-P) interfaces 5076 and 5078; similarly, second processor 5080 includes P-P interfaces 5086 and 5088. Processors 5070, 5080 may exchange information via a point-to-point (P-P) interface 5050 using P-P interface circuits 5078, 5088. As shown in FIG. 50, IMCs 5072 and 5082 couple the processors to respective memories, namely a memory 5032 and a memory 5034, which may be portions of main memory locally attached to the respective processors.

Processors 5070, 5080 may each exchange information with a chipset 5090 via individual P-P interfaces 5052, 5054 using point to point interface circuits 5076, 5094, 5086, 5098. Chipset 5090 may optionally exchange information with the coprocessor 5038 via a high-performance interface 5092. In one embodiment, the coprocessor 5038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 5090 may be coupled to a first bus 5016 via an interface 5096. In one embodiment, first bus 5016 may be a Peripheral Component Interconnect (PCI) bus, or a bus such as a PCI Express bus or another third generation I/O interconnect bus, although the scope of the present invention is not so limited.

As shown in FIG. 50, various I/O devices 5014 may be coupled to first bus 5016, along with a bus bridge 5018 which couples first bus 5016 to a second bus 5020. In one embodiment, one or more additional processor(s) 5015, such as general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, are coupled to first bus 5016. In one embodiment, second bus 5020 may be a low pin count (LPC) bus. Various devices may be coupled to a second bus 5020 including, for example, a keyboard and/or mouse 5022, communication devices 5027 and a storage unit 5028 such as a disk drive or other mass storage device which may include instructions/code and data 5030, in one embodiment. Further, an audio I/O 5024 may be coupled to the second bus 5020. Note that other architectures are possible. For example, instead of the point-to-point architecture of FIG. 50, a system may implement a multi-drop bus or other such architecture.

Figure 51:
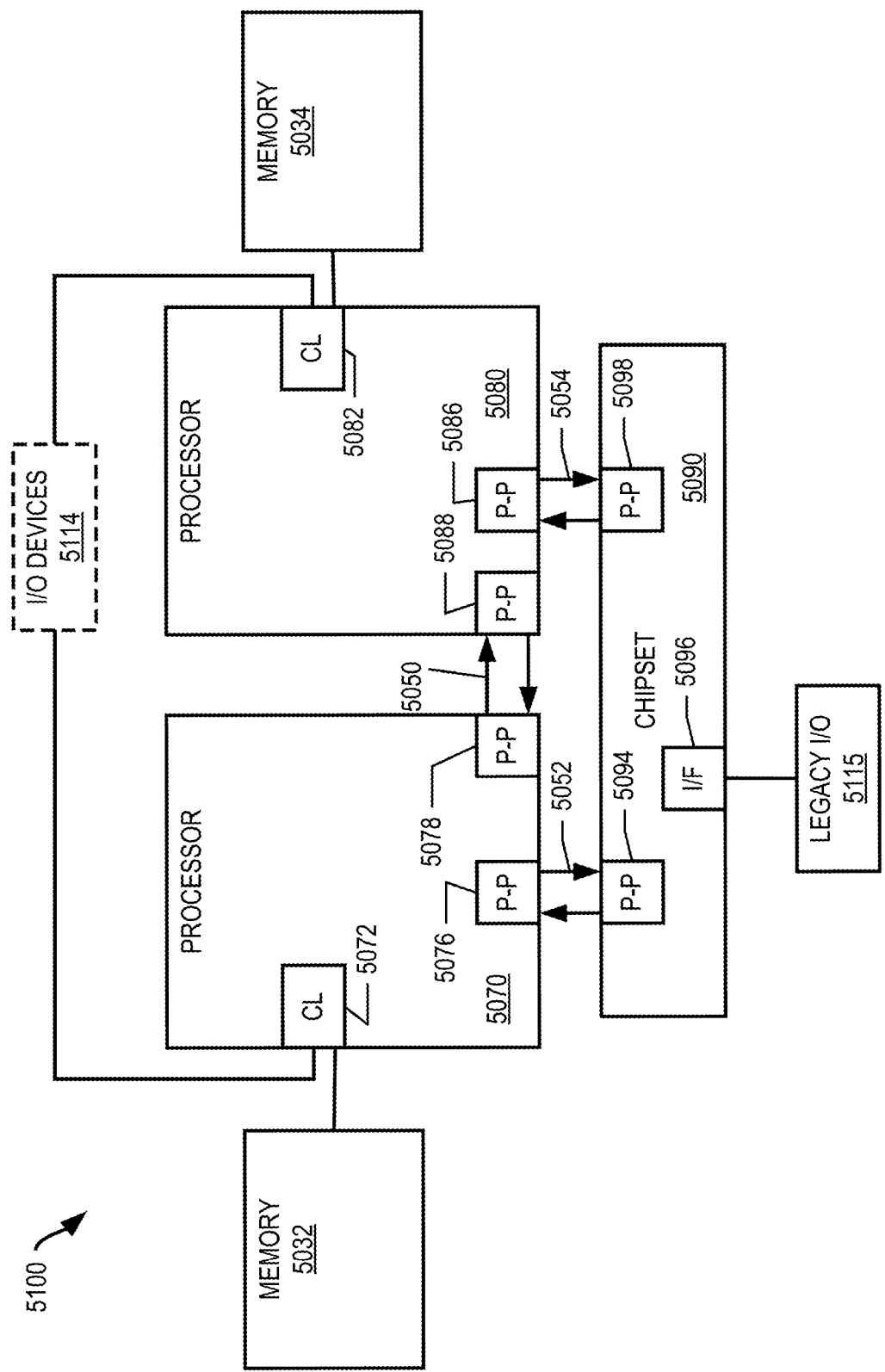

Referring now to FIG. 51, shown is a block diagram of a second more specific exemplary system 5100 in accordance with an embodiment of the present invention. Like elements in FIGS. 50 and 51 bear like reference numerals, and certain aspects of FIG. 50 have been omitted from FIG. 51 in order to avoid obscuring other aspects of FIG. 51.

FIG. 51 illustrates that the processors 5070, 5080 may include integrated memory and I/O control logic ("CL") 5072 and 5082, respectively. Thus, the CL 5072, 5082 include integrated memory controller units and include I/O control logic. FIG. 51 illustrates that not only are the memories 5032, 5034 coupled to the CL 5072, 5082, but also that I/O devices 5114 are also coupled to the control logic 5072, 5082. Legacy I/O devices 5115 are coupled to the chipset 5090.

Figure 52:
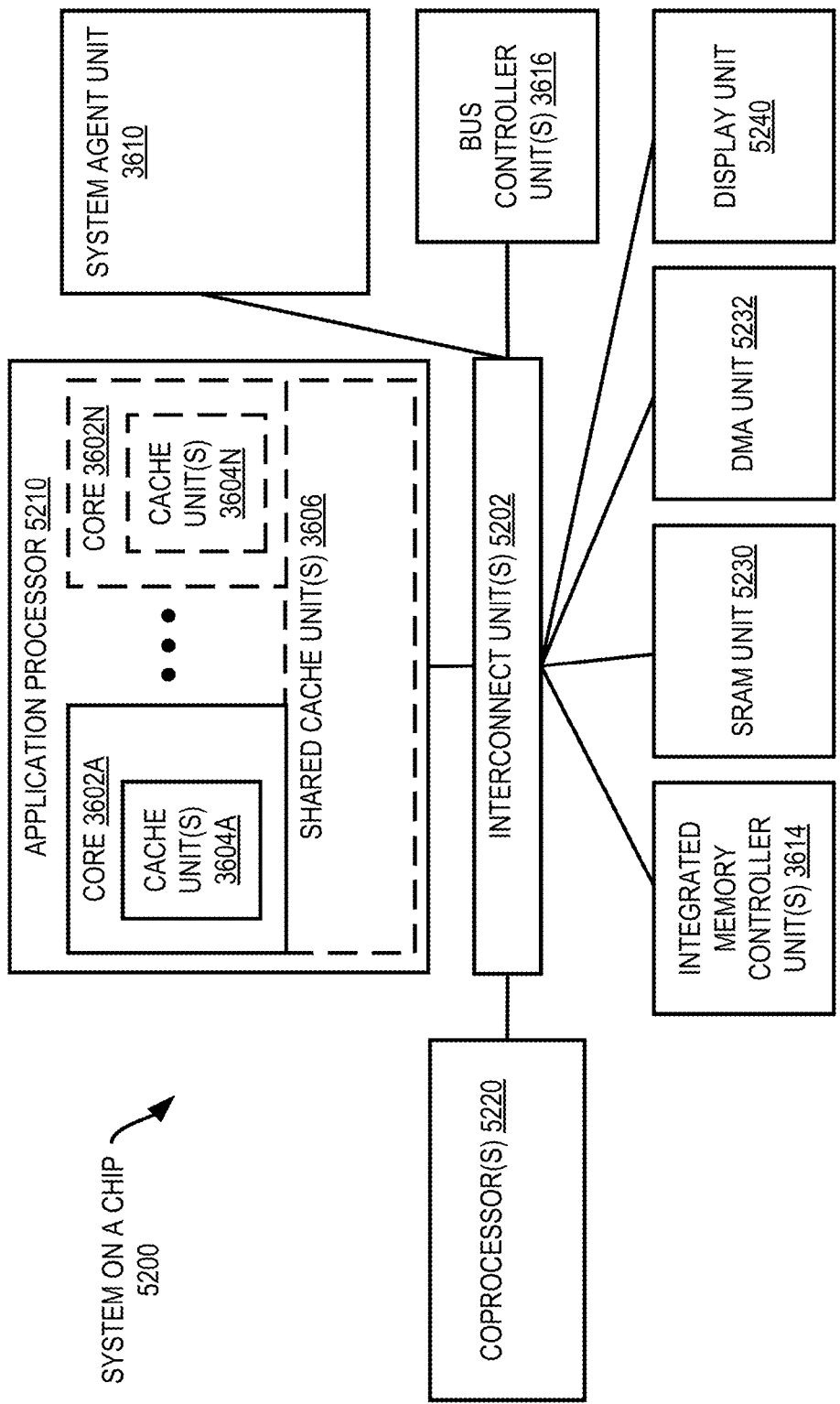

Referring now to FIG. 52, shown is a block diagram of a SoC 5200 in accordance with an embodiment of the present invention. Similar elements in FIG. 36 bear like reference numerals. Also, dashed lined boxes are optional features on more advanced SoCs. In FIG. 52, an interconnect unit(s) 5202 is coupled to: an application processor 5210 which includes a set of one or more cores 3602A-N, which include cache units 3604A-N, and shared cache unit(s) 3606; a system agent unit 3610; a bus controller unit(s) 3616; an integrated memory controller unit(s) 3614; a set or one or more coprocessors 5220 which may include integrated graphics logic, an image processor, an audio processor, and a video processor, general-purpose processors, server processors or processing elements for use in a server-environment, security coprocessors, high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device; an static random access memory (SRAM) unit 5230; a direct memory access (DMA) unit 5232; and a display unit 5240 for coupling to one or more external displays. In one embodiment, the coprocessor(s) 5220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, including, e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, a storage system (including volatile and non-volatile memory and/or storage elements), at least one input device, and at least one output device.

Program code, such as code 5030 illustrated in FIG. 50, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Instructions to be executed by a processor core according to embodiments of the invention may be embodied in a "generic vector friendly instruction format" which is detailed below. In other embodiments, such a format is not utilized and another instruction format is used, however, the description below of the write-mask registers, various data transformations (swizzle, broadcast, etc.), addressing, etc. is generally applicable to the description of the embodiments of the instruction(s) above. Additionally, exemplary systems, architectures, and pipelines are detailed below. Instructions may be executed on such systems, architectures, and pipelines, but are not limited to those detailed.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX, AVX2, and AVX-512) and using the Vector Extensions (VEX) coding scheme has been released and/or published (e.g., see Intel® 64 and IA-32 Architectures Software Developer's Manual, September 2014; Intel® Advanced Vector Extensions Programming Reference, October 2014; and Intel® Architecture Instruction Set Extensions Programming Reference, October 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 53A:
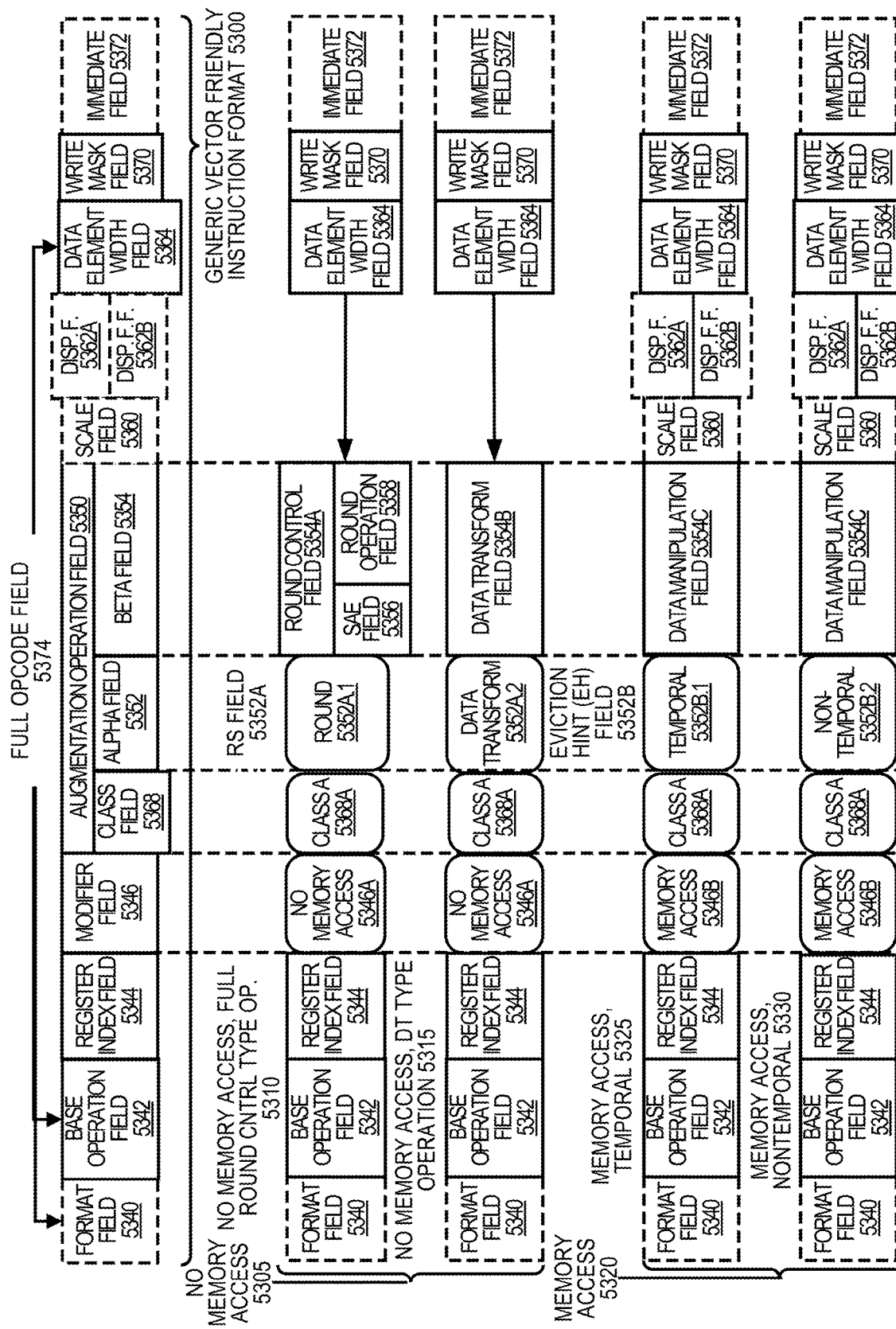
FIGS. 53A-53B are block diagrams illustrating a generic vector friendly instruction format and instruction templates thereof according to embodiments of the invention.
Figure 53B:
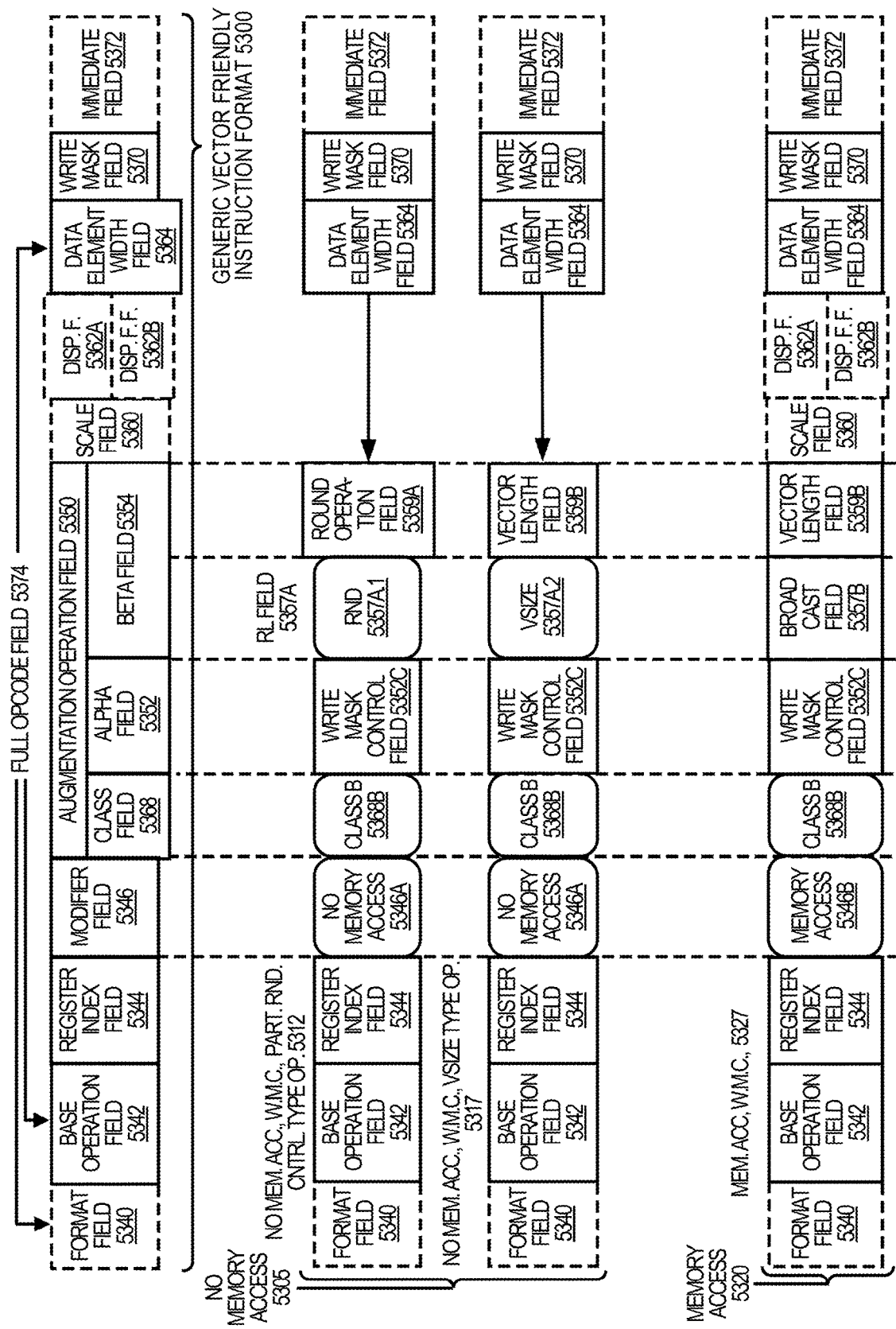

FIGS. 53A-53B are block diagrams illustrating a generic vector friendly instruction format and instruction templates thereof according to embodiments of the invention. FIG. 53A is a block diagram illustrating a generic vector friendly instruction format and class A instruction templates thereof according to embodiments of the invention; while FIG. 53B is a block diagram illustrating the generic vector friendly instruction format and class B instruction templates thereof according to embodiments of the invention. Specifically, a generic vector friendly instruction format 5300 for which are defined class A and class B instruction templates, both of which include no memory access 5305 instruction templates and memory access 5320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 53A include: 1) within the no memory access 5305 instruction templates there is shown a no memory access, full round control type operation 5310 instruction template and a no memory access, data transform type operation 5315 instruction template; and 2) within the memory access 5320 instruction templates there is shown a memory access, temporal 5325 instruction template and a memory access, non-temporal 5330 instruction template. The class B instruction templates in FIG. 53B include: 1) within the no memory access 5305 instruction templates there is shown a no memory access, write mask control, partial round control type operation 5312 instruction template and a no memory access, write mask control, vsize type operation 5317 instruction template; and 2) within the memory access 5320 instruction templates there is shown a memory access, write mask control 5327 instruction template.

The generic vector friendly instruction format 5300 includes the following fields listed below in the order illustrated in FIGS. 53A-53B.

Format field 5340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 5342—its content distinguishes different base operations.

Register index field 5344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 5346—its content distinguishes occurrences of instructions in the generic vector instruction format that specify memory access from those that do not; that is, between no memory access 5305 instruction templates and memory access 5320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 5350—its content distinguishes which one of a variety of different operations to be performed in addition to the base operation. This field is context specific. In one embodiment of the invention, this field is divided into a class field 5368, an alpha field 5352, and a beta field 5354. The augmentation operation field 5350 allows common groups of operations to be performed in a single instruction rather than 2, 3, or 4 instructions.

Scale field 5360—its content allows for the scaling of the index field's content for memory address generation (e.g., for address generation that uses 2scale*index+base).

Displacement Field 5362A—its content is used as part of memory address generation (e.g., for address generation that uses 2scale*index+base+displacement).

Displacement Factor Field 5362B (note that the juxtaposition of displacement field 5362A directly over displacement factor field 5362B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 5374 (described later herein) and the data manipulation field 5354C. The displacement field 5362A and the displacement factor field 5362B are optional in the sense that they are not used for the no memory access 5305 instruction templates and/or different embodiments may implement only one or none of the two.

Data element width field 5364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 5370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 5370 allows for partial vector operations, including loads, stores, arithmetic, logical, etc. While embodiments of the invention are described in which the write mask field's 5370 content selects one of a number of write mask registers that contains the write mask to be used (and thus the write mask field's 5370 content indirectly identifies that masking to be performed), alternative embodiments instead or additional allow the mask write field's 5370 content to directly specify the masking to be performed.

Immediate field 5372—its content allows for the specification of an immediate. This field is optional in the sense that is it not present in an implementation of the generic vector friendly format that does not support immediate and it is not present in instructions that do not use an immediate.

Class field 5368—its content distinguishes between different classes of instructions. With reference to FIGS. 53A-B, the contents of this field select between class A and class B instructions. In FIGS. 53A-B, rounded corner squares are used to indicate a specific value is present in a field (e.g., class A 5368A and class B 5368B for the class field 5368 respectively in FIGS. 53A-B).

Instruction Templates of Class A

In the case of the non-memory access 5305 instruction templates of class A, the alpha field 5352 is interpreted as an RS field 5352A, whose content distinguishes which one of the different augmentation operation types are to be performed (e.g., round 5352A.1 and data transform 5352A.2 are respectively specified for the no memory access, round type operation 5310 and the no memory access, data transform type operation 5315 instruction templates), while the beta field 5354 distinguishes which of the operations of the specified type is to be performed. In the no memory access 5305 instruction templates, the scale field 5360, the displacement field 5362A, and the displacement scale filed 5362B are not present.

No-Memory Access Instruction Templates—Full Round Control Type Operation

In the no memory access full round control type operation 5310 instruction template, the beta field 5354 is interpreted as a round control field 5354A, whose content(s) provide static rounding. While in the described embodiments of the invention the round control field 5354A includes a suppress all floating point exceptions (SAE) field 5356 and a round operation control field 5358, alternative embodiments may support may encode both these concepts into the same field or only have one or the other of these concepts/fields (e.g., may have only the round operation control field 5358).

SAE field 5356—its content distinguishes whether or not to disable the exception event reporting; when the SAE field's 5356 content indicates suppression is enabled, a given instruction does not report any kind of floating-point exception flag and does not raise any floating point exception handler.

Round operation control field 5358—its content distinguishes which one of a group of rounding operations to perform (e.g., Round-up, Round-down, Round-towards-zero and Round-to-nearest). Thus, the round operation control field 5358 allows for the changing of the rounding mode on a per instruction basis. In one embodiment of the invention where a processor includes a control register for specifying rounding modes, the round operation control field's 5350 content overrides that register value.

No Memory Access Instruction Templates—Data Transform Type Operation

In the no memory access data transform type operation 5315 instruction template, the beta field 5354 is interpreted as a data transform field 5354B, whose content distinguishes which one of a number of data transforms is to be performed (e.g., no data transform, swizzle, broadcast).

In the case of a memory access 5320 instruction template of class A, the alpha field 5352 is interpreted as an eviction hint field 5352B, whose content distinguishes which one of the eviction hints is to be used (in FIG. 53A, temporal 5352B.1 and non-temporal 5352B.2 are respectively specified for the memory access, temporal 5325 instruction template and the memory access, non-temporal 5330 instruction template), while the beta field 5354 is interpreted as a data manipulation field 5354C, whose content distinguishes which one of a number of data manipulation operations (also known as primitives) is to be performed (e.g., no manipulation; broadcast; up conversion of a source; and down conversion of a destination). The memory access 5320 instruction templates include the scale field 5360, and optionally the displacement field 5362A or the displacement scale field 5362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 5352 is interpreted as a write mask control (Z) field 5352C, whose content distinguishes whether the write masking controlled by the write mask field 5370 should be a merging or a zeroing.

In the case of the non-memory access 5305 instruction templates of class B, part of the beta field 5354 is interpreted as an RL field 5357A, whose content distinguishes which one of the different augmentation operation types are to be performed (e.g., round 5357A.1 and vector length (VSIZE) 5357A.2 are respectively specified for the no memory access, write mask control, partial round control type operation 5312 instruction template and the no memory access, write mask control, VSIZE type operation 5317 instruction template), while the rest of the beta field 5354 distinguishes which of the operations of the specified type is to be performed. In the no memory access 5305 instruction templates, the scale field 5360, the displacement field 5362A, and the displacement scale filed 5362B are not present.

In the no memory access, write mask control, partial round control type operation 5310 instruction template, the rest of the beta field 5354 is interpreted as a round operation field 5359A and exception event reporting is disabled (a given instruction does not report any kind of floating-point exception flag and does not raise any floating point exception handler).

Round operation control field 5359A—just as round operation control field 5358, its content distinguishes which one of a group of rounding operations to perform (e.g., Round-up, Round-down, Round-towards-zero and Round-to-nearest). Thus, the round operation control field 5359A allows for the changing of the rounding mode on a per instruction basis. In one embodiment of the invention where a processor includes a control register for specifying rounding modes, the round operation control field's 5350 content overrides that register value.

In the no memory access, write mask control, VSIZE type operation 5317 instruction template, the rest of the beta field 5354 is interpreted as a vector length field 5359B, whose content distinguishes which one of a number of data vector lengths is to be performed on (e.g., 128, 256, or 512 byte).

In the case of a memory access 5320 instruction template of class B, part of the beta field 5354 is interpreted as a broadcast field 5357B, whose content distinguishes whether or not the broadcast type data manipulation operation is to be performed, while the rest of the beta field 5354 is interpreted the vector length field 5359B. The memory access 5320 instruction templates include the scale field 5360, and optionally the displacement field 5362A or the displacement scale field 5362B.

With regard to the generic vector friendly instruction format 5300, a full opcode field 5374 is shown including the format field 5340, the base operation field 5342, and the data element width field 5364. While one embodiment is shown where the full opcode field 5374 includes all of these fields, the full opcode field 5374 includes less than all of these fields in embodiments that do not support all of them. The full opcode field 5374 provides the operation code (opcode).

The augmentation operation field 5350, the data element width field 5364, and the write mask field 5370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 54A is a block diagram illustrating an exemplary specific vector friendly instruction format according to embodiments of the invention. FIG. 54A shows a specific vector friendly instruction format 5400 that is specific in the sense that it specifies the location, size, interpretation, and order of the fields, as well as values for some of those fields. The specific vector friendly instruction format 5400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 53 into which the fields from FIG. 54A map are illustrated.

It should be understood that, although embodiments of the invention are described with reference to the specific vector friendly instruction format 5400 in the context of the generic vector friendly instruction format 5300 for illustrative purposes, the invention is not limited to the specific vector friendly instruction format 5400 except where claimed. For example, the generic vector friendly instruction format 5300 contemplates a variety of possible sizes for the various fields, while the specific vector friendly instruction format 5400 is shown as having fields of specific sizes. By way of specific example, while the data element width field 5364 is illustrated as a one bit field in the specific vector friendly instruction format 5400, the invention is not so limited (that is, the generic vector friendly instruction format 5300 contemplates other sizes of the data element width field 5364).

The generic vector friendly instruction format 5300 includes the following fields listed below in the order illustrated in FIG. 54A.

EVEX Prefix (Bytes 0-3) 5402—is encoded in a four-byte form.

Format Field 5340 (EVEX Byte 0, bits [7:0])—the first byte (EVEX Byte 0) is the format field 5340 and it contains 0x62 (the unique value used for distinguishing the vector friendly instruction format in one embodiment of the invention).

The second-fourth bytes (EVEX Bytes 1-3) include a number of bit fields providing specific capability.

REX field 5405 (EVEX Byte 1, bits [7-5])—consists of a EVEX.R bit field (EVEX Byte 1, bit [7]-R), EVEX.X bit field (EVEX byte 1, bit [6]-X), and 5357BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 5310—this is the first part of the REX' field 5310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 5415 (EVEX byte 1, bits [3:0]-mmmm)—its content encodes an implied leading opcode byte (0F, 0F 38, or 0F 3).

Data element width field 5364 (EVEX byte 2, bit [7]-W)—is represented by the notation EVEX.W. EVEX.W is used to define the granularity (size) of the datatype (either 32-bit data elements or 64-bit data elements).

EVEX.vvvv 5420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 5420 encodes the 4 low-order bits of the first source register specifier stored in inverted (1s complement) form. Depending on the instruction, an extra different EVEX bit field is used to extend the specifier size to 32 registers.

EVEX.U 5368 Class field (EVEX byte 2, bit [2]-U)—If EVEX.0=0, it indicates class A or EVEX.U0; if EVEX.0=1, it indicates class B or EVEX.U1.

Prefix encoding field 5425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field;

and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 5352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 5354 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 5310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 5370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 5430 (Byte 4) is also known as the opcode byte. Part of the opcode is specified in this field.

MOD R/M Field 5440 (Byte 5) includes MOD field 5442, Reg field 5444, and R/M field 5446. As previously described, the MOD field's 5442 content distinguishes between memory access and non-memory access operations. The role of Reg field 5444 can be summarized to two situations: encoding either the destination register operand or a source register operand, or be treated as an opcode extension and not used to encode any instruction operand. The role of R/M field 5446 may include the following: encoding the instruction operand that references a memory address, or encoding either the destination register operand or a source register operand.

Scale, Index, Base (SIB) Byte (Byte 6)—As previously described, the scale field's 5350 content is used for memory address generation. SIB.xxx 5454 and SIB.bbb 5456—the contents of these fields have been previously referred to with regard to the register indexes Xxxx and Bbbb.

Displacement field 5362A (Bytes 7-10)—when MOD field 5442 contains 10, bytes 7-10 are the displacement field 5362A, and it works the same as the legacy 32-bit displacement (disp32) and works at byte granularity.

Displacement factor field 5362B (Byte 7)—when MOD field 5442 contains 01, byte 7 is the displacement factor field 5362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 5362B is a reinterpretation of disp8; when using displacement factor field 5362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 5362B substitutes the legacy x86 instruction set 8-bit displacement. Thus, the displacement factor field 5362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 5372 operates as previously described.

Full Opcode Field

FIG. 54B is a block diagram illustrating the fields of the specific vector friendly instruction format 5400 that make up the full opcode field 5374 according to one embodiment of the invention. Specifically, the full opcode field 5374 includes the format field 5340, the base operation field 5342, and the data element width (W) field 5364. The base operation field 5342 includes the prefix encoding field 5425, the opcode map field 5415, and the real opcode field 5430.

Register Index Field

FIG. 54C is a block diagram illustrating the fields of the specific vector friendly instruction format 5400 that make up the register index field 5344 according to one embodiment of the invention. Specifically, the register index field 5344 includes the REX field 5405, the REX' field 5410, the MODR/M.reg field 5444, the MODR/M.r/m field 5446, the VVVV field 5420, xxx field 5454, and the bbb field 5456.

Augmentation Operation Field

Figure 54D:
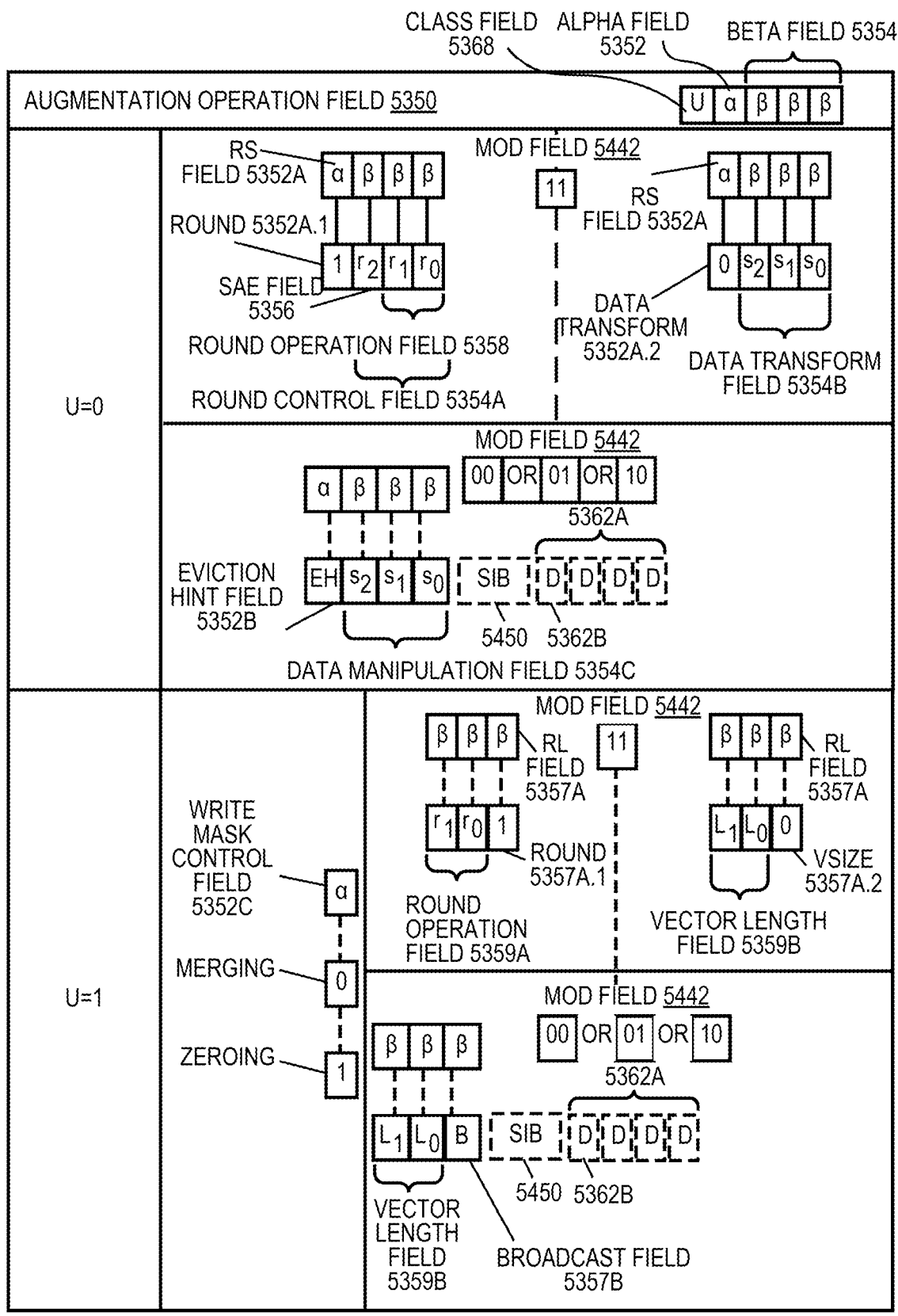
FIG. 54D is a block diagram illustrating the fields of a specific vector friendly instruction format that make up the augmentation operation field according to one embodiment of the invention.

FIG. 54D is a block diagram illustrating the fields of the specific vector friendly instruction format 5400 that make up the augmentation operation field 5350 according to one embodiment of the invention. When the class (U) field 5368 contains 0, it signifies EVEX.U0 (class A 5368A); when it contains 1, it signifies EVEX.U1 (class B 5368B). When U=0 and the MOD field 5442 contains 11 (signifying a no memory access operation), the alpha field 5352 (EVEX byte 3, bit [7]-EH) is interpreted as the rs field 5352A. When the rs field 5352A contains a 1 (round 5352A.1), the beta field 5354 (EVEX byte 3, bits [6:4]-SSS) is interpreted as the round control field 5354A. The round control field 5354A includes a one bit SAE field 5356 and a two bit round operation field 5358. When the rs field 5352A contains a 0 (data transform 5352A.2), the beta field 5354 (EVEX byte 3, bits [6:4]-SSS) is interpreted as a three bit data transform field 5354B. When U=0 and the MOD field 5442 contains 00, 01, or 10 (signifying a memory access operation), the alpha field 5352 (EVEX byte 3, bit [7]-EH) is interpreted as the eviction hint (EH) field 5352B and the beta field 5354 (EVEX byte 3, bits [6:4]-SSS) is interpreted as a three bit data manipulation field 5354C.

When U=1, the alpha field 5352 (EVEX byte 3, bit [7]-EH) is interpreted as the write mask control (Z) field 5352C. When U=1 and the MOD field 5442 contains 11 (signifying a no memory access operation), part of the beta field 5354 (EVEX byte 3, bit [4]-S0) is interpreted as the RL field 5357A; when it contains a 1 (round 5357A.1) the rest of the beta field 5354 (EVEX byte 3, bit [6-5]-S2-1) is interpreted as the round operation field 5359A, while when the RL field 5357A contains a 0 (VSIZE 5357.A2) the rest of the beta field 5354 (EVEX byte 3, bit [6-5]-S2-1) is interpreted as the vector length field 5359B (EVEX byte 3, bit [6-5]-L1-0). When U=1 and the MOD field 5442 contains 00, 01, or 10 (signifying a memory access operation), the beta field 5354 (EVEX byte 3, bits [6:4]-SSS) is interpreted as the vector length field 5359B (EVEX byte 3, bit [6-5]-L1-0) and the broadcast field 5357B (EVEX byte 3, bit [4]-B).

Exemplary Register Architecture

Figure 55:
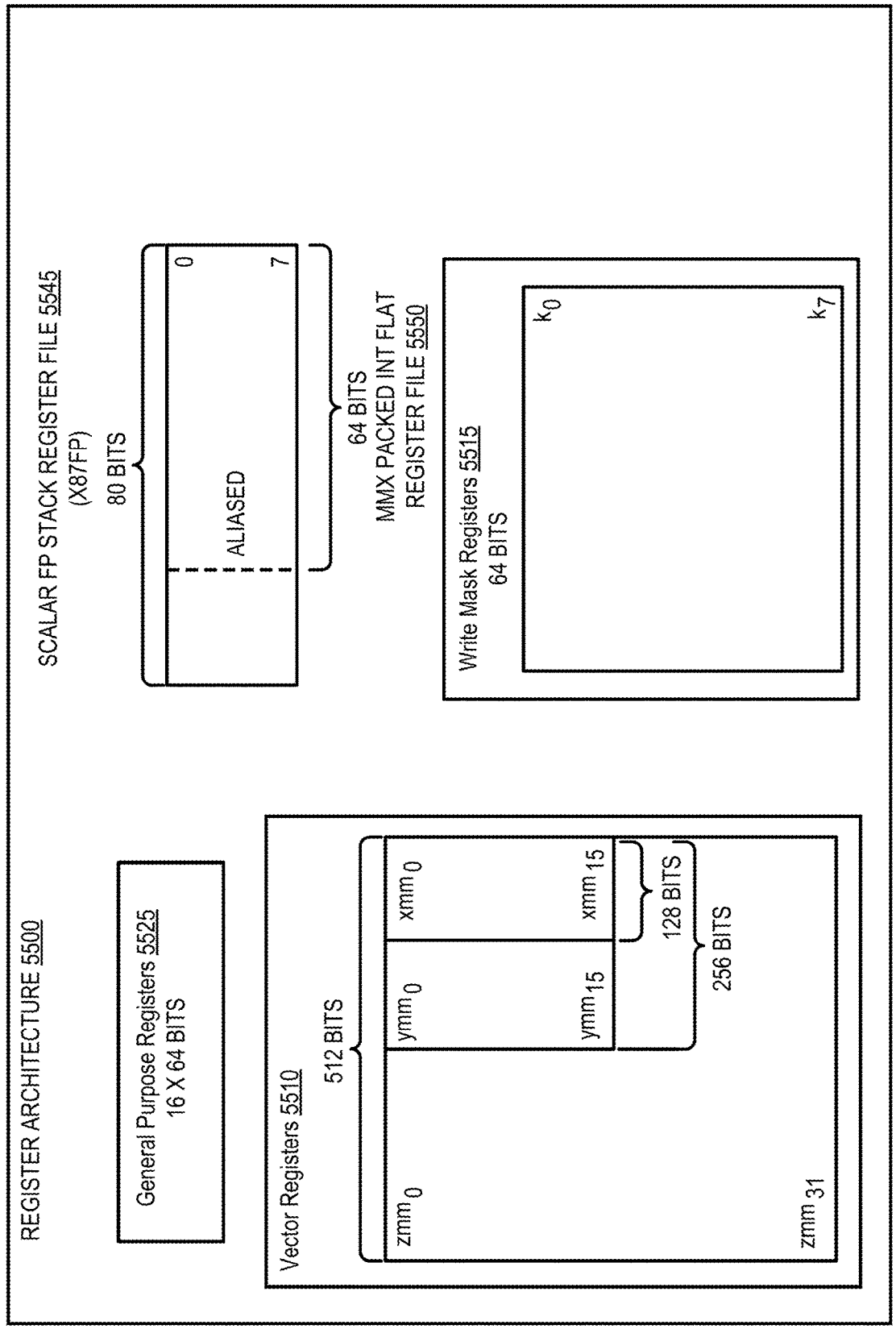
FIG. 55 is a block diagram of a register architecture according to one embodiment of the invention.

FIG. 55 is a block diagram of a register architecture 5500 according to one embodiment of the invention. In the embodiment illustrated, there are 32 vector registers 5510 that are 512 bits wide; these registers are referenced as zmm0 through zmm31 (the zmm register set). Other embodiments may include, instead of the zmm register set, a set of sixteen vector registers that are 256 bits wide; these registers are referenced as ymm0 through ymm15 (the ymm register set). Other embodiments may include, instead of the zmm register set or ymm register set, a set of sixteen vector registers that are 128 bits wide; these registers are references as xmm0 through xmm15 (the xmm register set). In FIG. 55, the lower order 256 bits of the lower 16 zmm registers are overlaid on registers ymm0-15, and the lower order 128 bits of the lower 16 zmm registers (the lower order 128 bits of the ymm registers) are overlaid on registers xmm0-15.

The specific vector friendly instruction format 5400 operates on these overlaid register file as illustrated in the below table.

| Adjustable Vector Length | Class | Operations | Registers |
|---|---|---|---|
| Instruction Templates that do not include the vector length field 5359B | A (FIG. 53A; U = 0) | 5310, 5315, 5325, 5330 | zmm registers (the vector length is 64 byte) |
| | B (FIG. 53B; U = 1) | 5312 | zmm registers (the vector length is 64 byte) |
| Instruction templates that do include the vector length field 5359B | B (FIG. 53B; U = 1) | 5317, 5327 | zmm, ymm, or xmm registers (the vector length is 64 byte, 32 byte, or 16 byte) depending on the vector length field 5359B |

In other words, the vector length field 5359B selects between a maximum length and one or more other shorter lengths, where each such shorter length is half the length of the preceding length; and instructions templates without the vector length field 5359B operate on the maximum vector length. Further, in one embodiment, the class B instruction templates of the specific vector friendly instruction format 5400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 5515—in the embodiment illustrated, there are 8 write mask registers (k0 through k7), each 64 bits in size. In an alternate embodiment, the write mask registers 5515 are 16 bits in size. In one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 5525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 5545, on which is aliased the MMX packed integer flat register file 5550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 56:
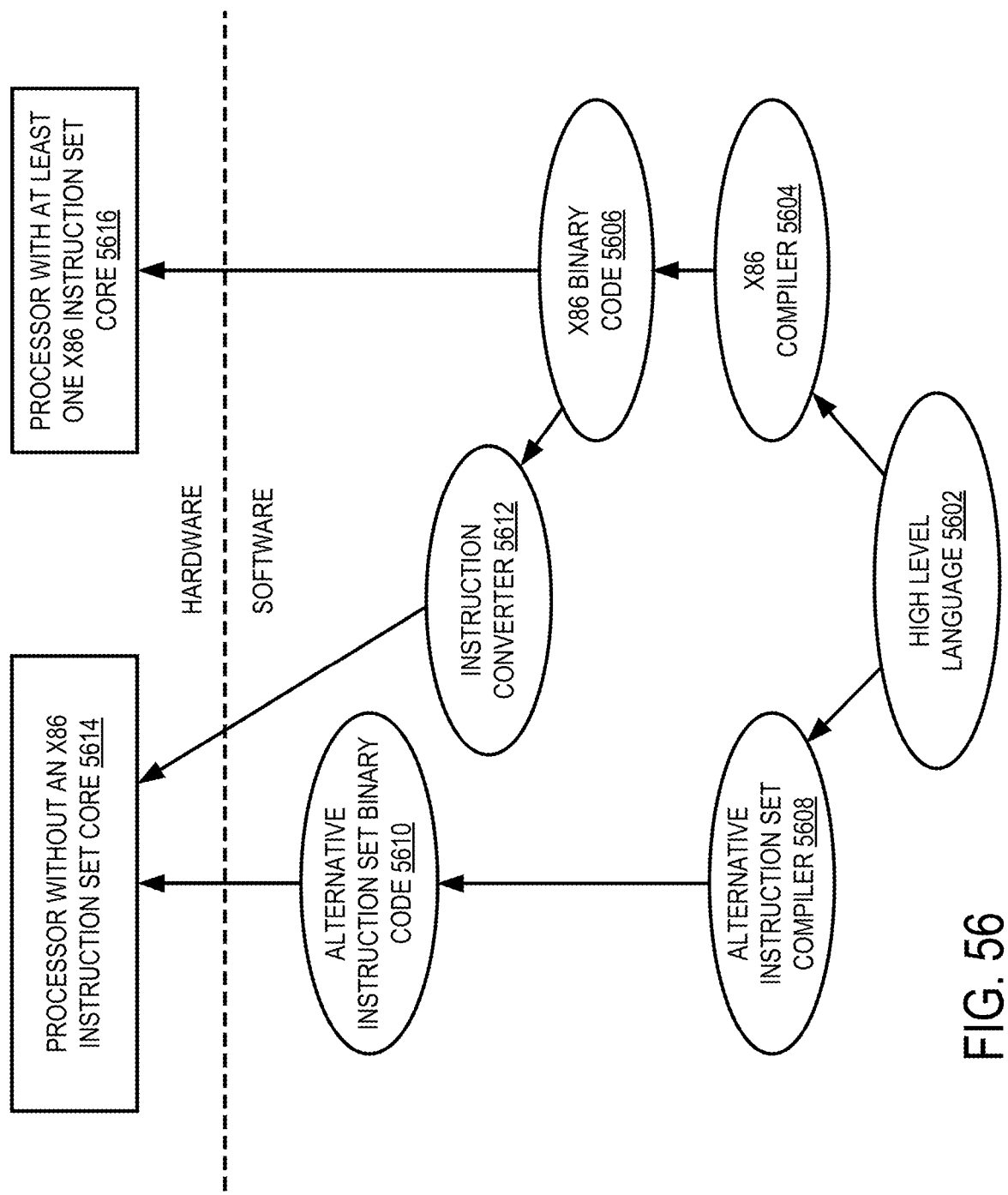
FIG. 56 is a block diagram contrasting the use of a software instruction converter to convert binary instructions in a source instruction set to binary instructions in a target instruction set according to embodiments of the invention.

FIG. 56 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 56 shows a program in a high level language 5602 may be compiled using an x86 compiler 5604 to generate x86 binary code 5606 that may be natively executed by a processor with at least one x86 instruction set core 5616. The processor with at least one x86 instruction set core 5616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 5604 represents a compiler that is operable to generate x86 binary code 5606 (e.g., object code) that can, with or without additional linkage processing, be executed on the processor with at least one x86 instruction set core 5616. Similarly, FIG. 56 shows the program in the high level language 5602 may be compiled using an alternative instruction set compiler 5608 to generate alternative instruction set binary code 5610 that may be natively executed by a processor without at least one x86 instruction set core 5614 (e.g., a processor with cores that execute the MIPS instruction set of MIPS Technologies of Sunnyvale, CA and/or that execute the ARM instruction set of ARM Holdings of Sunnyvale, CA). The instruction converter 5612 is used to convert the x86 binary code 5606 into code that may be natively executed by the processor without an x86 instruction set core 5614. This converted code is not likely to be the same as the alternative instruction set binary code 5610 because an instruction converter capable of this is difficult to make; however, the converted code will accomplish the general operation and be made up of instructions from the alternative instruction set. Thus, the instruction converter 5612 represents software, firmware, hardware, or a combination thereof that, through emulation, simulation or any other process, allows a processor or other electronic device that does not have an x86 instruction set processor or core to execute the x86 binary code 5606.

Figure 57:
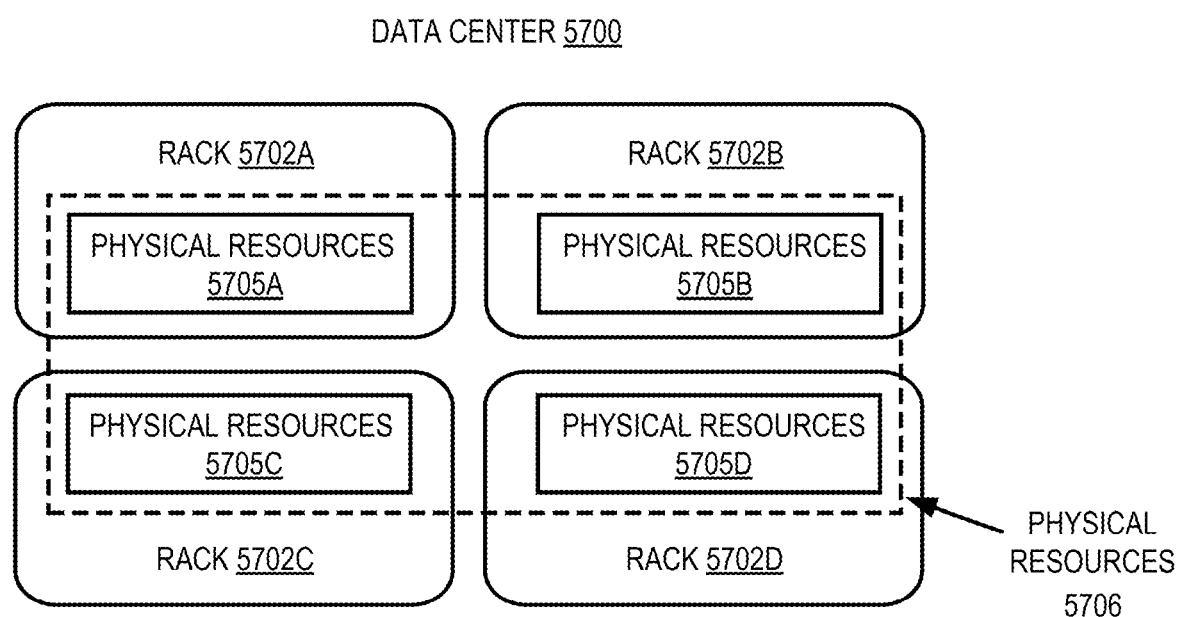
FIGS. 57-66 are illustrations of embodiments of the invention in systems.

FIG. 57 illustrates a conceptual overview of a data center 5700 that may generally be representative of a data center or other type of computing network in/for which one or more techniques described herein may be implemented according to various embodiments. As shown in FIG. 57, data center 5700 may generally contain a plurality of racks, each of which may house computing equipment comprising a respective set of physical resources. In the particular non-limiting example depicted in FIG. 57, data center 5700 contains four racks 5702A to 5702D, which house computing equipment comprising respective sets of physical resources (PCRs) 5705A to 5705D. According to this example, a collective set of physical resources 5706 of data center 5700 includes the various sets of physical resources 5705A to 5705D that are distributed among racks 5702A to 5702D. Physical resources 5706 may include resources of multiple types, such as—for example—processors, co-processors, accelerators, field-programmable gate arrays (FPGAs), memory, and storage. The embodiments are not limited to these examples.

The illustrative data center 5700 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 5702A, 5702B, 5702C, 5702D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 5700 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 5700 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 5700 additionally receives usage information for the various resources, predicts resource usage for different types of workloads based on past resource usage, and dynamically reallocates the resources based on this information.

Figure 58:
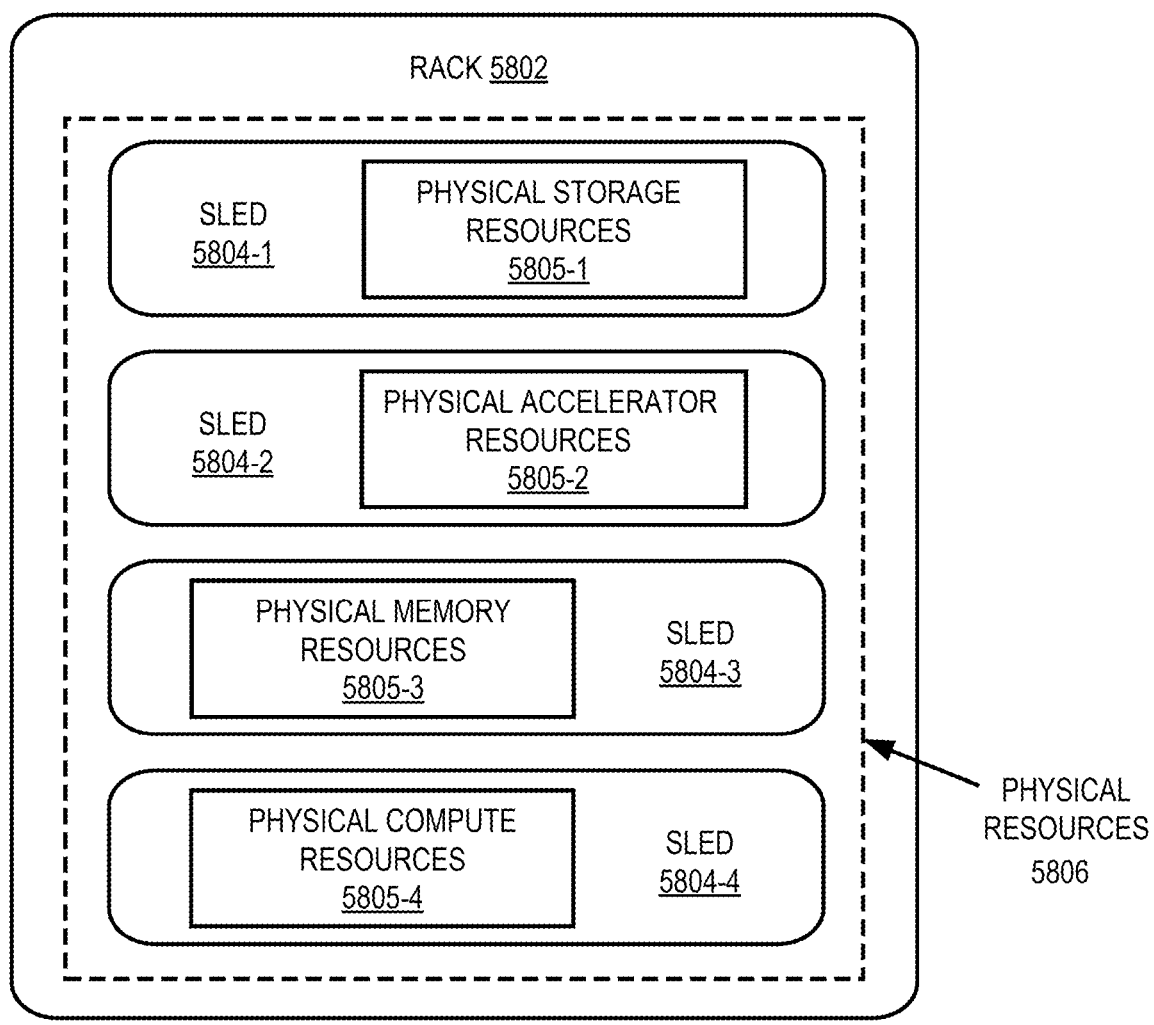

The racks 5702A, 5702B, 5702C, 5702D of the data center 5700 may include physical design features that facilitate the automation of a variety of types of maintenance tasks. For example, data center 5700 may be implemented using racks that are designed to be robotically-accessed, and to accept and house robotically-manipulable resource sleds. Furthermore, in the illustrative embodiment, the racks 5702A, 5702B, 5702C, 5702D include integrated power sources that receive a greater voltage than is typical for power sources. The increased voltage enables the power sources to provide additional power to the components on each sled, enabling the components to operate at higher than typical frequencies. FIG. 58 illustrates an exemplary logical configuration of a rack 202 of the data center 5700. As shown in FIG. 58, rack 5802 may generally house a plurality of sleds, each of which may comprise a respective set of physical resources. In the particular non-limiting example depicted in FIG. 58, rack 5802 houses sleds 5804-1 to 5804-4 comprising respective sets of physical resources 5805-1 to 5805-4, each of which constitutes a portion of the collective set of physical resources 5806 comprised in rack 5802. With respect to FIG. 1, if rack 5802 is representative of—for example—rack 102A, then physical resources 5806 may correspond to the physical resources 105A comprised in rack 102A. In the context of this example, physical resources 105A may thus be made up of the respective sets of physical resources, including physical storage resources 5805-1, physical accelerator resources 5805-2, physical memory resources 5804-3, and physical compute resources 5805-5 comprised in the sleds 5804-1 to 5804-4 of rack 5802. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 59:
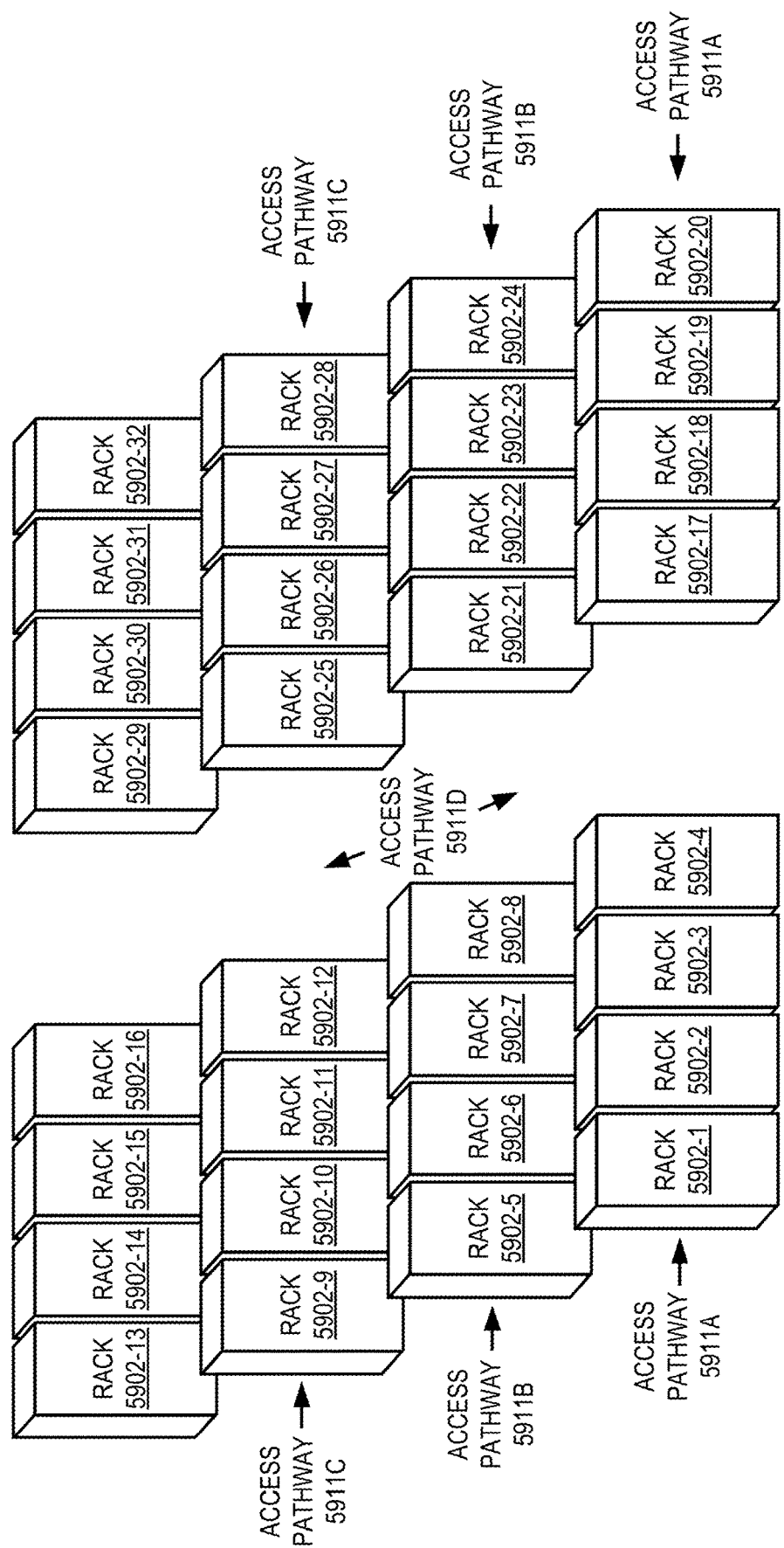

FIG. 59 illustrates an example of a data center 5900 that may generally be representative of one in/for which one or more techniques described herein may be implemented according to various embodiments. In the particular non-limiting example depicted in FIG. 59, data center 5900 comprises racks 5902-1 to 5902-32. In various embodiments, the racks of data center 5900 may be arranged in such fashion as to define and/or accommodate various access pathways. For example, as shown in FIG. 59, the racks of data center 5900 may be arranged in such fashion as to define and/or accommodate access pathways 5911A, 5911B, 5911C, and 5911D. In some embodiments, the presence of such access pathways may generally enable automated maintenance equipment, such as robotic maintenance equipment, to physically access the computing equipment housed in the various racks of data center 5900 and perform automated maintenance tasks (e.g., replace a failed sled, upgrade a sled). In various embodiments, the dimensions of access pathways 5911A, 5911B, 5911C, and 5911D, the dimensions of racks 5902-1 to 5902-32, and/or one or more other aspects of the physical layout of data center 5900 may be selected to facilitate such automated operations. The embodiments are not limited in this context.

Figure 60:
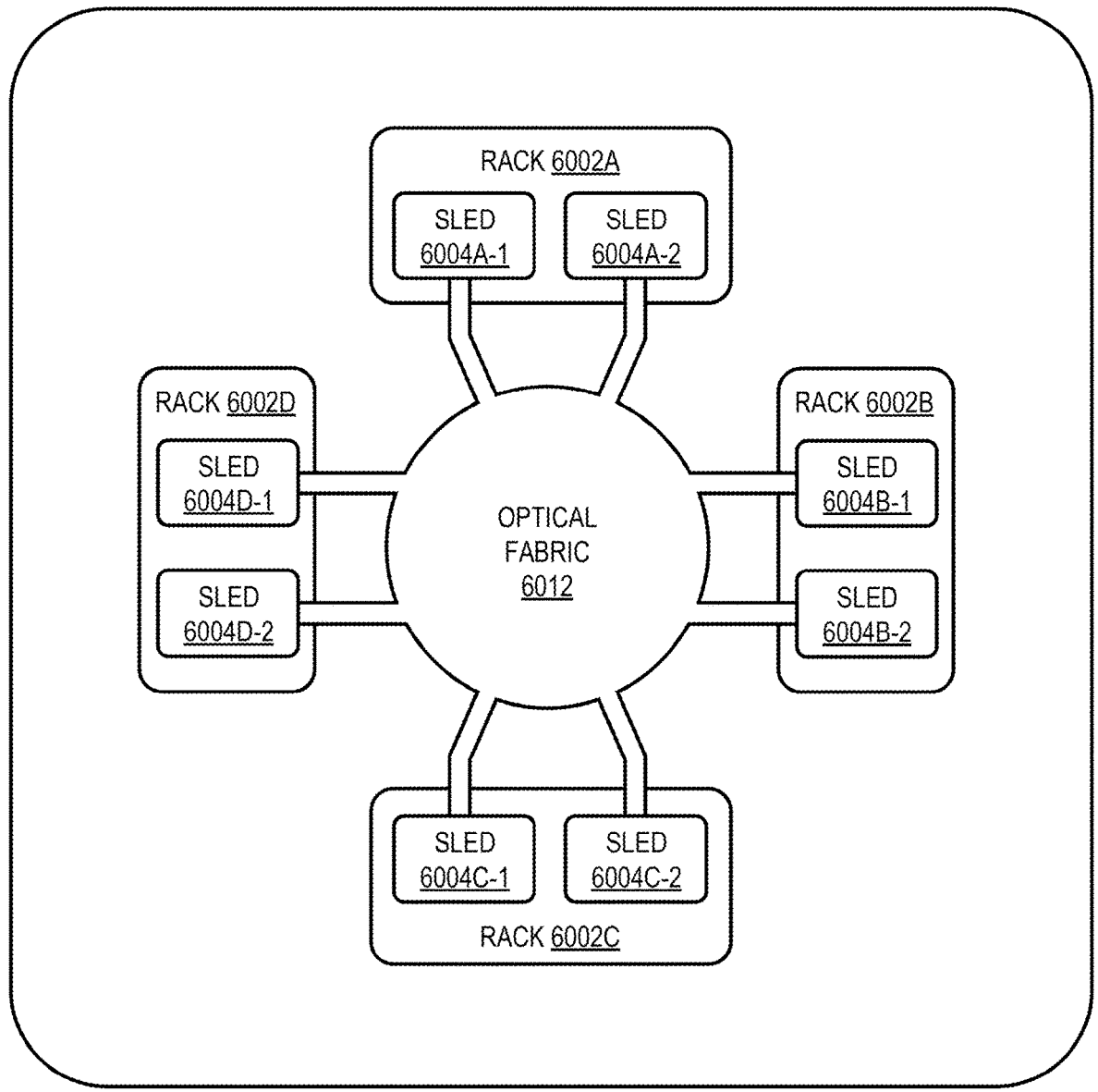

FIG. 60 illustrates an example of a data center 6000 that may generally be representative of one in/for which one or more techniques described herein may be implemented according to various embodiments. As shown in FIG. 60, data center 6000 may feature an optical fabric 6012. Optical fabric 6012 may generally comprise a combination of optical signaling media (such as optical cabling) and optical switching infrastructure via which any particular sled in data center 6000 can send signals to (and receive signals from) each of the other sleds in data center 6000. The signaling connectivity that optical fabric 6012 provides to any given sled may include connectivity both to other sleds in a same rack and sleds in other racks. In the particular non-limiting example depicted in FIG. 60, data center 6000 includes four racks 6002A to 6002D. Racks 6002A to 6002D house respective pairs of sleds 6004A-1 and 6004A-2, 6004B-1 and 6004B-2, 6004C-1 and 6004C-2, and 6004D-1 and 6004D-2. Thus, in this example, data center 6000 comprises a total of eight sleds. Via optical fabric 6012, each such sled may possess signaling connectivity with each of the seven other sleds in data center 6000. For example, via optical fabric 6012, sled 6004A-1 in rack 6002A may possess signaling connectivity with sled 6004A-2 in rack 6002A, as well as the six other sleds 6004B-1, 6004B-2, 6004C-1, 6004C-2, 6004D-1, and 6004D-2 that are distributed among the other racks 6002B, 6002C, and 6002D of data center 6000. The embodiments are not limited to this example.

FIG. 5 illustrates an overview of a connectivity scheme 500 that may generally be representative of link-layer connectivity that may be established in some embodiments among the various sleds of a data center, such as any of example data centers 5700, 5900, and 6000 of FIGS. 57, 59, and 60. Connectivity scheme 6100 may be implemented using an optical fabric that features a dual-mode optical switching infrastructure 6114. Dual-mode optical switching infrastructure 6114 may generally comprise a switching infrastructure that is capable of receiving communications according to multiple link-layer protocols via a same unified set of optical signaling media, and properly switching such communications. In various embodiments, dual-mode optical switching infrastructure 6114 may be implemented using one or more dual-mode optical switches 6115. In various embodiments, dual-mode optical switches 6115 may generally comprise high-radix switches. In some embodiments, dual-mode optical switches 6115 may comprise multi-ply switches, such as four-ply switches. In various embodiments, dual-mode optical switches 6115 may feature integrated silicon photonics that enable them to switch communications with significantly reduced latency in comparison to conventional switching devices. In some embodiments, dual-mode optical switches 6115 may constitute leaf switches 6130 in a leaf-spine architecture additionally including one or more dual-mode optical spine switches 6120.

Figure 61A:
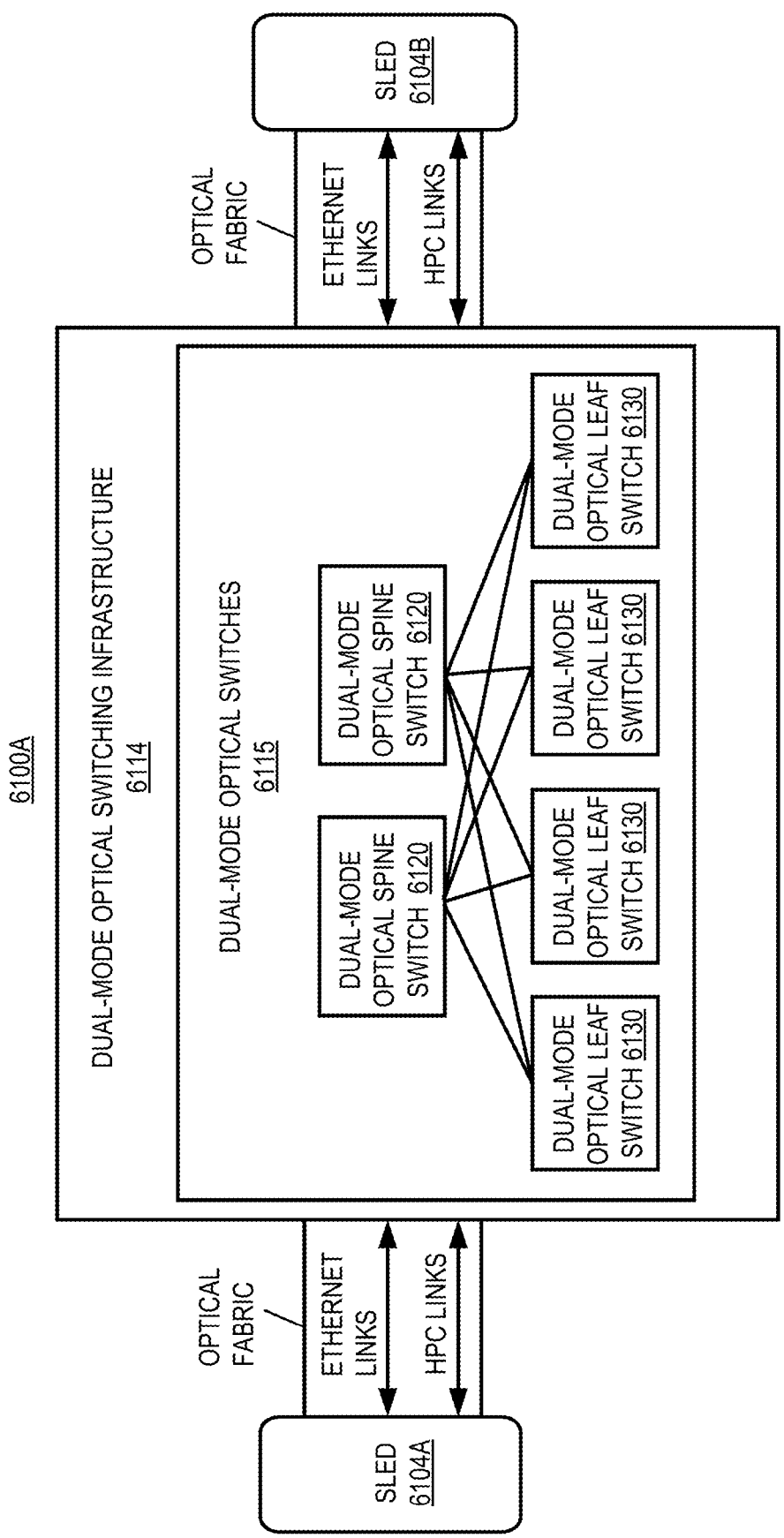

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 61A, with respect to any particular pair of sleds 6104A and 6104B possessing optical signaling connectivity to the optical fabric, connectivity scheme 6100 may thus provide support for link-layer connectivity via both Ethernet links and HPC links. Thus, both Ethernet and HPC communications can be supported by a single high-bandwidth, low-latency switch fabric. The embodiments are not limited to this example.

Figure 61B:
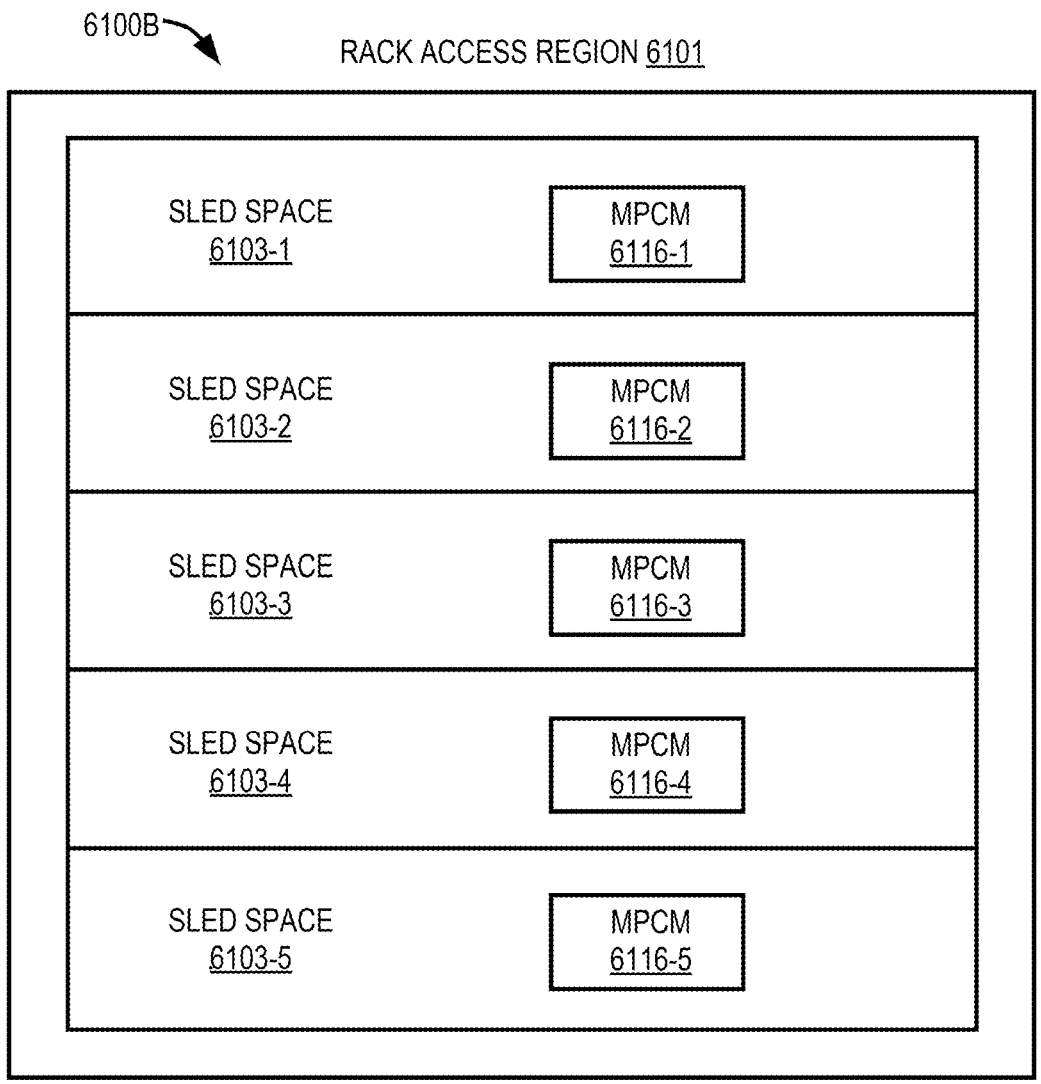
Figure 61C:
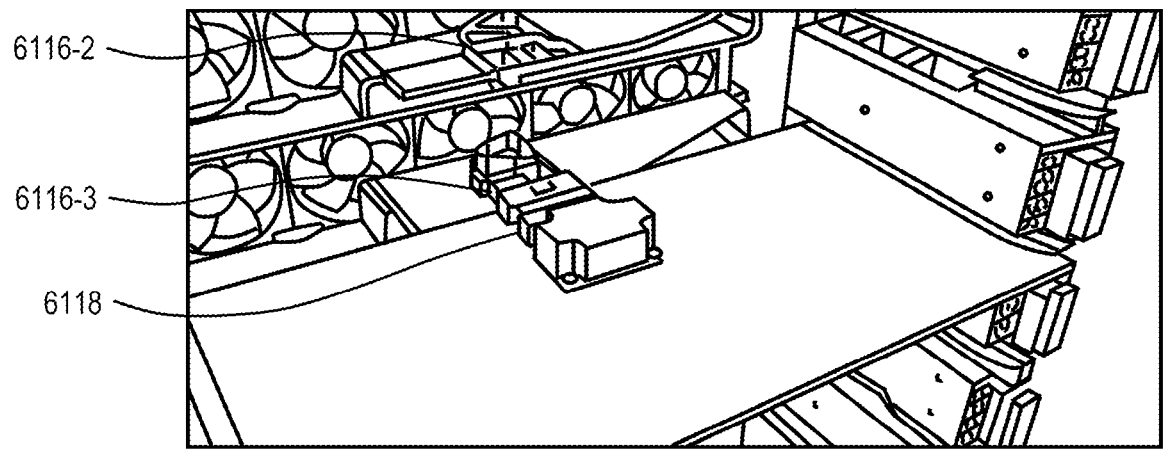

FIG. 61B illustrates a general overview of a rack architecture 600 that may be representative of an architecture of any particular one of the racks depicted in FIGS. 57 to 60 according to some embodiments. As reflected in FIG. 61B, rack architecture 600 may generally feature a plurality of sled spaces into which sleds may be inserted, each of which may be robotically-accessible via a rack access region 601. In the particular non-limiting example depicted in FIG. 61B, rack architecture 6100 features five sled spaces 6103-1 to 6103-5. Sled spaces 6103-1 to 6103-5 feature respective multi-purpose connector modules (MPCMs) 6116-1 to 6116-5. FIG. 61C is a detailed diagram of a portion of the rack architecture 6100 of FIG. 61B. As shown in FIG. 61C, when a sled is inserted into any given one of sled spaces 6103-1 to 6103-5, the corresponding MPCM (e.g., MPCM 6116-3) may couple with a counterpart MPCM 6120 of the inserted sled. This coupling may provide the inserted sled with connectivity to both signaling infrastructure and power infrastructure of the rack in which it is housed.

Figure 62:
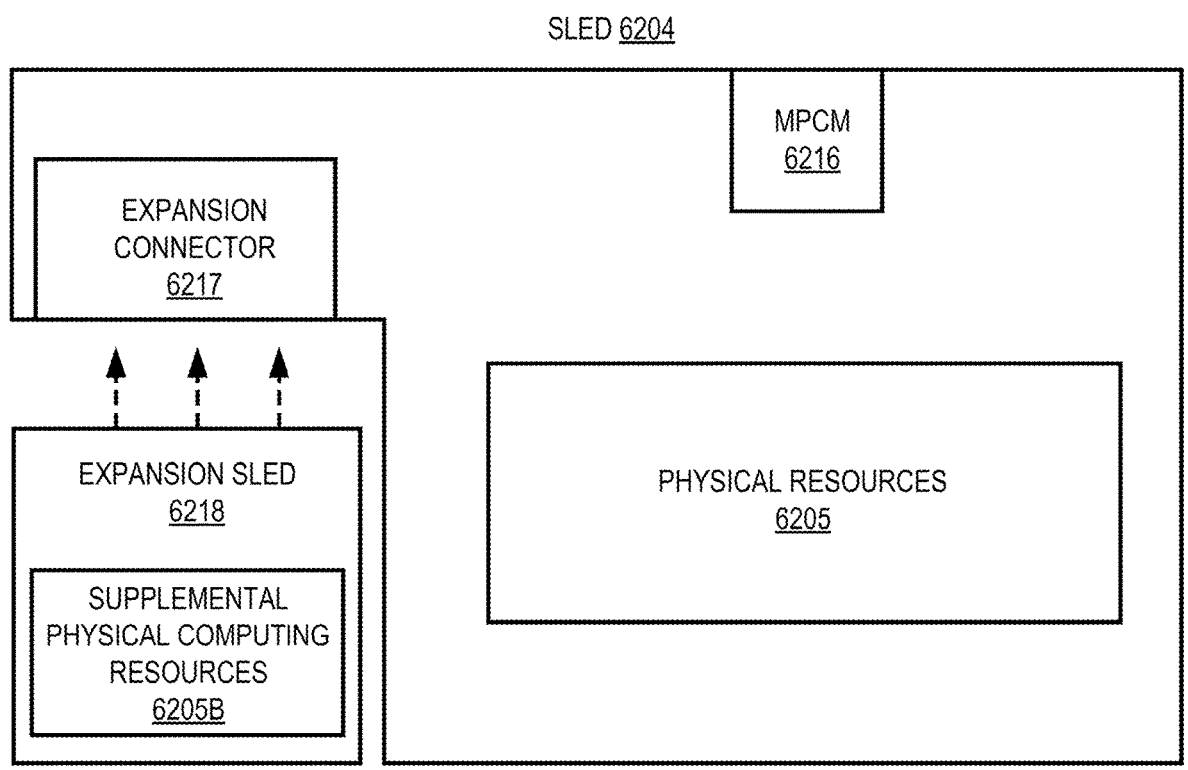

Included among the types of sleds to be accommodated by rack architecture 6100 may be one or more types of sleds that feature expansion capabilities. FIG. 62 illustrates an example of a sled 6204 that may be representative of a sled of such a type. As shown in FIG. 62, sled 6204 may comprise a set of physical resources 6205, as well as an MPCM 6216 designed to couple with a counterpart MPCM when sled 6204 is inserted into a sled space such as any of sled spaces 603-1 to 603-5 of FIG. 61A. Sled 6204 may also feature an expansion connector 6217. Expansion connector 6217 may generally comprise a socket, slot, or other type of connection element that is capable of accepting one or more types of expansion modules, such as an expansion sled 6218. By coupling with a counterpart connector on expansion sled 6218, expansion connector 6217 may provide physical resources 6205 with access to supplemental computing resources 6205B residing on expansion sled 6218. The embodiments are not limited in this context.

Figure 63:
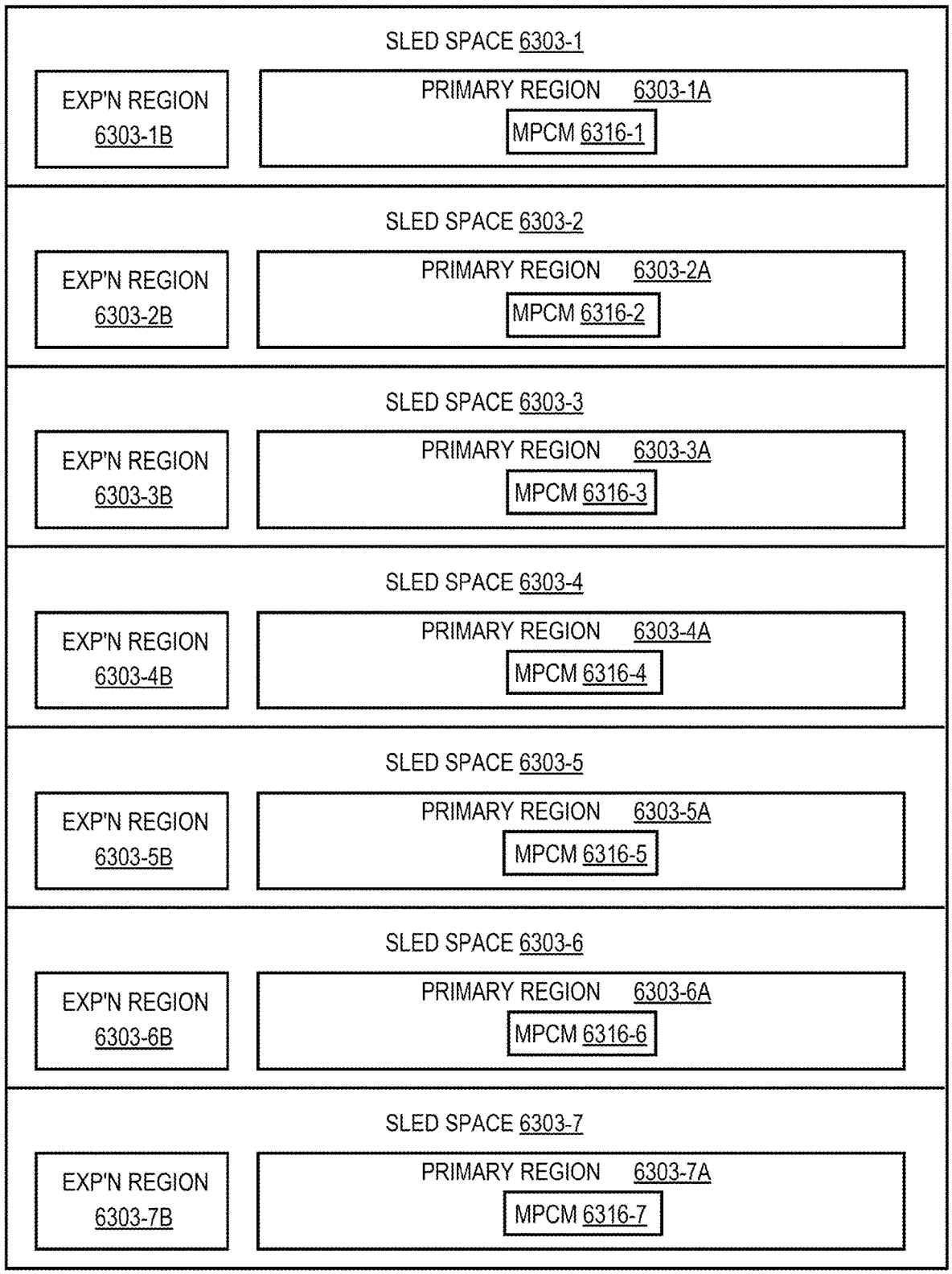

FIG. 63 illustrates an example of a rack architecture 800 that may be representative of a rack architecture that may be implemented in order to provide support for sleds featuring expansion capabilities, such as sled 6204 of FIG. 62. In the particular non-limiting example depicted in FIG. 63, rack architecture 6300 includes seven sled spaces 6303-1 to 6303-7, which feature respective MPCMs 6316-1 to 6316-7. Sled spaces 6303-1 to 6303-7 include respective primary regions 6303-1A to 6303-7A and respective expansion regions 6303-1B to 6303-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 6218 of FIG. 62, in the event that the inserted sled is configured with such a module.

Figure 64:
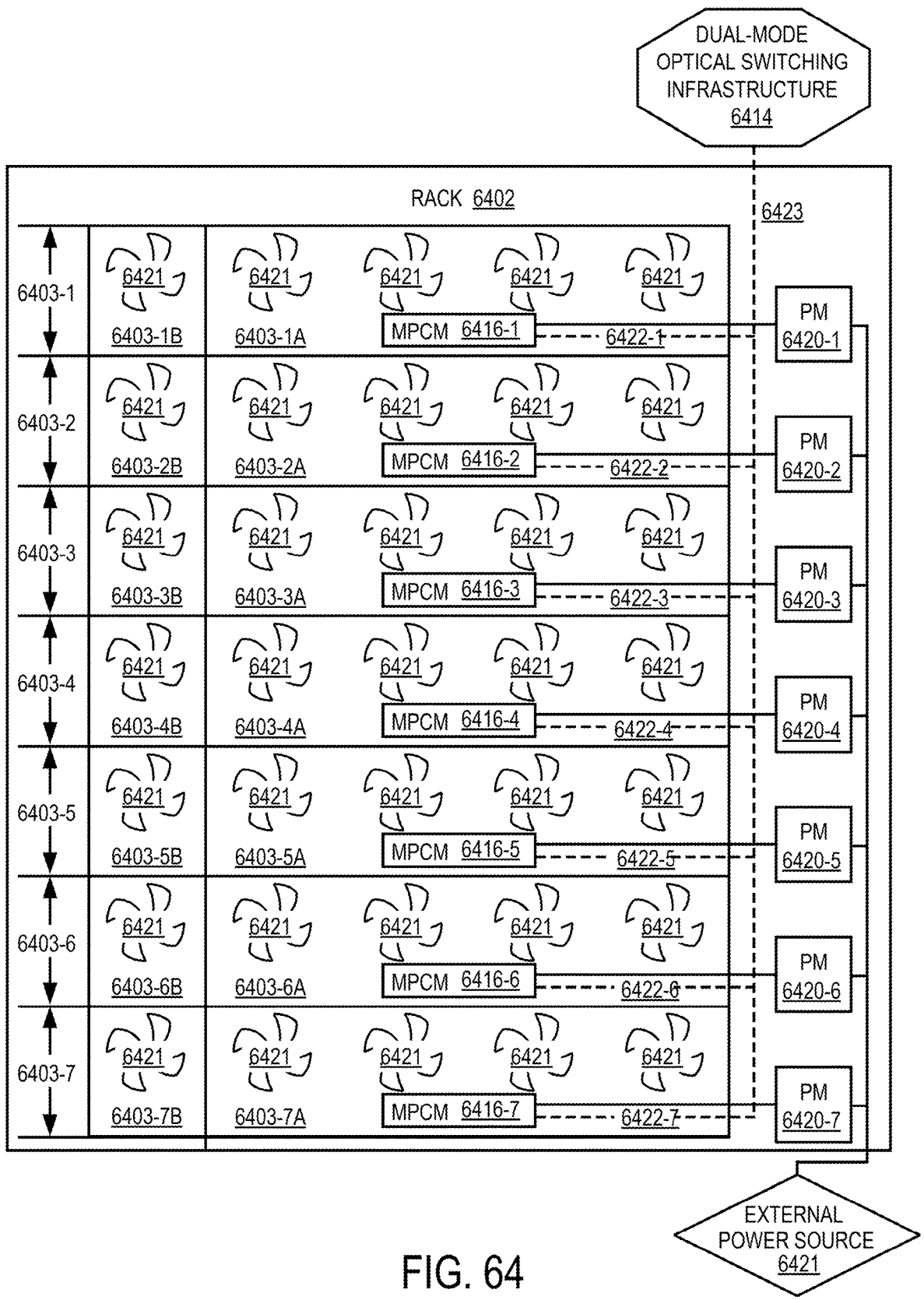

FIG. 64 illustrates an example of a rack 902 that may be representative of a rack implemented according to rack architecture 800 of FIG. 8 according to some embodiments. In the particular non-limiting example depicted in FIG. 64, rack 6402 features seven sled spaces 6403-1 to 6403-7, which include respective primary regions 6403-1A to 6403-7A and respective expansion regions 6403-1B to 6403-7B. In various embodiments, temperature control in rack 6402 may be implemented using an air cooling system. For example, as reflected in FIG. 64, rack 6402 may feature a plurality of fans 6419 that are generally arranged to provide air cooling within the various sled spaces 6403-1 to 6403-7. In some embodiments, the height of the sled space is greater than the conventional "1U" server height. In such embodiments, fans 6419 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 6416-1 to 6416-7 may be configured to provide inserted sleds with access to power sourced by respective power modules 6420-1 to 6420-7, each of which may draw power from an external power source 6421. In various embodiments, external power source 6421 may deliver alternating current (AC) power to rack 6402, and power modules 6420-1 to 6420-7 may be configured to convert such AC power to direct current (DC) power to be sourced to inserted sleds. In some embodiments, for example, power modules 6420-1 to 6420-7 may be configured to convert 277-volt AC power into 12-volt DC power for provision to inserted sleds via respective MPCMs 6416-1 to 6416-7. The embodiments are not limited to this example.

MPCMs 6416-1 to 6416-7 may also be arranged to provide inserted sleds with optical signaling connectivity to a dual-mode optical switching infrastructure 6414, which may be the same as—or similar to—dual-mode optical switching infrastructure 514 of FIG. 5. In various embodiments, optical connectors contained in MPCMs 6416-1 to 6416-7 may be designed to couple with counterpart optical connectors contained in MPCMs of inserted sleds to provide such sleds with optical signaling connectivity to dual-mode optical switching infrastructure 6414 via respective lengths of optical cabling 6422-1 to 6422-7. In some embodiments, each such length of optical cabling may extend from its corresponding MPCM to an optical interconnect loom 6423 that is external to the sled spaces of rack 6402. In various embodiments, optical interconnect loom 6423 may be arranged to pass through a support post or other type of load-bearing element of rack 6402. The embodiments are not limited in this context. Because inserted sleds connect to an optical switching infrastructure via MPCMs, the resources typically spent in manually configuring the rack cabling to accommodate a newly inserted sled can be saved.

Figure 65:
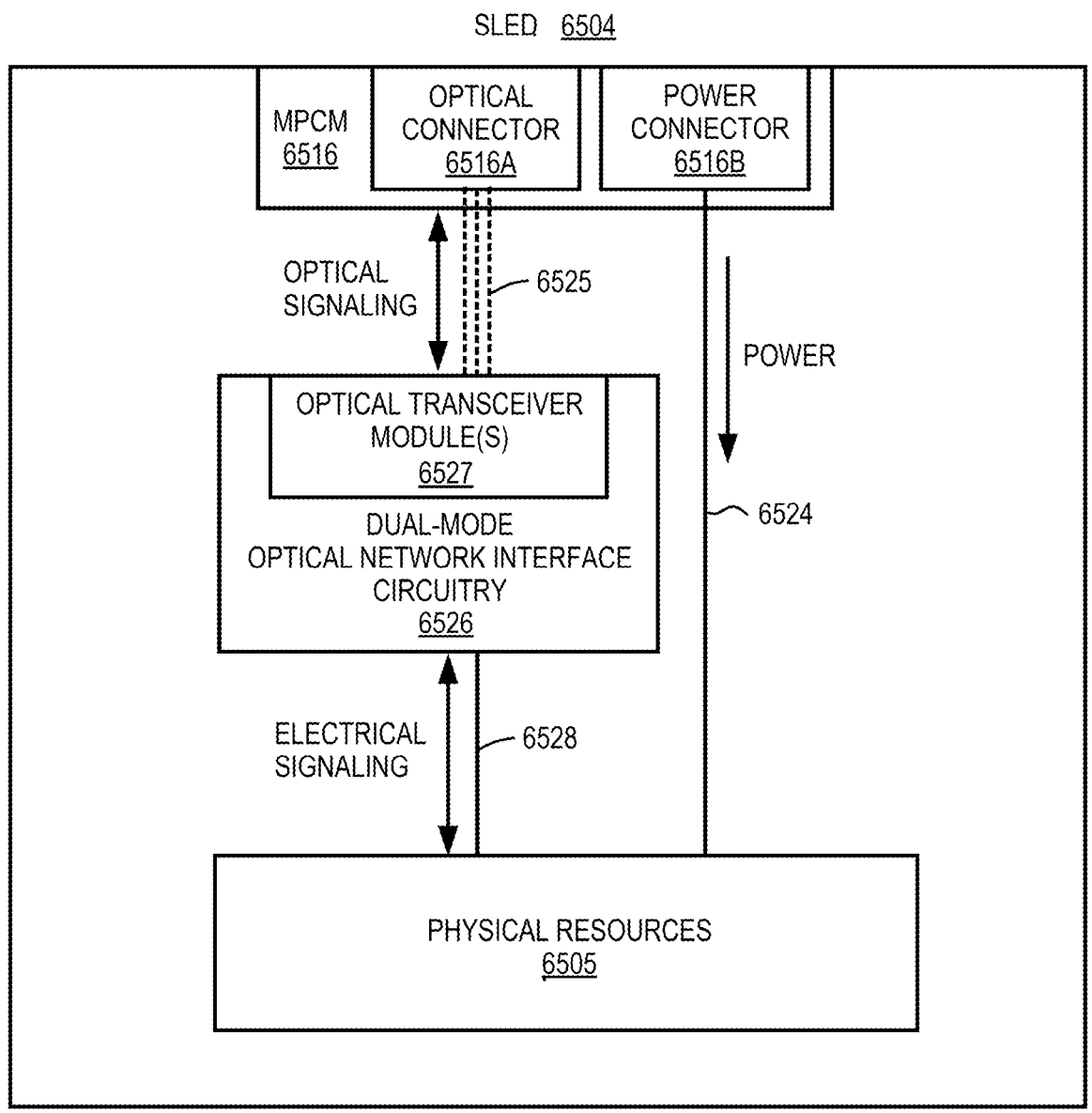

FIG. 65 illustrates an example of a sled 6504 that may be representative of a sled designed for use in conjunction with rack 6402 of FIG. 64 according to some embodiments. Sled 6504 may feature an MPCM 6516 that comprises an optical connector 6516A and a power connector 6516B, and that is designed to couple with a counterpart MPCM of a sled space in conjunction with insertion of MPCM 6516 into that sled space. Coupling MPCM 6516 with such a counterpart MPCM may cause power connector 6516 to couple with a power connector comprised in the counterpart MPCM. This may generally enable physical resources 6505 of sled 6504 to source power from an external source, via power connector 6516 and power transmission media 6524 that conductively couples power connector 6516 to physical resources 6505.

Sled 6504 may also include dual-mode optical network interface circuitry 6526. Dual-mode optical network interface circuitry 6526 may generally comprise circuitry that is capable of communicating over optical signaling media according to each of multiple link-layer protocols supported by dual-mode optical switching infrastructure 6414 of FIG. 64. In some embodiments, dual-mode optical network interface circuitry 6526 may be capable both of Ethernet protocol communications and of communications according to a second, high-performance protocol. In various embodiments, dual-mode optical network interface circuitry 6526 may include one or more optical transceiver modules 6527, each of which may be capable of transmitting and receiving optical signals over each of one or more optical channels. The embodiments are not limited in this context.

Coupling MPCM 6516 with a counterpart MPCM of a sled space in a given rack may cause optical connector 6516A to couple with an optical connector comprised in the counterpart MPCM. This may generally establish optical connectivity between optical cabling of the sled and dual-mode optical network interface circuitry 6526, via each of a set of optical channels 6525. Dual-mode optical network interface circuitry 6526 may communicate with the physical resources 6505 of sled 6504 via electrical signaling media 6528. In addition to the dimensions of the sleds and arrangement of components on the sleds to provide improved cooling and enable operation at a relatively higher thermal envelope (e.g., 250 W), as described above with reference to FIG. 64, in some embodiments, a sled may include one or more additional features to facilitate air cooling, such as a heatpipe and/or heat sinks arranged to dissipate heat generated by physical resources 6505. It is worthy of note that although the example sled 6504 depicted in FIG. 65 does not feature an expansion connector, any given sled that features the design elements of sled 6504 may also feature an expansion connector according to some embodiments. The embodiments are not limited in this context.

Figure 66:
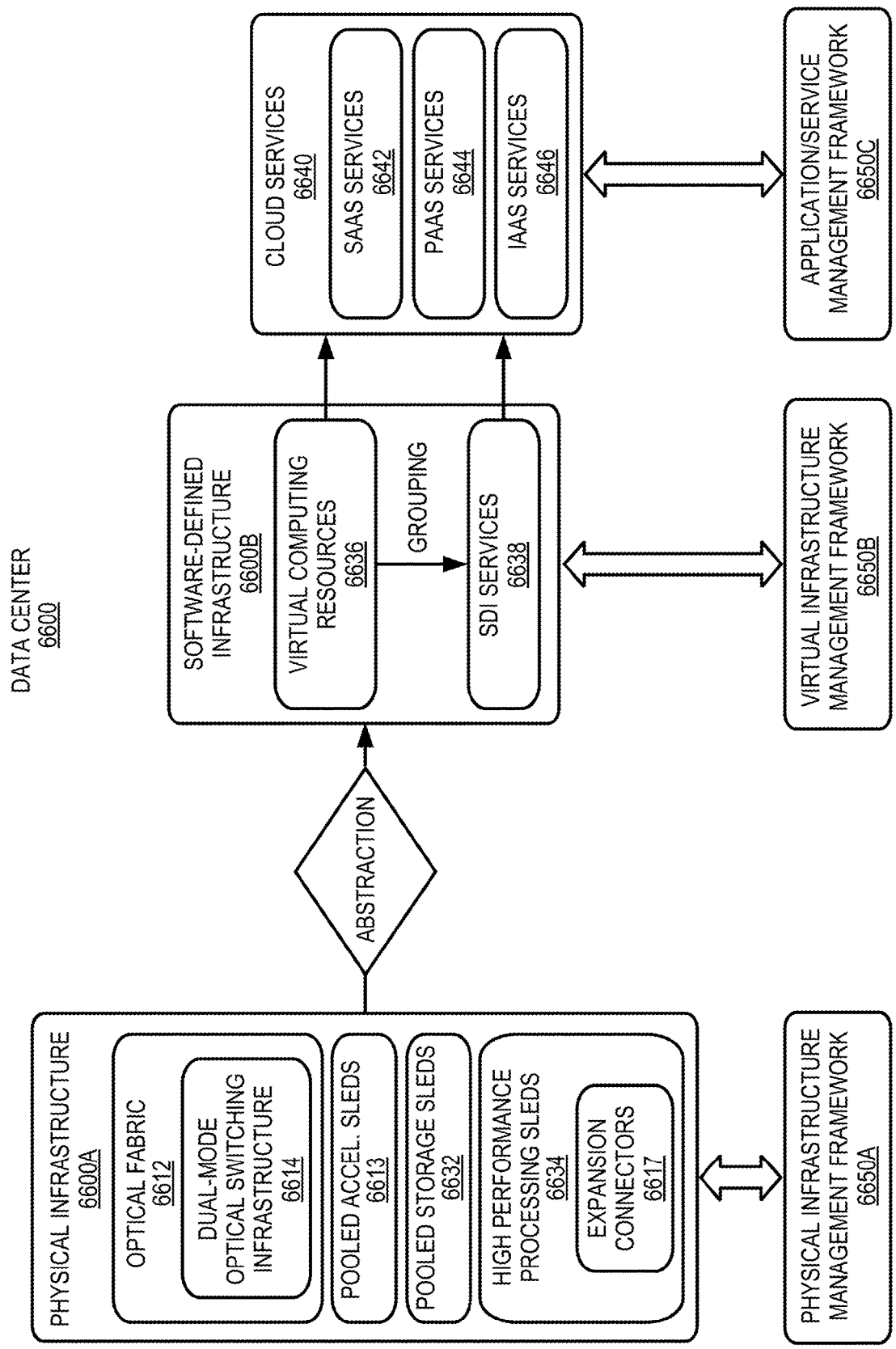

FIG. 66 illustrates an example of a data center 6600 that may generally be representative of one in/for which one or more techniques described herein may be implemented according to various embodiments. As reflected in FIG. 66, a physical infrastructure management framework 6650A may be implemented to facilitate management of a physical infrastructure 6600A of data center 6600. In various embodiments, one function of physical infrastructure management framework 6650A may be to manage automated maintenance functions within data center 6600, such as the use of robotic maintenance equipment to service computing equipment within physical infrastructure 6600A. In some embodiments, physical infrastructure 6600A may feature an advanced telemetry system that performs telemetry reporting that is sufficiently robust to support remote automated management of physical infrastructure 6600A. In various embodiments, telemetry information provided by such an advanced telemetry system may support features such as failure prediction/prevention capabilities and capacity planning capabilities. In some embodiments, physical infrastructure management framework 6650A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 66, the physical infrastructure 6600A of data center 6600 may comprise an optical fabric 6612, which may include a dual-mode optical switching infrastructure 6614. Optical fabric 6612 and dual-mode optical switching infrastructure 6614 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 6600. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 6630 may be included among the physical infrastructure 6600A of data center 6600, each of which may comprise a pool of accelerator resources—such as co-processors and/or FPGAs, for example—that is available globally accessible to other sleds via optical fabric 6612 and dual-mode optical switching infrastructure 6614.

In another example, in various embodiments, one or more pooled storage sleds 6632 may be included among the physical infrastructure 6600A of data center 6600, each of which may comprise a pool of storage resources that is available globally accessible to other sleds via optical fabric 6612 and dual-mode optical switching infrastructure 6614. In some embodiments, such pooled storage sleds 6632 may comprise pools of solid-state storage devices such as solid-state drives (SSDs). In various embodiments, one or more high-performance processing sleds 6634 may be included among the physical infrastructure 6600A of data center 6600. In some embodiments, high-performance processing sleds 6634 may comprise pools of high-performance processors, as well as cooling features that enhance air cooling to yield a higher thermal envelope of up to 250 W or more. In various embodiments, any given high-performance processing sled 6634 may feature an expansion connector 6617 that can accept a far memory expansion sled, such that the far memory that is locally available to that high-performance processing sled 6634 is disaggregated from the processors and near memory comprised on that sled. In some embodiments, such a high-performance processing sled 6634 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 61. The embodiments are not limited in this context.

In various embodiments, one or more layers of abstraction may be applied to the physical resources of physical infrastructure 6600A in order to define a virtual infrastructure, such as a software-defined infrastructure 6600B. In some embodiments, virtual computing resources 6636 of software-defined infrastructure 6600B may be allocated to support the provision of cloud services 6640. In various embodiments, particular sets of virtual computing resources 6636 may be grouped for provision to cloud services 6640 in the form of SDI services 6638. Examples of cloud services 6640 may include—without limitation—software as a service (SaaS) services 6642, platform as a service (PaaS) services 6644, and infrastructure as a service (IaaS) services 6646.

In some embodiments, management of software-defined infrastructure 6600B may be conducted using a virtual infrastructure management framework 6650B. In various embodiments, virtual infrastructure management framework 6650B may be designed to implement workload fingerprinting techniques and/or machine-learning techniques in conjunction with managing allocation of virtual computing resources 6636 and/or SDI services 6638 to cloud services 6640. In some embodiments, virtual infrastructure management framework 6650B may use/consult telemetry data in conjunction with performing such resource allocation. In various embodiments, an application/service management framework 6650C may be implemented in order to provide QoS management capabilities for cloud services 6640. The embodiments are not limited in this context.

Operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

One or more parts of embodiments of the invention may be implemented using different combinations of software, firmware, and/or hardware. Embodiments may be implemented using an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) may include hardware and software, such as a set of one or more processors coupled to one or more machine-readable storage media to store code for execution on the set of processors and/or to store data. For instance, an electronic device may include non-volatile memory containing the code since the non-volatile memory may persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
    an instruction decoder configured to decode a plurality of instructions to be executed by an execution unit;
    register renaming circuitry configured to eliminate move instructions from the plurality of instructions to be executed by the execution unit, the register renaming circuitry including a register alias table (RAT) including a plurality of entry locations, at least one of the entry locations including a physical register file identifier field, a sign-extend indicator field, a zero-extend indicator field, and a zero indicator field; and
    a multiplexer configured to select between a modified source operand and an unmodified source operand for use by the execution unit, wherein the selection is based on the sign-extend indicator, the zero-extend indicator, and the zero indicator.

2. The processor of claim 1, wherein the multiplexer is to select the modified source operand in response to the zero indicator indicating that the unmodified source operand is to be replaced with a zero.

3. The processor of claim 1, wherein the multiplexer is to select the modified source operand in response to the sign-extend indicator indicating that the unmodified source operand is to be sign-extended.

4. The processor of claim 1, wherein the multiplexer is to select the modified source operand in response to the zero-extend indicator indicating that the unmodified source operand is to be zero-extended.

5. The processor of claim 1, further comprising a micro-operation cache to store metadata to indicate elimination of a micro-operation decoded from a move instruction.

6. A method comprising:
    decoding a plurality of instructions to be executed by an execution unit;
    allocating an entry in a register alias table (RAT) for eliminating a move instruction from the plurality of instructions to be executed by the execution unit, the RAT including a plurality of entry locations, at least one of the entry locations including a physical register file identifier field, a sign-extend indicator field, a zero-extend indicator field, and a zero indicator field; and
    selecting between a modified source operand and an unmodified source operand for use by the execution unit, wherein the selection is based on the sign-extend indicator, the zero-extend indicator, and the zero indicator.

7. The method of claim 6, wherein selecting includes selecting the modified source operand in response to the zero indicator indicating that the unmodified source operand is to be replaced with a zero.

8. The method of claim 6, wherein selecting includes selecting the modified source operand in response to the sign-extend indicator indicating that the unmodified source operand is to be sign-extended.

9. The method of claim 6, wherein selecting includes selecting the the modified source operand in response to the zero-extend indicator indicating that the unmodified source operand is to be zero-extended.

10. The method of claim 6, further comprising storing metadata in a micro-operation cache to indicate elimination of a micro-operation decoded from the move instruction.

11. A system comprising:
    a system memory including dynamic random-access memory;
    a plurality of cores, each core including:
        an instruction decoder configured to decode a plurality of instructions to be executed by an execution unit;
        register renaming circuitry configured to eliminate move instructions from the plurality of instructions to be executed by the execution unit, the register renaming circuitry including a register alias table (RAT) including a plurality of entry locations, at least one of the entry locations including a physical register file identifier field, a sign-extend indicator field, a zero-extend indicator field, and a zero indicator field; and
        a multiplexer configured to select between a modified source operand and an unmodified source operand for use by the execution unit, wherein the selection is based on the sign-extend indicator, the zero-extend indicator, and the zero indicator.

12. The system of claim 11, wherein the multiplexer is to select the modified source operand in response to the zero indicator indicating that the unmodified source operand is to be replaced with a zero.

13. The system of claim 11, wherein the multiplexer is to select the modified source operand in response to the sign-extend indicator indicating that the unmodified source operand is to be sign-extended.

14. The system of claim 11, wherein the multiplexer is to select the modified source operand in response to the zero-extend indicator indicating that the unmodified source operand is to be zero-extended.

15. The system of claim 11, wherein each core also includes a micro-operation cache to store metadata to indicate elimination of a micro-operation decoded from the move instruction.

* * * * *